US008809037B2

(12) United States Patent
Haley, III et al.

(10) Patent No.: US 8,809,037 B2
(45) Date of Patent: Aug. 19, 2014

(54) SYSTEMS, APPARATUSES AND METHODS FOR TREATING WASTEWATER

(75) Inventors: John W. Haley, III, Providence, RI (US); Toby D. Ahrens, Arlington, MA (US); Shawn R. Kitchner, Pawtucket, RI (US)

(73) Assignee: BioProcessH20 LLC, Portsmouth, RI (US)

( * ) Notice: Subject to any disclaimer, the term of this patent is extended or adjusted under 35 U.S.C. 154(b) by 598 days.

(21) Appl. No.: 12/903,568

(22) Filed: Oct. 13, 2010

(65) Prior Publication Data

US 2011/0068057 A1 Mar. 24, 2011

Related U.S. Application Data

(63) Continuation-in-part of application No. 12/768,361, filed on Apr. 27, 2010, which is a continuation-in-part of application No. 12/605,121, filed on Apr. 23, 2009.

(60) Provisional application No. 61/108,183, filed on Oct. 24, 2008, provisional application No. 61/175,950, filed on May 6, 2009, provisional application No. 61/241,520, filed on Sep. 11, 2009, provisional application No. 61/251,183, filed on Oct. 13, 2009, provisional application No. 61/385,719, filed on Sep. 23, 2010.

(51) Int. Cl.

| | |
|---|---|
| ***A62D 3/00*** | (2006.01) |
| ***A62D 3/02*** | (2007.01) |
| ***B09B 3/00*** | (2006.01) |
| ***B09C 1/10*** | (2006.01) |
| ***C12N 1/00*** | (2006.01) |

(52) U.S. Cl.

USPC .................... 435/262.5; 435/243; 435/256.8; 435/821

(58) Field of Classification Search

None

See application file for complete search history.

(56) References Cited

U.S. PATENT DOCUMENTS

| | | | |
|---|---|---|---|
| 458,788 | A | 9/1891 | Jungbluth |
| 469,044 | A | 2/1892 | Jungbluth |
| 681,884 | A | 9/1901 | Monjeau |
| 877,569 | A | 1/1908 | Joseph |
| 910,400 | A | 1/1909 | Lischer |
| 968,015 | A | 8/1910 | Wilkie |
| 978,889 | A | 12/1910 | Imhoff |
| 1,187,814 | A | 6/1916 | Carter |
| 1,753,980 | A | 4/1930 | Baumgartner |
| 2,008,507 | A | 7/1935 | Laughlin |
| 2,141,979 | A | 12/1938 | Halvorson et al. |
| 2,142,196 | A | 1/1939 | Langdon |
| 2,220,859 | A | 11/1940 | Bispham et al. |
| 2,308,866 | A | 1/1943 | Dekema |
| 2,437,210 | A | 10/1944 | Riebli |
| 2,580,764 | A | 1/1952 | Gunz |
| 2,732,663 | A | 5/1952 | Dewey, II |
| 2,854,792 | A | 9/1956 | Juda |
| 2,815,607 | A | 12/1957 | Schroeder |
| 3,160,141 | A | 12/1964 | Crutchfield |
| 3,231,490 | A | 1/1966 | Fry |
| 3,238,124 | A | 3/1966 | Burton |
| 3,274,730 | A | 9/1966 | Bose |
| 3,275,147 | A | 9/1966 | Glide |
| 3,348,922 | A | 10/1967 | Bose et al. |
| 3,398,481 | A | 8/1968 | Lake |
| 3,407,935 | A | 10/1968 | Burton |
| 3,465,654 | A | 9/1969 | Fox |
| 3,468,057 | A | 9/1969 | Buisson et al. |
| 3,577,678 | A | 5/1971 | Burton |
| 3,610,532 | A | 10/1971 | Modrey |
| 3,768,200 | A | 10/1973 | Klock |
| 3,835,039 | A | 9/1974 | Ciambrone |
| 3,876,542 | A | 4/1975 | Carlson |
| 3,955,317 | A | 5/1976 | Gudin |
| 3,959,923 | A | 6/1976 | Selke |
| 4,003,160 | A | 1/1977 | Muller |
| 4,011,162 | A | 3/1977 | Oldham et al. |
| 4,041,640 | A | 8/1977 | Itanami et al. |
| 4,086,161 | A | 4/1978 | Burton |

(Continued)

FOREIGN PATENT DOCUMENTS

| | | |
|---|---|---|
| AU | 2003234604 AA | 11/2003 |
| AU | 2005274791 AA | 2/2006 |

(Continued)

OTHER PUBLICATIONS

"CO2 Fixation and Oil Production Using Micro-Algae", Michimasa Kishimoto, et al., published in the Journal of Fermentation and Bioengineering in 1994, vol. 78, Issue 6, pp. 479-482.

(Continued)

*Primary Examiner* — Debbie K Ware

(74) *Attorney, Agent, or Firm* — Edwards Wildman Palmer LLP; David J. Silvia

(57) ABSTRACT

Systems, apparatuses, and methods of treating wastewater are provided. In some aspects, a container may be provided and may include a first member, a second member spaced apart from the first member, and media supported by and extending between the first and second members. An organism may be introduced into the container and wastewater may be introduced into the container for treatment. The media may be loop cord media. In other aspects, two containers may be provided and wastewater may be initially introduced into a first container for treatment, removed from the first container, and subsequently introduced into the second container for further treatment. A first species of organism may be present in the first container and a second species of organism may be present in the second container. Methods of using these containers are also provided.

16 Claims, 118 Drawing Sheets

(56) References Cited

U.S. PATENT DOCUMENTS

| | | | |
|---|---|---|---|
| 4,088,571 | A | 5/1978 | Helgesson |
| 4,093,539 | A | 6/1978 | Guarino |
| 4,128,205 | A | 12/1978 | Coash |
| RE29,970 | E | 4/1979 | Torpey |
| 4,181,514 | A | 1/1980 | Lefkowitz et al. |
| 4,209,943 | A | 7/1980 | Moeller et al. |
| 4,217,728 | A | 8/1980 | Shimamatsu et al. |
| 4,279,753 | A | 7/1981 | Nielson et al. |
| 4,320,008 | A | 3/1982 | Kokubo |
| 4,324,067 | A | 4/1982 | Kessler |
| 4,324,068 | A | 4/1982 | Anthony |
| 4,341,038 | A | 7/1982 | Bloch et al. |
| 4,411,780 | A | 10/1983 | Suzuki et al. |
| 4,422,930 | A | 12/1983 | Hatanaka |
| 4,438,591 | A | 3/1984 | Kessler |
| 4,446,236 | A | 5/1984 | Clyde |
| 4,451,362 | A | 5/1984 | Spelsberg |
| 4,473,970 | A | 10/1984 | Hills |
| 4,504,393 | A | 3/1985 | Davies |
| 4,584,791 | A | 4/1986 | Wolf |
| 4,676,956 | A | 6/1987 | Mori |
| 4,679,578 | A | 7/1987 | Miller |
| 4,690,849 | A | 9/1987 | Fukuda et al. |
| 4,717,519 | A | 1/1988 | Sagami |
| 4,729,828 | A | 3/1988 | Miller |
| 4,800,674 | A | 1/1989 | Sprung |
| 4,857,464 | A | 8/1989 | Weathers et al. |
| 4,868,123 | A | 9/1989 | Berson et al. |
| 4,871,551 | A | 10/1989 | Spencer |
| 4,895,645 | A | 1/1990 | Zorich, Jr. |
| 4,900,678 | A | 2/1990 | Mori |
| 4,929,484 | A | 5/1990 | Basse |
| 4,949,905 | A | 8/1990 | Jones et al. |
| 4,952,511 | A | 8/1990 | Radmer |
| 4,956,936 | A | 9/1990 | Sprung |
| 4,970,166 | A | 11/1990 | Mori |
| 4,996,791 | A | 3/1991 | Sprung |
| 5,001,859 | A | 3/1991 | Sprung |
| 5,011,605 | A | 4/1991 | Pape et al. |
| 5,038,517 | A | 8/1991 | Talbott |
| 5,085,766 | A | 2/1992 | Born |
| 5,104,803 | A | 4/1992 | Delente |
| 5,151,347 | A | 9/1992 | Delente et al. |
| 5,160,395 | A | 11/1992 | Basse et al. |
| 5,162,051 | A | 11/1992 | Hoeksema |
| 5,212,903 | A | 5/1993 | Talbott |
| 5,232,676 | A | 8/1993 | Wolff et al. |
| 5,240,600 | A | 8/1993 | Wang et al. |
| 5,267,695 | A | 12/1993 | Thayer |
| 5,276,977 | A | 1/1994 | Cysewski |
| 5,307,590 | A | 5/1994 | Brown et al. |
| 5,324,658 | A | 6/1994 | Cox et al. |
| 5,389,248 | A | 2/1995 | Pare et al. |
| 5,397,474 | A | 3/1995 | Henry |
| 5,399,266 | A | 3/1995 | Hasegawa et al. |
| 5,423,988 | A | 6/1995 | Yamasaki et al. |
| 5,466,434 | A | 11/1995 | Kyle |
| 5,492,938 | A | 2/1996 | Kyle et al. |
| 5,527,456 | A | 6/1996 | Jensen |
| 5,549,828 | A | 8/1996 | Ehrlich |
| 5,558,461 | A | 9/1996 | Van Dorp |
| 5,573,669 | A | 11/1996 | Jensen |
| 5,580,644 | A | 12/1996 | Minami |
| 5,585,266 | A | 12/1996 | Plitt et al. |
| 5,587,239 | A | 12/1996 | Ueba et al. |
| 5,594,973 | A | 1/1997 | Brusseleers |
| 5,622,630 | A | 4/1997 | Romano |
| 5,659,977 | A | 8/1997 | Jensen et al. |
| 5,711,983 | A | 1/1998 | Kyle et al. |
| 5,771,716 | A | 6/1998 | Schlussel |
| 5,846,423 | A | 12/1998 | Jensen |
| 5,863,433 | A | 1/1999 | Behrends |
| 5,943,818 | A | 8/1999 | Fruehwirth |
| 5,954,087 | A | 9/1999 | Wolf et al. |
| 5,958,239 | A | 9/1999 | Sing |
| 5,958,761 | A | 9/1999 | Yogev et al. |
| 5,976,377 | A | 11/1999 | Hyfantis, Jr. et al. |
| 5,997,972 | A | 12/1999 | Basse |
| 6,015,618 | A | 1/2000 | Orima |
| 6,039,965 | A | 3/2000 | Donlan et al. |
| 6,063,348 | A | 5/2000 | Hinke et al. |
| 6,174,720 | B1 | 1/2001 | Oxley et al. |
| 6,176,440 | B1 | 1/2001 | Elliott |
| 6,238,563 | B1 | 5/2001 | Carroll et al. |
| 6,241,889 | B1 | 6/2001 | Haley, III |
| 6,245,555 | B1 | 6/2001 | Curtis |
| 6,274,035 | B1 | 8/2001 | Yuan et al. |
| 6,319,407 | B1 | 11/2001 | Määttäet al. |
| 6,382,525 | B1 | 5/2002 | Santiesteban et al. |
| 6,406,630 | B1 | 6/2002 | Henry |
| 6,447,681 | B1 | 9/2002 | Carlberg et al. |
| 6,509,188 | B1 | 1/2003 | Trösch et al. |
| 6,524,486 | B2 | 2/2003 | Borodyanski et al. |
| 6,554,233 | B1 | 4/2003 | Ungerecht |
| 6,566,123 | B1 | 5/2003 | Barclay |
| 6,571,735 | B1 | 6/2003 | Wilkinson |
| 6,607,900 | B2 | 8/2003 | Bailey et al. |
| 6,617,155 | B1 | 9/2003 | Van Toever |
| 6,667,171 | B2 | 12/2003 | Bayless et al. |
| 6,698,383 | B1 | 3/2004 | Terwort et al. |
| 6,753,178 | B2 | 6/2004 | Adelberg et al. |
| 6,794,183 | B2 | 9/2004 | Wildi |
| 6,808,135 | B1 | 10/2004 | Landry |
| 6,854,209 | B2 | 2/2005 | Van Horssen et al. |
| 6,875,344 | B2 | 4/2005 | Haley, III |
| 6,881,340 | B2 | 4/2005 | Haley, III |
| 6,883,732 | B2 | 4/2005 | Hasegawa |
| 6,884,342 | B2 | 4/2005 | Haley, III |
| 6,932,279 | B2 | 8/2005 | Burcham |
| 6,939,462 | B2 | 9/2005 | Haley, III |
| 6,955,275 | B2 | 10/2005 | Haley, III |
| 6,997,406 | B2 | 2/2006 | Nelson et al. |
| 7,005,280 | B2 | 2/2006 | Barclay |
| 7,011,962 | B2 | 3/2006 | Barclay |
| 7,070,122 | B2 | 7/2006 | Burcham et al. |
| 7,135,290 | B2 | 11/2006 | Dillon |
| 7,163,811 | B2 | 1/2007 | Behrens et al. |
| 7,172,691 | B2 | 2/2007 | Dunlop et al. |
| 7,252,979 | B2 | 8/2007 | Behrens et al. |
| 7,300,789 | B2 | 11/2007 | Martin et al. |
| 7,351,558 | B2 | 4/2008 | Ruecker et al. |
| 7,381,558 | B2 | 6/2008 | Barclay |
| 7,401,575 | B2 | 7/2008 | Waybright |
| 7,416,668 | B1 | 8/2008 | Theodore |
| 7,429,329 | B2 | 9/2008 | Theodore |
| 7,455,773 | B1 | 11/2008 | Harmon et al. |
| 7,536,827 | B2 | 5/2009 | Busch et al. |
| 7,563,372 | B1 | 7/2009 | Theodore |
| 7,579,174 | B2 | 8/2009 | Bailey et al. |
| 7,597,145 | B2 | 10/2009 | Allard et al. |
| 7,617,644 | B2 | 11/2009 | Nielsen |
| 7,618,813 | B2 | 11/2009 | Lee et al. |
| 7,677,475 | B2 | 3/2010 | Lawyer |
| 7,682,821 | B2 | 3/2010 | Woods et al. |
| 7,794,969 | B1 | 9/2010 | Reppas et al. |
| 7,905,930 | B2 | 3/2011 | Oyler |
| 7,942,345 | B2 | 5/2011 | Sesser et al. |
| 7,977,085 | B2 | 7/2011 | Rispoli |
| 8,003,379 | B2 | 8/2011 | Goldman et al. |
| 8,110,395 | B2 | 2/2012 | Lewnard et al. |
| 8,126,780 | B2 | 2/2012 | Iwai et al. |
| 8,198,076 | B2 | 6/2012 | Hu et al. |
| 2001/0031491 | A1 | 10/2001 | Curtis |
| 2002/0034817 | A1 | 3/2002 | Henry et al. |
| 2002/0079270 | A1 | 6/2002 | Borodyanski et al. |
| 2003/0017558 | A1 | 1/2003 | Pham et al. |
| 2003/0059932 | A1 | 3/2003 | Craigie et al. |
| 2003/0073231 | A1 | 4/2003 | Dutil |
| 2003/0129743 | A1 | 7/2003 | Wildi et al. |
| 2003/0143727 | A1 | 7/2003 | Chang |
| 2003/0180898 | A1 | 9/2003 | Bailey et al. |
| 2004/0000518 | A1 | 1/2004 | Haley |
| 2004/0029267 | A1 | 2/2004 | Martin et al. |
| 2004/0049976 | A1 | 3/2004 | Maffei |

(56) References Cited

U.S. PATENT DOCUMENTS

| | | | |
|---|---|---|---|
| 2004/0208892 | A1 | 10/2004 | Evan et al. |
| 2004/0209256 | A1 | 10/2004 | Dillon |
| 2004/0219648 | A1 | 11/2004 | Barclay |
| 2005/0064577 | A1 | 3/2005 | Berzin |
| 2005/0133444 | A1 | 6/2005 | Warrow |
| 2005/0239182 | A1 | 10/2005 | Berzin |
| 2005/0260553 | A1 | 11/2005 | Berzin |
| 2005/0266541 | A1 | 12/2005 | Dillon |
| 2005/0268544 | A1 | 12/2005 | Maffei |
| 2005/0287561 | A1 | 12/2005 | Dillon et al. |
| 2006/0035370 | A1 | 2/2006 | Lee et al. |
| 2006/0053691 | A1 | 3/2006 | Harwood et al. |
| 2006/0068492 | A1 | 3/2006 | Choi et al. |
| 2006/0100279 | A1 | 5/2006 | Behrens et al. |
| 2006/0122410 | A1 | 6/2006 | Fichtali |
| 2006/0188969 | A1 | 8/2006 | Barclay |
| 2006/0241287 | A1 | 10/2006 | Hecht et al. |
| 2006/0246581 | A1 | 11/2006 | Tomita |
| 2006/0257281 | A1 | 11/2006 | Weide et al. |
| 2006/0286205 | A1 | 12/2006 | Fichtali et al. |
| 2006/0286649 | A1 | 12/2006 | Bailey et al. |
| 2007/0009942 | A1 | 1/2007 | Dillon |
| 2007/0048848 | A1 | 3/2007 | Sears |
| 2007/0054351 | A1 | 3/2007 | Sears |
| 2007/0099280 | A1 | 5/2007 | Barclay |
| 2007/0151923 | A1 | 7/2007 | Haley, III |
| 2007/0155006 | A1 | 7/2007 | Levin |
| 2007/0166266 | A1 | 7/2007 | Dillon et al. |
| 2007/0166449 | A1 | 7/2007 | Dillon et al. |
| 2007/0167398 | A1 | 7/2007 | Dillon et al. |
| 2007/0191303 | A1 | 8/2007 | Dillon et al. |
| 2007/0231219 | A1 | 10/2007 | Warrow et al. |
| 2007/0264708 | A1 | 11/2007 | Bayless et al. |
| 2007/0289206 | A1 | 12/2007 | Kertz |
| 2008/0009055 | A1 | 1/2008 | Lewnard |
| 2008/0023387 | A1 | 1/2008 | Harris |
| 2008/0032359 | A1 | 2/2008 | Behrens et al. |
| 2008/0032366 | A1 | 2/2008 | Bailey et al. |
| 2008/0032381 | A1 | 2/2008 | Bailey et al. |
| 2008/0032387 | A1 | 2/2008 | Bailey et al. |
| 2008/0038774 | A1 | 2/2008 | Higashiyama et al. |
| 2008/0040970 | A1 | 2/2008 | Davanzo |
| 2008/0044865 | A1 | 2/2008 | Behrens et al. |
| 2008/0044866 | A1 | 2/2008 | Behrens et al. |
| 2008/0052987 | A1 | 3/2008 | Busch et al. |
| 2008/0053880 | A1 | 3/2008 | Miller |
| 2008/0057551 | A1 | 3/2008 | Bailey et al. |
| 2008/0086937 | A1 | 4/2008 | Hazlebeck et al. |
| 2008/0086938 | A1 | 4/2008 | Hazlebeck et al. |
| 2008/0086939 | A1 | 4/2008 | Dunlop et al. |
| 2008/0096267 | A1 | 4/2008 | Howard et al. |
| 2008/0110827 | A1 | 5/2008 | Cote et al. |
| 2008/0118964 | A1 | 5/2008 | Huntley et al. |
| 2008/0124756 | A1 | 5/2008 | Dillon |
| 2008/0135457 | A1 | 6/2008 | Ridge |
| 2008/0135474 | A1 | 6/2008 | Limcaco |
| 2008/0135475 | A1 | 6/2008 | Limcaco |
| 2008/0138851 | A1 | 6/2008 | Apt et al. |
| 2008/0155890 | A1 | 7/2008 | Oyler |
| 2008/0160591 | A1 | 7/2008 | Willson et al. |
| 2008/0163804 | A1 | 7/2008 | Hauk |
| 2008/0178739 | A1 | 7/2008 | Lewnard et al. |
| 2008/0220486 | A1 | 9/2008 | Weiss |
| 2008/0241902 | A1 | 10/2008 | Berry et al. |
| 2008/0257809 | A1 | 10/2008 | Baskis et al. |
| 2008/0274494 | A1 | 11/2008 | Kertz |
| 2008/0286851 | A1 | 11/2008 | Whitton |
| 2008/0293132 | A1 | 11/2008 | Goldman et al. |
| 2008/0295400 | A1 | 12/2008 | Harwood et al. |
| 2008/0299147 | A1 | 12/2008 | Dillon et al. |
| 2008/0311649 | A1 | 12/2008 | Cloud et al. |
| 2009/0000941 | A1 | 1/2009 | Kropf |
| 2009/0004715 | A1 | 1/2009 | Trimbur et al. |
| 2009/0007779 | A1 | 1/2009 | Coignet et al. |
| 2009/0011480 | A1 | 1/2009 | Trimbur et al. |
| 2009/0011492 | A1 | 1/2009 | Berzin |
| 2009/0023180 | A1 | 1/2009 | Dillon |
| 2009/0035842 | A1 | 2/2009 | Trimbur et al. |
| 2009/0047721 | A1 | 2/2009 | Trimbur et al. |
| 2009/0047722 | A1 | 2/2009 | Wilkerson et al. |
| 2009/0061493 | A1 | 3/2009 | Trimbur et al. |
| 2009/0064567 | A1 | 3/2009 | Lippmeier et al. |
| 2009/0068727 | A1 | 3/2009 | Karr |
| 2009/0069213 | A1 | 3/2009 | Avila et al. |
| 2009/0078788 | A1 | 3/2009 | Holmes |
| 2009/0087890 | A1 | 4/2009 | Pyle et al. |
| 2009/0126260 | A1 | 5/2009 | Aravanis et al. |
| 2009/0130706 | A1 | 5/2009 | Berzin et al. |
| 2009/0130747 | A1 | 5/2009 | Wen-Teng et al. |
| 2009/0148918 | A1 | 6/2009 | Trimbur et al. |
| 2009/0148927 | A1 | 6/2009 | Schroeder et al. |
| 2009/0148931 | A1 | 6/2009 | Wilkerson et al. |
| 2009/0155864 | A1 | 6/2009 | Bauer et al. |
| 2009/0162919 | A1 | 6/2009 | Radaelli et al. |
| 2009/0162922 | A1 | 6/2009 | De Mattia et al. |
| 2009/0181434 | A1 | 7/2009 | Aikens et al. |
| 2009/0181436 | A1 | 7/2009 | Beecher et al. |
| 2009/0197322 | A1 | 8/2009 | Goldman |
| 2009/0215155 | A1 | 8/2009 | Cloud et al. |
| 2009/0215179 | A1 | 8/2009 | Gressel et al. |
| 2009/0230040 | A1 | 9/2009 | Limcaco |
| 2009/0236282 | A1 | 9/2009 | Wang |
| 2009/0249685 | A1 | 10/2009 | Flowers et al. |
| 2009/0274736 | A1 | 11/2009 | Dillon et al. |
| 2009/0275120 | A1 | 11/2009 | Koch et al. |
| 2009/0280545 | A1 | 11/2009 | Mendez et al. |
| 2009/0285850 | A1 | 11/2009 | Dillon et al. |
| 2009/0294354 | A1 | 12/2009 | Theodore et al. |
| 2009/0299643 | A1 | 12/2009 | Anastassiou et al. |
| 2009/0305942 | A1 | 12/2009 | Day et al. |
| 2010/0018214 | A1 | 1/2010 | Halachmi Katchanov |
| 2010/0035343 | A1 | 2/2010 | Cheng et al. |
| 2010/0068801 | A1 | 3/2010 | Woods et al. |
| 2010/0071629 | A1 | 3/2010 | Wu et al. |
| 2010/0095583 | A1 | 4/2010 | King |
| 2010/0105125 | A1 | 4/2010 | Haley, III |
| 2010/0144017 | A1 | 6/2010 | Shepherd |
| 2010/0162621 | A1 | 7/2010 | Seebo |
| 2010/0170149 | A1 | 7/2010 | Keeler et al. |
| 2010/0170150 | A1 | 7/2010 | Walsh, Jr. |
| 2010/0236135 | A1 | 9/2010 | Kleinberger |
| 2010/0279395 | A1 | 11/2010 | Haley, III |
| 2010/0297739 | A1 | 11/2010 | Steiner et al. |
| 2011/0039326 | A1 | 2/2011 | Morris et al. |
| 2011/0065157 | A1 | 3/2011 | Gorny et al. |
| 2011/0073542 | A1 | 3/2011 | Adey et al. |
| 2011/0076747 | A1 | 3/2011 | Cloud et al. |
| 2011/0081710 | A1 | 4/2011 | Wright et al. |
| 2011/0119999 | A1 | 5/2011 | Adey et al. |
| 2011/0131876 | A1 | 6/2011 | Pettibone |
| 2011/0165666 | A1 | 7/2011 | Dahle |
| 2011/0258915 | A1 | 10/2011 | Subhadra |
| 2011/0258920 | A1 | 10/2011 | Licamele et al. |
| 2011/0306121 | A1 | 12/2011 | Chou |
| 2012/0018373 | A1 | 1/2012 | Jones et al. |

FOREIGN PATENT DOCUMENTS

| | | | |
|---|---|---|---|
| AU | 2007273128 AA | | 1/2008 |
| AU | 2008246176 AA | | 11/2008 |
| CA | 2232707 | | 3/1997 |
| CA | 2488443 AA | | 11/2003 |
| CN | 1668185 | | 9/2005 |
| CN | 100374539 | | 9/2005 |
| DE | 102005025118 | | 1/2007 |
| DE | 102006031212 | | 9/2007 |
| EA | 0009596 | B1 | 2/2008 |
| EP | 0164508 | | 12/1985 |
| EP | 0761605 | A1 | 3/1997 |
| EP | 1277831 | | 1/2003 |
| EP | 1509076 | A1 | 3/2005 |
| EP | 2046938 | A2 | 4/2009 |
| EP | 2152848 | A2 | 2/2010 |
| GB | 2106493 | A | 4/1983 |

(56) References Cited

FOREIGN PATENT DOCUMENTS

| | | | |
|---|---|---|---|
| JP | 55147194 | | 11/1980 |
| JP | 56058588 | | 5/1981 |
| JP | 61293591 | | 12/1986 |
| JP | 61293592 | | 12/1986 |
| JP | 62083094 | | 4/1987 |
| JP | 62097695 | | 5/1987 |
| JP | 01034496 | | 2/1989 |
| JP | 07108293 | | 4/1995 |
| JP | H07-87955 | A | 4/1995 |
| JP | 07299487 | | 11/1995 |
| JP | 2002315458 | A | 10/2002 |
| JP | 2005533632 | T2 | 11/2005 |
| WO | WO-8602944 | A1 | 5/1986 |
| WO | 9711154 | | 3/1997 |
| WO | 03094598 | A1 | 11/2003 |
| WO | WO-2004093525 | A2 | 11/2004 |
| WO | 2005101525 | | 10/2005 |
| WO | 2006020177 | | 2/2006 |
| WO | 2007011343 | | 1/2007 |
| WO | 2007025145 | | 3/2007 |
| WO | 2007038605 | A2 | 4/2007 |
| WO | WO-2007104564 | A1 | 9/2007 |
| WO | 2007129327 | A1 | 11/2007 |
| WO | WO-2007/129327 | A1 | 11/2007 |
| WO | 2008008262 | | 1/2008 |
| WO | 2008008263 | | 1/2008 |
| WO | 2008079724 | | 7/2008 |
| WO | 2008134010 | | 11/2008 |
| WO | 2009051478 | | 4/2009 |
| WO | 2009051479 | | 4/2009 |
| WO | 2009051480 | | 4/2009 |
| WO | 2009096773 | | 8/2009 |
| WO | 2009129396 | A1 | 10/2009 |
| WO | 2009142765 | | 11/2009 |

OTHER PUBLICATIONS

"Single cell protein production of Euglena gracilic and carbo dioxide fixation in an innovative photo-bioreactor", S.R. Chae, et al., published in Bioresource Technology in 2006, vol. 97, Issue 2, pp. 322-329.
"Reduction of CO2 by a high-density culture of *Chlorella sp.* in a semicontinuous photobioreactor", Sheng-Yi Chiu, et al., published in Bioresource Technology at least as early as Jul. 17, 2008, vol. 99, Issue 9, pp. 3389-3396.
"Carbon Dioxide fixation by Chlorella Kessleri, C. Vulgaris, *Scenedesmus* obliquus and *Spirulina sp.* cultivated in flasks and vertical tubular photobioreactors", Michele Greque de Morais et al., published in Biotechnology Letters in 2007, vol. 29, Issue 9, pp. 1349-1352.
Solena Group, www.solenagroup.com/technology.htm, 6 pages, published at least as early as Feb. 5, 2010.
Livefuels, Inc., www.livefuels.com, 9 pages, published at least as early as Feb. 5, 2010.
Aquaflow Bionomic Corporation Limited, www.aquaflowgroup.com, 3 pages, published at least as early as Feb. 5, 2010.
Petrosun, Inc., www.petrosuninc.com, 9 pages, published at least as early as Feb. 5, 2010.
Petroalgae, Inc., www.petroalgae.com, 2 pages, published at least as early as Feb. 5, 2010.
Ternion Bio Industries, Inc., www.ternionbio.com, 5 pages, published at least as early as Feb. 5, 2010.
Organic Fuels, www.organicfuels.com, 8 pages, published at least as early as Feb. 5, 2010.
International Search Report and Written Opinion for PCT Patent Application No. PCT/US11/52842 dated Apr. 13, 2012, 14 pgs.
International Search Report and Written Opinion of PCT Patent Application No. PCT/US10/52474 dated Dec. 10, 2010, 11 pgs.
International Search Report dated Jun. 28, 2010 for PCT Patent Application No. PCT/US10/32574, 3 pgs.
Written Opinion of the International Searching Authority dated Jun. 28, 2010 for PCT Patent Application No. PCT/US10/32574, 3 pgs.
International Search Report dated Apr. 9, 2010 for PCT Patent Application No. PCT/US09/61878, 4 pgs.
Written Opinion of the International Searching Authority dated Apr. 9, 2010 for PCT Patent Application No. PCT/US09/61878, 20 pgs.
Advanced Lab Group, www.advancedlabgroup.com, 2 pages, published at least as early as Feb. 5, 2010.
Solix Biofuels, Inc., www.solixbiofuels.com, 11 pages, published at least as early as Feb. 8, 2010.
Sapphire Energy, www.sapphireenergy.com, 7 pages, published at least as early as Feb. 8, 2010.
Solazyme, Inc., www.solazyme.com, 3 pages, published at least as early as Feb. 8, 2010.
Blue Marble Energy, www.bluemarbleenergy.net, 5 pages, published at least as early as Feb. 8, 2010.
Inventure, Inc., www.inventurechem.com, 5 pages, published at least as early as Feb. 8, 2010.
Aurora Biofuels, www.aurorabiofuels.com, 6 pages, published at least as early as Feb. 8, 2010.
Bionavitas, Inc., www.bionavitas.com, 5 pages, published at least as early as Feb. 8, 2010.
Seambiotic Ltd., www.seambiotic.com, 4 pages, published at least as early as Feb. 8, 2010.
Martek Biosciences Corporation, www.martek.com, 4 pages, published at least as early as Feb. 8, 2010.
Cyanotech Corporation, www.cyanotech.com, 16 pages, published at least as early as Feb. 8, 2010.
Transalgae (Israel) Ltd., www.transalgae.com, 4 pages, published at least as early as Feb. 8, 2010.
XL Renewables, www.xlrenewables.com, 12 pages, published at least as early as Feb. 8, 2010.
Origin Oil, Inc., www.originoil.com, 23 pages, published at least as early as Feb. 8, 2010.
Carbon Capture Corporation, www.carbcc.com, 6 pages, published at least as early as Feb. 8, 2010.
Algaewheel Technologies LLC, www.algaewheel.com, 17 pages, published at least as early as Feb. 8, 2010.
Algaelink NV, www.algaelink.com, 18 pages, published at least as early as Feb. 8, 2010.
Brightsource Energy, Inc., www.brightsourceenergy.com, 12 pages, published at least as early as Feb. 8, 2010.
Sequest LLC, www.sequestllc.com, 1 page, published at least as early as Feb. 8, 2010.
Earth Renaissance Technologies LLC, www.earthrenaissancetechnologies.com, 8 pages, published at least as early as Feb. 8, 2010.
Thermal Energy International, Inc., www.thermalenergy.com, 7 pages, published at least as early as Feb. 8, 2010.
Bard Holding, Inc., www.bardholding.com, 6 pages, published at least as early as Feb. 5, 2010.
Bioalgene, www.bioalgene.com, 2 pages, published at least as early as Feb. 5, 2010.
Synthetic Genomics, Inc., www.syntheticgenomics.com, 9 pages, published at least as early as Feb. 5, 2010.
Scipio Biofuels, Inc., www.scipiobiofuels.com, 2 pages, published at least as early as Feb. 5, 2010.
Algae Floating Systems, Inc., www.algaefloatingsystems.com, 6 pages, published at least as early as Feb. 5, 2010.
Algae Fuel Systems, www.algaefuelsystems.com, 20 pages, published at least as early as Feb. 5, 2010.
Aquatic Energy LLC, www.aquaticenergy.com, 4 pages, published at least as early as Feb. 5, 2010.
Biocentricenergy, www.biocentricenergy.com, 6 pages, published at least as early as Feb. 5, 2010.
Dao Energy Llc, www.dao-energy.com, 8 pages, published at least as early as Feb. 5, 2010.
Global Green Solutions, Inc., www.globalgreensolutionsinc.com, 8 pages, published at least as early as Feb. 5, 2010.
Imperium Renewables, www.imperiumrenewables.com, 3 pages, published at least as early as Feb. 5, 2010.
Phycal LLC, www.phycal.com, 4 pages, published at least as early as Feb. 5, 2010.
Susquehanna Biotech LLC, www.susquehannabiotech.com, 1 page, published at least as early as Feb. 5, 2010.

(56) References Cited

OTHER PUBLICATIONS

Ingrepro B.V., www.ingrepro.nl/?lang=EN, 6 pages, published at least as early as Feb. 5, 2010.
Oil Fox, www.oilfox.com, 19 pages, published at least as early as Feb. 5, 2010.
International Energy, Inc., www.internationalenergyinc.com, 6 pages, published at least as early as Feb. 5, 2010.
Kent Bioenergy Corporation, www.kentbioenergy.com, 4 pages, published at least as early as Feb. 5, 2010.
Renewed World Energies (RWE) Corporation, www.rwenergies.com, 13 pages, published at least as early as Feb. 5, 2010.
Canadian Pacific Algae, Inc., www.canadianpacificalgae.com, 7 pages, published at least as early as Feb. 5, 2010.
"Comparisons of Growth of Six Diatom Species Between Two Configurations of Photobioreactors", Fernando R. Silva-Aciares et al., published in Aqua Cultural Engineering, vol. 38, pp. 26-35, published at least as early as Jul. 17, 2008.
"A novel airlift photobioreactor with baffles for improved light utilization through the flashing light effect", Jorg Degan, et al., published in the Journal of Biotechnology in 2001, vol. 92, Issue 2, pp. 89-94.
"Modelling for waste water treatment by Rhodopseudomonas palustris Y6 immobilized on fibre in a columnar bioreactor", P. Xu, et al., published in Applied Microbiology and Biotechnology in 1996, vol. 44, Issue 5, pp. 676-682.
"Continuous antibiotic production by an immobilized cyanobacterium in a seaweed-type bioreactor", Aparat Chetsumon, et al., published in Journal of Applied Phycology in 1995, vol. 7, Issue 2, pp. 135-139.
"Direct visualization of flowing biomass capture and release within a fibrous matrix", Trond E. Bustnes, et al., published in Biochemical Engineering Journal in 2004, vol. 18, Issue 3, pp. 231-234.
Office Action in Chinese Application No. 200980151425.X, issued on Jun. 4, 2012.
Notice of Preliminary Rejection for Korean Patent Application No. 10-2011-7010482, dated Sep. 29, 2013.
Final Rejection for Korean Patent Application No. 10-2011-7010482, dated Dec. 23, 2012.
European Search Report for European Patent Application No. 09822783.8, dated Aug. 20, 2013.
Requisition of the Examiner for Canadian Patent Application No. 2,739,801, dated Nov. 27, 2012.
Second Office Action for Chinese Patent Application No. 200980151425.X, dated Apr. 16, 2013.
Extended European Search Report, dated Aug. 27, 2013, for European Patent Application No. 10772521.0.
Preliminary Report on Patentability, dated Jan. 20, 2012, for PCT Patent Application No. PCT/US10/32574.
Patent Examination Report, dated Sep. 25, 2012, for Australian Patent Application No. 2009308283.
Office Action, dated Jun. 4, 2013, for Canadian Patent Application No. 2,760,856.
Office Action, dated Jul. 15, 2013, for Chinese Patent Application No. 201080030173.8.
Office Action, dated Jul. 12, 2013, for Korean Patent Application No. 10-2011-7029172.
Office Action, dated Jul. 12, 2013, for Japanese Patent Application No. 2012-509839.

SYSTEMS, APPARATUSES AND METHODS FOR TREATING WASTEWATER

RELATED APPLICATIONS

The present application is a continuation-in-part of and claims the benefit of co-pending U.S. patent application Ser. No. 12/768,361, filed Apr. 27, 2010, which is a continuation-in-part of and claims the benefit of co-pending U.S. patent application Ser. No. 12/605,121, filed Oct. 23, 2009, which claims the benefit of U.S. Provisional Patent Application Nos. 61/108,183, filed Oct. 24, 2008, 61/175,950, filed May 6, 2009, and 61/241,520, filed Sep. 11, 2009; and the present application claims the benefit of U.S. Provisional Patent Application Nos. 61/251,183, filed Oct. 13, 2009, and 61/385,719, filed Sep. 23, 2010; the contents of all are hereby incorporated herein by reference.

FIELD OF THE INVENTION

The present invention generally relates to systems, apparatuses, and methods for treating wastewater and, more particularly, to systems, apparatuses, and methods for treating wastewater within a container including organisms and media therein.

BACKGROUND

Wastewater has previously been treated in a variety of different manners including, for example, trickle towers, fluidized bed reactors, membrane bioreactors, extended air activated sludge processes, etc. While such wastewater treatment manners remove some of the undesirable elements from the wastewater, these manners of treating wastewater have generally been inefficient at removing the undesirable elements from the wastewater. Thus, high levels of undesirable elements remain in the wastewater and vast quantities of time are required to remove an adequate quantity of the undesirable elements from the wastewater. Accordingly, a need exists for systems, apparatuses, and methods for treating wastewater in an efficient, timely, and adequate manner.

SUMMARY

In some aspects, a wastewater treatment system is provided.

In other aspects, a method of treating wastewater is provided.

In further aspects, a wastewater treatment system is provided and includes a container for containing wastewater and at least one organism. The container may include media therein for supporting the at least one organism. The media may be rotated to dislodge the at least one organism from the media.

In yet other aspects, a method of treating wastewater is provided and includes providing a container, introducing wastewater into the container, and providing at least one organism within the container. The method may also include providing media within the container and supporting the at least organism on the media. The method may further include rotating the media and dislodging the at least one organism from the media due to the rotating of the media.

In still other aspects, a method of treating wastewater is provided and includes providing a container including a first member, a second member spaced apart from the first member, and a media supported by and extending between the first and second members, wherein the first member, second member, and media are at least partially positioned within the container, introducing an organism into the container, wherein the organism is supported on the media, introducing wastewater into the container, submerging the organism and at least a portion of the media in the wastewater, and rotating the first member, second member, and media within the container.

In yet further aspects, a method of treating wastewater is provided and includes providing a first container including a first member, a second member spaced apart from the first member, and a first media supported by and extending between the first and second members, wherein the first member, second member, and first media are at least partially positioned within the first container, providing a second container including a third member, a fourth member spaced apart from the third member, and a second media supported by and extending between the third and fourth members, wherein the third member, fourth member, and second media are at least partially positioned within the second container, introducing a first species of organism into the first container, wherein the first species of organism is supported on the first media, introducing wastewater into the first container, submerging the first species of organism and at least a portion of the first media in the wastewater, removing the wastewater from the first container, introducing a second species of organism into the second container, wherein the second species of organism is different than the first species of organism and the second species of organism is supported on the second media, introducing the wastewater into the second container after removing the wastewater from the first container, and submerging the second species of organism and at least a portion of the second media in the wastewater.

BRIEF DESCRIPTION OF THE DRAWINGS

FIG. 120 is a top view of another exemplary connector plate of a frame of the container shown in FIG. 108;

FIG. 121 is a top perspective view of the frame of FIG. 120 shown with the connector plate of FIG. 120 at both the upper and lower connector plate positions;

FIG. 122 is an exemplary system diagram of wastewater treatment systems showing, among other things, a relationship between a controller, a container, an artificial lighting system, and an environmental control device;

FIG. 123 is a cross-sectional view taken along a plane perpendicular to a longitudinal extent of an exemplary alternative container, this exemplary container having a generally square shape;

FIG. 124 is a cross-sectional view taken along a plane perpendicular to a longitudinal extent of another exemplary alternative container, this exemplary container having a generally rectangular shape;

FIG. 125 is a cross-sectional view taken along a plane perpendicular to a longitudinal extent of yet another exemplary alternative container, this exemplary container having a generally triangular shape;

FIG. 126 is a cross-sectional view taken along a plane perpendicular to a longitudinal extent of still another exemplary alternative container, this exemplary container having a generally oval shape;

FIG. 127 is a top view of a further exemplary wastewater treatment system commonly referred to as a raceway;

FIG. 128 is a cross-sectional view taken along line 128-128 in FIG. 127;

FIG. 129 is a cross-sectional view similar to FIG. 128 and is shown with another exemplary frame base;

FIG. 130 is a side view of a further exemplary frame base;

FIG. 131 is a partial cross-sectional view similar to FIG. 128 and is shown with another exemplary frame and connector plate;

Figure 127:
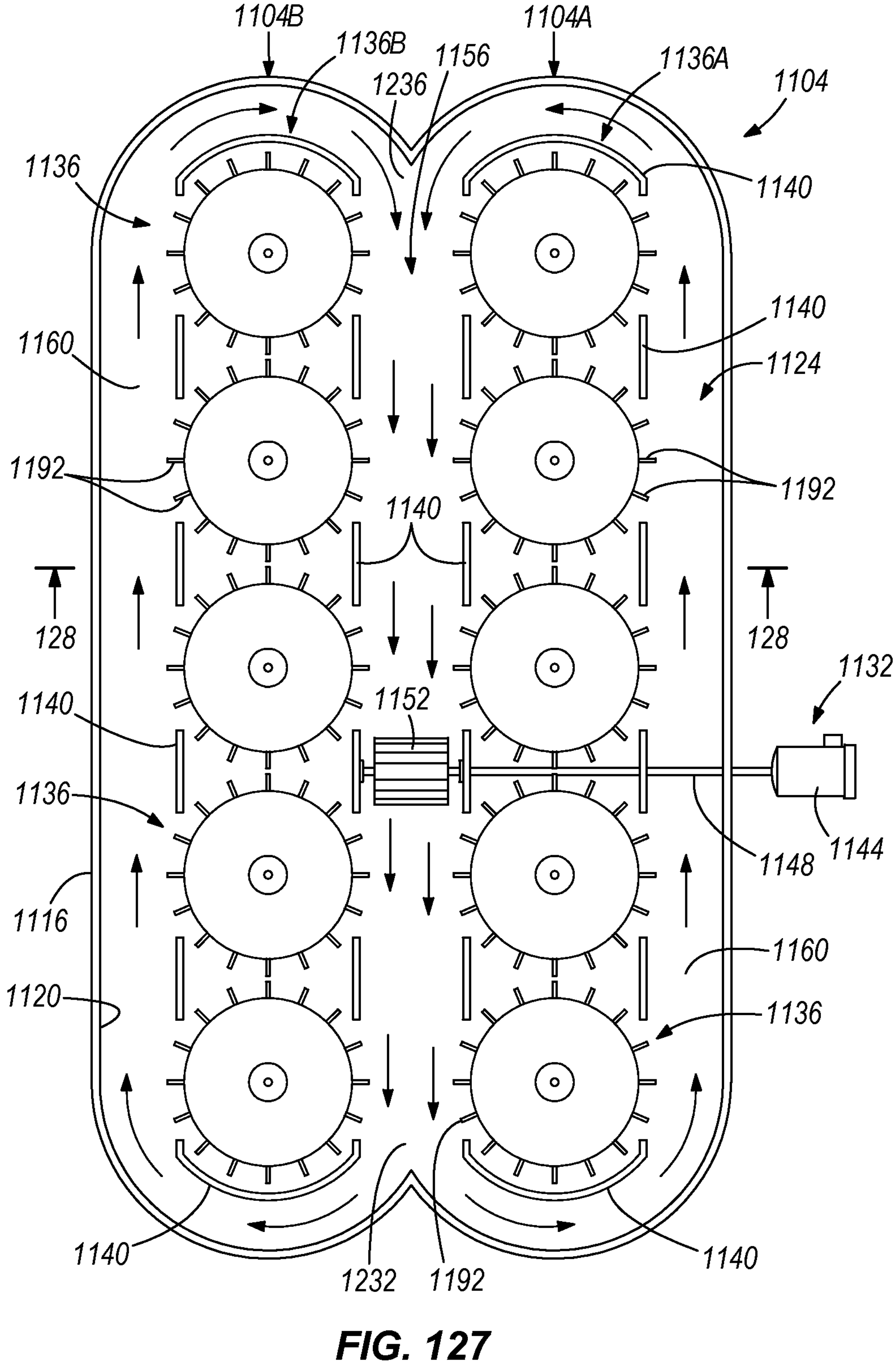
Figure 134:
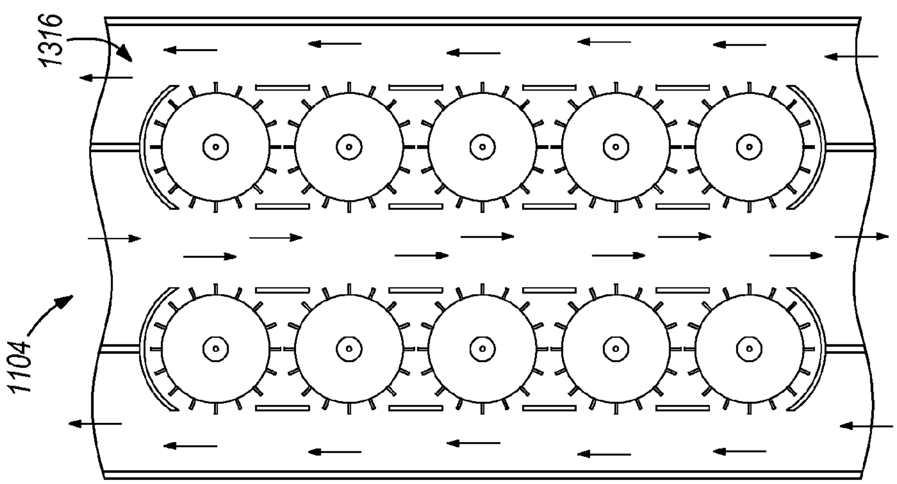
Figure 133:
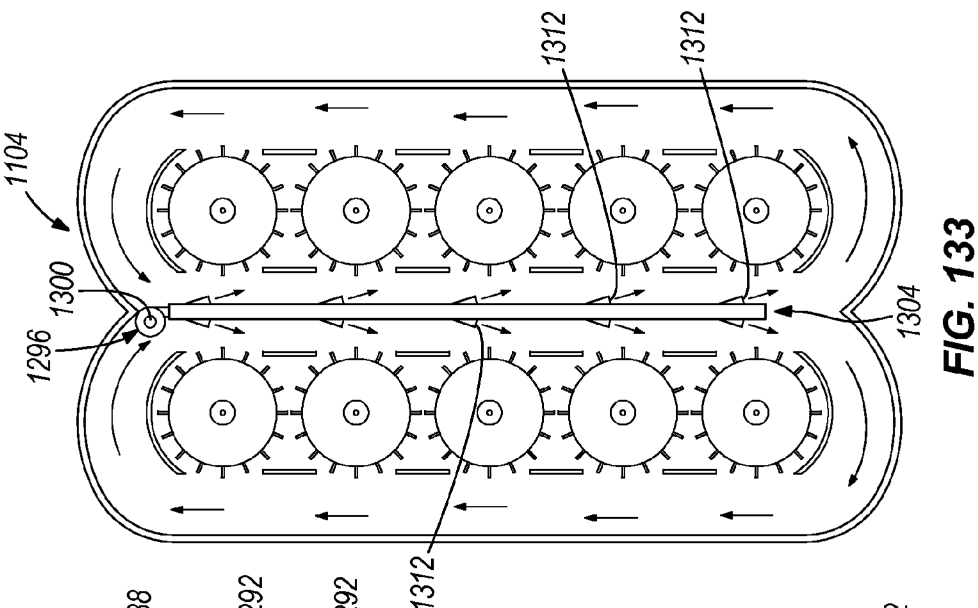
Figure 132:
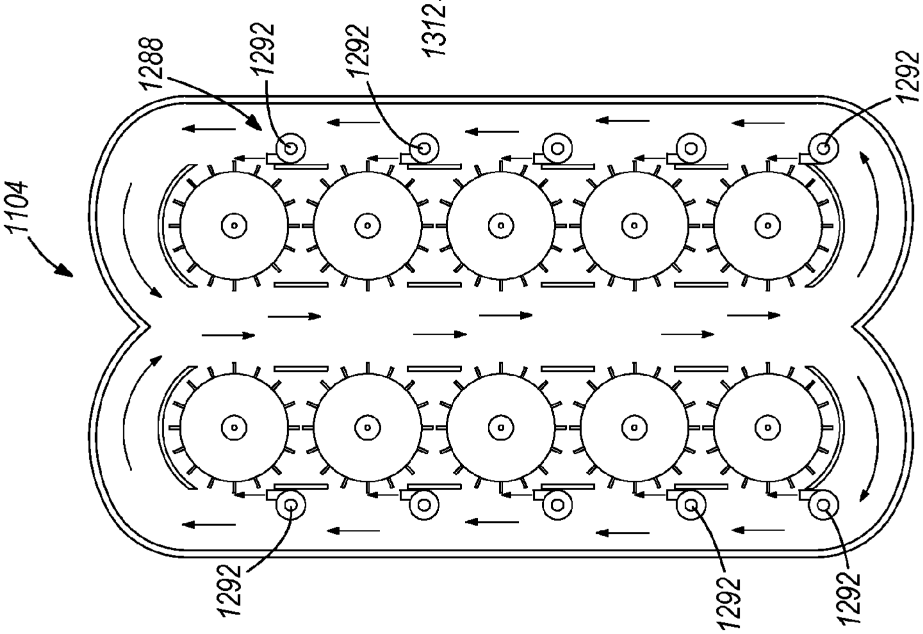
Figure 135:
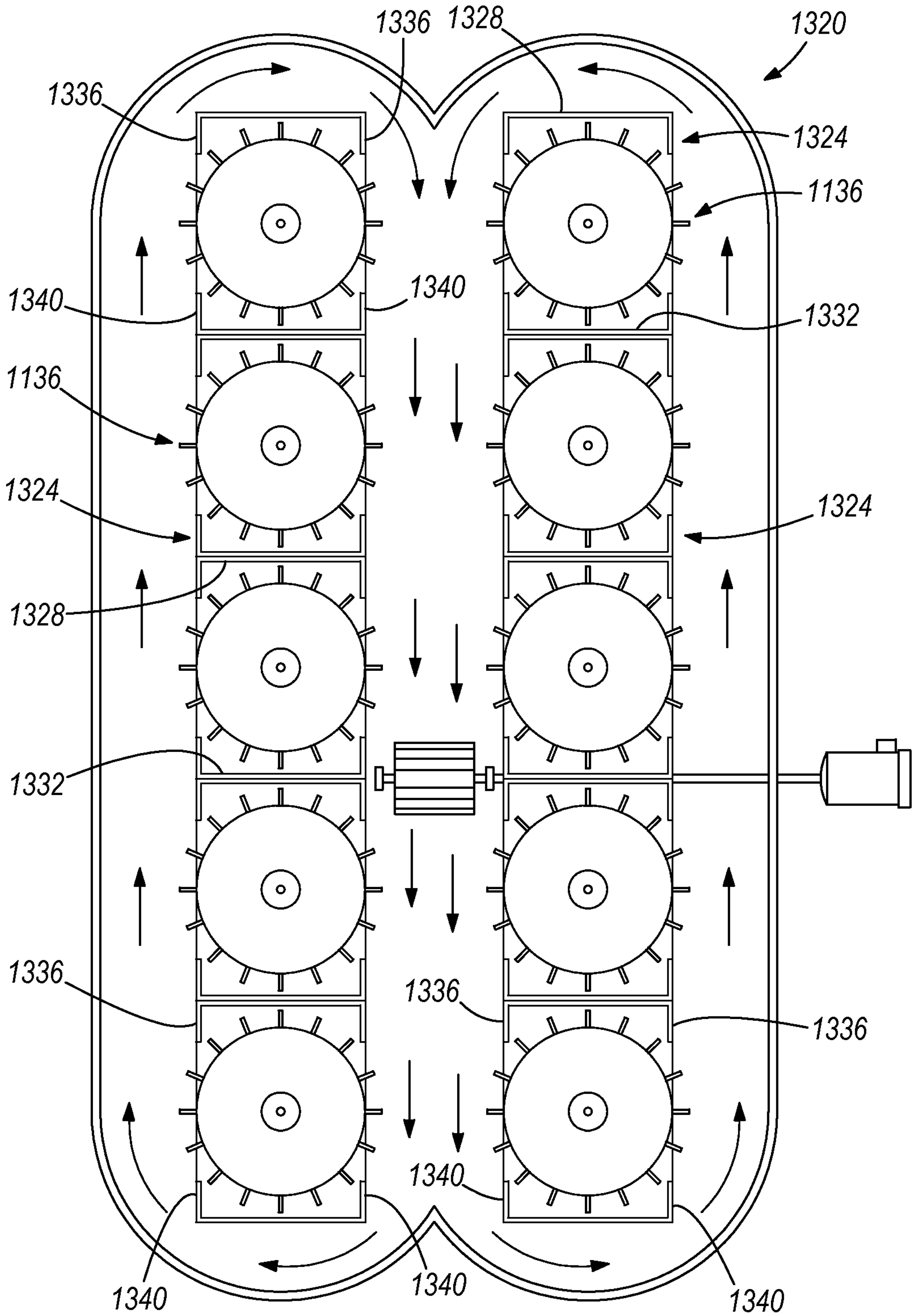
Figure 136:
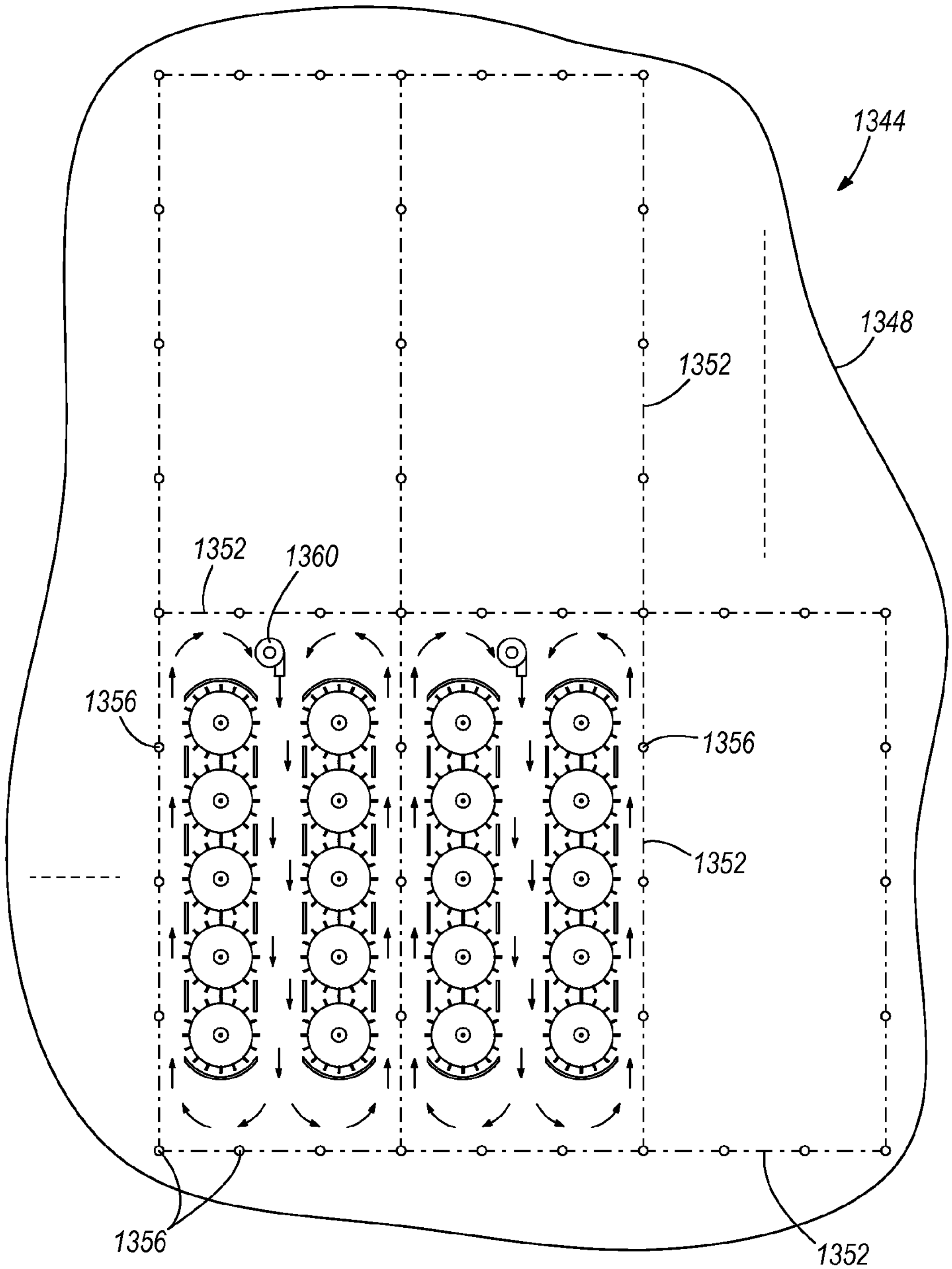
Figure 137:
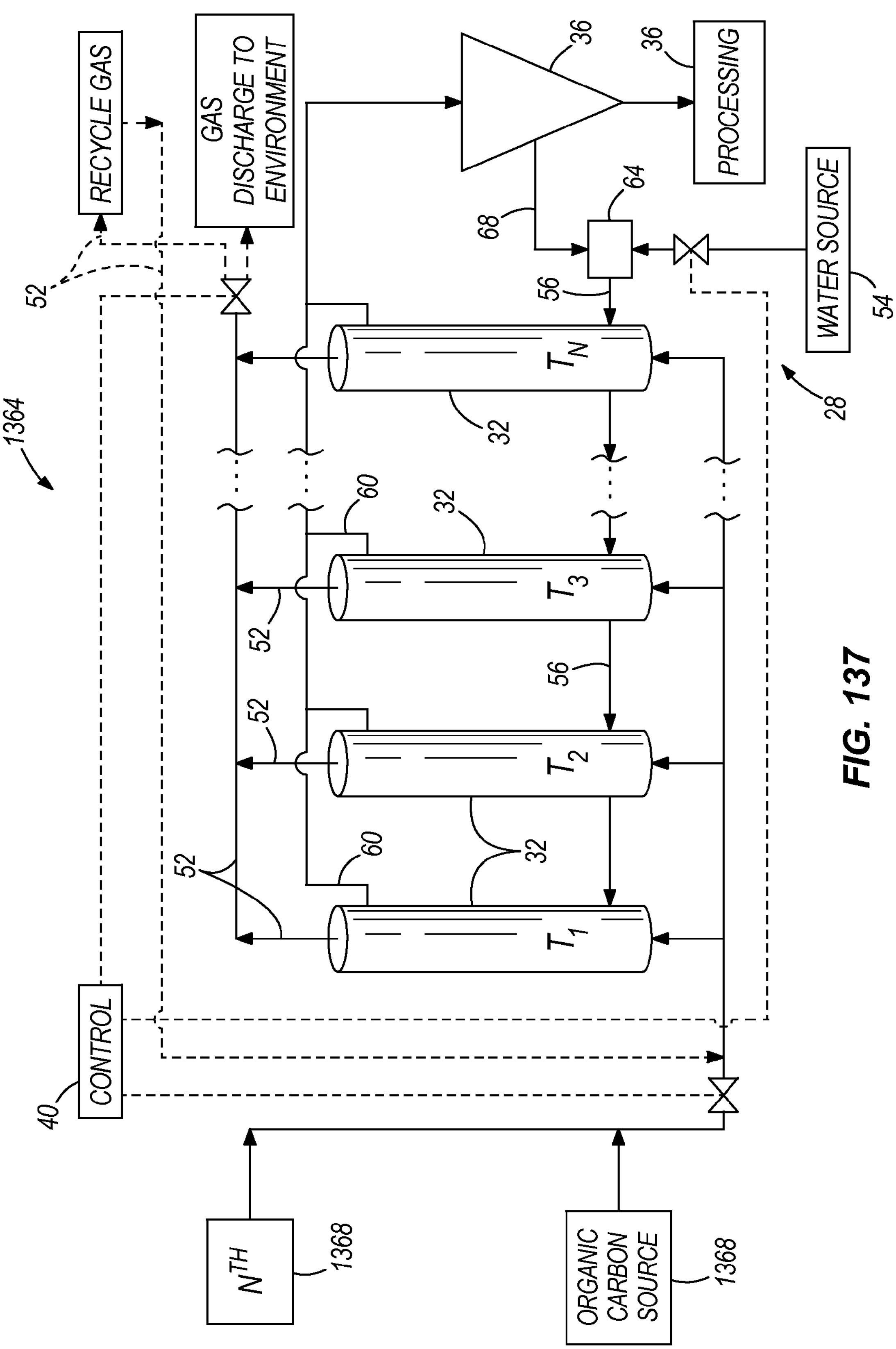
Figure 138:
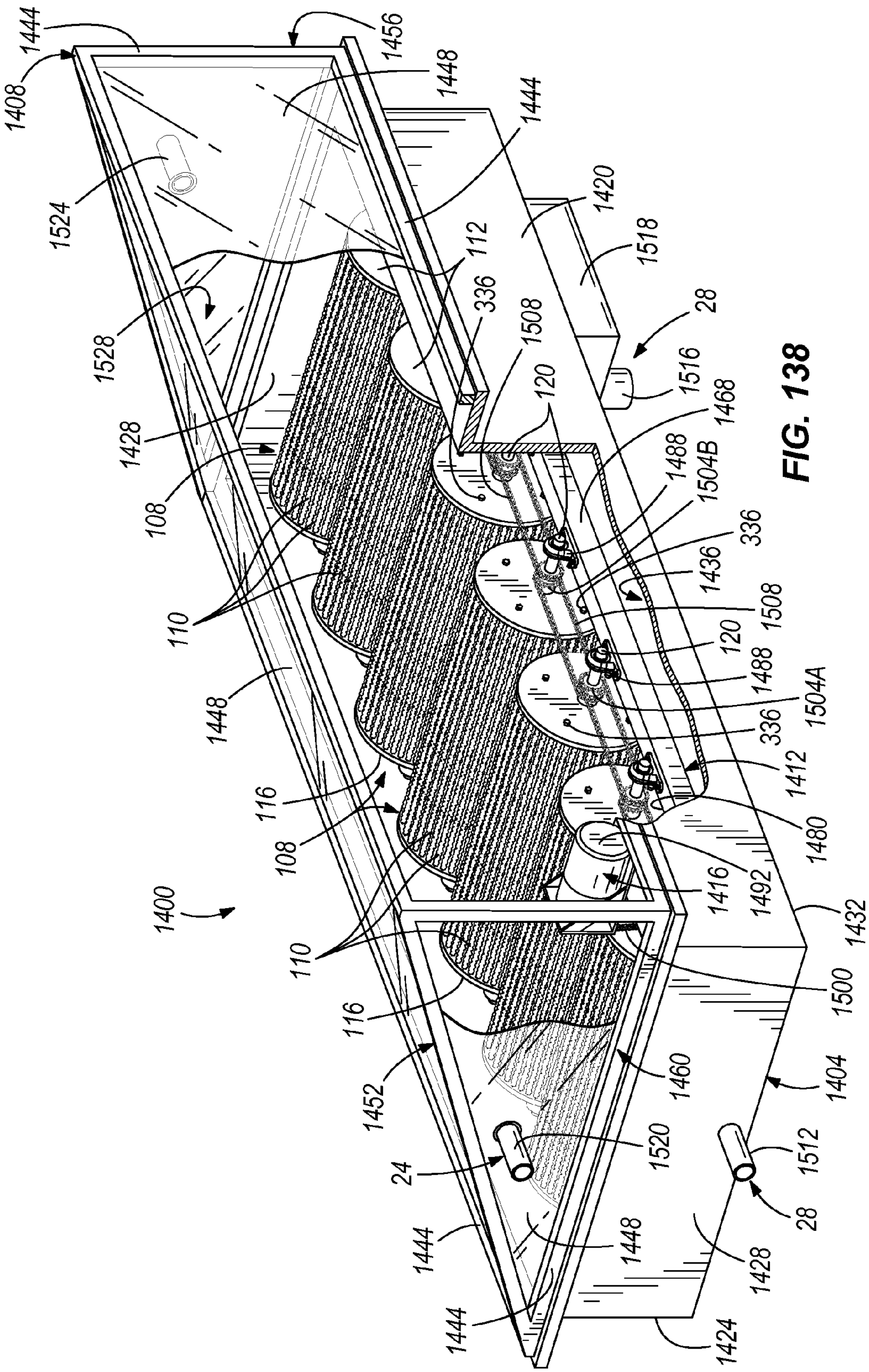
Figure 139:
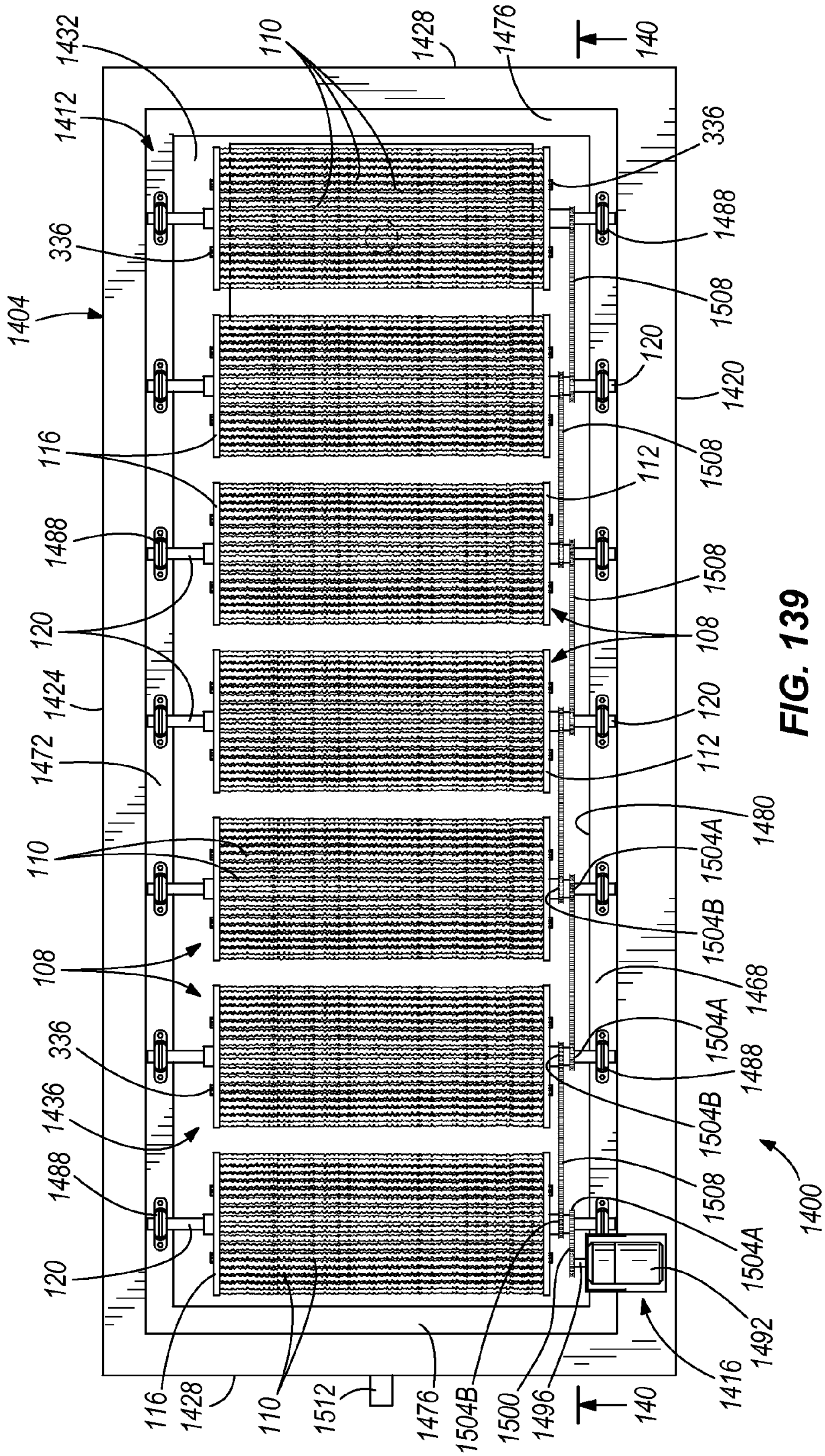
Figure 140:
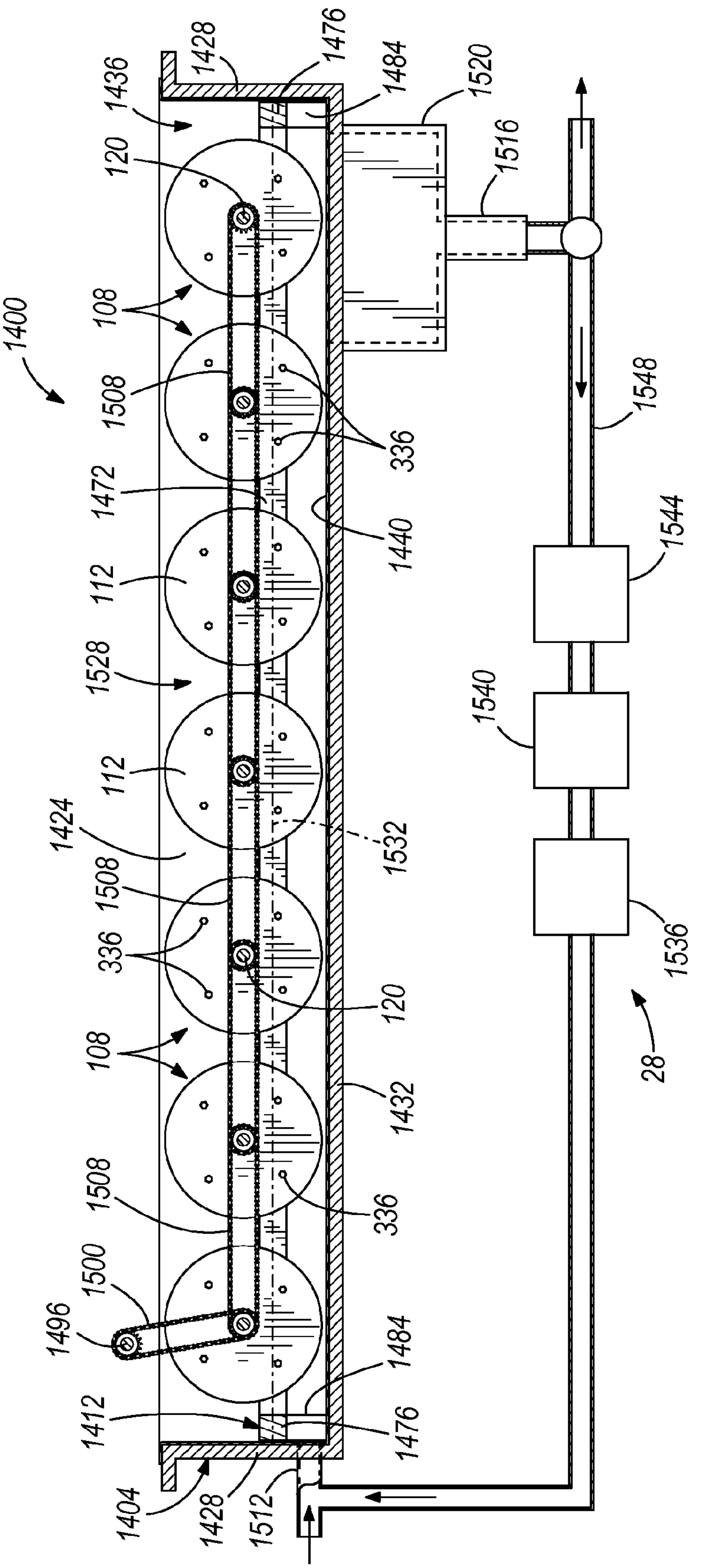
Figure 141:
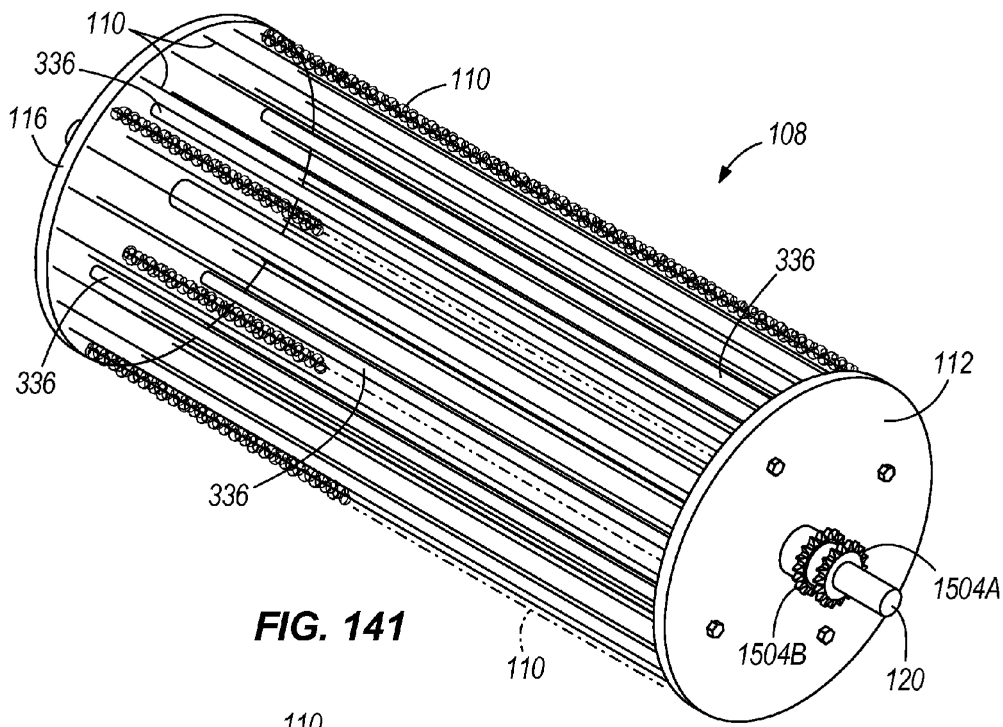
Figure 142:
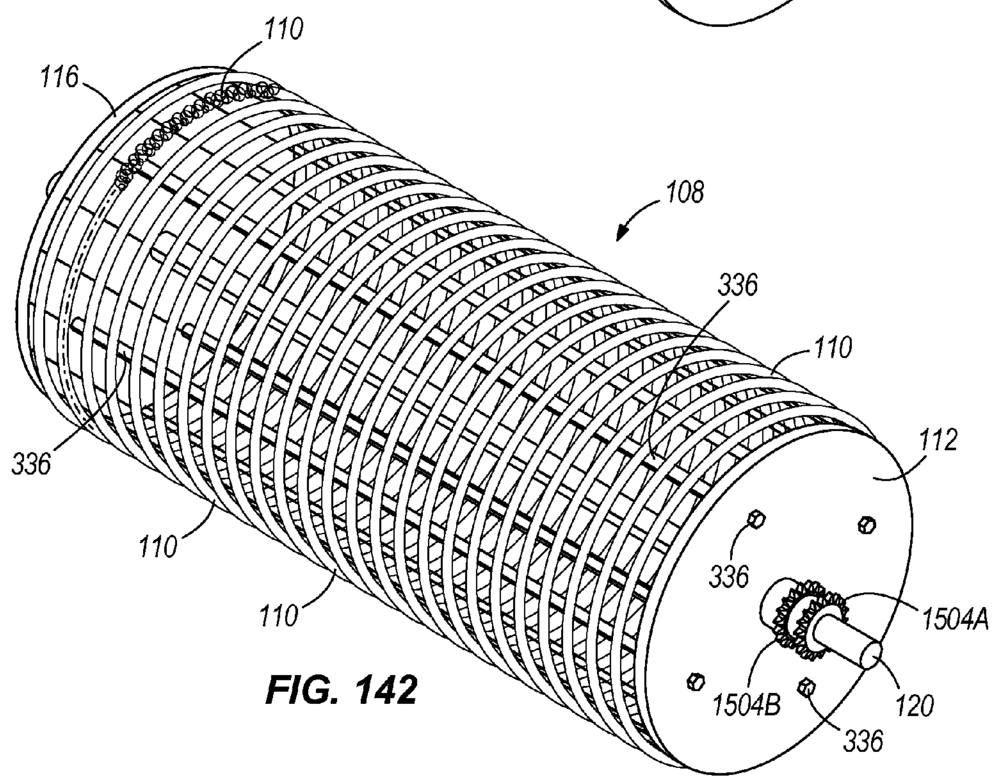
Figure 143:
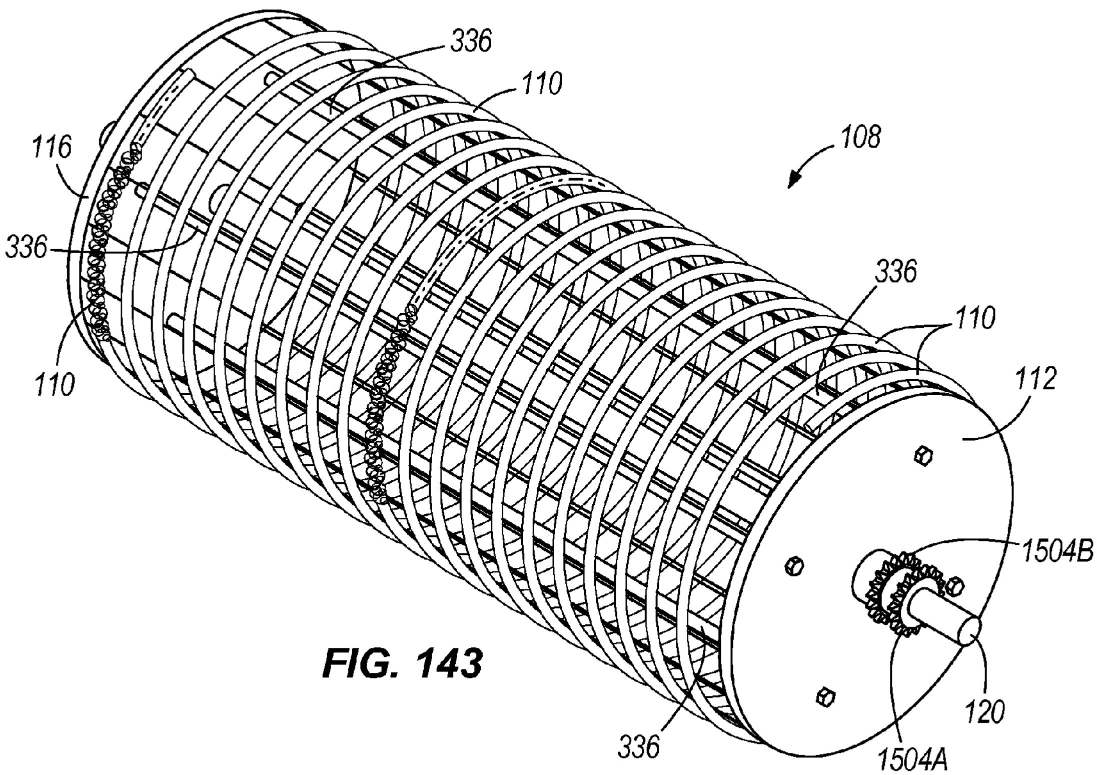
Figure 144:
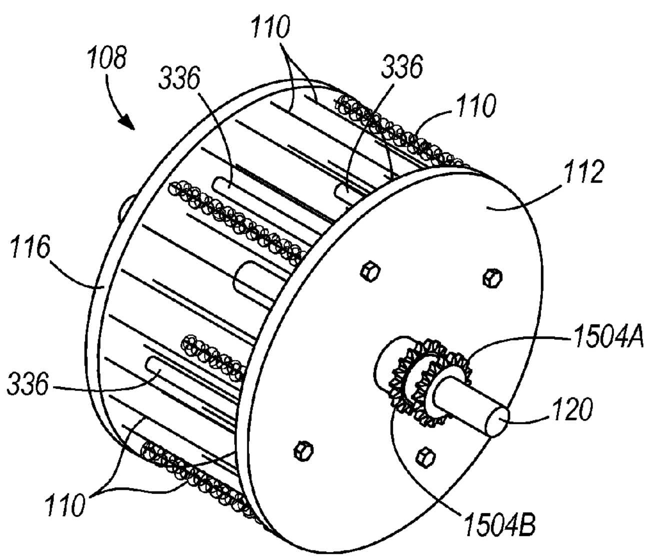
Figure 145:
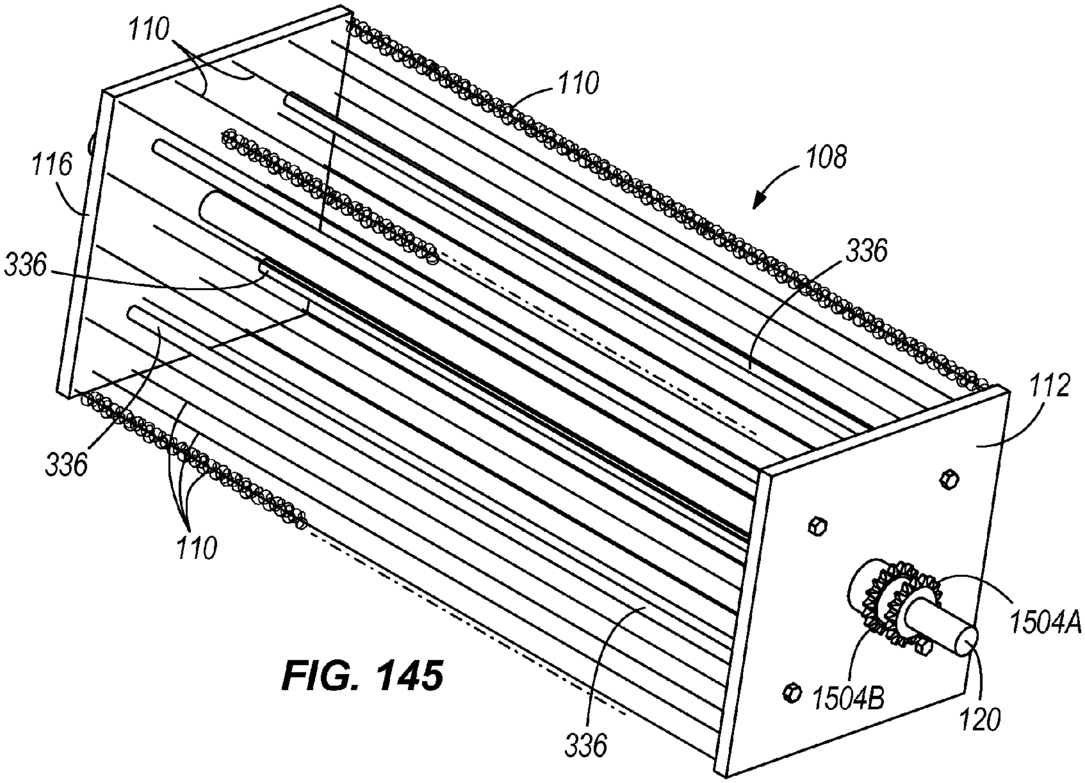
Figure 146:
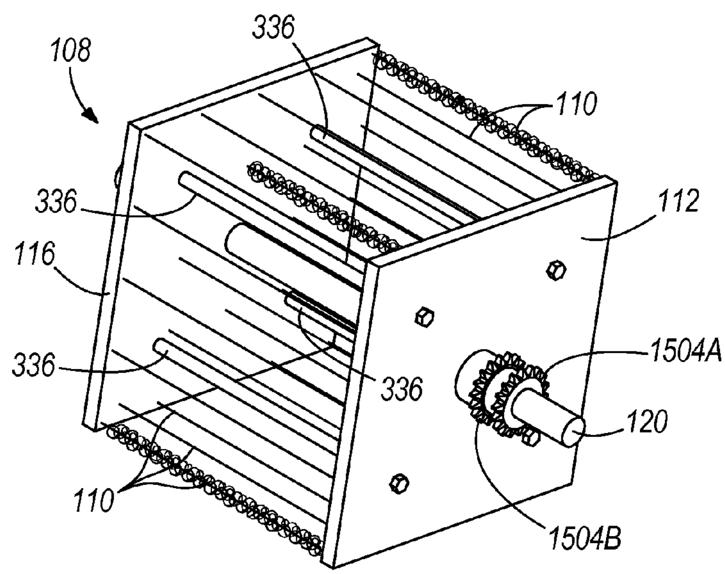
Figure 147:
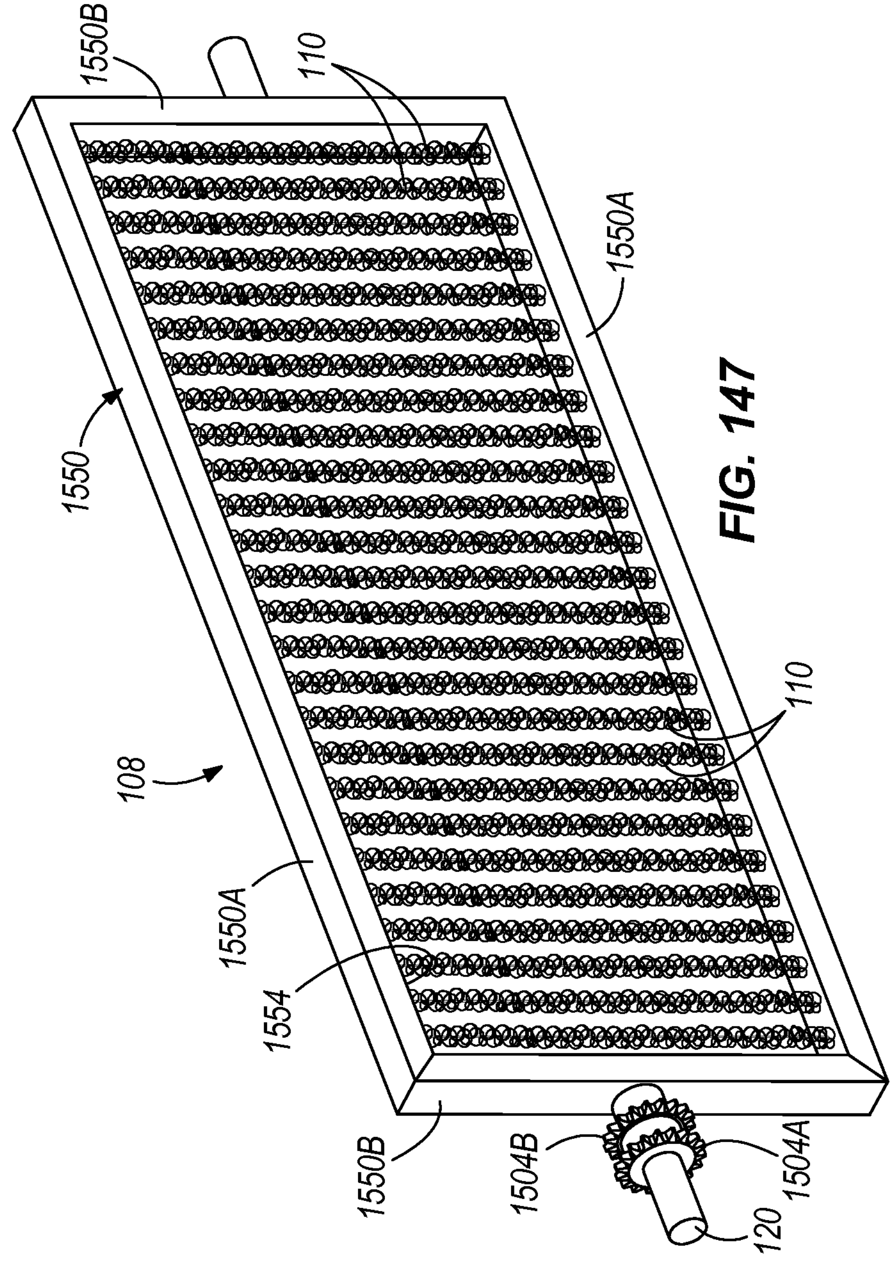
Figure 148:
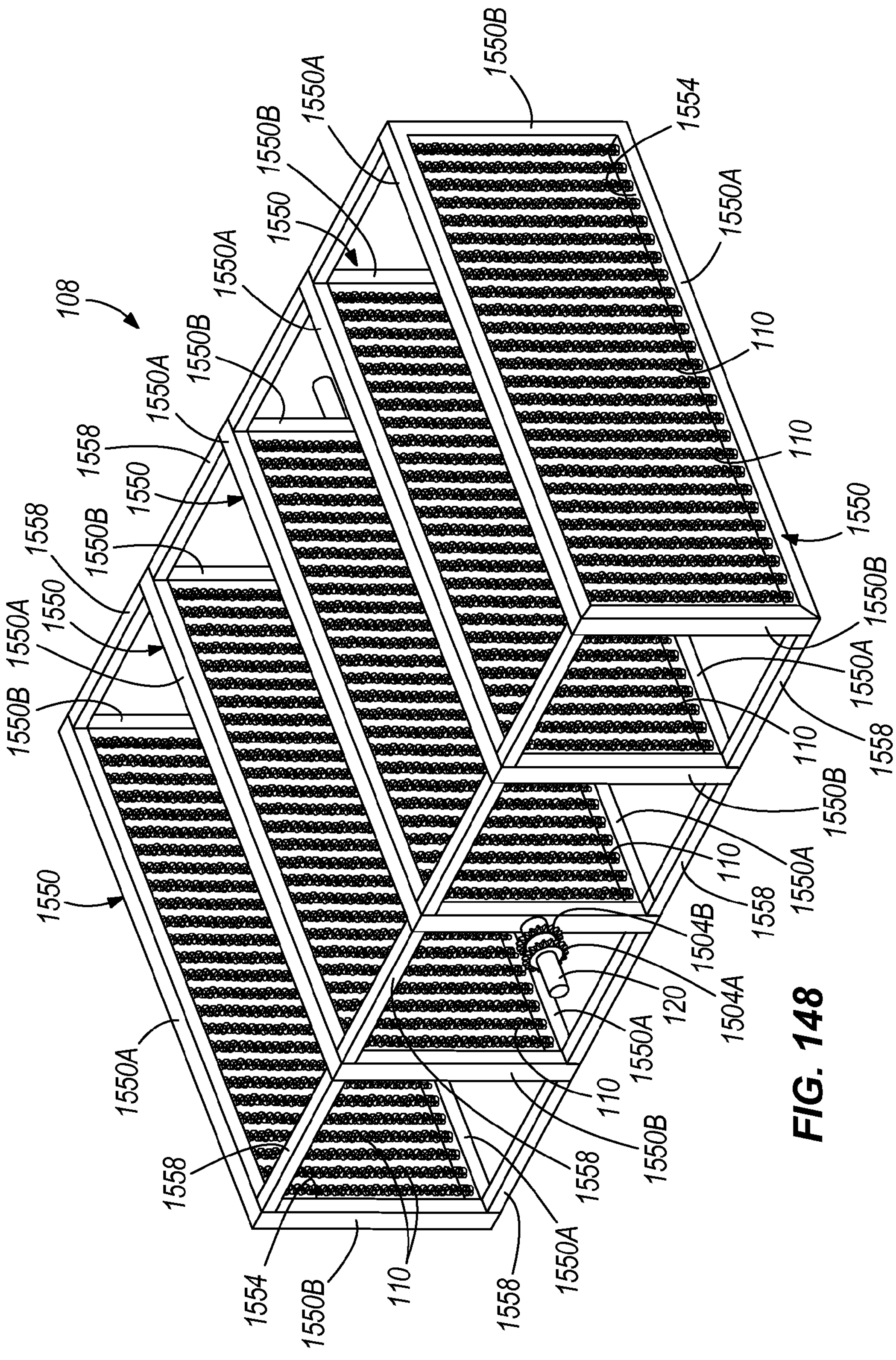
Figure 149:
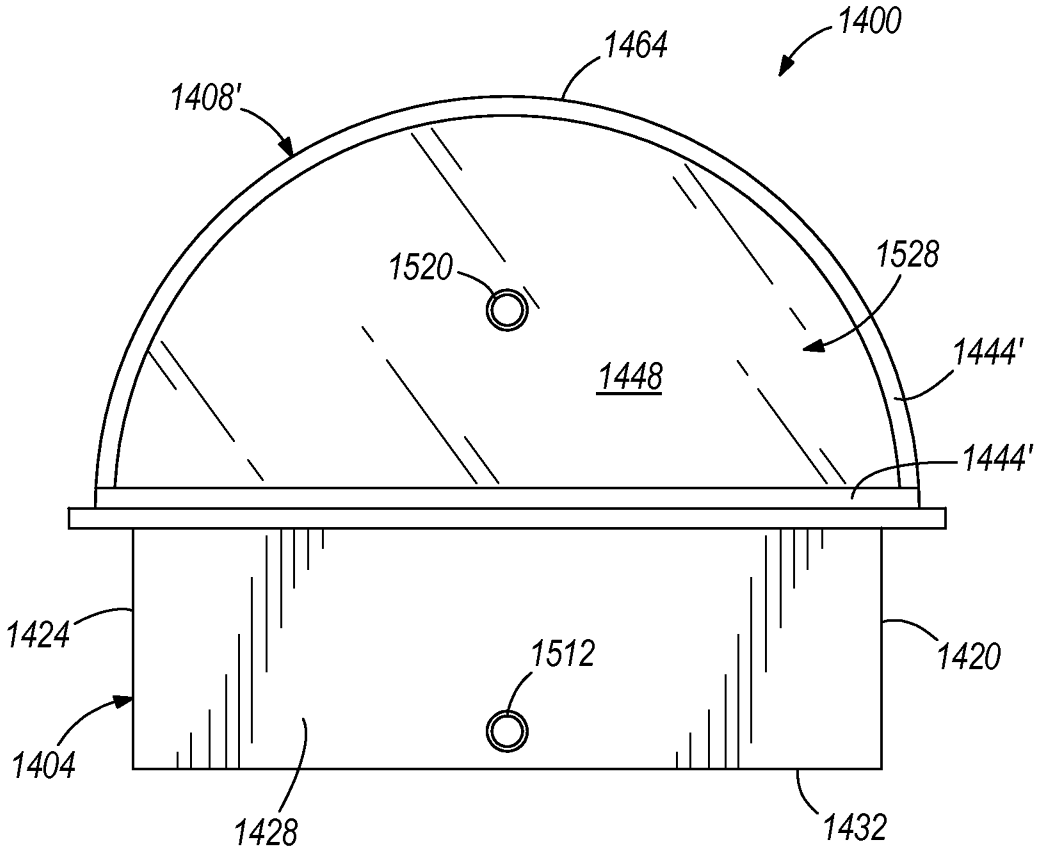
Figure 150:
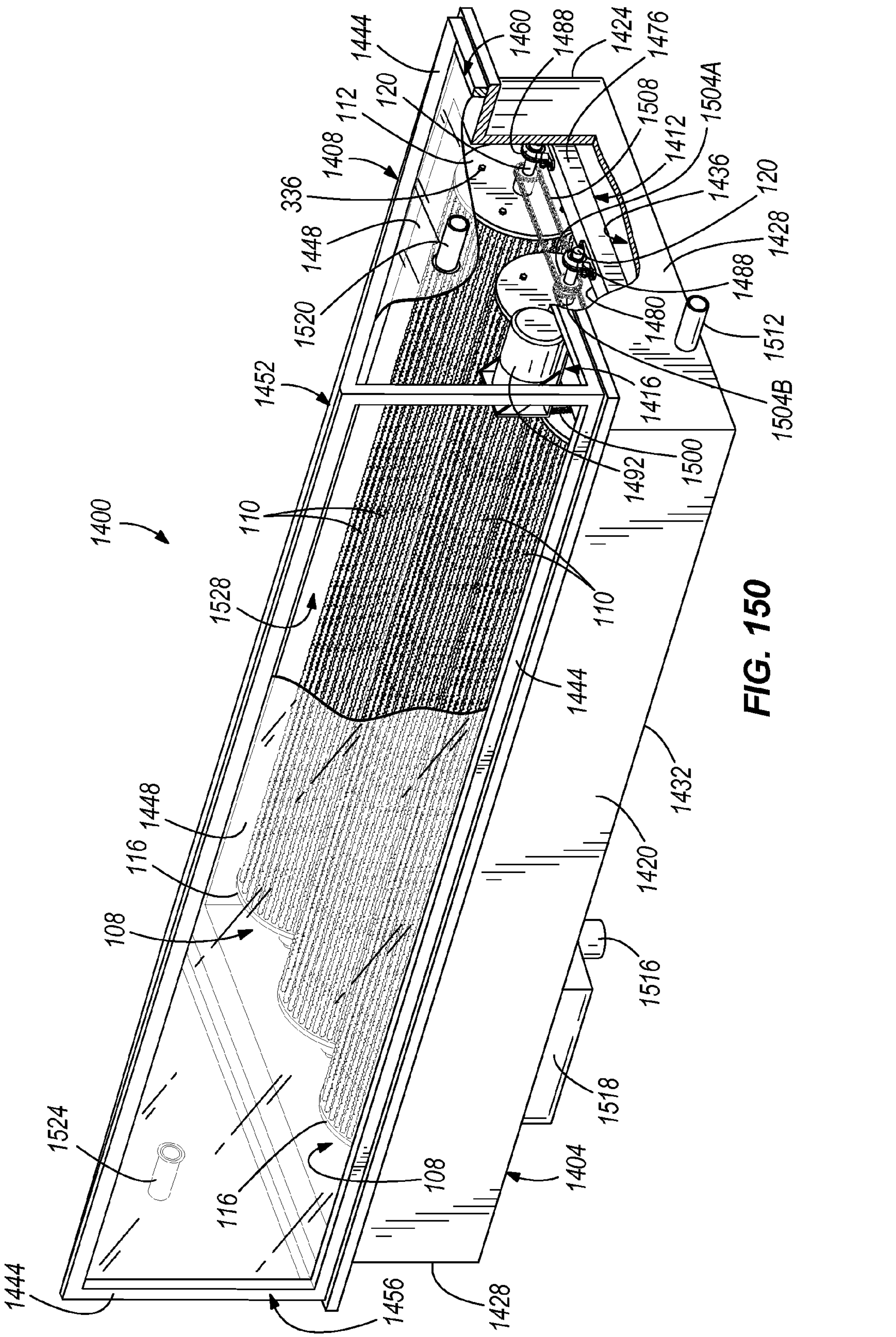
Figure 151:
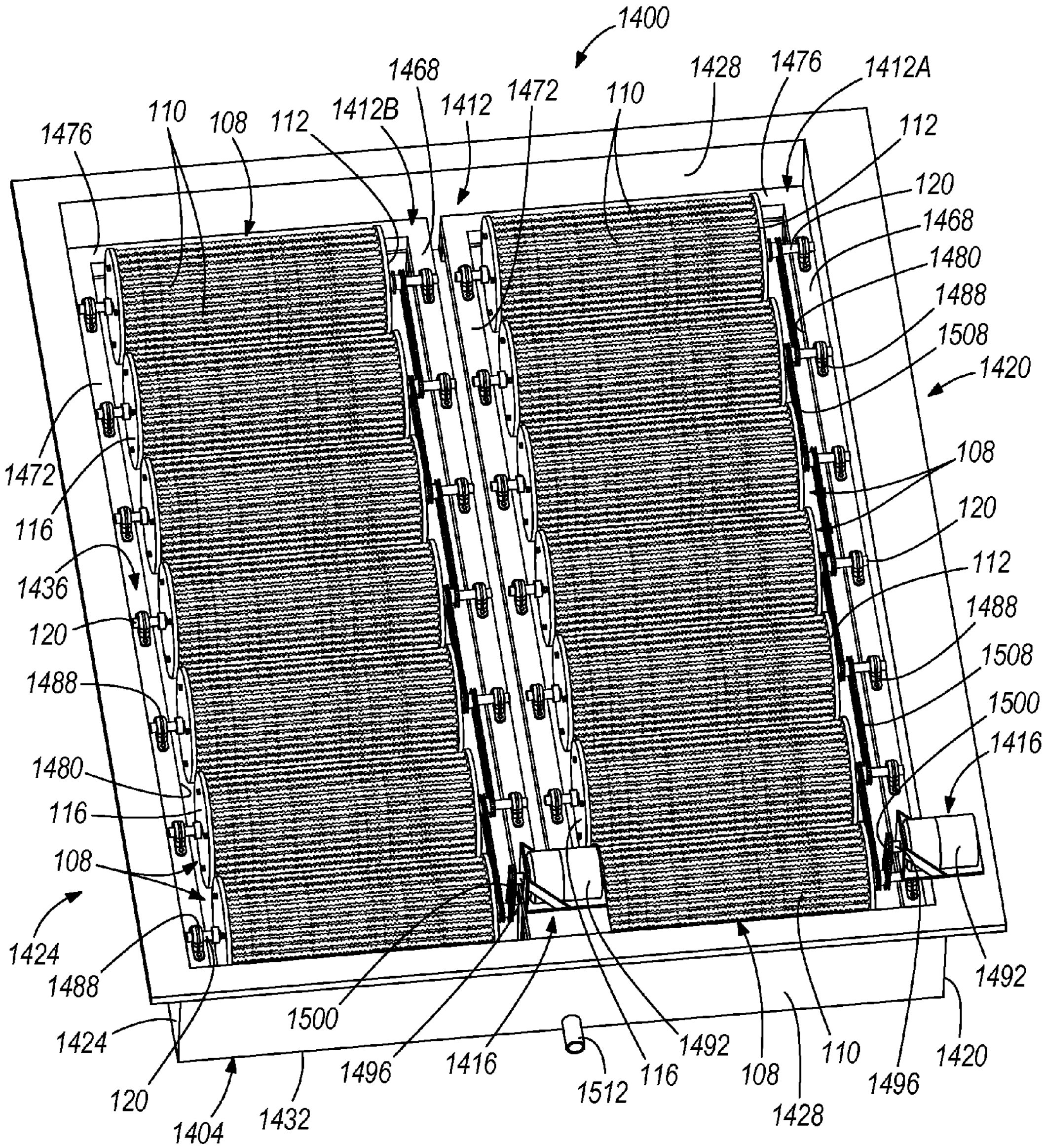
Figure 152:
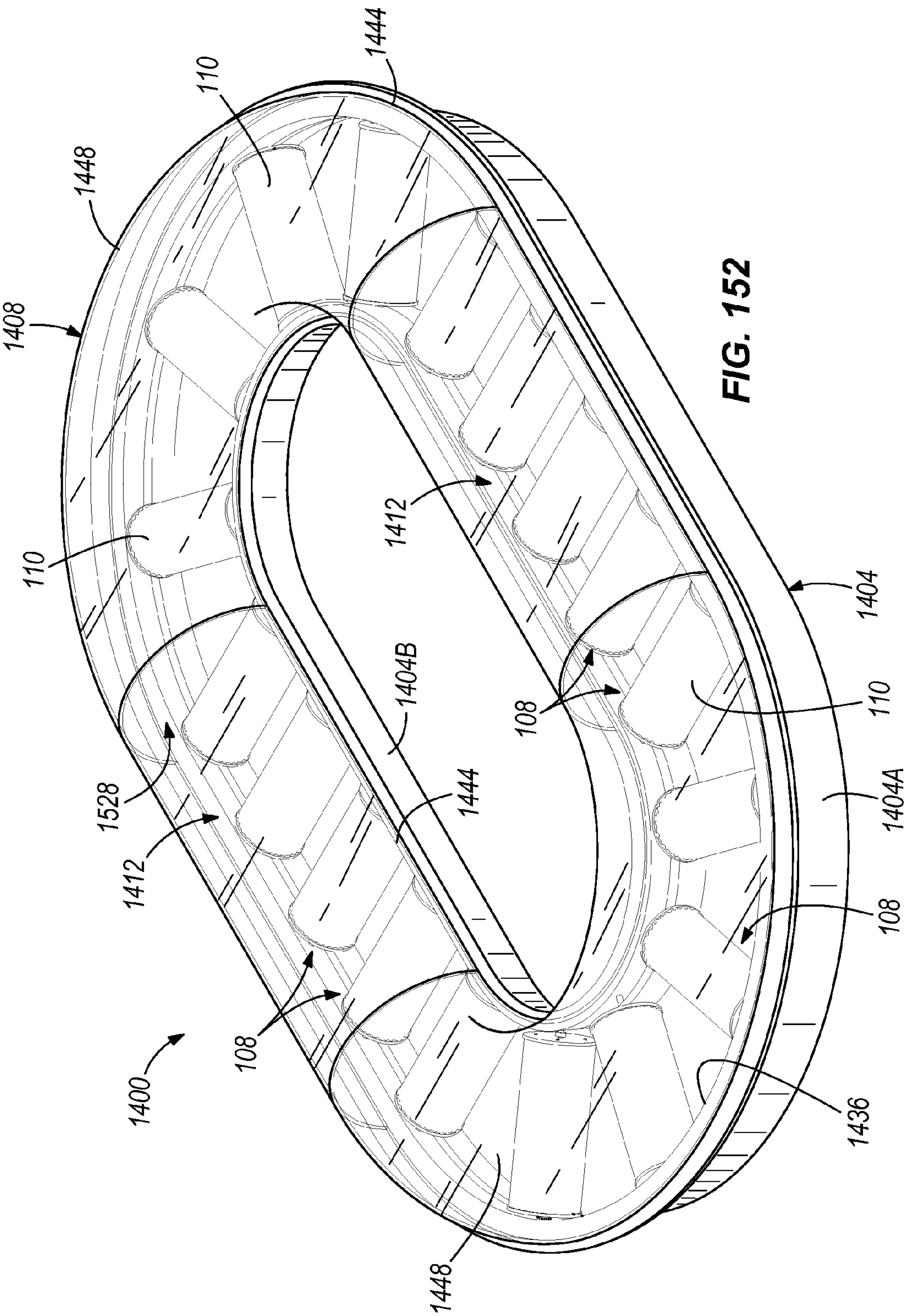
Figure 153:
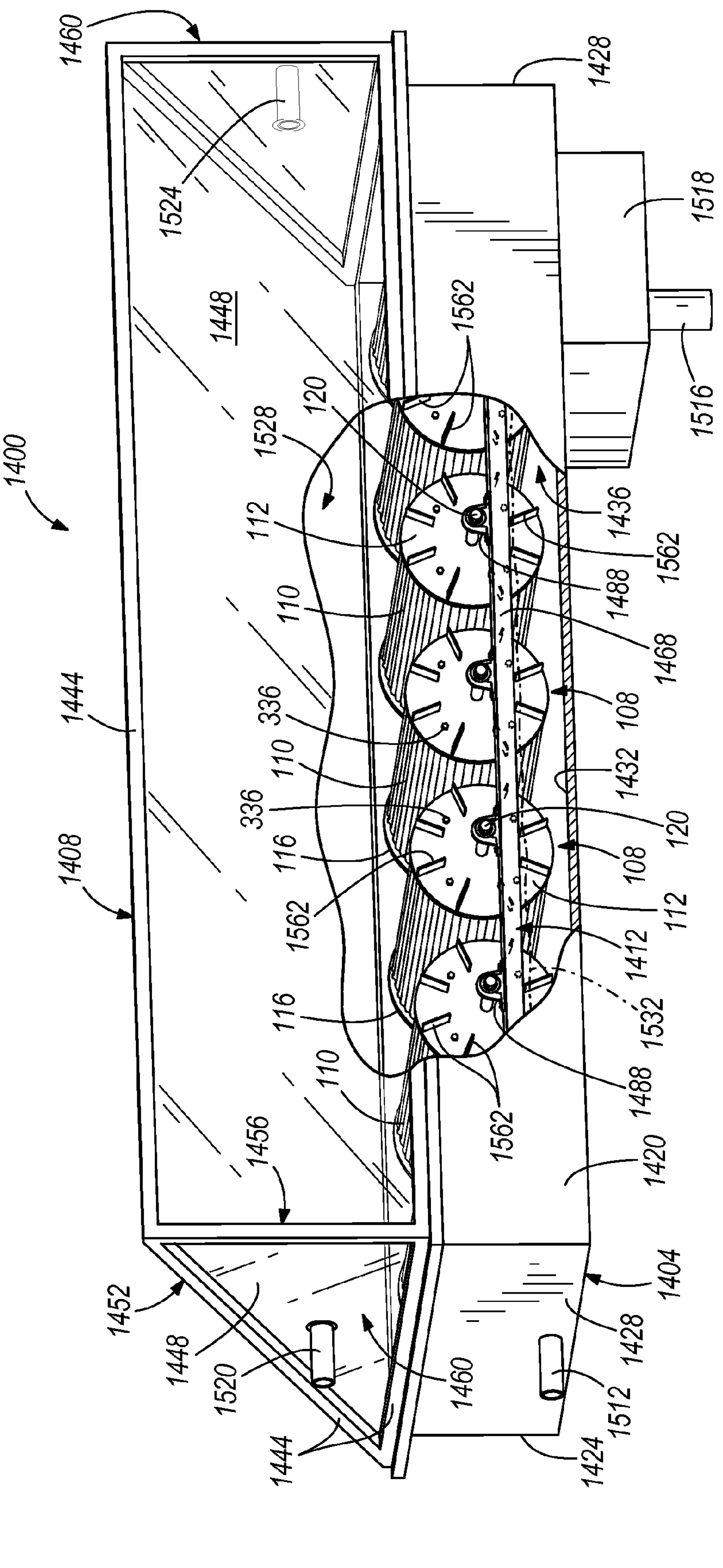
Figure 154:
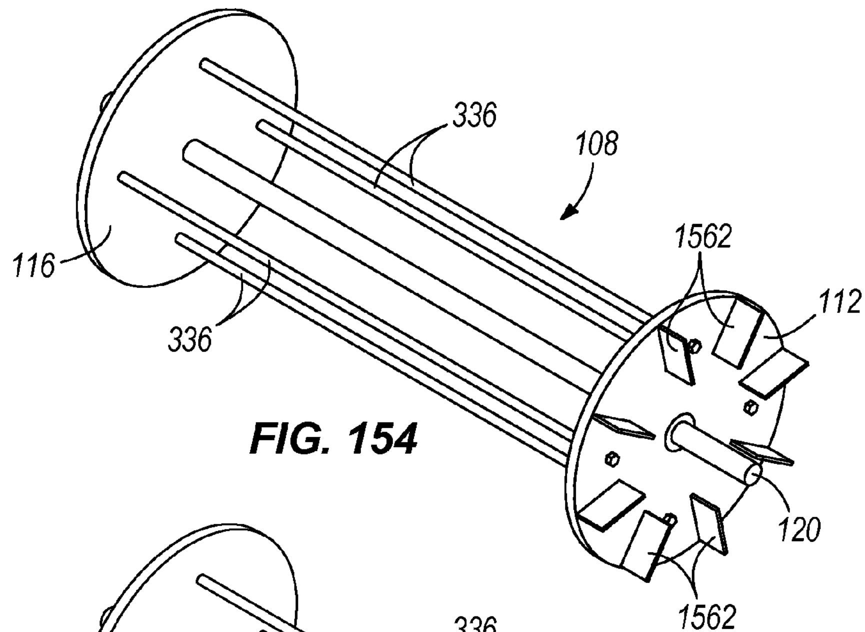
Figure 155:
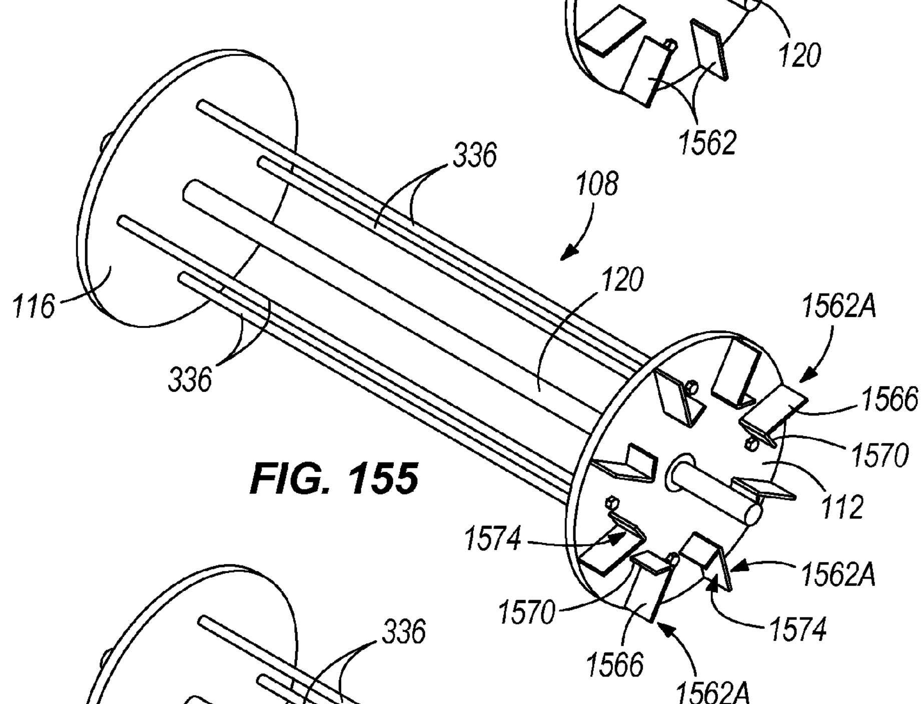
Figure 156:
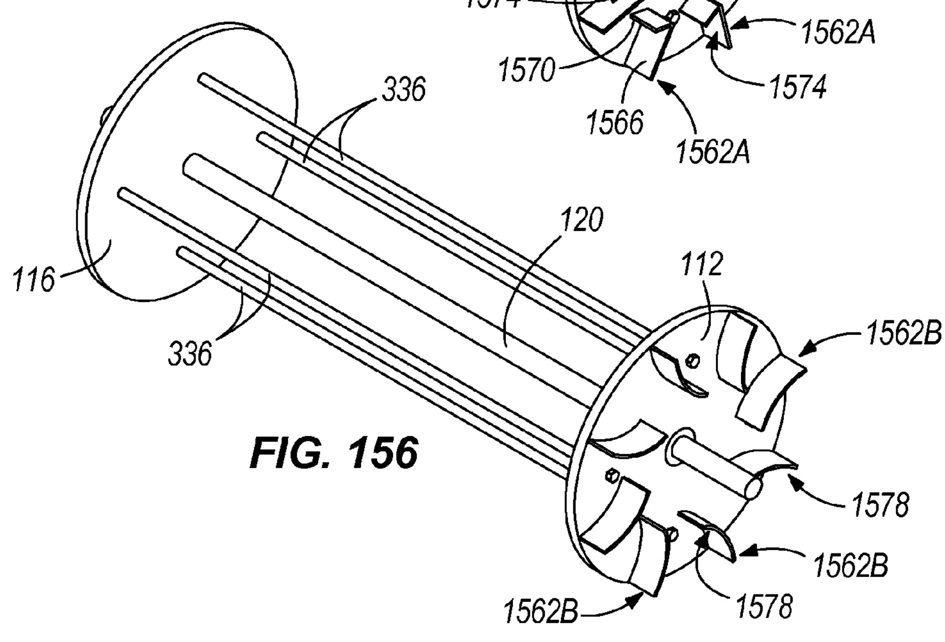
Figure 157:
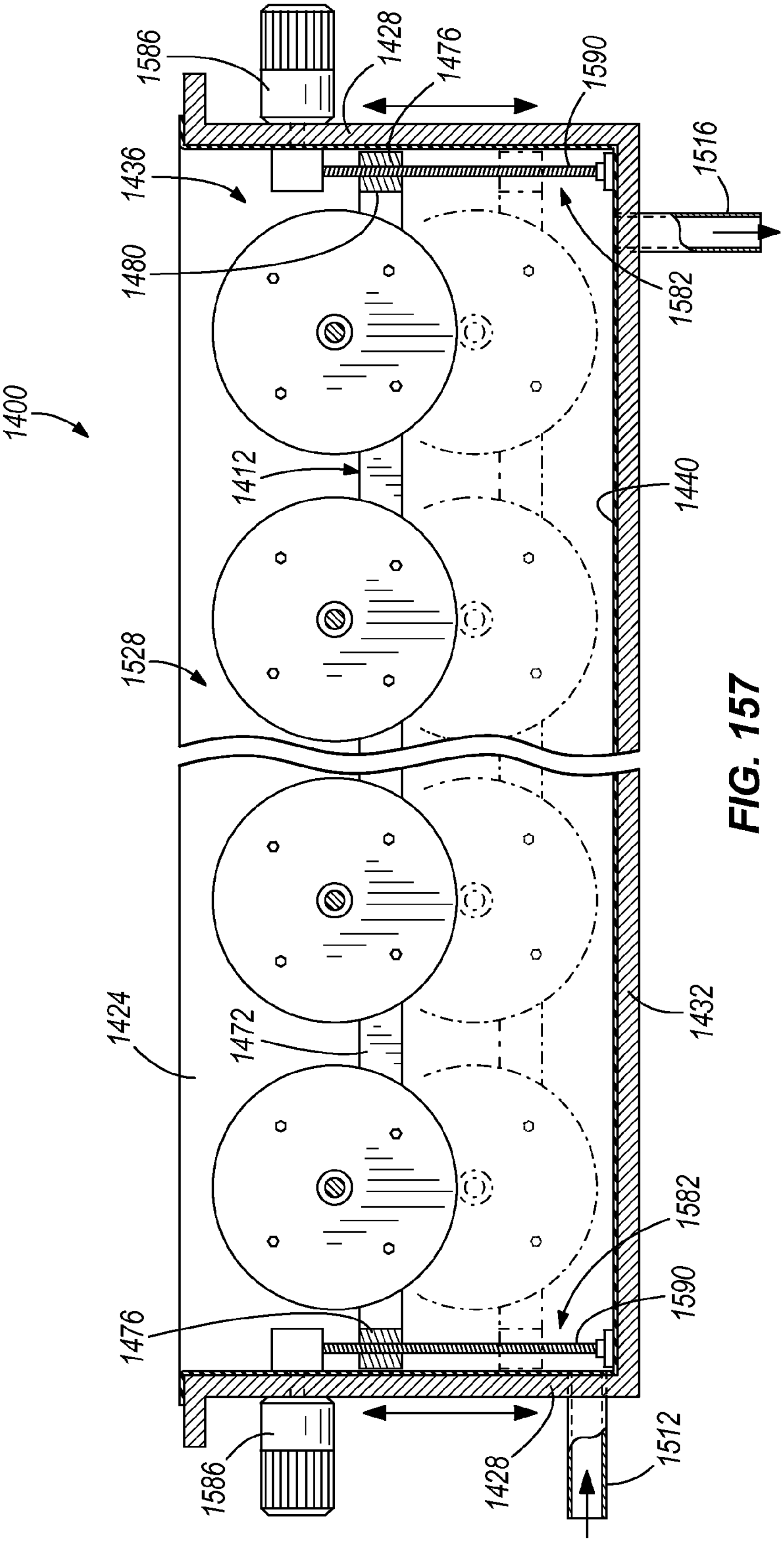
Figure 158:
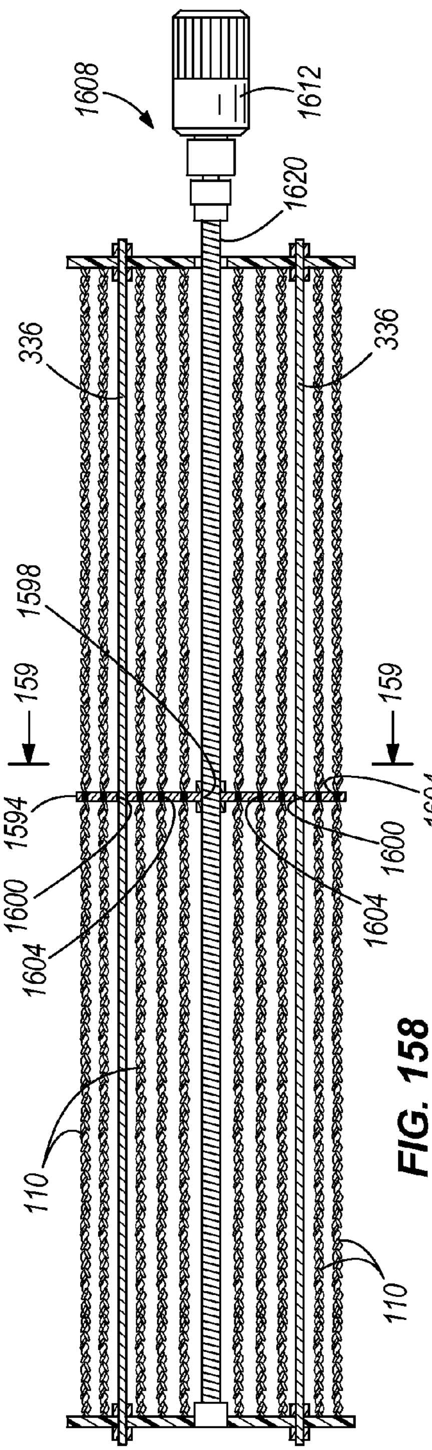
Figure 159:
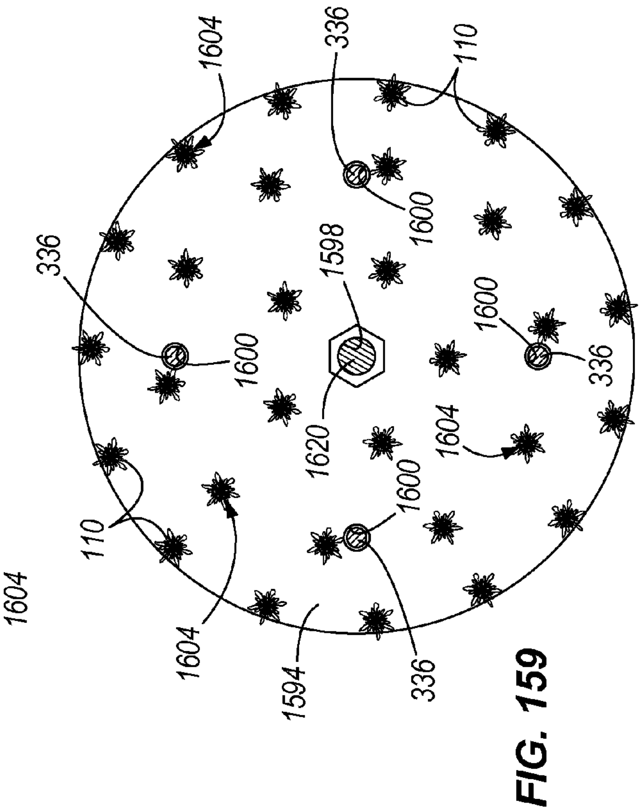
Figure 160:
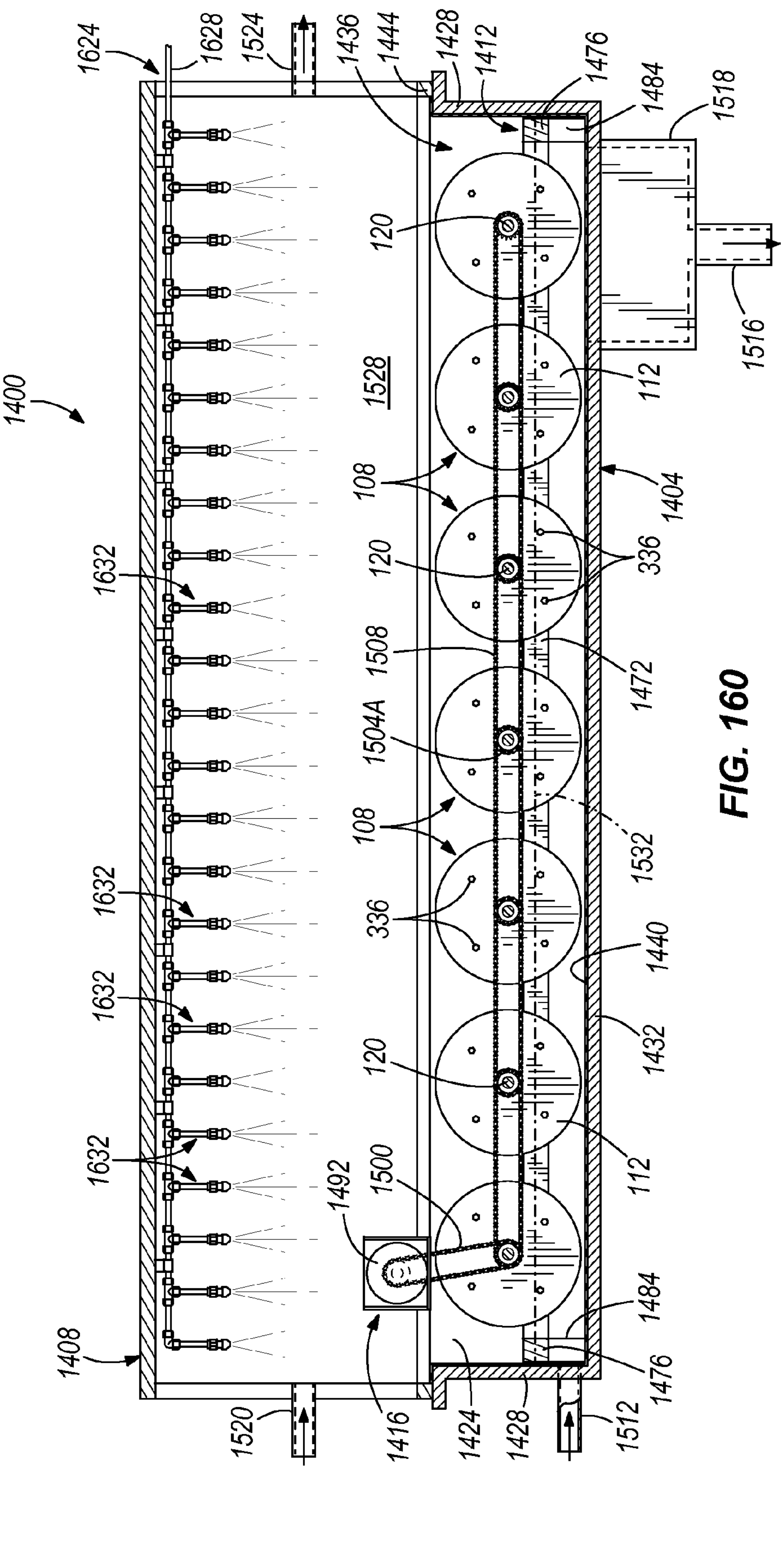
Figure 161:
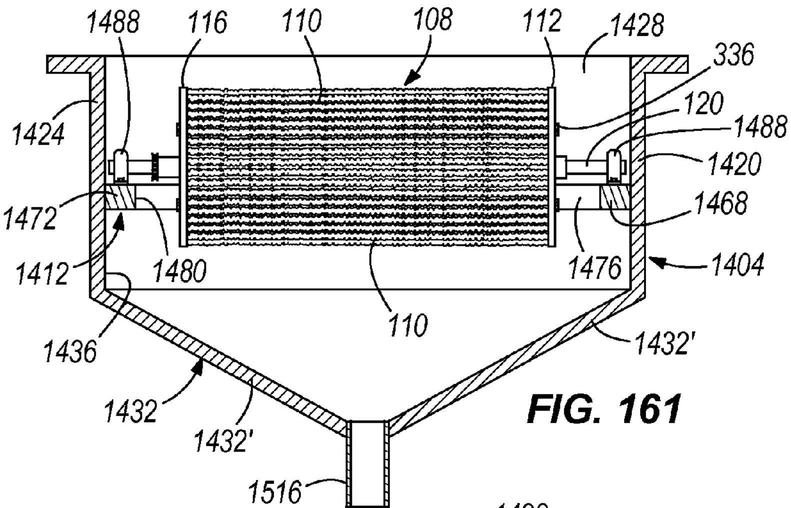
Figure 162:
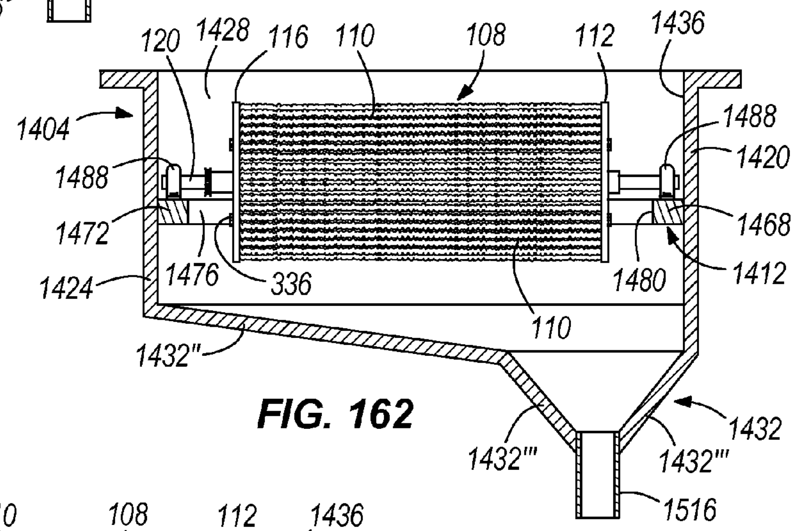
Figure 163:
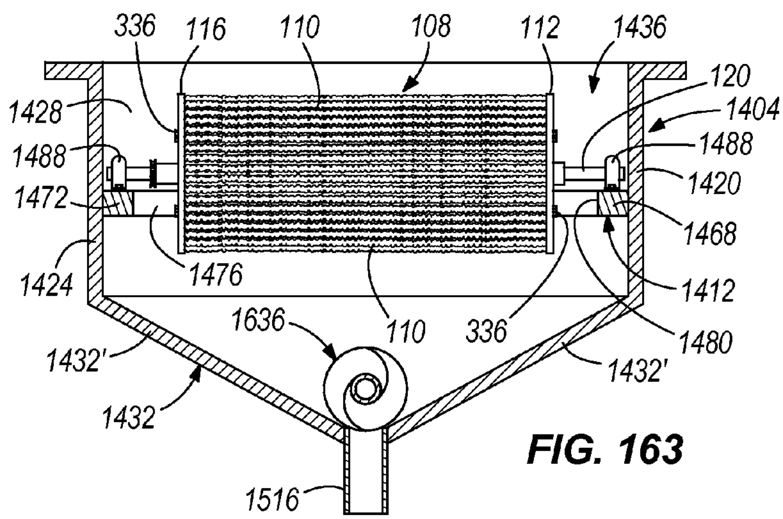
Figure 164:
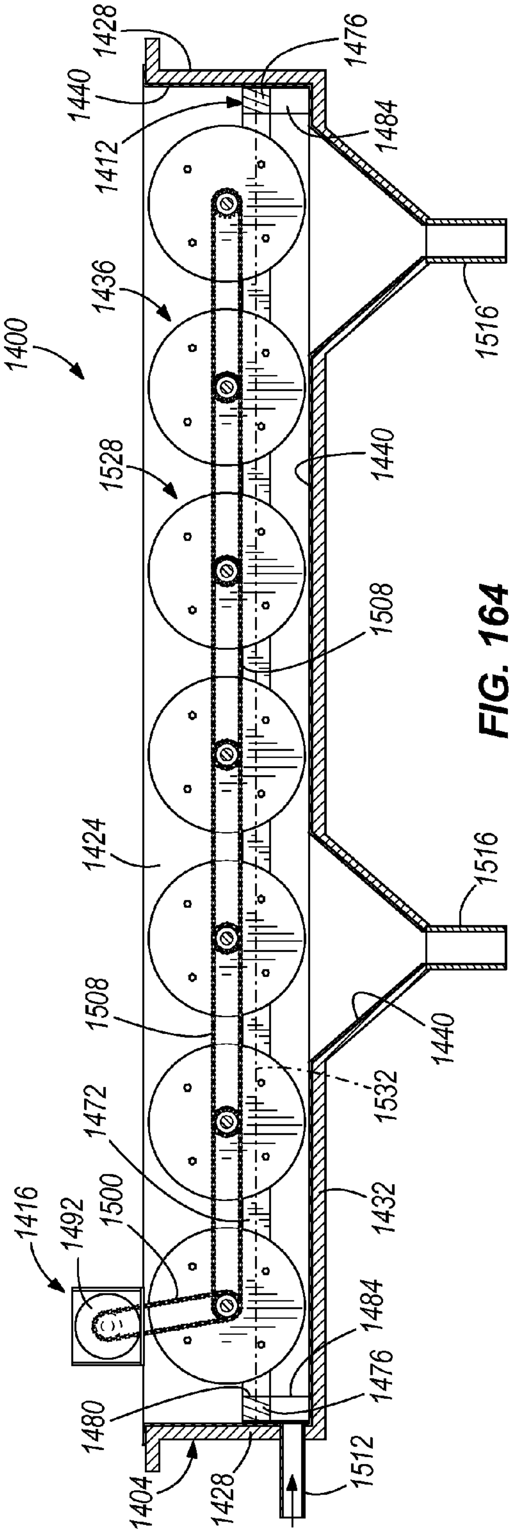
Figure 165:
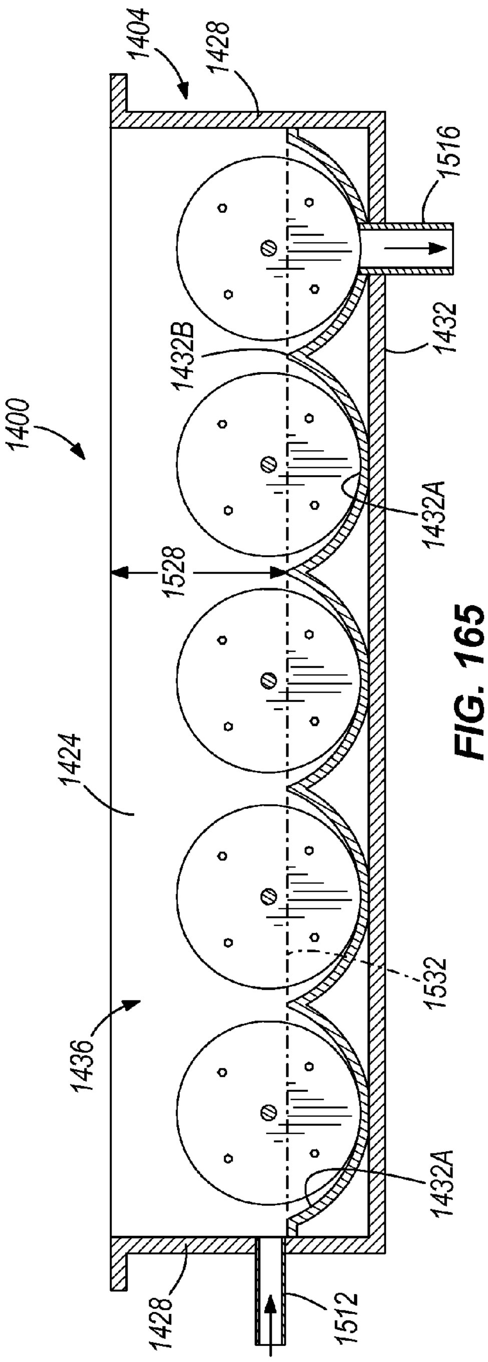
Figure 166:
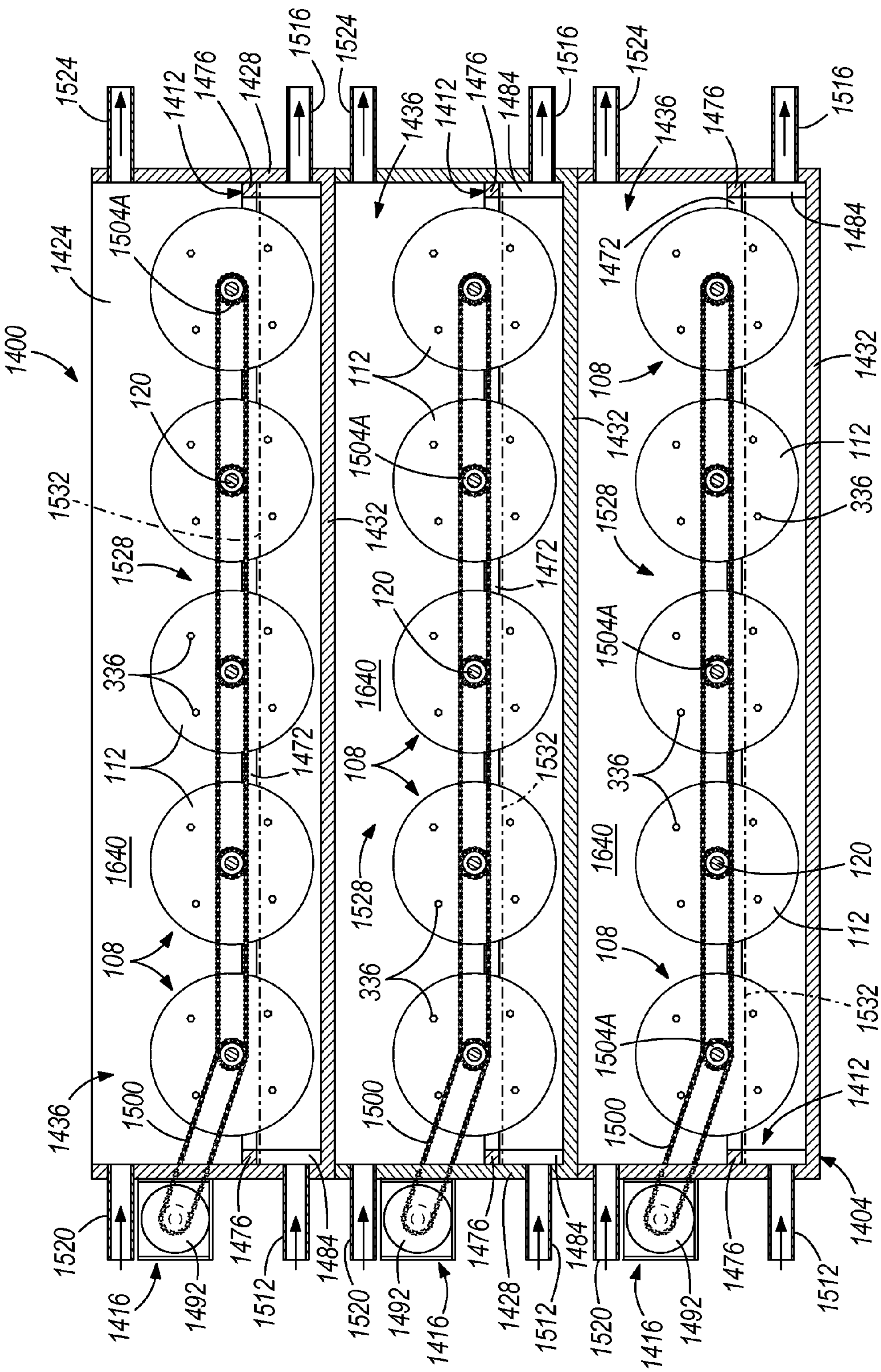
Figure 167:
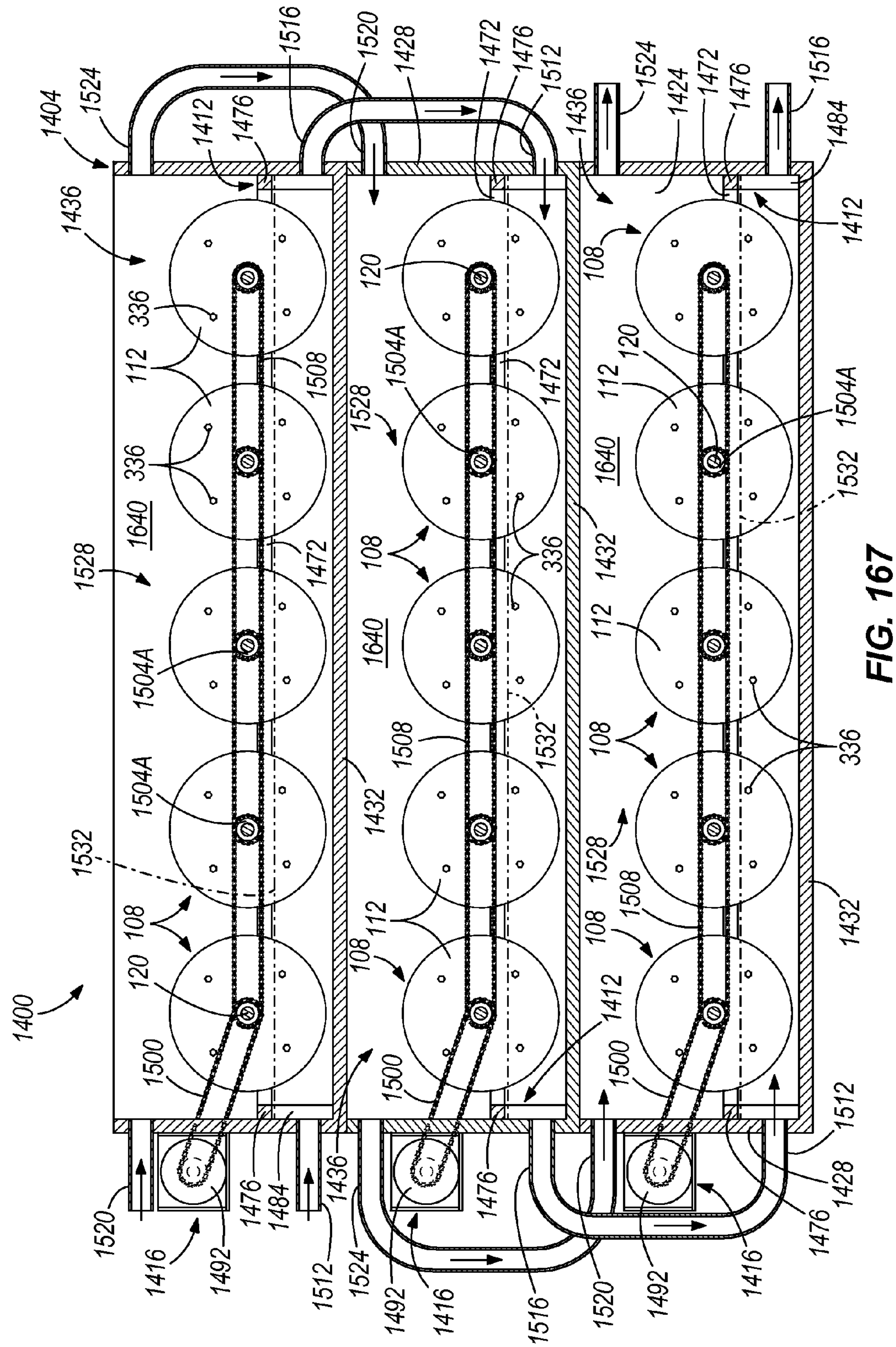
Figure 168:
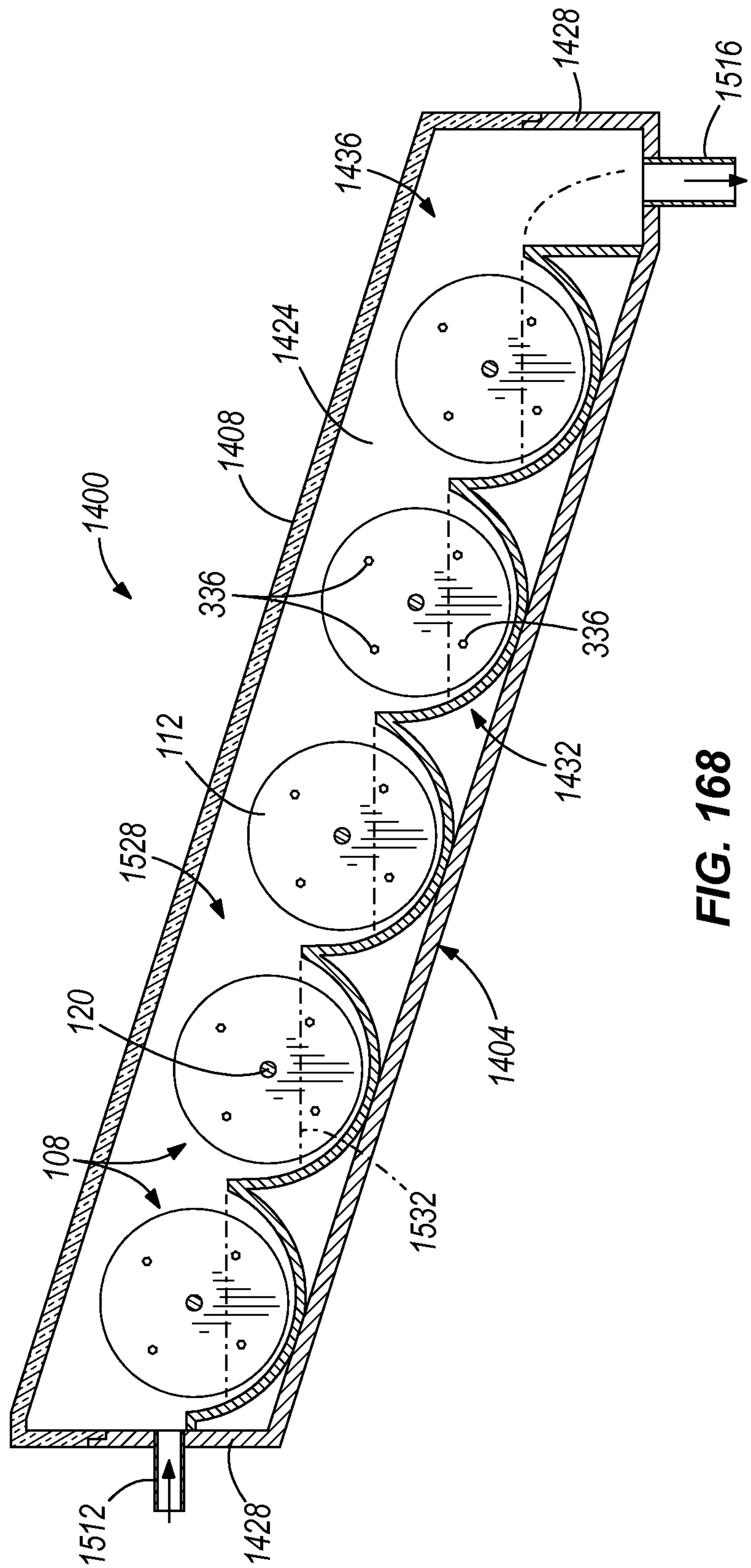
Figure 169:
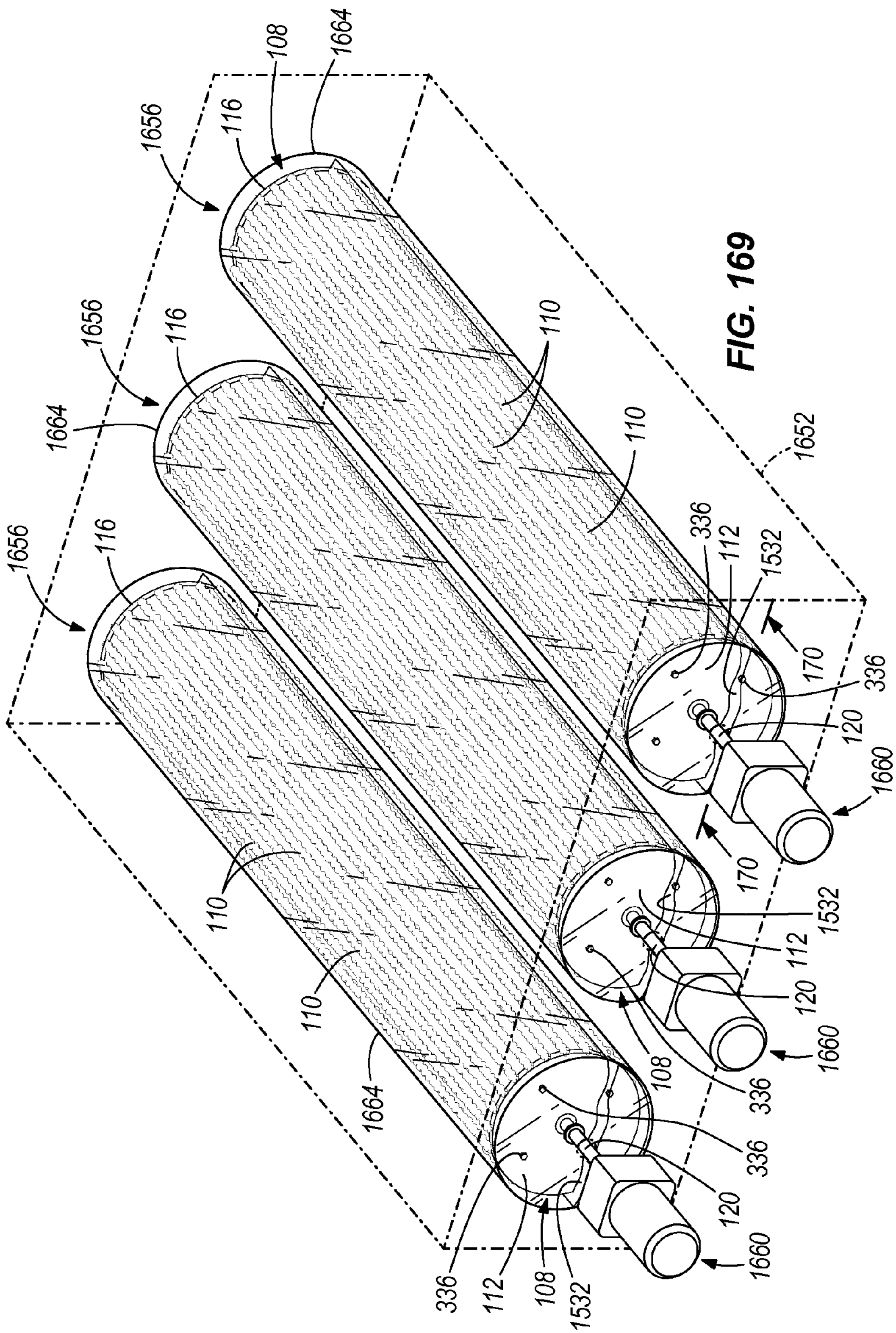
Figure 170:
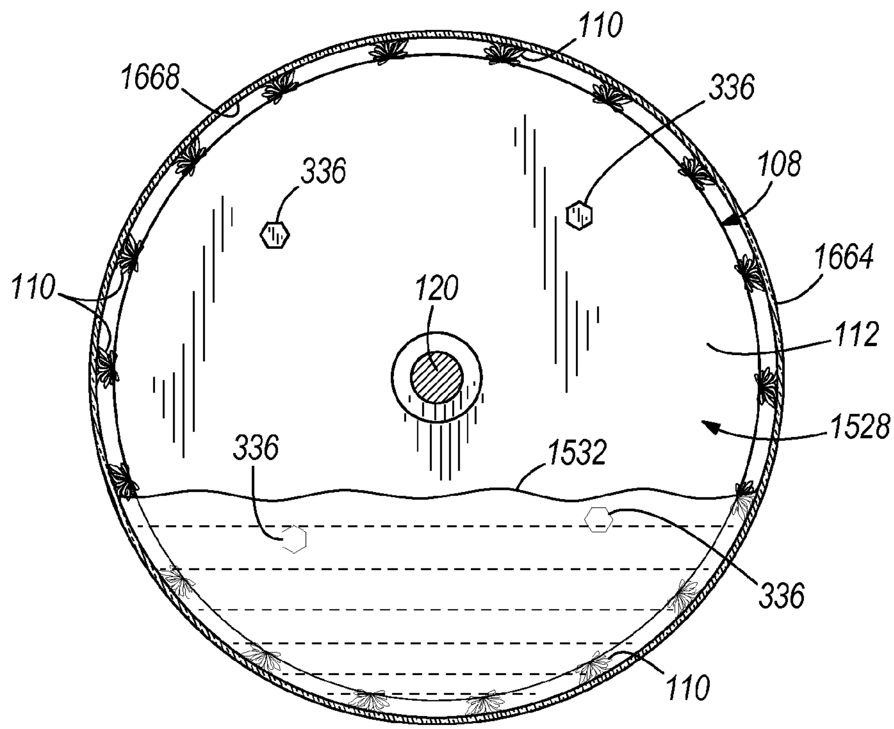
Figure 171:
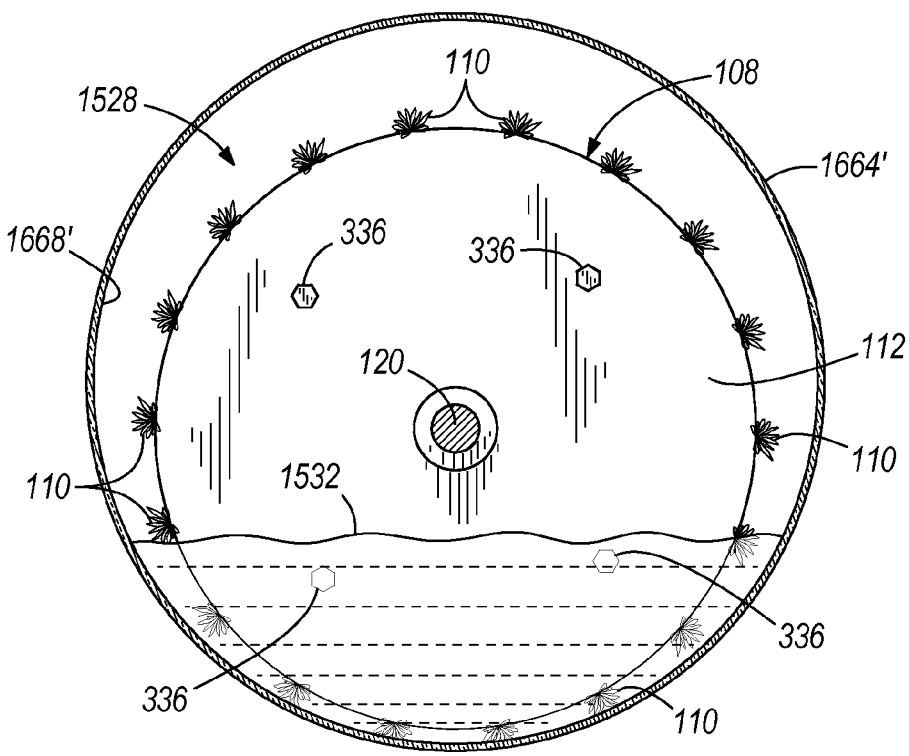
Figure 172:
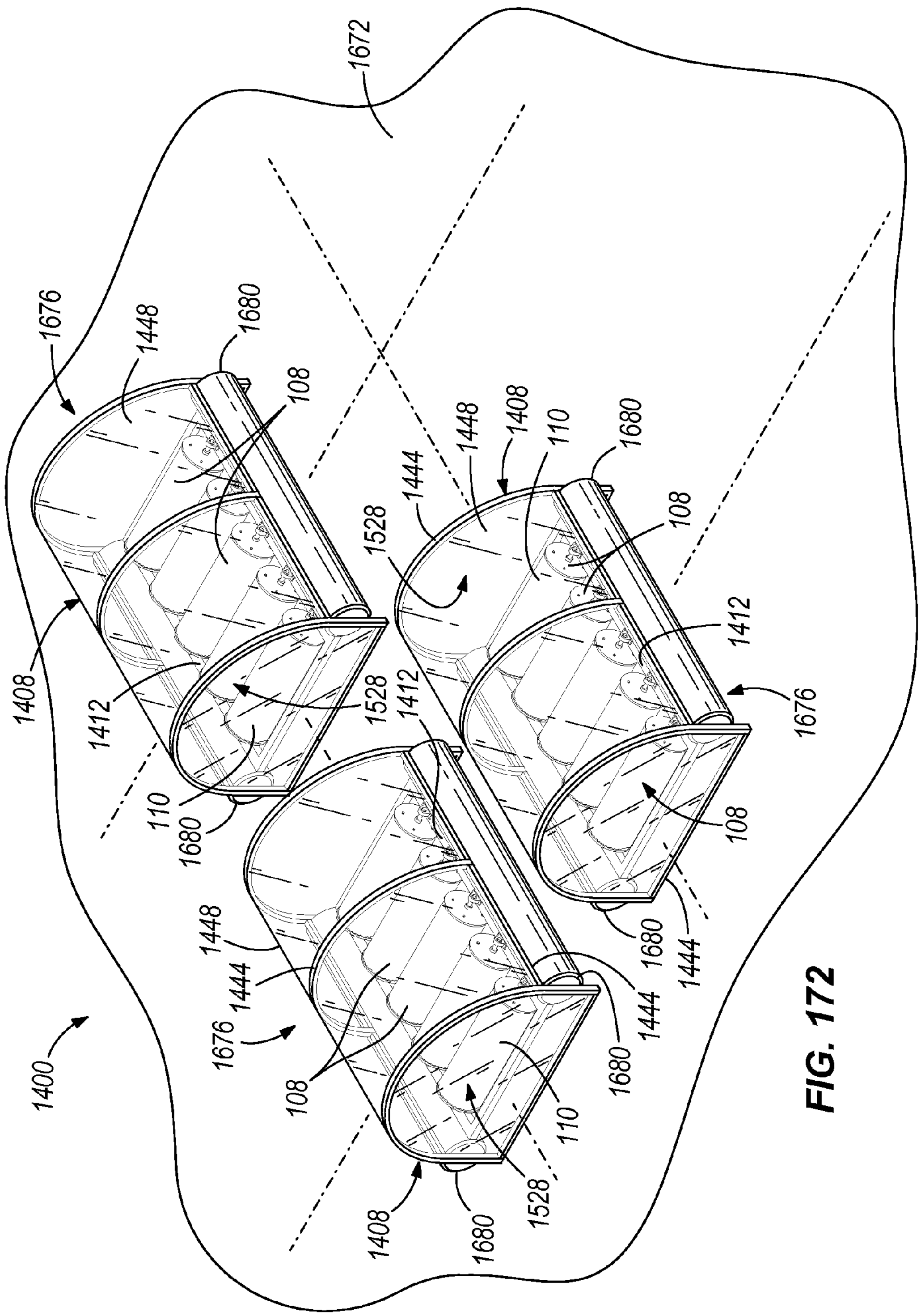
Figure 173:
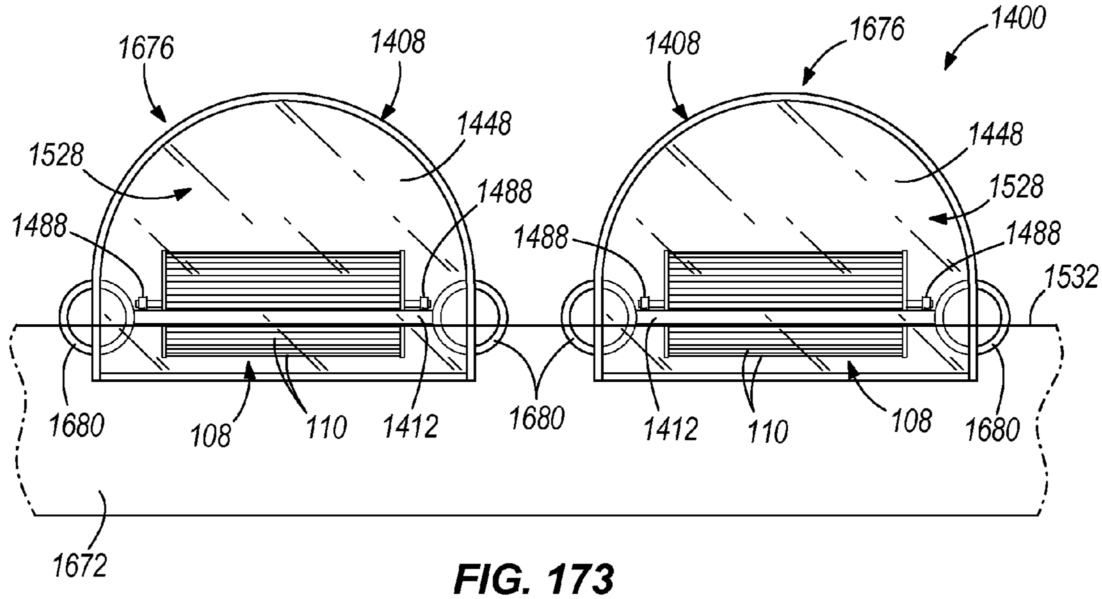
Figure 174:
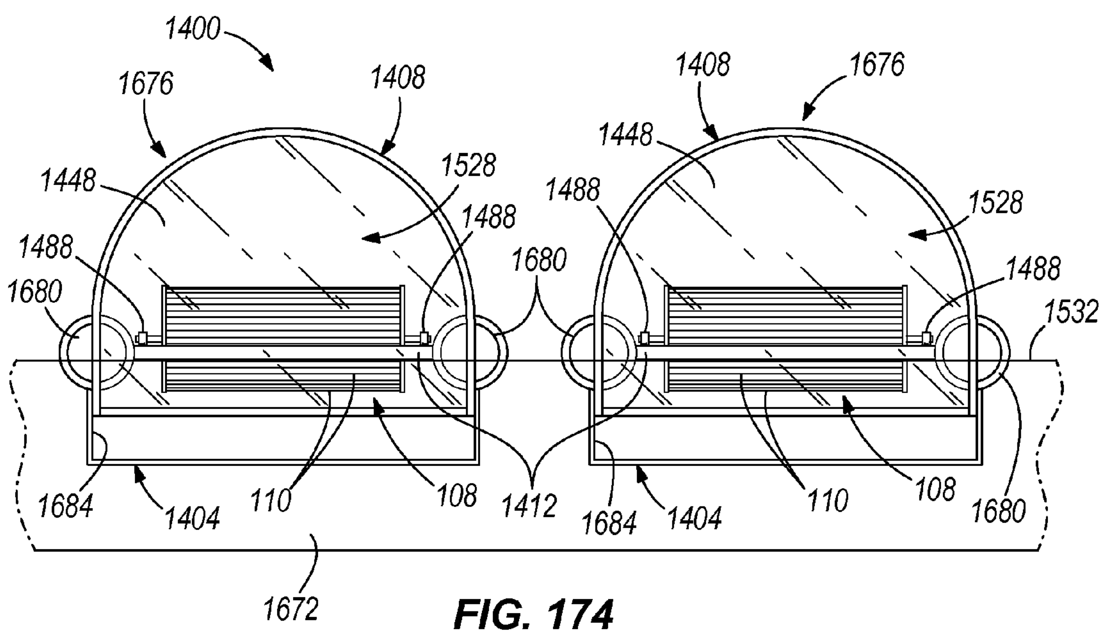
Figure 175:
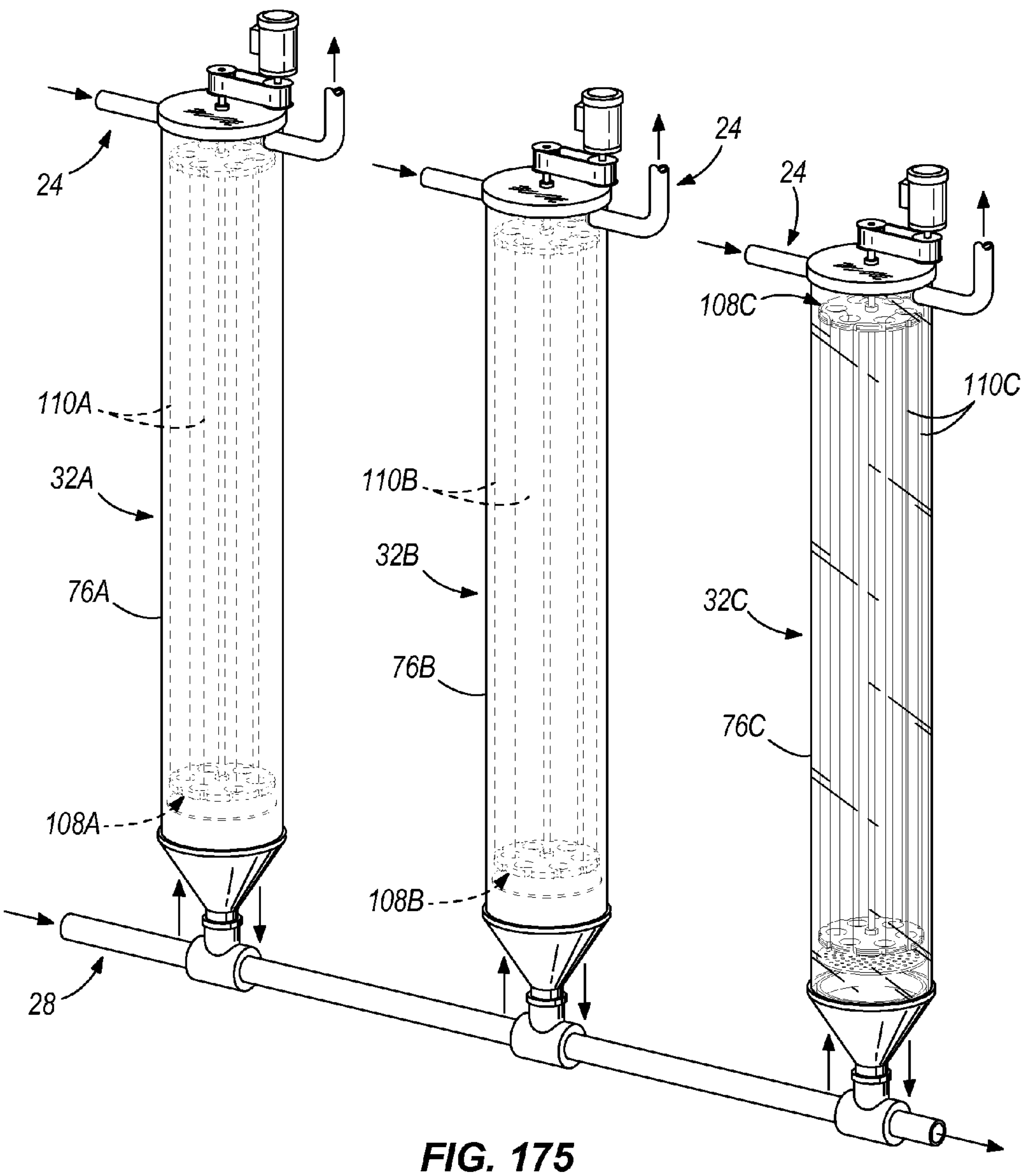
Figure 176:
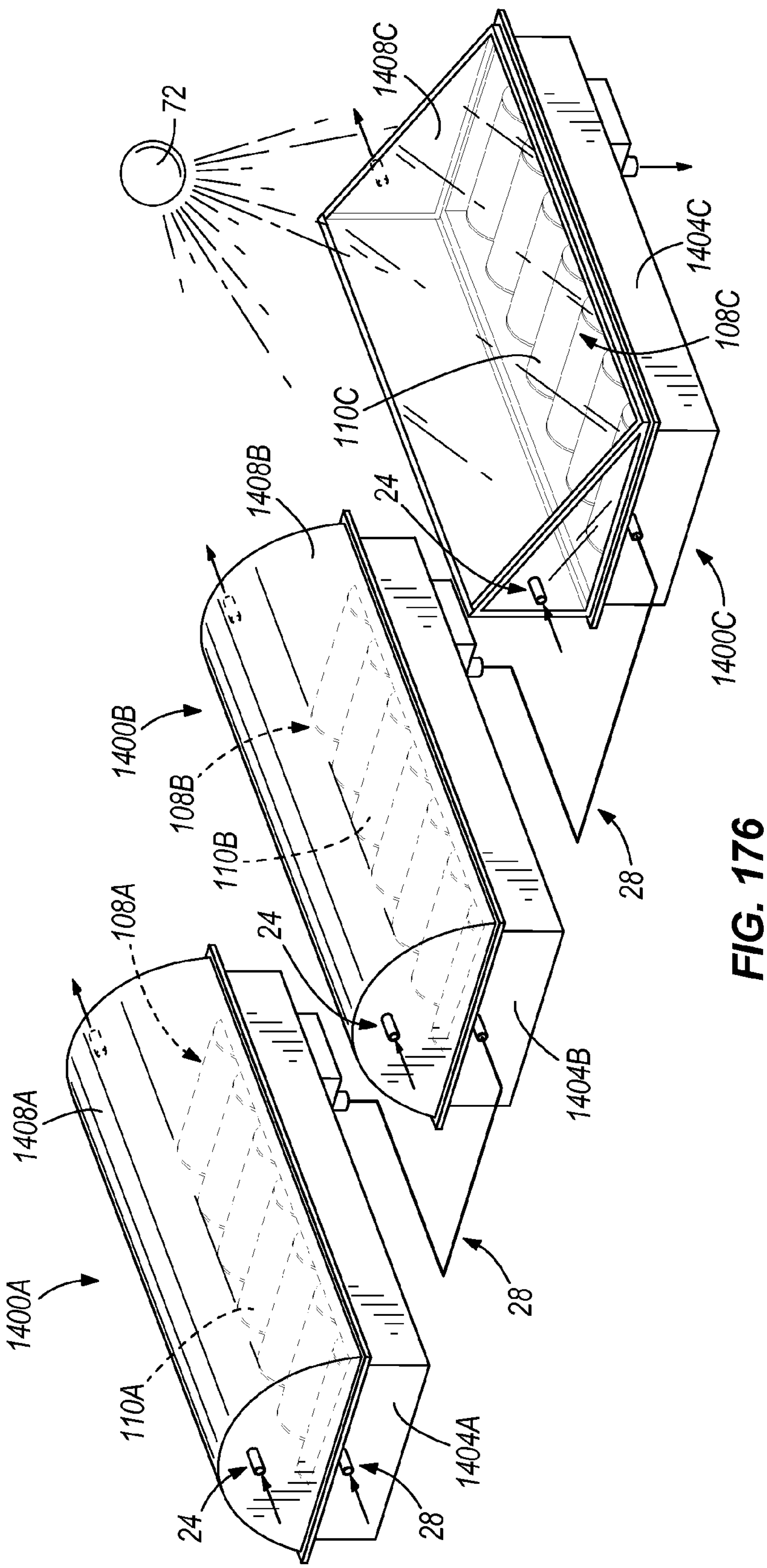

FIG. 132 is a top view of the exemplary wastewater treatment system of FIG. 127 shown with another exemplary manner of moving wastewater;

FIG. 133 is a top view of the exemplary wastewater treatment system of FIG. 127 shown with yet another exemplary manner of moving wastewater;

FIG. 134 is a top view of the exemplary wastewater treatment system of FIG. 127 shown with a further exemplary manner of moving wastewater;

FIG. 135 is a top view of yet another exemplary wastewater treatment system commonly referred to as a raceway;

FIG. 136 is a top view of still another exemplary wastewater treatment system showing a plurality of raceways disposed within a body of water;

FIG. 137 is a schematic of a further exemplary wastewater treatment system;

FIG. 138 is a top perspective view of yet a further exemplary wastewater treatment system;

FIG. 139 is a top view of the wastewater treatment system shown in FIG. 138 with a cover removed;

FIG. 140 is a cross-sectional view taken along line 140-140 in FIG. 139;

FIG. 141 is a top perspective view of a media frame and media supported on the media frame shown in FIG. 138 with a portion of the media represented schematically;

FIG. 142 is a top perspective view of another exemplary media frame and media supported thereon with a portion of the media represented schematically;

FIG. 143 is a top perspective view of yet another exemplary media frame and media supported thereon with a portion of the media represented schematically;

FIG. 144 is a top perspective view of still another exemplary media frame and media supported thereon with a portion of the media represented schematically;

FIG. 145 is a top perspective view of a further exemplary media frame and media supported thereon with a portion of the media represented schematically;

FIG. 146 is a top perspective view of yet a further exemplary media frame and media supported thereon with a portion of the media represented schematically;

FIG. 147 is a top perspective view of still a further exemplary media frame and media supported thereon;

FIG. 148 is a top perspective view of another exemplary media frame and media supported thereon;

FIG. 149 is an end view of the wastewater treatment system shown in FIG. 138 shown with another exemplary cover;

FIG. 150 is a top perspective view of still a further exemplary wastewater treatment system with the exemplary media frames and media supported on the media frames extending in a longitudinal direction of the system;

FIG. 151 is a top perspective view of another exemplary wastewater treatment system including multiple rows of media frames and media;

FIG. 152 is a top perspective view of yet another exemplary wastewater treatment system having an oval configuration;

FIG. 153 is a top perspective view of still another exemplary wastewater treatment system including fins coupled to media frames, the system moves wastewater therethrough to engage the fins and rotate the media frames;

FIG. 154 is a top perspective view of a media frame of the system shown in FIG. 153 with the media removed from the media frame;

FIG. 155 is a top perspective view of another exemplary media frame of the system shown in FIG. 153 with the media removed from the media frame;

FIG. 156 is a top perspective view of yet another exemplary media frame of the system shown in FIG. 153 with the media removed from the media frame;

FIG. 157 is a cross-sectional view taken along a vertical plane of another exemplary system for treating wastewater, this system is similar to the system shown in FIG. 138 except the present system shown in FIG. 157 is capable of adjusting the height of the media frames and media within the system;

FIG. 158 is a cross-sectional view taken along a vertical plane of a media frame and an exemplary microorganism removal mechanism coupled to the media frame;

FIG. 159 is a cross-sectional view taken along line 159-159 of FIG. 158;

FIG. 160 is a cross-sectional view taken along a vertical plane of a system including another exemplary microorganism removal mechanism;

FIG. 161 is a schematical end view of a further exemplary wastewater treatment system;

FIG. 162 is a schematical end view of yet a further exemplary wastewater treatment system;

FIG. 163 is a schematical end view of still a further exemplary wastewater treatment system including an auger;

FIG. 164 is a schematical front view of another exemplary wastewater treatment system including a plurality of outlets;

FIG. 165 is a cross-sectional view taken along a vertical plane of yet another exemplary wastewater treatment system including an arcuate bottom of a retaining wall;

FIG. 166 is a cross-sectional view taken along a vertical plane of still another exemplary wastewater treatment system including multiple layers of media frames;

FIG. 167 is a cross-sectional view taken along a vertical plane of another exemplary wastewater treatment system including multiple layers of media frames;

FIG. 168 is a cross-sectional view taken along a vertical plane of a further exemplary wastewater treatment system including a zigzag shape;

FIG. 169 is a top perspective view of yet a further exemplary wastewater treatment system, the system including a plurality of horizontal containers having one media frame in each container;

FIG. 170 is a cross-sectional view taken along line 170-170 in FIG. 169 of one of the containers;

FIG. 171 is a cross-sectional view similar to that shown in FIG. 170 of another exemplary container;

FIG. 172 is a top perspective view of still a further exemplary wastewater treatment system shown in a body of water;

FIG. 173 is an elevation view of the system shown in FIG. 176;

FIG. 174 is an elevation view of another exemplary wastewater treatment system disposed in a body of water;

FIG. 175 is a schematic of an exemplary wastewater treatment system; and

FIG. 176 is a schematic of another exemplary wastewater treatment system.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

DETAILED DESCRIPTION

Figure 1:
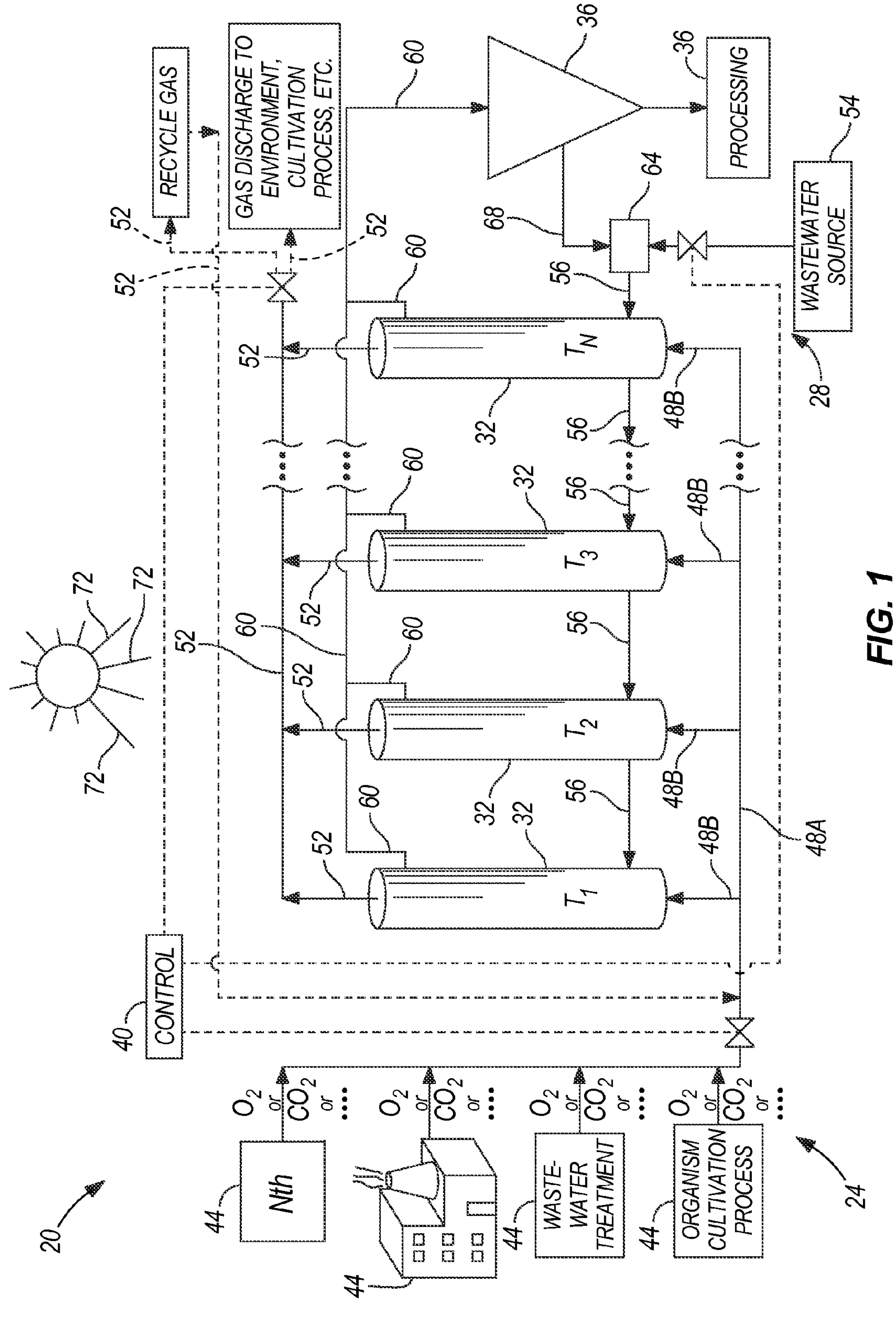
FIG. 1 is a schematic of an exemplary wastewater treatment system.

With reference to FIG. 1, an exemplary system 20 for treating wastewater is illustrated. The system 20 is capable of treating a wide variety of types of wastewater resulting from a wide variety of sources such as, for example: industry; municipal and domestic sewage; non-toxic wastewater that contains organic nutrients such as protein and sugar laden water from food and beverage processing, packaging, and bottling; land fill leach water; storm water runoff; aquaculture wastewater; hog, cow and other feed lot applications; etc. The wastewater may undergo initial screening, filtering, or treatments prior to introduction into the system 20 in order to remove larger objects or other undesired elements from the wastewater. When in the system 20, wastewater is exposed to organisms of all types and sizes including, but not limited to, microorganisms and macroorganisms. More particularly, such organisms may be of a variety of types including, but not limited to, any autotrophic, mixotrophic, heterotrophic, and chemotrophic organisms; nitrifying and denitrifying organisms such as, for example, nitrosomonas, nitrobacters, etc.; any activated sludge microbes commonly found in activated and integrated fixed film activated sludge processes; bacteria, etc.; which perform multiple treatments to the wastewater. While the systems disclosed herein are capable of treating wastewater with various types of organisms, the words “microorganism”, “microorganisms”, and variations thereof will be used hereinafter when referring to organisms in order to simply the following description and for the sake of brevity. However, it should be understood that the use of “microorganism”, “microorganisms”, and variations thereof is not intended to be limiting upon the disclosure of the present invention.

In some exemplary embodiments, the microorganisms may remove the Biochemical Oxygen Demand (“BOD”) and the Chemical Oxygen Demand (“COD”) from the wastewater, cause nitrification of the wastewater, and denitrification of wastewater. The waste digesting microorganisms are supplied with organic rich (polluted) wastewater and the microorganisms use the nutrients in the wastewater for metabolism and life processes, and reduce wastewater nutrients to non-polluting by-products. In some exemplary embodiments, the microorganism may be introduced into the wastewater with inoculums. In other exemplary embodiments, microorganisms required for treatment may naturally be found in the wastewater, thus introduction of microorganisms into the wastewater is not required. After the wastewater leaves the system 20, it may be sent to additional treatment processes such as, for example, solids removal, disinfection processes (e.g., ozonation, ultraviolet radiation, etc.), etc.

Different types of wastewater may require different types of microorganisms and environmental conditions in order to efficiently treat the wastewater. The system 20 is capable of accommodating various types of wastewater, various types of microorganisms, and controlling environmental conditions required to treat the various types of wastewater.

Figure 122:
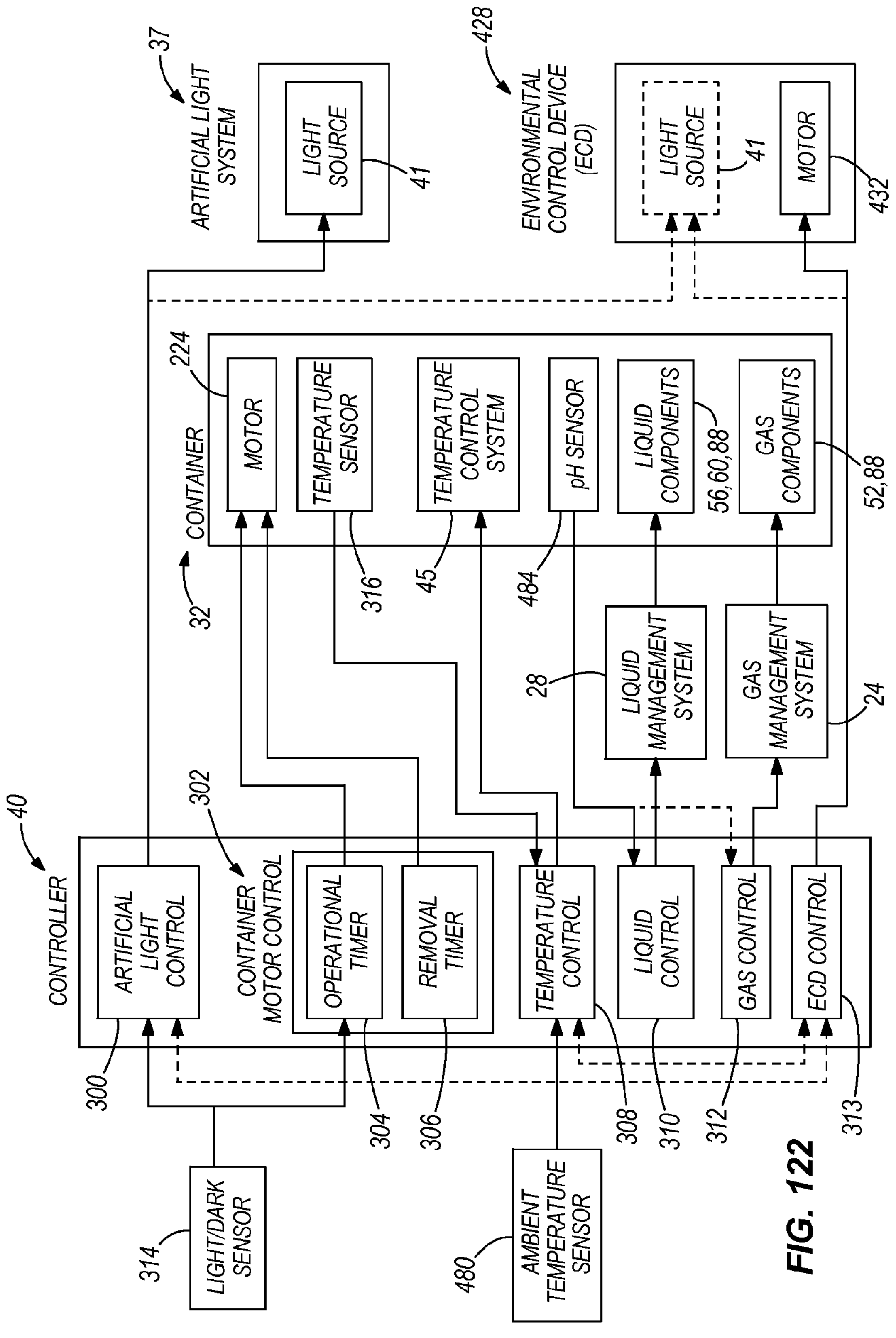
Figure 123:
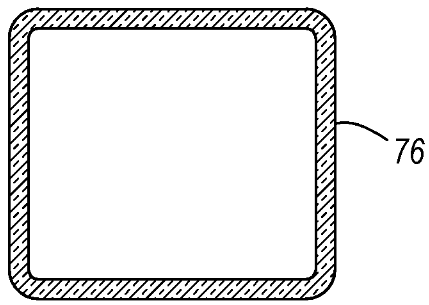
Figure 124:
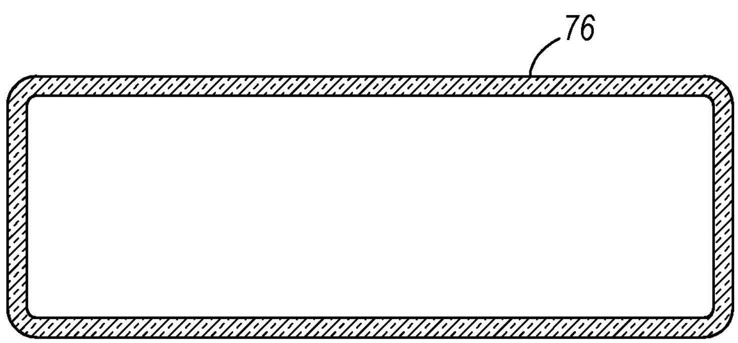
Figure 125:
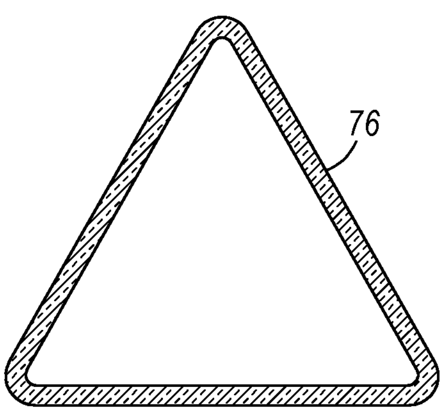
Figure 126:
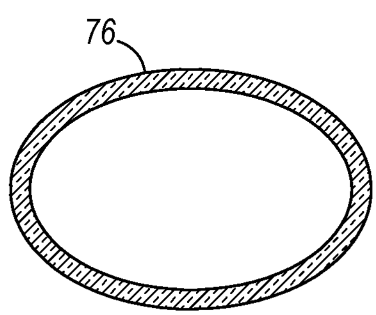

With continued reference to FIG. 1, the system 20 includes a gas management system 24, a liquid management system 28, a plurality of containers 32, downstream wastewater treatment equipment 36, an artificial light system 37 (see FIGS. 30-80 and 100-107), a clean-in-place or flushing system 38 (see FIG. 81), and a programmable logic controller 40 (see FIG. 122). The gas management system 24 includes at least one gas source 44, which may be one or more of a wide variety of sources. In some exemplary embodiments, the gas source 44 may provide a gas at least partially comprised of oxygen. In such exemplary embodiments, the gas source 44 may be atmospheric gas, emissions containing oxygen generated from an industrial facility, a byproduct generated from an algae cultivation facility, or a pressurized oxygen canister. It is preferred that the gas from the gas source 44 does not contain toxic levels of sulfur dioxide or other toxic gases and compounds, such as heavy metals, that may inhibit microbial growth. If the gas exhausted from a source includes sulfur dioxide or other toxic gases or materials, it is preferable that the gas be scrubbed or purified prior to introduction into the containers 32. The gas management system 24 introduces the gas into the containers 32 in a feed stream. In some exemplary embodiments, the feed stream may comprise between about 10% and about 100% of oxygen by volume. Alternatively, the feed stream may comprise other percentages of oxygen by volume and still be within the spirit and scope of the present invention.

The oxygen source 44 for the system 20 may be a single source 44 (e.g., atmospheric gas), a plurality of similar sources 44 (e.g., a plurality of algae cultivation facilities), or a plurality of different sources 44 (e.g., atmospheric gas and an algae cultivation facility). The gas management system 24 includes a network of pipes 48 that delivers the gas from the gas source(s) 44 to each of the containers 32. In the illustrated exemplary embodiment of FIG. 1, the containers 32 are connected in parallel via the pipes 48. As represented in the illustrated exemplary embodiment, the network of pipes 48 includes a main inlet line 48A and a plurality of secondary inlet branches 48B, which extend from the main inlet line 48A and route the gas from the main inlet line 48A to each of the plurality of containers 32. The secondary inlet branches 48B are connected to the bottom of the containers 32 and release the gas into the interior of container 32, which is generally filled with wastewater. When introduced into the containers 32, the gas assumes the form of bubbles in the wastewater and ascends through the wastewater to the top of the containers 32. In some examples, the pressure range contemplated for the introduction of the gas is about 1-100 pounds per square inch (psi). The gas management system 24 may include a gas sparger, diffuser, bubble distributor, water saturated gas injection, or other device located at the bottom of the containers 32 to introduce the gas into the containers 32 and more evenly distribute the gas throughout the containers 32. Additionally, other gas spargers, diffusers, bubble distributors, or other devices may be incrementally disposed within and along the height of containers 32 to introduce gas bubbles into the containers 32 at multiple height locations. The oxygen introduced into containers 32 is, at least in part, consumed by microorganisms contained within container 32 in the wastewater treatment process. In some embodiments, the gas management system 24 may include, where necessary, gas pre-filtering, cooling, and toxic gas scrubbing elements.

The gas management system 24 further includes gas discharge pipes 52. As described above, oxygen that is introduced into the container and not consumed by microorganisms migrates up the container 32 and accumulates in the upper region of each of the containers 32. When the microorganisms consume the oxygen, a byproduct of the consumption process is carbon dioxide which is released by the microorganisms into the wastewater. Such carbon dioxide may rise and accumulate at the top region of the container 32 with the excess oxygen. High carbon dioxide levels in the wastewater and container 32 may inhibit the microorganisms from treating the wastewater in the containers 32. Accordingly, it is desirable to exhaust carbon dioxide and other undesirable gases from the containers 32.

The accumulated gas at the top of the containers 32 may be exhausted from the containers 32 in a variety of manners including, for example, to the environment, back into the main gas line for recycling, or to further processes where additional oxygen and/or carbon dioxide may be extracted. Further, in some exemplary embodiments, a portion of the excess gas may be exhausted to the environment and a portion of the gas may be recycled by introducing it into the main gas line or sent for further processing.

As described above, the illustrated exemplary embodiment of the wastewater treatment system 20 includes a gas management system providing oxygen to the containers 32, which makes the system 20 an aerobic system. It should be understood that the wastewater treatment system 20 may have other exemplary embodiments where the system 20 is not an aerobic system. For example, the system 20 may not include a gas management system and, thus, may not provide oxygen to the containers 32, thereby making the system an anaerobic system. Also, for example, the system 20 may operate in an anoxic condition where the oxygen is bound to another compound such as, for example, nitrogen (i.e., nitrate—NO3), and introduced into the containers 32. Further, for example, the gas management system 24 may deliver a gas other than oxygen to the containers 32 such as, for example, carbon dioxide, etc. In such examples, the system may include organisms in the container 32 that require gases other than oxygen in order to digest, consume, or otherwise treat the wastewater. The illustrated exemplary embodiment of the system 20, along with these and other alternative exemplary embodiments of the system 20, are not intended to be limiting and the system 20 is capable of operating in different manners.

The liquid management system 28 comprises a wastewater source 54, a network of pipes including wastewater inlet pipes 56 that provide wastewater to the containers 32, wastewater outlet pipes 60 that exhaust treated wastewater and excess microorganisms from the containers 32, and at least one pump 64. Outlet pipes 60 may be used to transfer treated wastewater and microorganisms downstream to other equipment 36 for further processing. The pump 64 controls the amount and rate at which wastewater is introduced into and removed from the containers 32. In some embodiments, the liquid management system 28 may include two pumps, one for controlling the introduction of wastewater into the containers 32 and one for controlling removal of treated wastewater and excess microorganisms from the containers 32. The liquid management system 28 may also comprise wastewater reclamation pipes 68 that reintroduce the treated wastewater back into the wastewater inlet pipes 56 for further treatment.

The plurality of containers 32 are utilized to treat wastewater therein. The containers 32 may be sealed-off from the surrounding environment and the internal environment of the containers 32 is controlled by the controller 40 via the gas and liquid management systems 24, 28 among other components described in greater detail below. With reference to FIG. 122, the controller 40 includes an artificial light control 300, a motor control 302 having an operational timer 304 and a removal timer 306, a temperature control 308, a liquid control 310, a gas control 312, and an environmental control device (ECD) control 313. Operation of the controller 40 as it relates to the components of the wastewater treatment system 20 will be described in greater detail below. In an exemplary embodiment, the controller 40 may be an Allen Bradley CompactLogix programmable logic controller (PLC). Alternatively, the controller 40 may be other types of devices for controlling the system 20 in the manner described herein.

In some embodiments, the containers 32 are oriented in a vertical manner and may be arranged in a relatively tightly packed side-by-side array in order to efficiently utilize space, with for example, containers ranging 3 inches to 6+ feet in width or diameter, and 6 to 30+ feet in height. For example, a single acre of land may include about 2000 to 2200 containers having a 24-inch diameter. In other embodiments, the containers 32 may be stacked one above another to provide an even more efficient use of space. In such embodiments where the containers are stacked, gas introduced into a bottom container may ascend through the bottom container and, upon reaching the top of the bottom container, may be routed to a bottom of a container positioned above the bottom container. In this manner, the gas may be routed through several containers in order to effectively utilize the gas.

Figure 85:
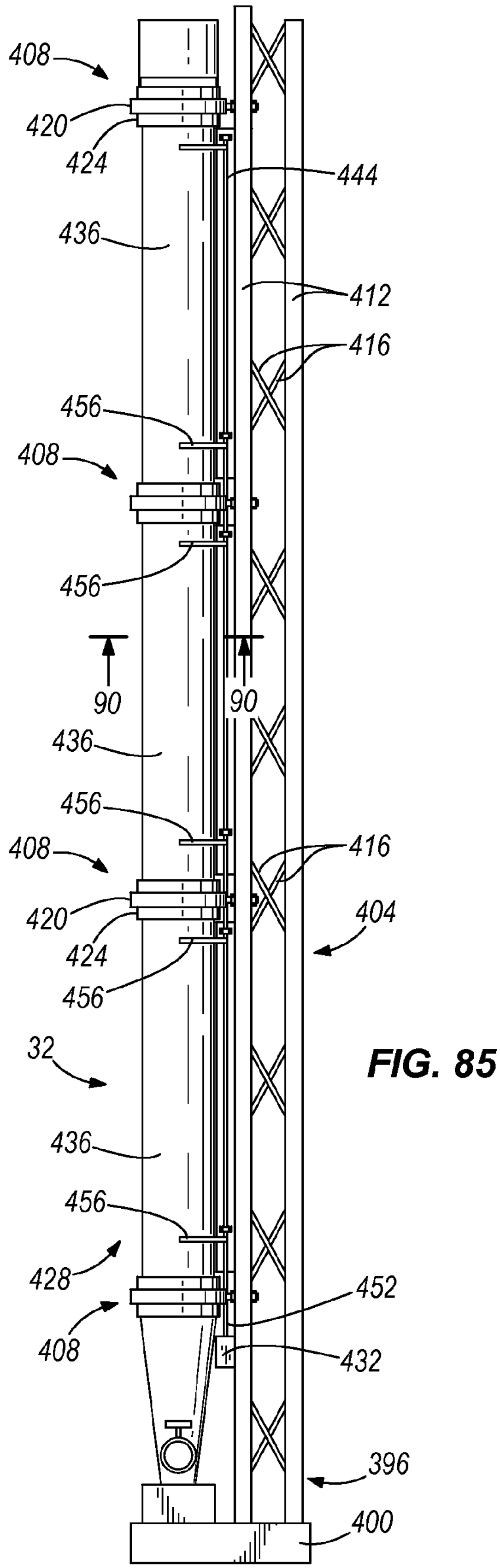
FIG. 85 is an elevation view of an exemplary container, an exemplary environmental control device, and an exemplary support structure for supporting the container and the environmental control device in a vertical manner.

The containers 32 may be vertically supported in a variety of different manners. One exemplary manner of vertically supporting the containers 32 is illustrated in FIG. 85 and is described in greater detail below. This illustrated example is only one of many exemplary manners of supporting the containers 32 and is not intended to be limiting. Other manners of supporting the containers 32 are contemplated and are within the spirit and scope of the present invention.

Light energy or photons are an important ingredient of the photosynthesis process for some microorganisms used to treat wastewater. Photons may originate from sunlight or artificial light sources. Some of the exemplary embodiments disclosed herein utilize sunlight as the source of photons, other exemplary embodiments disclosed herein utilize artificial light as the source of photons, while still other embodiments utilize a combination of sunlight and artificial light as the source of photons. With respect to the exemplary embodiment illustrated in FIG. 1, sunlight 72 is the source of photons. The containers 32 illustrated in FIG. 1 are arranged to receive direct sunlight 72 to facilitate the photosynthesis process, which facilitates cultivation of the microorganisms within the containers 32. It should also be understood that not all microorganisms used in the systems disclosed herein require photons for growth and energy and, instead, rely on other elements for growth and energy.

Figure 2:
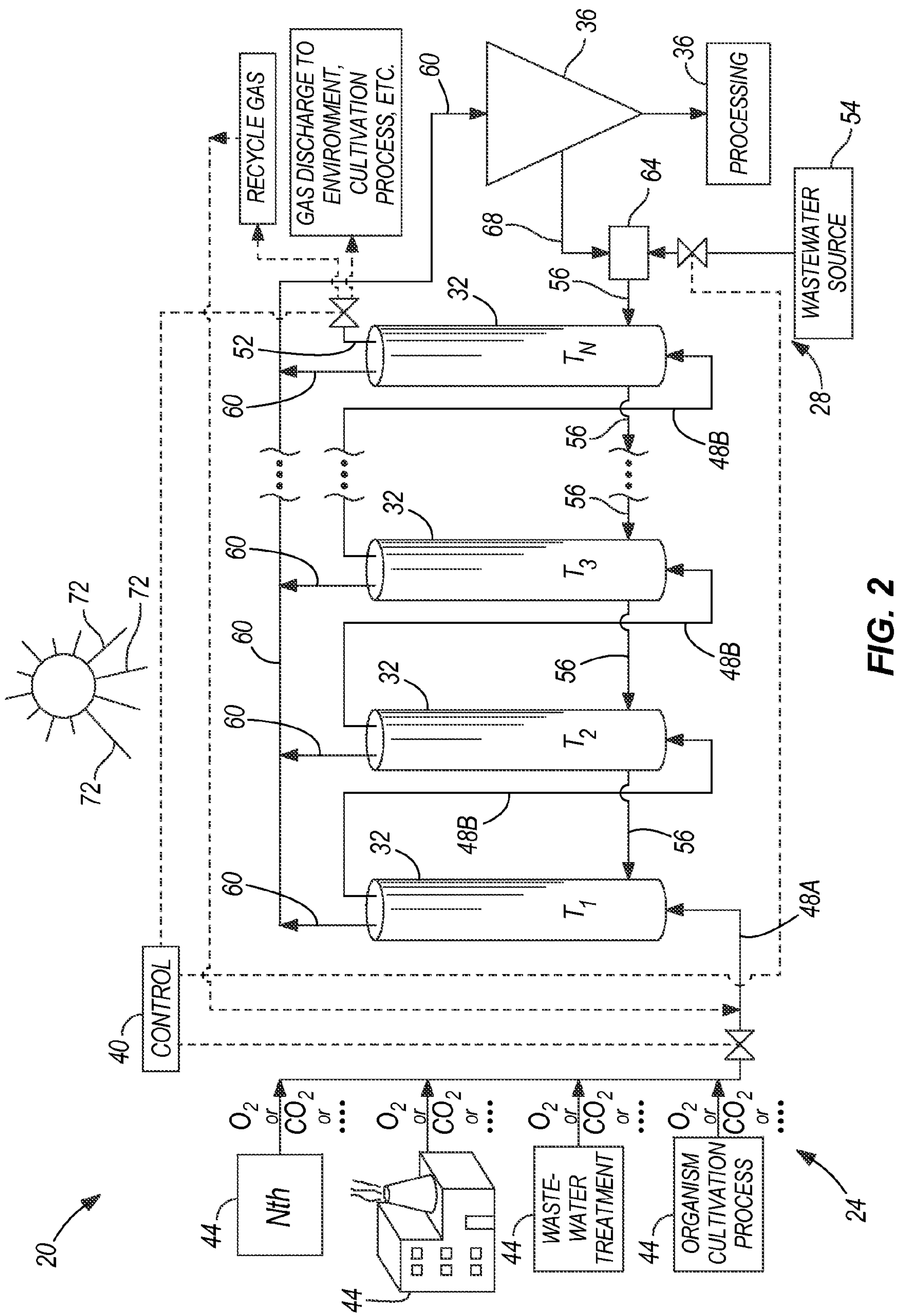
FIG. 2 is a schematic of another exemplary wastewater treatment system.

Referring now to FIG. 2, another exemplary system 20 for treating wastewater is illustrated and has many similarities to the system 20 illustrated in FIG. 1, particularly with respect to the plurality of containers 32, the liquid management system 28, and the controller 40. Similar components between embodiments illustrated in FIGS. 1 and 2 may be identified with the same reference numbers or may be identified with different reference numbers.

In the exemplary embodiment illustrated in FIG. 2, the containers 32 are connected in series by way of the gas management system 24 and, more specifically, by way of the network of pipes 48, which is in contrast with the embodiment illustrated in FIG. 1 where the containers 32 are connected in-parallel by way of the gas management system 24. When connected in series, the gas management system 24 includes a main inlet line 48A that introduces gas into the bottom of a first container 32 ($T_1$) and includes a plurality of serial secondary inlet branches 48B that transport the exhausted gas from one container 32 to the bottom of the next container 32. After the last container 32 ($T_N$), the gas is exhausted from the last container 32 ($T_N$) through the gas discharge pipe 52 to any one or more of the environment, reintroduced into the main gas line, an algae cultivation process, delivered for further processing, etc.

It should be understood that the plurality of containers 32 may be connected to one another in a combination of both parallel and serial manners and the gas management system 24 may be appropriately configured to route gas to the containers 32 when connected in both serially and parallel manners.

The wastewater treatment systems illustrated in and described with respect to FIGS. 1 and 2, and other wastewater treatment systems disclosed herein include a liquid management system 28 that allows the individual containers 32 to be emptied and filled on demand. This feature is a valuable resource for controlling contamination of the containers 32. If contamination occurs in one or more of the containers 32, those containers 32 may be emptied and the contaminate eliminated. To the contrary, in conventional wastewater pond or tank systems, contamination anywhere in the pond or tanks contaminates the entire pond or tank and, therefore, the entire pond or tank must be emptied and/or treated. Emptying an entire pond or tank may be a cumbersome task if not, in some cases, impossible. In addition, many systems disclosed herein, including those in FIGS. 1 and 2, include individual containers 32 and if contamination occurs in one of the containers 32, other containers 32 are not affected. Thus, the systems disclosed herein are more adept at dealing with contamination than conventional wastewater treatment pond or tank systems.

With reference to FIGS. 3-27, the plurality of containers 32 will be described in greater detail. In this example, the plurality of containers 32 are all substantially identical and, therefore, only a single container 32 is illustrated and described herein. The illustrated and described container 32 is only an exemplary embodiment of the container 32. The container 32 is capable of having a different configuration and capable of including different components. Thus, the illustrated container 32 and accompanying description is not meant to be limiting.

Figure 3:
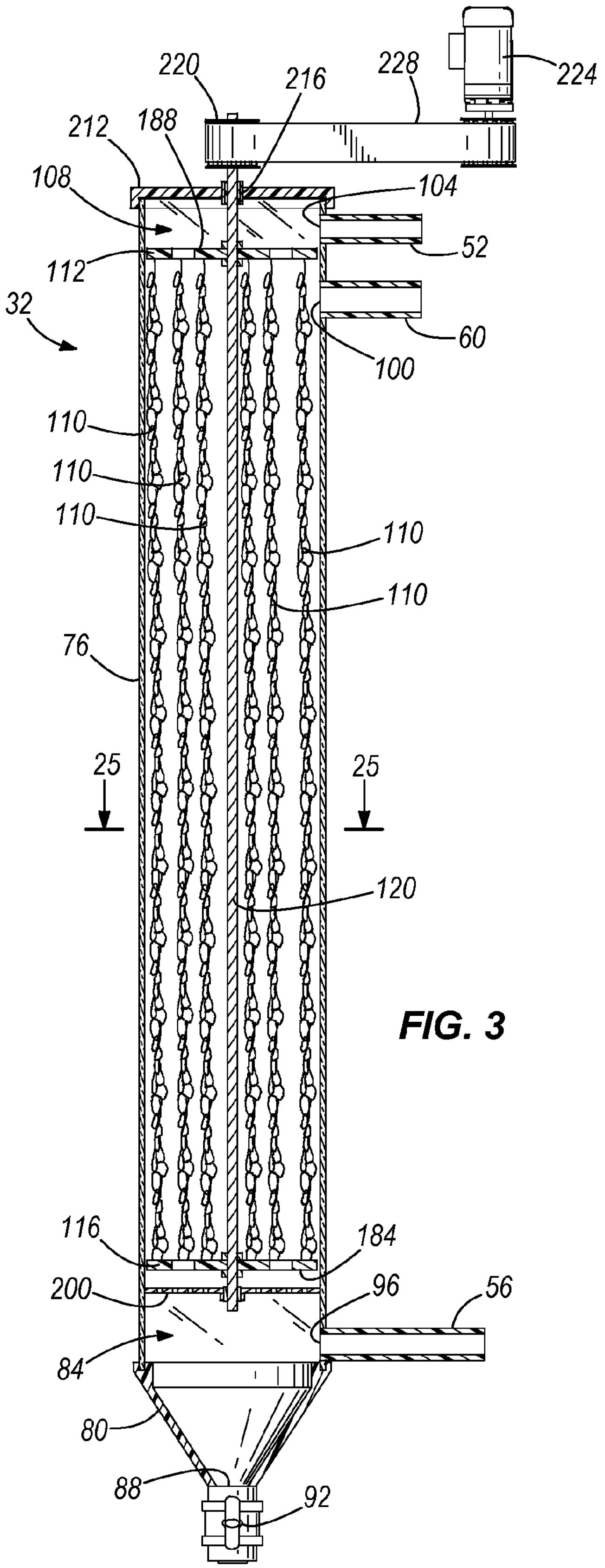
FIG. 3 is a cross-sectional view taken along a longitudinal plane of a container of the systems shown in FIGS. 1 and 2.
Figure 4:
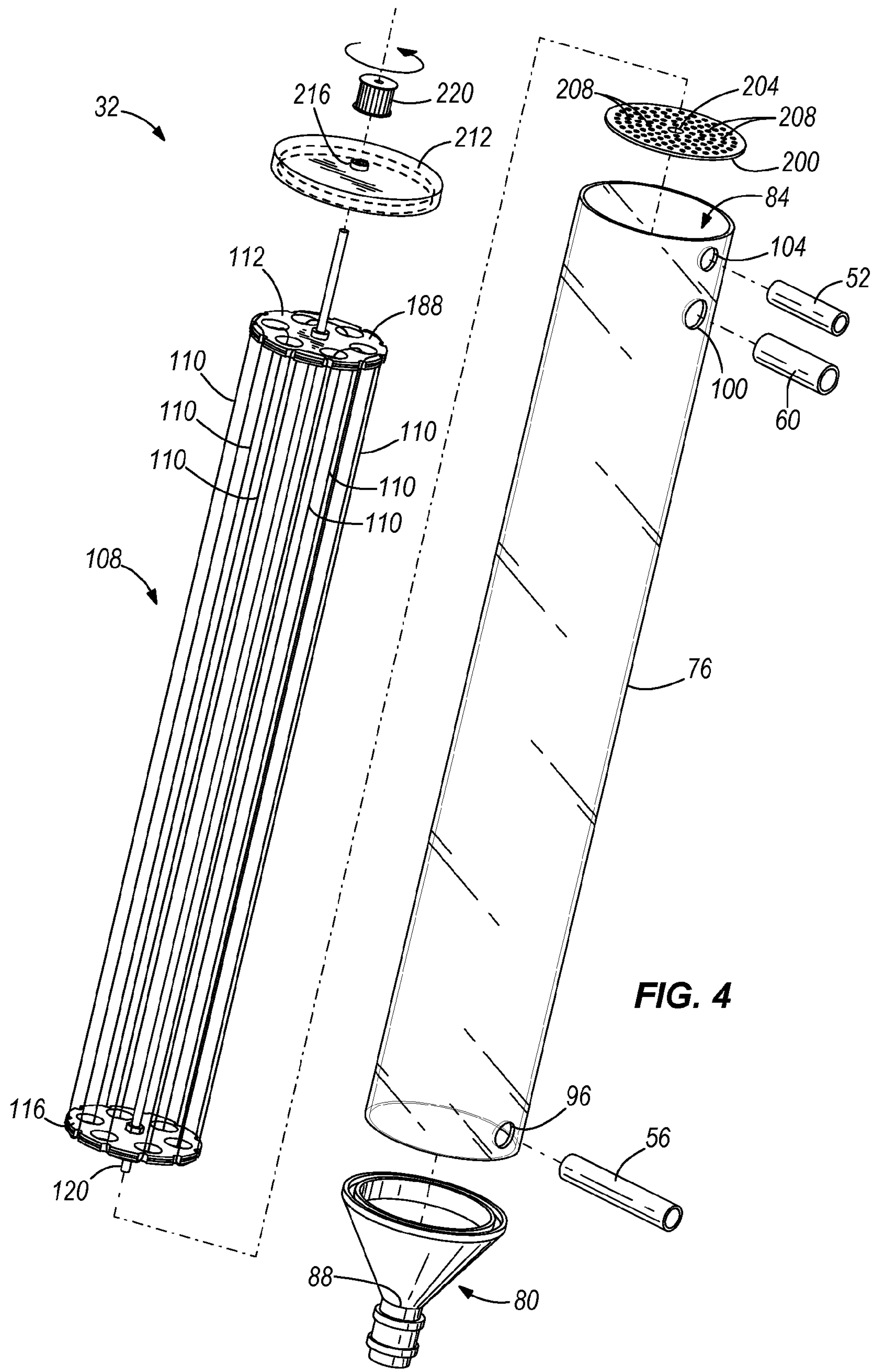
FIG. 4 is an exploded view of the container shown in FIG. 3.

With particular reference to FIGS. 3 and 4, the illustrated exemplary container 32 includes a cylindrical housing 76 and a frusto-conical base 80. Alternatively, the housing 76 may have different shapes, some of which will be described in greater detail below with reference to FIGS. 123-126. The housing 76 may be made of an opaque, translucent, or transparent material.

In some exemplary embodiments, it may be desirable to prevent the contents of the container 32 from being exposed to sunlight or other light sources. In such exemplary embodiments, the housing 76 is preferably made of an opaque material such as, for example, fiberglass, stainless steel, plastic, concrete, polypropylene, polyethylene, any polyvinylchloride, etc.

In other exemplary embodiments, the housing 76 may be made of multiple materials in a dual layer configuration including an outer housing and interior liner. In such embodiments, the outer housing may be made of a first material and the inner liner may be made of a second material. The outer housing and inner liner may be made of any of the above referenced materials or other appropriate materials.

In yet other exemplary embodiments, exposure of the container contents to light may not be of concern or, in some cases, may be desired. In such exemplary embodiments, the housing 76 may be made of a translucent or transparent material such as, for example, glass, acrylic, plastic (such as polycarbonate), LEXAN® (a highly durable polycarbonate resin thermoplastic), fiber re-enforced plastic (FRP), laminated composite material (glass plastic laminations), and any other appropriate material. In such embodiments, a significant amount of sunlight 72 penetrates through the housing 76, into the cavity 84, and contacts the microorganisms contained within the container 32. In some embodiments, the housing 76 is translucent to allow penetration of some sunlight 72 through the housing 76 and into the cavity 84. In other embodiments, the housing 76 may be coated with infrared inhibitors, Ultraviolet blockers, or other filtering coatings to inhibit heat, ultraviolet rays, and/or particular wavelengths of light from penetrating through the housing 76 and into the container 32. The housing 76 can be made of a variety of materials including, for example, plastic (such as polycarbonate), glass, and any other material that allows penetration of sunlight 72 through the housing 76. One of the many possible materials or products from which the housing 76 may be made is the translucent aquaculture tanks manufactured by Kalwall Corporation of Manchester, N.H.

In some embodiments, the housing 76 may be made of a material that does not readily form a desired shape of the housing 76 under normal circumstances such as, for example, cylindrical. In such embodiments, the housing 76 may have the tendency to form an oval cross-sectional shape rather than a substantially round cross-sectional shape. To assist the housing 76 with forming the desired shape, additional components may be required. For example, a pair of support rings may be disposed within and secured to the housing 76, one near the top and one near the bottom. These support rings are substantially circular in shape and assist with forming the housing 76 into the cylindrical shape. In addition, other components of the container 32 may assist the housing 76 with forming the cylindrical shape such as, for example, upper and lower connector plates 112, 116, a bushing 200, and a cover 212 (all of which are described in greater detail below). Example of materials that may be used to make the container housing 76 may include polycarbonate, acrylic, LEXAN® (a highly durable polycarbonate resin thermoplastic), fiber reenforced plastic (FRP), laminated composite material (glass plastic laminations), glass, etc. Such materials may be formed in a sheet and rolled into a substantially cylindrical shape such that edges of the sheet engage each other and are bonded, welded, or otherwise secured together in an air and water tight manner. Such a sheet may not form a perfectly cylindrical shape when at rest, thereby requiring the assistance of those components described above used to form the desired shape. Alternatively, such materials may be formed in the desired cylindrical shape rather than formed as a sheet and rolled.

The base 80 includes an opening 88 through which gas is injected by the gas management system 24 into the container 32. A gas valve 92 (see FIG. 3) is coupled between the gas management system 24 and the base 80 of the container 32 to selectively prevent or allow the flow of gas into the container 32. In some embodiments, the gas valve 92 is electronically coupled to the controller 40 and the controller 40 determines when the gas valve 92 is opened and closed. In other embodiments, the gas valve 92 is manually manipulated by a user and the user determines when the gas valve 92 is opened and closed.

With continued reference to FIGS. 3 and 4, the housing 76 also includes a wastewater inlet 96 in fluid communication with the liquid management system 28 to facilitate the flow of wastewater into the container 32. In the illustrated exemplary embodiment, the wastewater inlet 96 is disposed in the housing 76 near a bottom of the housing 76. Alternatively, the wastewater inlet 96 may be disposed closer to or further from the bottom. In the illustrated exemplary embodiment, the housing 76 includes a single wastewater inlet 96. Alternatively, the housing 76 may include a plurality of wastewater inlets 96 to facilitate injection of wastewater into the container 32 from a plurality of locations. In some embodiments, the wastewater inlet 96 is defined in the base 80 of the container 32 rather than the housing 76.

The housing 76 further includes a plurality of wastewater outlets 100 in fluid communication with the liquid management system 28 to facilitate the flow of wastewater out of the container 32. In the illustrated exemplary embodiment, the wastewater outlets 100 are disposed near a top of the housing 76. Alternatively, the wastewater outlets 100 may be disposed closer to or further from the top of the housing 76. In some embodiments, the wastewater outlets 100 are defined in the base 80 of the container 32. While the illustrated exemplary embodiment of the housing 76 includes two wastewater outlets 100, the housing 76 is alternatively capable of including a single wastewater outlet 100 to facilitate the flow of wastewater out of the container 32. In other embodiments, the opening 88 could be used as an outlet or drain for the wastewater out of the container 32.

The housing 76 also includes a gas outlet 104 in fluid communication with the gas management system 24 to facilitate the flow of gas out of the container 32. During operation, gas accumulates, as discussed above, at the top of the housing 76 and, accordingly, the gas outlet 104 is disposed near a top of the housing 76 in order to accommodate the gas buildup. While the illustrated exemplary embodiment of the housing 76 includes a single gas outlet 104, the housing 76 is alternatively capable of including a plurality of gas outlets 104 to facilitate the flow of gas out of the container 32.

Figure 5:
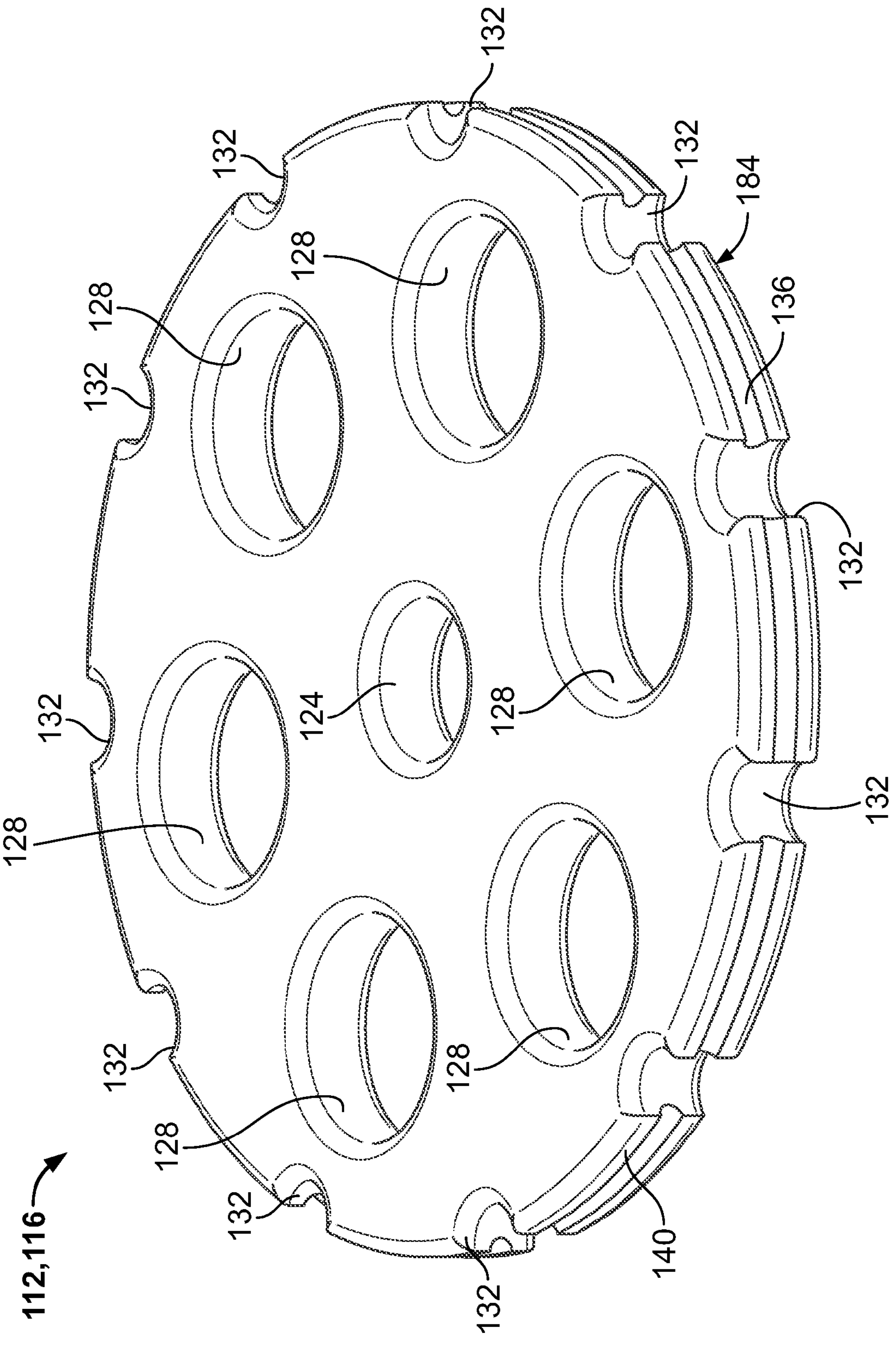
FIG. 5 is a top perspective view of a connector plate of the container shown in FIG. 3.

With continued reference to FIGS. 3 and 4, the container 32 further includes a media frame 108 positioned in the housing cavity 84 and for supporting media 110 thereon. As used herein, the term "media" means a structural element providing at least one surface for supporting microorganisms. The frame 108 includes an upper connector plate 112, a lower connector plate 116, and a shaft 120. In this example, the upper and lower connector plates 112, 116 are substantially identical and, therefore, only one will be illustrated. Referring now to FIG. 5, the upper and lower connector plates 112, 116 are substantially circular in shape and include a central aperture 124 for receiving the shaft 120. In some embodiments, the central aperture 124 is appropriately sized to receive the shaft 120 and provide a press-fit or resistance-fit connection between the shaft 120 and the connector plates 112, 116. In such an embodiment, no additional fastening or bonding is required to secure the connector plates 112, 116 to the shaft 120. In other embodiments, the shaft 120 is fastened to the upper and lower connector plates 112, 116. The shaft 120 may be fastened to the connector plates 112, 116 in a variety of manners. For example, the shaft 120 may include threads thereon and the interior surface of the central apertures 124 of the connector plates 112, 116 may include complimentary threads, thereby facilitating threading of the connector plates 112, 116 onto the shaft 120. Also, for example, the shaft 120 may include threads thereon, the shaft 120 may be inserted through the central apertures 124 of the connector plates 112, 116, and nuts may be threaded onto the shaft 120 both above and below each of the connector plates 112, 116, thereby compressing the connector plates 112, 116 between the nuts and securing the connector plates 112, 116 to the shaft 120. In yet other embodiments, the connector plates 112, 116 may be bonded to the shaft 120 in a variety of manners such as, for example, welding, brazing, adhering, etc. No matter the manner in which the connector plates 112, 116 are secured to the shaft 120, a rigid connection between the connector plates 112, 116 and the shaft 120 is desired to inhibit movement of the connector plates 112, 116 relative to the shaft 120.

It should be understood that the frame 108 may include other devices in place of the connector plates 112, 116 such as, for example, metal or plastic wire screens, metal or plastic wire matrices, etc. In such alternatives, the media 110 may be looped through and around openings present in the screens or matrices or may be affixed to the screens and matrices with fasteners such as, for example, hog rings, clips, etc.

With continued reference to FIG. 5, the upper and lower connector plates 112, 116 include a plurality of apertures 128 defined therethrough, a plurality of recesses 132 defined in a periphery of the connector plates 112, 116, and a slot 136 defined in an outer peripheral edge 140 of the connector plates 112, 116. All of the apertures 128, recesses 132, and the slot 136 are used to secure the media 110 to the connector plates 112, 116. In the illustrated exemplary embodiment, the connector plates 112, 116 are connected to the shaft 120 such that the apertures 128 and recesses 132 of the connector plate 112 vertically align with corresponding apertures 128 and recesses 132 of the connector plate 116. The configuration and size of the apertures 128 and recesses 132 in the illustrated exemplary embodiment of the connector plates 112, 116 are for exemplary illustrative purposes only and are not meant to be limiting. The connector plates 112, 116 are capable of having different configurations and sizes of apertures 128 and recesses 132. In some examples, the configuration and size of the apertures 128 and recesses 132 is dependent upon the type of wastewater and microorganism present in the container 32. Microorganisms that have lush growth require greater spacing between strands of media 110, whereas microorganisms having less lush growth may have strands of media 110 more closely packed. For example, algae species *C. Vulgaris* and *Botryococcus barunii* grow very lushly and the spacing of the individual media strands 110 may be about 1.5 inches on center. Also, for example, algae species *Phaeodactylum tricornutum* may not exhibit as lush of growth as *C. Vulgaris* or *Botryococcus barunii* and, accordingly, spacing of the individual media strands 110 is decreased to about 1.0 inch on center. Additionally, for example, the spacing of the individual media strands 110 is about 2+ inches on center for the algae species *B. Braunii*. It should be understood that the spacing of the individual media strands 110 may be established dependent on the species of microorganism present in the container 32 and the exemplary description herein is for illustrative purposes and is not intended to be limiting. Connection of the media 110 to the connector plates 112, 116 will be described in greater detail below.

Figure 6:
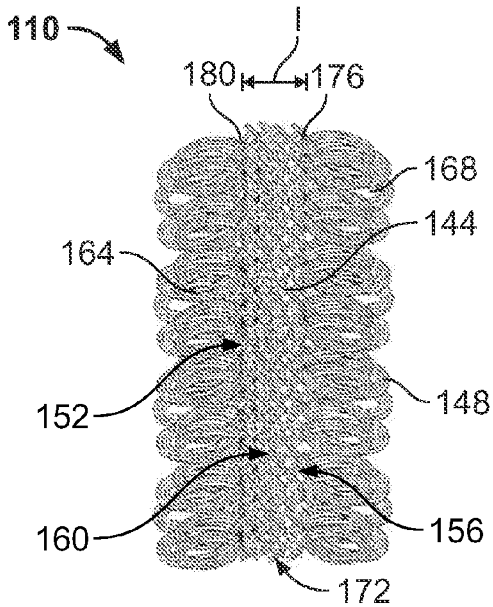
FIG. 6 is a front elevation view of a portion of an exemplary media for use in the container shown in FIG. 3.
Figure 7:
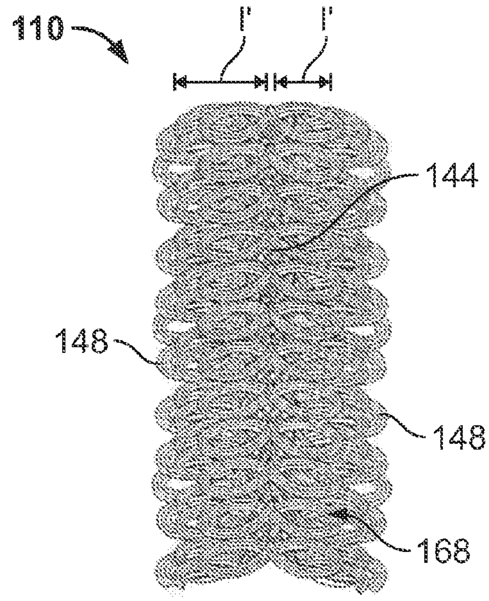
FIG. 7 is a rear elevation view of the exemplary media shown in FIG. 6.
Figure 8:
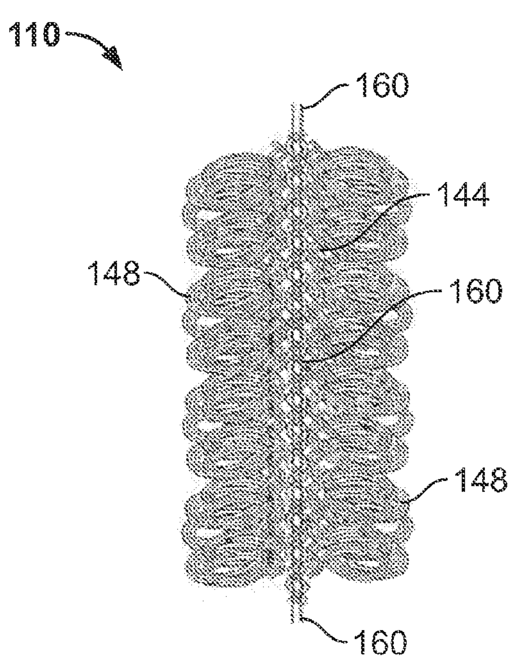
FIG. 8 is a front elevation view of the exemplary media shown in FIG. 6 with a support member.

Referring now to FIGS. 6-8, an exemplary media 110 is illustrated. The illustrated media 110 is one of a variety of different types of media 110 that may be utilized in the container 32 and is not meant to be limiting. The illustrated media 110 is a looped cord media, which comprises an elongated member 144 and a plurality of loops positioned along the elongated member 144. In the illustrated exemplary embodiment, the elongated member 144 is an elongated central core of the media 110. As used herein, elongated refers to the larger of the longer of the two dimensions of the media. In the illustrated exemplary embodiment, the vertical dimension of the media 110 is the elongated dimension. In other exemplary embodiments, the horizontal dimension or other dimension may be the elongated dimension.

Referring now to FIG. 6, an exemplary embodiment of the looped cord media 110 is illustrated. The media 110 of FIG. 6 comprises an elongated central core 144 including a first side 152 and a second side 156, a plurality of projections or media members 148 (loops in the illustrated exemplary embodiment) extending laterally from each of the first and second sides 152 and 156 and a reinforcing member 160 associated with the central core 144. In this example, the reinforcing member 160 comprises the interweaving of the cord. The media 110 also includes a front portion 164 (see FIG. 6) and a back portion 168 (see FIG. 7).

The central core 144 may be constructed in various ways and of various materials. In one embodiment, the central core 144 is knitted. The central core 144 may be knitted in a variety of manners and by a variety of machines. In some embodiments, the central core 144 may be knitted by knitting machines available from Comez SpA of Italy. The knitted portion of the core 144 may comprise a few (e.g., four to six), lengthwise rows of stitches 172. The interwoven knitted core 144 itself may act as the reinforcing member 160. The core 144 may be formed from yarn-like materials. Suitable yarn-like material may include, for example, polyester, polyamide, polyvinylidene chloride, polypropylene and other materials known to those of skill in the art. The yarn-like material may be of continuous filament construction, or a spun staple yarn. The lateral width l of the central core 144 is relatively narrow and is subject to variation. In some embodiments, the lateral width l is no greater than about 10.0 mm, is typically between about 3.0 mm and about 8.0 mm or between about 4.0 mm and about 6.0 mm.

As shown in FIG. 6, the plurality of loops 148 extend laterally from the first and second sides 152 and 156 of the central core 144. As can be seen, the plurality of loops 148 and the central core 144 are designed to provide a location where the microorganisms may collect, be supported, and/or be retrained during the wastewater treatment process. The plurality of loops 148 offer flexibility in shape to accommodate growing colonies of microorganisms. At the same time, the plurality of loops 148 inhibit the ascension of gas through the wastewater, thereby increasing the amount of time the oxygen resides near the microorganisms located on the media 110 (described in greater detail below).

The plurality of loops 148 are typically constructed of the same material as the central core 144, and may also include variable lateral widths l'. In this example, the lateral width l' of each of the plurality of loops 148 may be within the range of between about 10.0 mm and about 15.0 mm and the central core 144 occupies, in this example, between about 1/7 and 1/5 of the overall lateral width of the media 110. The media 110 comprises a high filament count yarn that provides physical capture and entrainment of the wastewater born microorganisms therein. The loop shape of the media 110 also assists with capturing the microorganisms in a manner similar to a net.

With reference to FIGS. 6-8, the media 110 may optionally be strengthened through use of a variety of different reinforcing members. The reinforcing members may be either part of the media 110, such as interwoven threads of the media 110, or an additional reinforcing member formed separately from the media 110 and added to the media 110. With particular reference to FIG. 6, the media 110 may include two reinforcing members 176 and 180, with one member disposed on each side of the core 144. In such embodiments, the two reinforcing members 176 and 180 are in the form of outside wales that are part of the interwoven threads of the media 110. With particular reference to FIG. 8, the media 110 includes an additional reinforcing member 160 formed separately from the interwoven knitted central core 144. The additional reinforcing member extends along and interconnects with the central core 144. The material of the reinforcing member 160 typically has a higher tensile strength than that of the central core 144 and may have a range of break strengths between about 50.0 pounds and about 500 pounds. Thus, the reinforcing member 160 may be constructed of various materials, including high strength synthetic filament, tape, and stainless steel wire or other wire. Two particularly useful materials are KEVLAR® and TENSYLON®. In some embodiments, a plurality of additional reinforcing members 160 may be used to reinforce the media 110.

One or more reinforcing members 160 may be added to the central core 144 in various manners. A first manner in which the media 110 may be strengthened is by adding one or more reinforcing members 160 to the weft of the core 144 during the knitting step. These reinforcing members 160 may be disposed in a substantially parallel relationship to the warp of the core 144 and stitched into the composite structure of the core 144. As will be appreciated, the use of these reinforcing members allows the width of the central core 144 to be reduced relative to central cores of known media, without significantly jeopardizing the tensile strength of the core.

Another manner in which the media 110 may be strengthened includes the introduction of the one or more reinforcing members 160 in a twisting operation subsequent to the knitting step. This method allows the parallel introduction of the tensioned reinforcing members into the central core 144, with the central core 144 wrapping around these reinforcing members 160.

In addition, various manners of incorporating reinforcing members 160 may be combined. Thus, one or more reinforcing members 160 may be laid into the central core 144 during the knitting process, and then one or more reinforcing members 160 may be introduced during the subsequent twisting step. These reinforcing members 160 could be the same or different (e.g., during knitting, KEVLAR® could be used, and during twisting, stainless steel wire could be introduced).

Further, the presence of the reinforcing members 160 may help provide a reduction of stretch in the media 110. Along these lines, the media 110 may hold more pounds of weight per foot of media than known structures. The media 110 may provide up to about 500 pounds of weight per foot. This has the advantages of reducing the risk of the media yielding or even breaking during use, and enables the wastewater treatment system 20 to support a larger volume of microorganisms, thereby increasing the volume of wastewater that can be treated.

Figure 9:
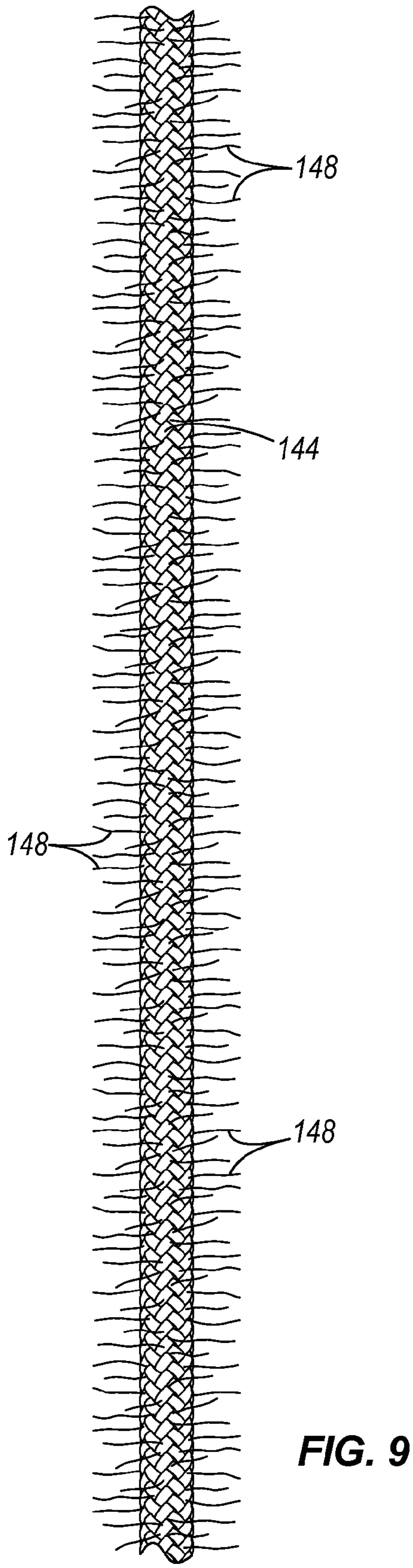
FIG. 9 is an elevation view of another exemplary media for use in the container shown in FIG. 3.
Figure 10:
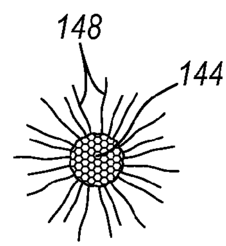
FIG. 10 is a top view of the exemplary media shown in FIG. 9.

As indicated above, the illustrated exemplary media is only one of a variety of different medias that may be utilized with the system 20. Referring now to FIGS. 9 and 10, another exemplary media 110 is illustrated and includes an elongated member 144 and a plurality of projections or media members 148 projecting from the elongated member 144. In this illustrated exemplary embodiment, the elongated member 144 is an elongated central core 144, which may be a woven material, and the media members 148 may be impaled into the central core 144 such that the media members 148 are oriented substantially perpendicular to the central core 144. The media members 148 are not loops, but instead are substantially linear strands of material projecting outward away from the central core 144. When used in a container 32, the central core 144 extends vertically between the upper and lower connector plates 112, 116 and the media members 148 are oriented substantially horizontal. Microorganisms present in the container 32 may rest or adhere to the central core 144 and the media members 148, thereby providing similar benefits to that of the exemplary media 110 described above and illustrated in FIGS. 6-8.

With continued reference to FIGS. 9 and 10, the central core 144 may be comprised of a variety of materials and formed in a variety of manners. For example, the central core 144 may be comprised of a knitted fiber construction made of high tensile strength synthetic material such as NYLON®, KEVLAR®, DACRON®, SPECTRA®, and other multifilament twisted fibers such as polyester and polyvinylidene. The construction may be re-enforced with metal threads and monofilaments that exhibit light guiding properties. Also, for example, the central core 144 may be formed by one or more of the following manners: Knitted, extruded, molded, teased, bonded, etc. Regarding the media members 148, the media members 148 may be comprised of a variety of materials and may be introduced into or formed with the central core 144 in a variety of manners. For example, the media members 148 may be comprised of one or more of the following materials: NYLON®, KEVLAR®, DACRON®, SPECTRA®, and other multifilament twisted fibers such as polyester and polyvinylidene chloride. It should be understood that the media members 148 may be comprised of the same material as the central core 144 or may be comprised of a different material than the central core 144. Also, for example, the media members 148 may be introduced into or formed with the central core 144 in one of the following manners: Knitted, tufted, injected, extruded, molded, teased, etc.

The exemplary media 110 described herein and illustrated in FIGS. 9 and 10 may have similar characteristics and features as the exemplary media 110 described above and illustrated in FIGS. 6-8. For example, the media 110 illustrated in FIGS. 9 and 10 may have any of the forms of reinforcing members described above in connection with the media 110 illustrated in FIGS. 6-8.

Figure 11:
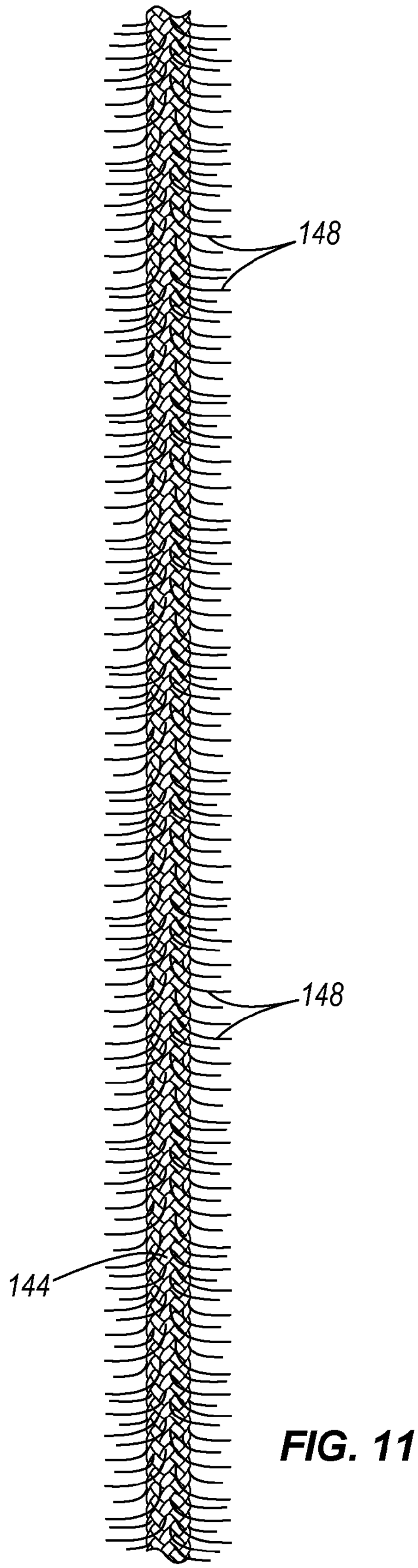
FIG. 11 is an elevation view of a further exemplary media for use in the container shown in FIG. 3.
Figure 12:
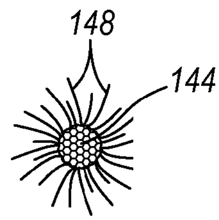
FIG. 12 is a top view of the exemplary media shown in FIG. 11.

Referring now to FIGS. 11 and 12, another exemplary media is illustrated and includes an elongated member 144 and a plurality of projections or media members 148 projecting from the elongated member 144. In this illustrated exemplary embodiment, the elongated member 144 is an elongated central core 144, which may be a woven material and the media members 148 may be woven into the central core 144 such that the media members 148 are oriented substantially perpendicular to the central core 144. The media members 148 are not loops, but instead are substantially linear strands of material projecting outward away from the central core 144. When used in a container 32, the central core 144 extends vertically between the upper and lower connector plates 112, 116 and the media members 148 are oriented substantially horizontal. Microorganisms present in the container 32 may rest or adhere to the central core 144 and the media members 148, thereby providing similar benefits to that of the exemplary medias 110 described above and illustrated in FIGS. 6-10.

With continued reference to FIGS. 11 and 12, the central core 144 may be comprised of a variety of materials and formed in a variety of manners. For example, the central core 144 may be comprised of a knitted fiber construction made of high tensile strength synthetic material such as NYLON®, KEVLAR®, DACRON®, SPECTRA®, and other multifilament twisted fibers such as polyester and polyvinylidene chloride. The construction may be re-enforced with metal threads and monofilaments that exhibit light guiding properties. Also, for example, the central core 144 may be formed by one or more of the following manners: Knitted, tufted, injected, molded, teased, extruded, bonded, etc. Regarding the media members 148, the media members 148 may be comprised of a variety of materials and may be introduced into or formed with the central core 144 in a variety of manners. For example, the media members 148 may be comprised of one or more of the following materials: NYLON®, KEVLAR®, DACRON®, SPECTRA®, and other multifilament twisted fibers such as polyester and polyvinylidene chloride. Materials may also exhibit light guiding properties. It should be understood that the media members 148 may be comprised of the same material as the central core 144 or may be comprised of a different material than the central core 144. Also, for example, the media members 148 may be introduced into or formed with the central core 144 in one of the following manners: Knitted, tufted, injected, molded, teased, bonded, etc.

The exemplary media 110 described herein and illustrated in FIGS. 11 and 12 may have similar characteristics and features as the exemplary medias 110 described above and illustrated in FIGS. 6-10. For example, the media 110 illustrated in FIGS. 11 and 12 may have any of the forms of reinforcing members described above in connection with the media 110 illustrated in FIGS. 6-8.

Figure 13:
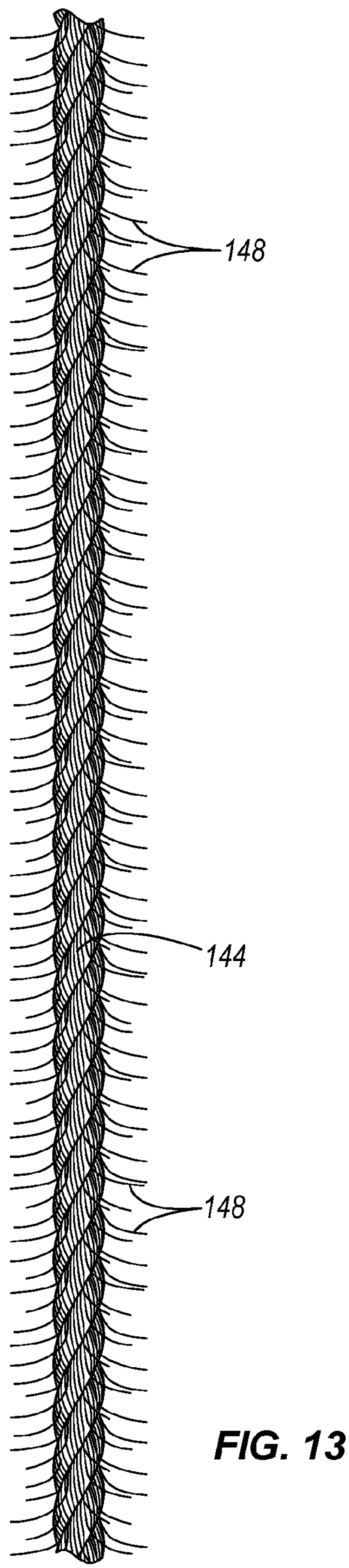
FIG. 13 is an elevation view of yet another exemplary media for use in the container shown in FIG. 3.
Figure 14:
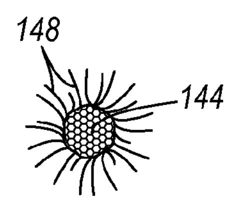
FIG. 14 is a top view of the exemplary media shown in FIG. 13.

Referring now to FIGS. 13 and 14, another exemplary media is illustrated and includes an elongated member 144 and a plurality of projections or media members 148 projecting from the elongated member 144. In this illustrated exemplary embodiment, the elongated member 144 is an elongated central core 144, which may be a yarn material or other material that may fray, and the media members 148 may be formed by teasing or otherwise disturbing the yarn material. When used in a container 32, the central core 144 extends vertically between the upper and lower connector plates 112, 116 and the media members 148 project outwardly from the central core 144. Microorganisms present in the container 32 may rest or adhere to the central core 144 and the media members 148, thereby providing similar benefits to that of the exemplary medias 110 described above and illustrated in FIGS. 6-12.

With continued reference to FIGS. 13 and 14, the central core 144 may be comprised of a variety of materials and formed in a variety of manners. For example, the central core 144 may be formed in one or more of the following manners:

Knitted, tufted, injected, extruded, molded, teased, bonded, etc. Since the media members 148 are formed by teasing or otherwise disturbing the central core 144, the media members 148 are comprised of the same material as the central core 144.

The exemplary media 110 described herein and illustrated in FIGS. 13 and 14 may have similar characteristics and features as the exemplary medias 110 described above and illustrated in FIGS. 6-12. For example, the media 110 illustrated in FIGS. 13 and 14 may have any of the forms of reinforcing members described above in connection with the media 110 illustrated in FIGS. 6-8.

Figure 15:
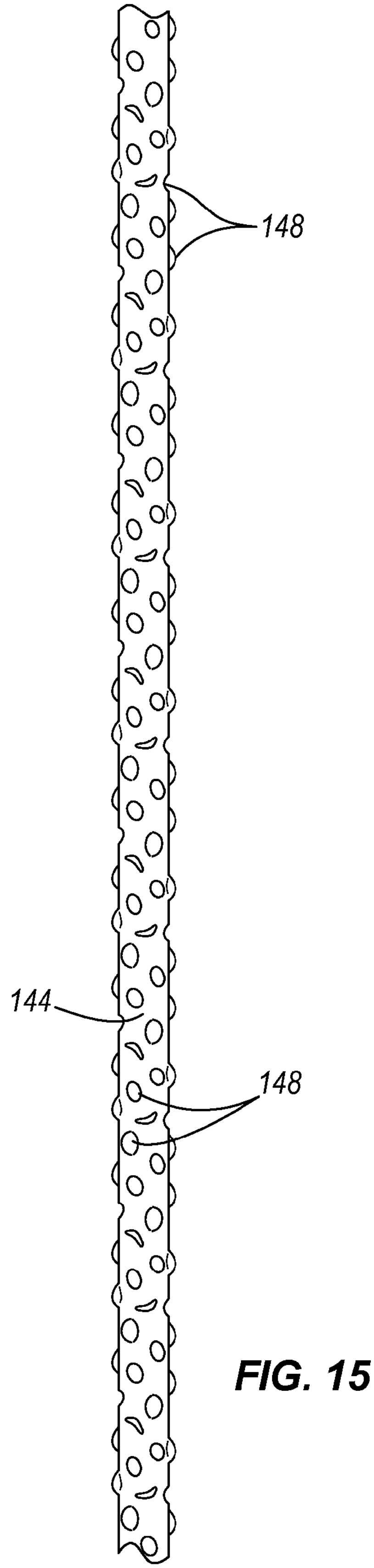
FIG. 15 is an elevation view of still another exemplary media for use in the container shown in FIG. 3.
Figure 16:
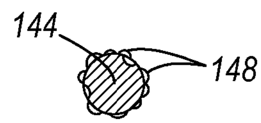
FIG. 16 is a top view of the exemplary media shown in FIG. 15.

Referring now to FIGS. 15 and 16, another exemplary media is illustrated and includes an elongated member 144 and a plurality of projections or media members 148 projecting from the elongated member 144. In this illustrated exemplary embodiment, the elongated member 144 is an elongated central core 144, which may be comprised of a solid material that is scratched, chipped, scoured, roughed, dented, stippled, gouged, or otherwise imperfected to provide the media members 148 that project from the central core 144. When used in a container 32, the central core 144 extends vertically between the upper and lower connector plates 112, 116 and the media members 148 project from the central core 144 in a substantially horizontal manner Microorganisms present in the container 32 may rest or adhere to the central core 144 and the media members 148, thereby providing similar benefits to that of the exemplary medias 110 described above and illustrated in FIGS. 6-14.

With continued reference to FIGS. 15 and 16, the central core 144 may be comprised of a variety of materials and formed in a variety of manners. For example, the central core 144 may be comprised of plastic, acrylic, metal carbon fiber, glass, fiber reinforced plastic, composites or blended combinations of strands, filaments, or particles. Since the media members 148 may be formed by imperfecting the outer surface of the central core 144, the media members 148 are comprised of the same material as the central core 144.

The exemplary media 110 described herein and illustrated in FIGS. 15 and 16 may have similar characteristics and features as the exemplary medias 110 described above and illustrated in FIGS. 6-14. For example, the media 110 illustrated in FIGS. 15 and 16 may have any of the forms of reinforcing members described above in connection with the media 110 illustrated in FIGS. 6-8.

Figure 17:
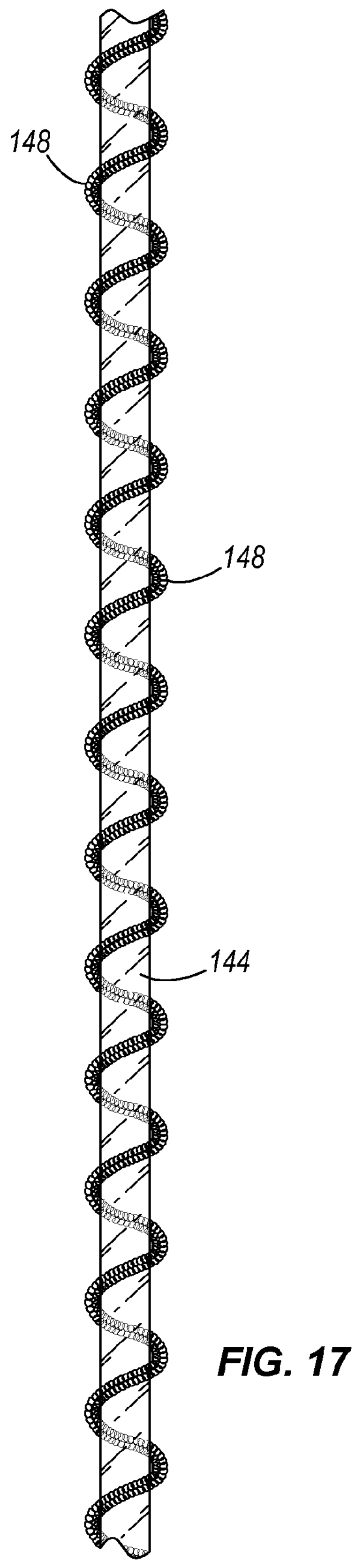
FIG. 17 is an elevation view of still a further exemplary media for use in the container shown in FIG. 3.
Figure 18:
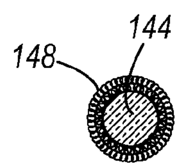
FIG. 18 is a top view of the exemplary media shown in FIG. 17.

Referring now to FIGS. 17 and 18, another exemplary media is illustrated and includes an elongated member 144 and a plurality of projections or media members 148 projecting from the elongated member 144. In this illustrated exemplary embodiment, the elongated member 144 is an elongated central core 144, which may be comprised of a wide variety of different types of materials such as, for example, metal, plastic, rubber, acrylic, glass, or any other materials that easily transmit and emit light therethrough and therefrom or any other materials that are transparent, translucent, or opaque. Also, in the illustrated exemplary embodiment, the media members 148 comprise one or more media strands wound closely around the central core 144.

In some exemplary embodiments, one or more light sources may emit light into the central core 144 of this exemplary media 110 and the central core 144 will then emit the light therefrom. Microorganisms present in the container 32 may rest or adhere to the central core 144 and the media members 148. Due to the close winding of the media members 148 and the central core 144, the light emitted from the central core 144 may emit onto the media members 148 and the microorganisms thereon. In other embodiments of this exemplary media 110, the outer surface of the central core 144 may be, for example, scratched, chipped, scoured, roughed, dented, stippled, gouged, or otherwise imperfected, to assist with diffraction of the light from the interior of the central core 144 to the exterior.

In other exemplary embodiments, the central core 144 may be made of a translucent or opaque material and light transmittal through the central core 144 may not be desired, thereby these exemplary embodiments not requiring a light source.

With continued reference to FIGS. 17 and 18, the media members 148 may be comprised of a variety of materials and may have a variety of configurations. For example, the media members 148 may be comprised of one or more of the following materials: NYLON®, KEVLAR®, DACRON®, SPECTRA®, and other monofilament and multifilament twisted fibers such as polyester and polyvinylidene chloride. Materials of the media members 148 may also exhibit light guiding properties. Also, for example, the media members 148 wound around the central core 144 may have a variety of different configurations such as loop cord media similar to that illustrated in FIGS. 6-8, any of the other exemplary media illustrated in FIGS. 9-16, or other shapes, sizes, and configurations.

The exemplary media 110 described herein and illustrated in FIGS. 17 and 18 may have similar characteristics and features as the exemplary medias 110 described above and illustrated in FIGS. 6-16. For example, the media 110 illustrated in FIGS. 17 and 18 may have any of the forms of reinforcing members described above in connection with the media 110 illustrated in FIGS. 6-8.

Figure 19:
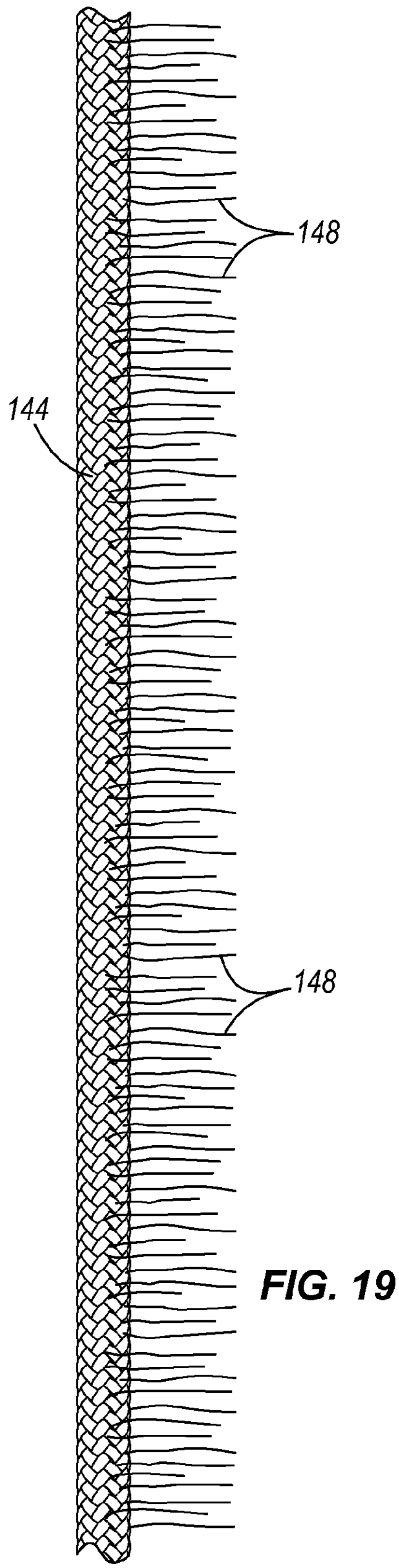
FIG. 19 is an elevation view of another exemplary media for use in the container shown in FIG. 3.

Referring now to FIG. 19, another exemplary media is illustrated and includes an elongated member 144 and a plurality of projections or media members 148 projecting from the elongated member 144. In this illustrated exemplary embodiment, the elongated member 144 is disposed at an end of the media members 148 and the media members 148 extend to one side of the elongated member 144. In some exemplary embodiments, the elongated member 144 may be a woven material and the media members 148 may be woven into the elongated member 144 such that the media members 148 are oriented substantially perpendicular to the elongated member 144. In the illustrated exemplary embodiment, the media members 148 are substantially linear strands of material projecting outward away from the elongated member 144. In other exemplary embodiments, the media members 148 may be loops. When used in a container 32, the elongated member 144 extends vertically between the upper and lower connector plates 112, 116 and the media members 148 are oriented substantially horizontal. Microorganisms present in the container 32 may rest or adhere to the elongated member 144 and the media members 148, thereby providing similar benefits to that of the exemplary medias 110 described above and illustrated in FIGS. 6-18.

With continued reference to FIG. 19, the elongated member 144 may be comprised of a variety of materials and formed in a variety of manners. For example, the elongated member 144 may be comprised of a knitted fiber construction made of high tensile strength synthetic material such as NYLON®, KEVLAR®, DACRON®, SPECTRA®, and other multifilament twisted fibers such as polyester and polyvinylidene chloride. The construction may be re-enforced with metal threads and/or monofilaments that exhibit light guiding properties. Also, for example, the elongated member 144 may be formed in one or more of the following manners: Knitted, tufted, injected, molded, teased, extruded, bonded, etc. Regarding the media members 148, the media members 148 may be comprised of a variety of materials and may be introduced into or formed with the elongated member 144 in a variety of manners. For example, the media members 148 may be comprised of one or more of the following materials: NYLON®, KEVLAR®, DACRON®, SPECTRA®, and other multifilament twisted fibers such as polyester and polyvinylidene chloride. Materials may also exhibit light guiding properties. It should be understood that the media members 148 may be comprised of the same material as the elongated member 144 or may be comprised of a different material than the elongated member 144. Also, for example, the media members 148 may be introduced into or formed with the elongated member 144 in one of the following manners: Knitted, tufted, injected, molded, teased, bonded, etc.

The exemplary media 110 described herein and illustrated in FIG. 19 may have similar characteristics and features as the exemplary medias 110 described above and illustrated in FIGS. 6-18. For example, the media 110 illustrated in FIG. 19 may have any of the forms of reinforcing members described above in connection with the media 110 illustrated in FIGS. 6-8.

Figure 20:
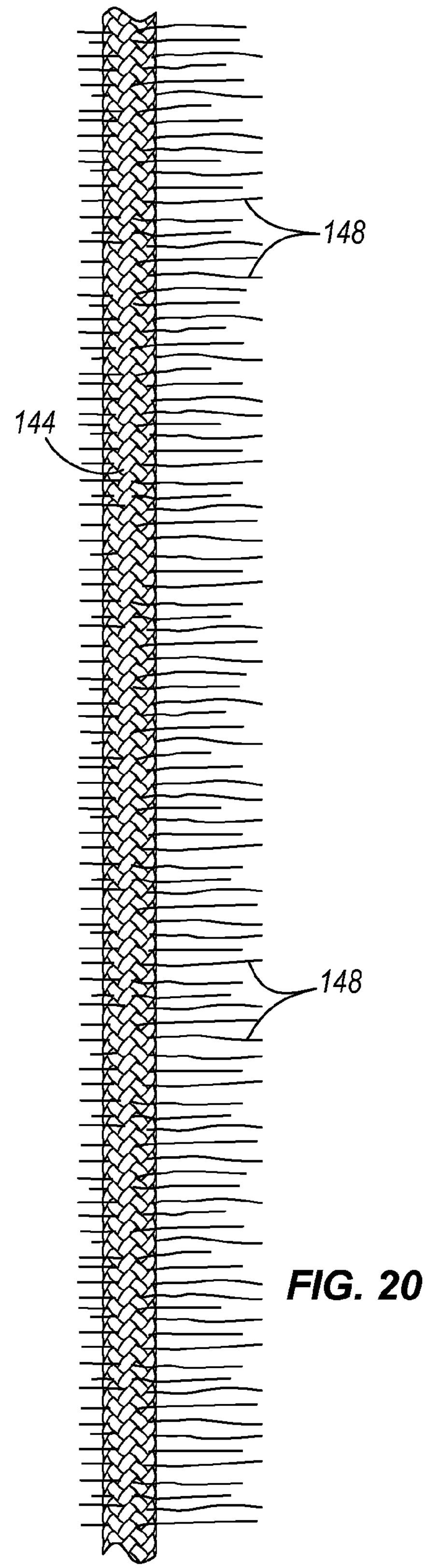
FIG. 20 is an elevation view of a further exemplary media for use in the container shown in FIG. 3.

Referring now to FIG. 20, another exemplary media is illustrated and includes an elongated member 144 and a plurality of projections or media members 148 projecting from the elongated member 144. In this illustrated exemplary embodiment, the elongated member 144 is disposed near an end of and displaced from a center of the media members 148. In some exemplary embodiments, the elongated member 144 may be a woven material and the media members 148 may be woven into the elongated member 144 such that the media members 148 are oriented substantially perpendicular to the elongated member 144. In the illustrated exemplary embodiment, the media members 148 are substantially linear strands of material projecting outward away from the elongated member 144. In other exemplary embodiments, the media members 148 may be loops. When used in a container 32, the elongated member 144 extends vertically between the upper and lower connector plates 112, 116 and the media members 148 are oriented substantially horizontal. Microorganisms present in the container 32 may rest or adhere to the elongated member 144 and the media members 148, thereby providing similar benefits to that of the exemplary medias 110 described above and illustrated in FIGS. 6-19.

With continued reference to FIG. 20, the elongated member 144 may be comprised of a variety of materials and formed in a variety of manners. For example, the elongated member 144 may be comprised of a knitted fiber construction made of high tensile strength synthetic material such as NYLON®, KEVLAR®, DACRON®, SPECTRA®, and other multifilament twisted fibers such as polyester and polyvinylidene chloride. The construction may be re-enforced with metal threads and/or monofilaments that exhibit light guiding properties. Also, for example, the elongated member 144 may be formed in one or more of the following manners: Knitted, tufted, injected, molded, teased, extruded, bonded, etc. Regarding the media members 148, the media members 148 may be comprised of a variety of materials and may be introduced into or formed with the elongated member 144 in a variety of manners. For example, the media members 148 may be comprised of one or more of the following materials: NYLON®, KEVLAR®, DACRON®, SPECTRA®, and other multifilament twisted fibers such as polyester and polyvinylidene chloride. Materials may also exhibit light guiding properties. It should be understood that the media members 148 may be comprised of the same material as the elongated member 144 or may be comprised of a different material than the elongated member 144. Also, for example, the media members 148 may be introduced into or formed with the elongated member 144 in one of the following manners: Knitted, tufted, injected, molded, teased, bonded, etc.

The exemplary media 110 described herein and illustrated in FIG. 20 may have similar characteristics and features as the exemplary medias 110 described above and illustrated in FIGS. 6-19. For example, the media 110 illustrated in FIG. 20 may have any of the forms of reinforcing members described above in connection with the media 110 illustrated in FIGS. 6-8.

Figure 21:
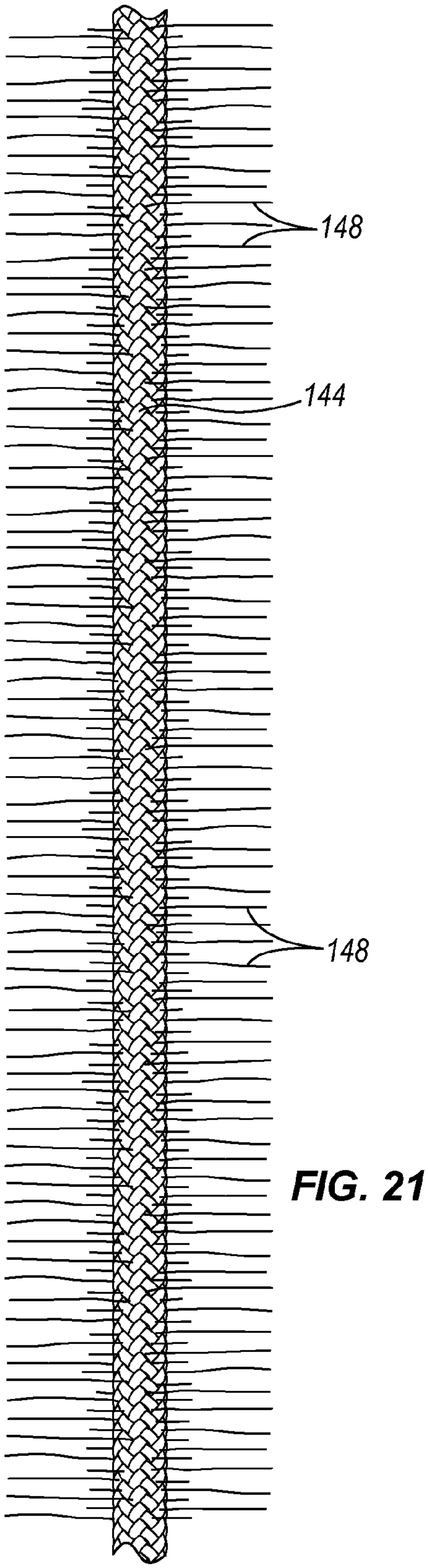
FIG. 21 is an elevation view of yet another exemplary media for use in the container shown in FIG. 3.

Referring now to FIG. 21, another exemplary media is illustrated and includes an elongated member 144 and a plurality of projections or media members 148 projecting from the elongated member 144. In this illustrated exemplary embodiment, the elongated member 144 is disposed near an end of and displaced from a center of the media members 148. In some exemplary embodiments, the elongated member 144 may be a woven material and the media members 148 may be woven into the elongated member 144 such that the media members 148 are oriented substantially perpendicular to the elongated member 144. In the illustrated exemplary embodiment, the media members 148 are substantially linear strands of material projecting outward away from the elongated member 144. In other exemplary embodiments, the media members 148 may be loops. When used in a container 32, the elongated member 144 extends vertically between the upper and lower connector plates 112, 116 and the media members 148 are oriented substantially horizontal. Microorganisms present in the container 32 may rest or adhere to the elongated member 144 and the media members 148, thereby providing similar benefits to that of the exemplary medias 110 described above and illustrated in FIGS. 6-20.

With continued reference to FIG. 21, the elongated member 144 may be comprised of a variety of materials and formed in a variety of manners. For example, the elongated member 144 may be comprised of a knitted fiber construction made of high tensile strength synthetic material such as NYLON®, KEVLAR®, DACRON®, SPECTRA®, and other multifilament twisted fibers such as polyester and polyvinylidene chloride. The construction may be re-enforced with metal threads and/or monofilaments that exhibit light guiding properties. Also, for example, the elongated member 144 may be formed by one or more of the following manners: Knitted, tufted, injected, molded, teased, extruded, bonded, etc. Regarding the media members 148, the media members 148 may be comprised of a variety of materials and may be introduced into or formed with the elongated member 144 in a variety of manners. For example, the media members 148 may be comprised of one or more of the following materials: NYLON®, KEVLAR®, DACRON®, SPECTRA®, and other multifilament twisted fibers such as polyester and polyvinylidene chloride. Materials may also exhibit light guiding properties. It should be understood that the media members 148 may be comprised of the same material as the elongated member 144 or may be comprised of a different material than the elongated member 144. Also, for example, the media members 148 may be introduced into or formed with the elongated member 144 in one of the following manners: Knitted, tufted, injected, molded, teased, bonded, etc.

The exemplary media 110 described herein and illustrated in FIG. 21 may have similar characteristics and features as the exemplary medias 110 described above and illustrated in FIGS. 6-20. For example, the media 110 illustrated in FIG. 21 may have any of the forms of reinforcing members described above in connection with the media 110 illustrated in FIGS. 6-8.

Figure 22:
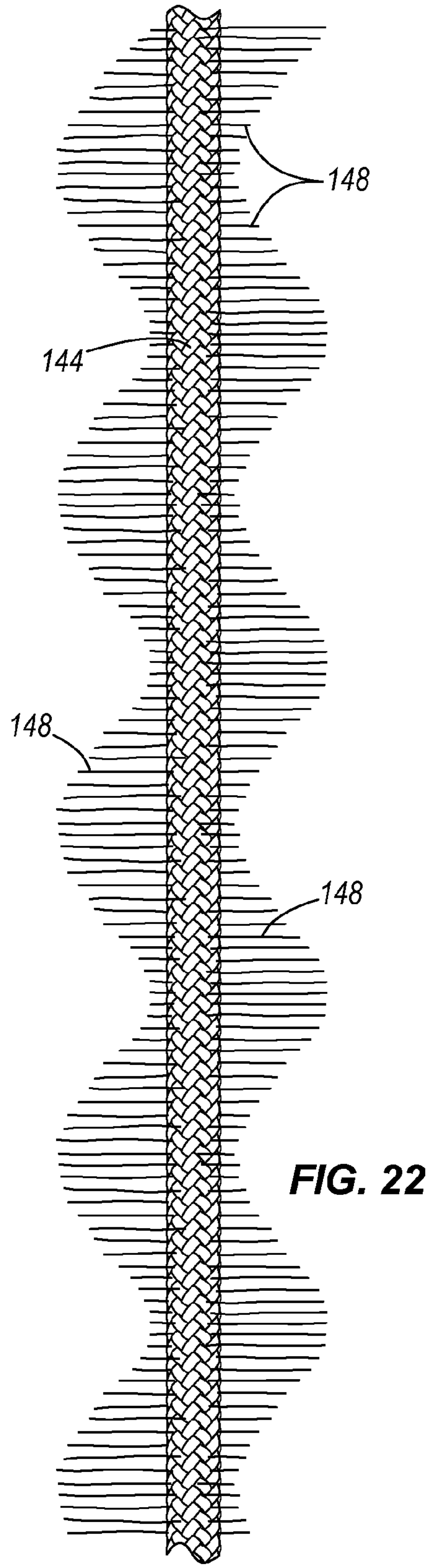
FIG. 22 is an elevation view of still another exemplary media for use in the container shown in FIG. 3.

Referring now to FIG. 22, another exemplary media is illustrated and includes an elongated member 144 and a plurality of projections or media members 148 projecting from the elongated member 144. In this illustrated exemplary embodiment, the elongated member 144 is disposed at different locations along the various media members 148. In some exemplary embodiments, the elongated member 144 may be a woven material and the media members 148 may be woven into the elongated member 144 such that the media members 148 are oriented substantially perpendicular to the elongated member 144. In the illustrated exemplary embodiment, the media members 148 are substantially linear strands of material projecting outward away from the elongated member 144. In other exemplary embodiments, the media members 148 may be loops. When used in a container 32, the elongated member 144 extends vertically between the upper and lower connector plates 112, 116 and the media members 148 are oriented substantially horizontal. Microorganisms present in the container 32 may rest or adhere to the elongated member 144 and the media members 148, thereby providing similar benefits to that of the exemplary medias 110 described above and illustrated in FIGS. 6-21.

With continued reference to FIG. 22, the elongated member 144 may be comprised of a variety of materials and formed in a variety of manners. For example, the elongated member 144 may be comprised of a knitted fiber construction made of high tensile strength synthetic material such as NYLON®, KEVLAR®, DACRON®, SPECTRA®, and other multifilament twisted fibers such as polyester and polyvinylidene chloride. The construction may be re-enforced with metal threads and/or monofilaments that exhibit light guiding properties. Also, for example, the elongated member 144 may be formed in one or more of the following manners: Knitted, tufted, injected, molded, teased, extruded, bonded, etc. Regarding the media members 148, the media members 148 may be comprised of a variety of materials and may be introduced into or formed with the elongated member 144 in a variety of manners. For example, the media members 148 may be comprised of one or more of the following materials: NYLON®, KEVLAR®, DACRON®, SPECTRA®, and other multifilament twisted fibers such as polyester and polyvinylidene chloride. Materials may also exhibit light guiding properties. It should be understood that the media members 148 may be comprised of the same material as the elongated member 144 or may be comprised of a different material than the elongated member 144. Also, for example, the media members 148 may be introduced into or formed with the elongated member 144 in one of the following manners: Knitted, tufted, injected, molded, teased, bonded, etc.

The exemplary media 110 described herein and illustrated in FIG. 22 may have similar characteristics and features as the exemplary medias 110 described above and illustrated in FIGS. 6-21. For example, the media 110 illustrated in FIG. 22 may have any of the forms of reinforcing members described above in connection with the media 110 illustrated in FIGS. 6-8.

Figure 23:
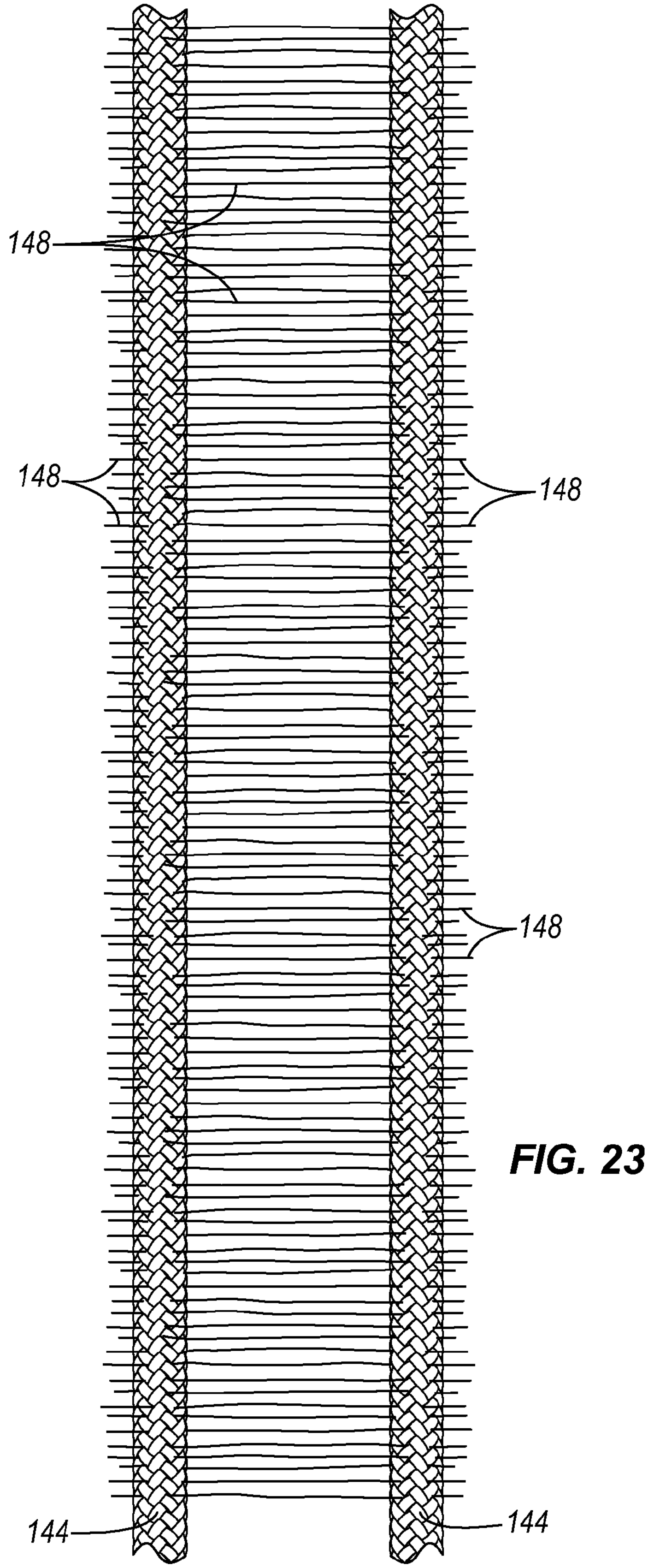
FIG. 23 is an elevation view of still a further exemplary media for use in the container shown in FIG. 3.
Figure 24:
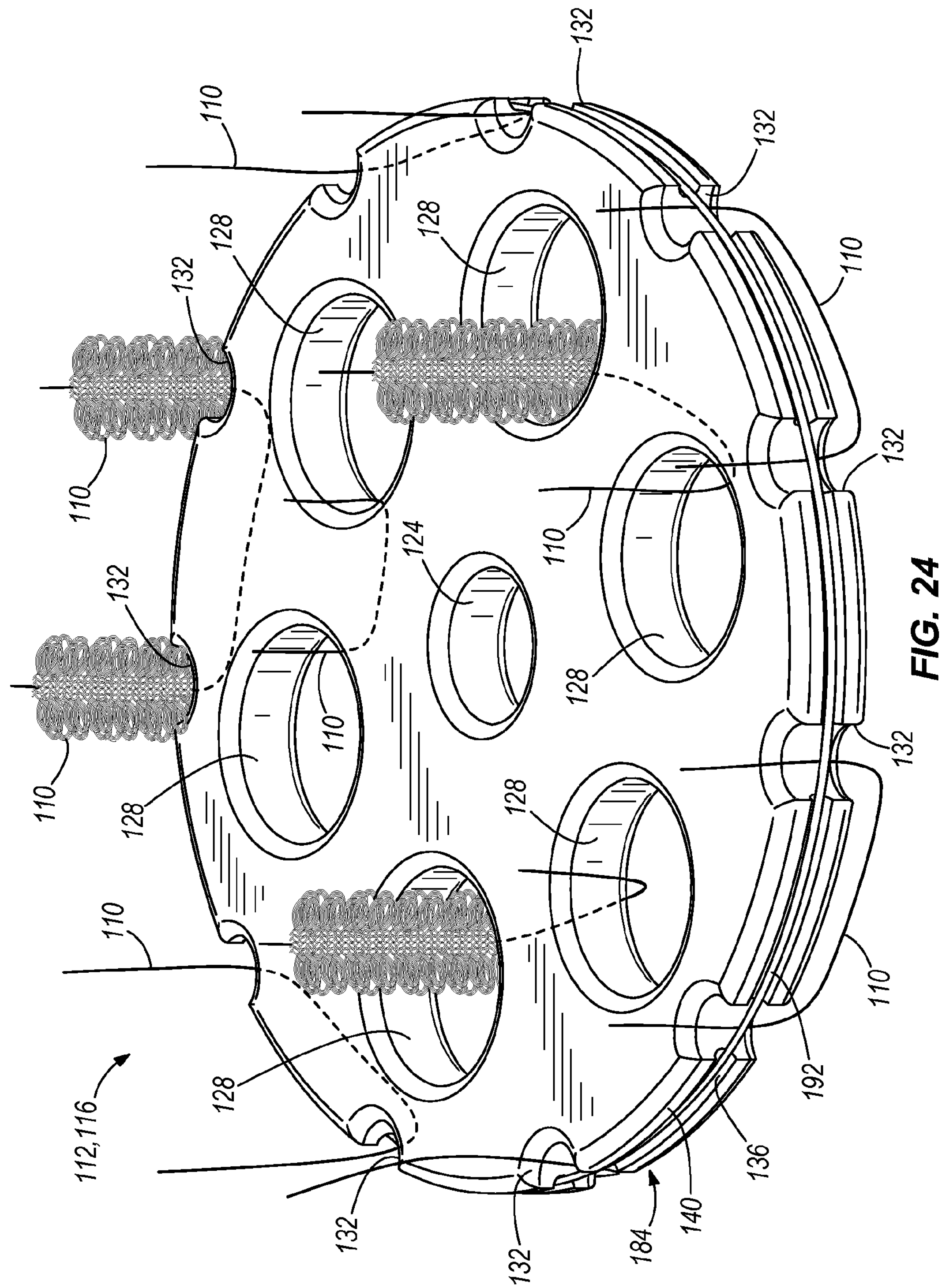
FIG. 24 is a top perspective view of the connector plate of the container shown in FIG. 5 with media coupled to the connector plate and a portion of the media schematically represented with lines.

Referring now to FIG. 23, another exemplary media is illustrated and includes a pair of elongated members 144 and a plurality of projections or media members 148 projecting from and extending between the elongated members 144. In this illustrated exemplary embodiment, the elongated members 144 are disposed near ends of and displaced from centers of the media members 148. In some exemplary embodiments, the elongated members 144 may be a woven material and the media members 148 may be woven into the elongated members 144 such that the media members 148 are oriented substantially perpendicular to the elongated members 144. In the illustrated exemplary embodiment, the media members 148 are substantially linear strands of material projecting outward away from the elongated members 144. In other exemplary embodiments, the media members 148 may be loops. When used in a container 32, the elongated members 144 extend vertically between the upper and lower connector plates 112, 116 and the media members 148 are oriented substantially horizontal. Microorganisms present in the container 32 may rest or adhere to the elongated members 144 and the media members 148, thereby providing similar benefits to that of the exemplary medias 110 described above and illustrated in FIGS. 6-22.

With continued reference to FIG. 23, the elongated members 144 may be comprised of a variety of materials and formed in a variety of manners. For example, the elongated members 144 may be comprised of a knitted fiber construction made of high tensile strength synthetic material such as NYLON®, KEVLAR®, DACRON®, SPECTRA®, and other multifilament twisted fibers such as polyester and polyvinylidene chloride. The construction may be re-enforced with metal threads and/or monofilaments that exhibit light guiding properties. Also, for example, the elongated members 144 may be formed by one or more of the following manners: Knitted, tufted, injected, molded, teased, extruded, bonded, etc. Regarding the media members 148, the media members 148 may be comprised of a variety of materials and may be introduced into or formed with the elongated members 144 in a variety of manners. For example, the media members 148 may be comprised of one or more of the following materials: NYLON®, KEVLAR®, DACRON®, SPECTRA®, and other multifilament twisted fibers such as polyester and polyvinylidene chloride. Materials may also exhibit light guiding properties. It should be understood that the media members 148 may be comprised of the same material as the elongated members 144 or may be comprised of a different material than the elongated members 144. Also, for example, the media members 148 may be introduced into or formed with the elongated members 144 in one of the following manners: Knitted, tufted, injected, molded, teased, bonded, etc.

The exemplary media 110 described herein and illustrated in FIG. 23 may have similar characteristics and features as the exemplary medias 110 described above and illustrated in FIGS. 6-22. For example, the media 110 illustrated in FIG. 23 may have any of the forms of reinforcing members described above in connection with the media 110 illustrated in FIGS. 6-8.

The illustrated and described exemplary medias are presented as only a portion of the many different types of medias capable of being employed by the system 20 and are not intended to be limiting. Accordingly, other types of medias are within the intended spirit and scope of the present invention. For example, medias may be comprised of any type of woven or non-woven material and may have any configuration.

With reference to FIGS. 3-5 and 24-26, connection of the media 110 to the frame 108 will be described. The media 110 may be connected to the frame 108 in a variety of manners, however, only some of the manners will be described herein. The described manners for connecting the media 110 to the frame 108 are not intended to be limiting and, as stated above, the media 110 may be connected to the frame 108 in a wide variety of manners.

In a first manner of connection, the media 110 may be comprised of a single long strand strung back and forth between the upper and lower connector plates 112, 116. In this manner, a first end of the media strand 110 is tied or otherwise secured to either the upper connector plate 112 or the lower connector plate 116, the strand of media 110 is extended back and forth between the upper and lower connector plates 112, 116, and the second end is tied to either the upper connector plate 112 or the lower connector plate 116 depending on the length of the media strand 110 and which of the connector plates 112, 116 is nearest the second end when the media strand is fully strung. Stringing a single piece of media 110 back and forth in this manner provides a plurality of media segments 110 extending between the upper and lower connector plates 112,116 that are spaced apart from one another. The single strand of media 110 may be strung back and forth between the upper and lower connector plates 112, 116 in a variety of manners, but, for the sake of brevity, only one exemplary manner will be described herein, however, the described manner is not intended to be limiting.

The first end of the strand is tied to the upper connector plate 112 in a first one of the apertures 128 defined therein. The media strand 110 is then extended downward to the lower connector plate 116 and inserted through a first one of the apertures 128 defined in the lower connector plate 116. The media strand 110 is then inserted upward through a second one of the apertures 128 positioned adjacent to the first one of the apertures 128 defined in the lower bracket plate 116 and extended upward toward the upper connector plate 112. The media strand 110 is then inserted upwardly through a second one of the apertures 128 positioned adjacent to the first one of the apertures 128 defined in the upper connector plate 112 and then downwardly inserted through a third one of the apertures 128 positioned adjacent the second one of the apertures 128 defined in the upper connector plate 112. Extension of the media strand 110 back and forth between adjacent apertures 128 defined in the upper and lower connector plates 112, 116 continues until the media 110 has been inserted through all of the apertures 128 defined in the upper and lower connector plates 112, 116. Since the illustrated exemplary connector plates 112, 116 includes six apertures 128 and the first end of the media strand 110 is tied to one of the apertures 128 in the upper connector plate 112, the last aperture 128 to be occupied will be in the upper connector plate 112.

After the media 110 has occupied the sixth aperture 128 in the upper connector plate 112, the media strand 110 is extended into a first one of the recesses 132 in the upper connector plate 112. From this first recess 132, the media strand 110 is extended downward toward and into a first one of the recesses 132 in the lower connector plate 116. The media strand 110 then extends along a bottom surface 184 of the lower connector plate 116 and upward into a second one of the recesses 132 adjacent the first one of the recesses 132 in the lower connector plate 116. From this second recess 132, the media strand 110 extends upward and into a second one of the recesses 132 positioned adjacent the first one of the recesses 132 defined in the upper connector plate 112. The media strand 110 then extends along a top surface 188 of the upper connector plate 112 and downward into a third one of the recesses 132 adjacent the second one of the recesses 132 in the upper connector plate 112. Extension of the media strand 110 back and forth between the adjacent recesses 132 defined in the upper and lower connector plates 112, 116 continues until the media 110 has been inserted through all of the recesses 132 defined in the upper and lower connector plates 112, 116. Since the illustrated exemplary connector plates 112, 116 include ten recesses 132 and one of the recesses 132 in the upper connector plate 112 is occupied first, the last recess 132 to be occupied will be in the upper connector plate 112. After upwardly inserting the media strand 110 into the last recess 132 in the upper connector plate 112, the second end of the media strand 110 may be tied to one of the apertures 128 defined in the upper connector plate 112. To assist with securing the media strand 110 to the upper and lower connector plates 112, 116, a fastener 192 such as, for example, a wire, rope, or other thin strong and bendable device is positioned around the edge 140 of each of the upper and lower connector plates 112, 116 and tightened into a slot 136 defined in the edge 140 of each of the upper and lower connector plates 112, 116 to entrap the media strand 110 in the recesses 132 between the fasteners 192 and the upper and lower connector plates 112, 116. As indicated above, the illustrated and described manner of connecting the media strand 110 to the frame 108 is only an exemplary manner and a wide variety of alternatives exist and are within the spirit and scope of the present invention.

In the illustrated example, the apertures 128 of the upper and lower plates 112, 116 are generally vertically aligned such that an aperture 128 of the upper plate 112 aligns vertically with an aperture 128 of the lower plate 116. Similarly, the recesses 132 of the upper and lower plates 112, 116 are generally vertically aligned. As illustrated, the various extensions or segments of the media strand 110 extending between the upper and lower connector plates 112, 116 extend in a substantially vertical manner This is achieved by extending the media strands 110 between aligned apertures 128 of the upper and lower plates 112, 116 and aligned recesses 132 of the upper and lower plates 112, 116. However, it should be understood that the media strand 110 may also extend between the upper and lower connector plates 112, 116 in an angled manner relative to the vertical such that the media strand 110 extends between unaligned apertures 128 and recesses 132. It should also be understood that the media strand 110 may also assume a spiral shape as it extends between the upper and lower connector plates 112, 116.

In a second manner of connection, the media 110 may be comprised of a plurality of separate medias 110 individually strung between the upper and lower connector plates 112, 116. In this manner, each media 110 extends between the upper and lower connector plates 112, 116 a single time. A first end of the each of the medias 110 is tied or otherwise secured to one of the upper connector plate 112 or the lower connector plate 116 and the second end extends to and secures to the other of the upper connector plate 112 or the lower connector plate 116. Stringing multiple medias 110 in this manner provides a plurality of media segments 110 extending between the upper and lower connector plates 112, 116 that are spaced apart from one another. In some embodiments, the plurality of medias 110 are strung between the upper and lower connector plates 112, 116 in a substantially vertical manner, which is achieved by extending the medias 110 between aligned apertures 128 and aligned recesses 132. In other embodiments, the plurality of medias 110 are strung between the upper and lower connector plates 112, 116 in an angled manner relative to the vertical, which is achieved by extending the medias 110 between unaligned apertures 128 and unaligned recesses 132. In further embodiments, the plurality of medias 110 may assume a spiral shape as they extend between the upper and lower connector plates 112, 116.

It should be understood that the media or medias 110 may be coupled to the upper and lower connector plates 112, 116 in a variety of manners other than those described herein. For example, the media or medias 110 may be clipped, adhered, fastened, or secured to the frame 108 in any other appropriate manner.

Figure 25:
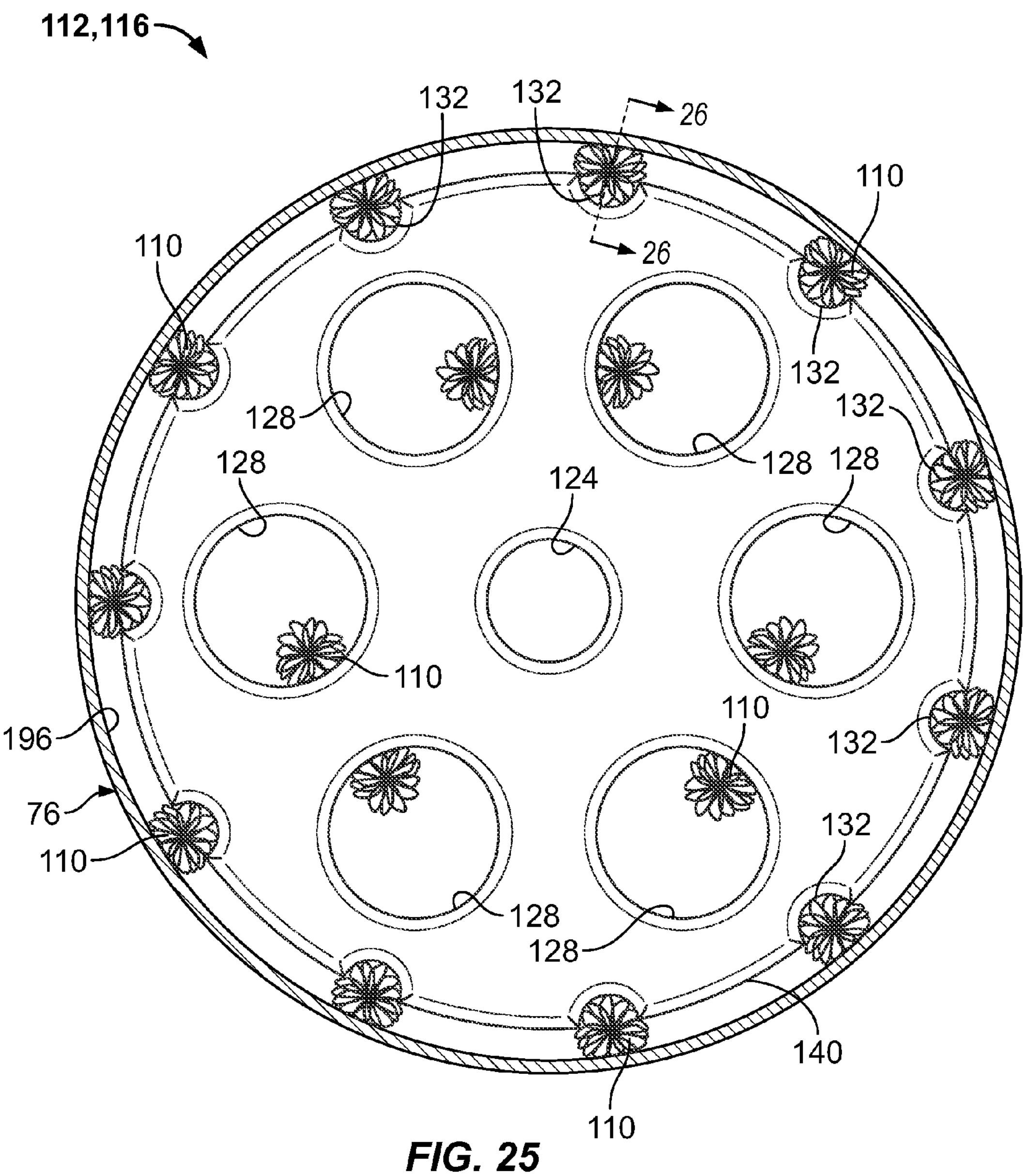
FIG. 25 is a cross-sectional view of the container taken along line 25-25 in FIG. 3.

With particular reference to FIG. 25, the illustrated exemplary orientation of the media 110 provides for a more dense concentration of media 110 near the center of the container 32 (i.e., near the shaft 120) than toward the outer periphery of the container 32. In addition, the exemplary orientation of media 110 provides a treacherous path for gases (e.g., oxygen) that are ascending through the wastewater in the container 32. This treacherous path slows the ascension of the gas bubbles, thereby facilitating increased contact time between the gas bubbles and the microorganisms supported on the media 110.

Figure 26:
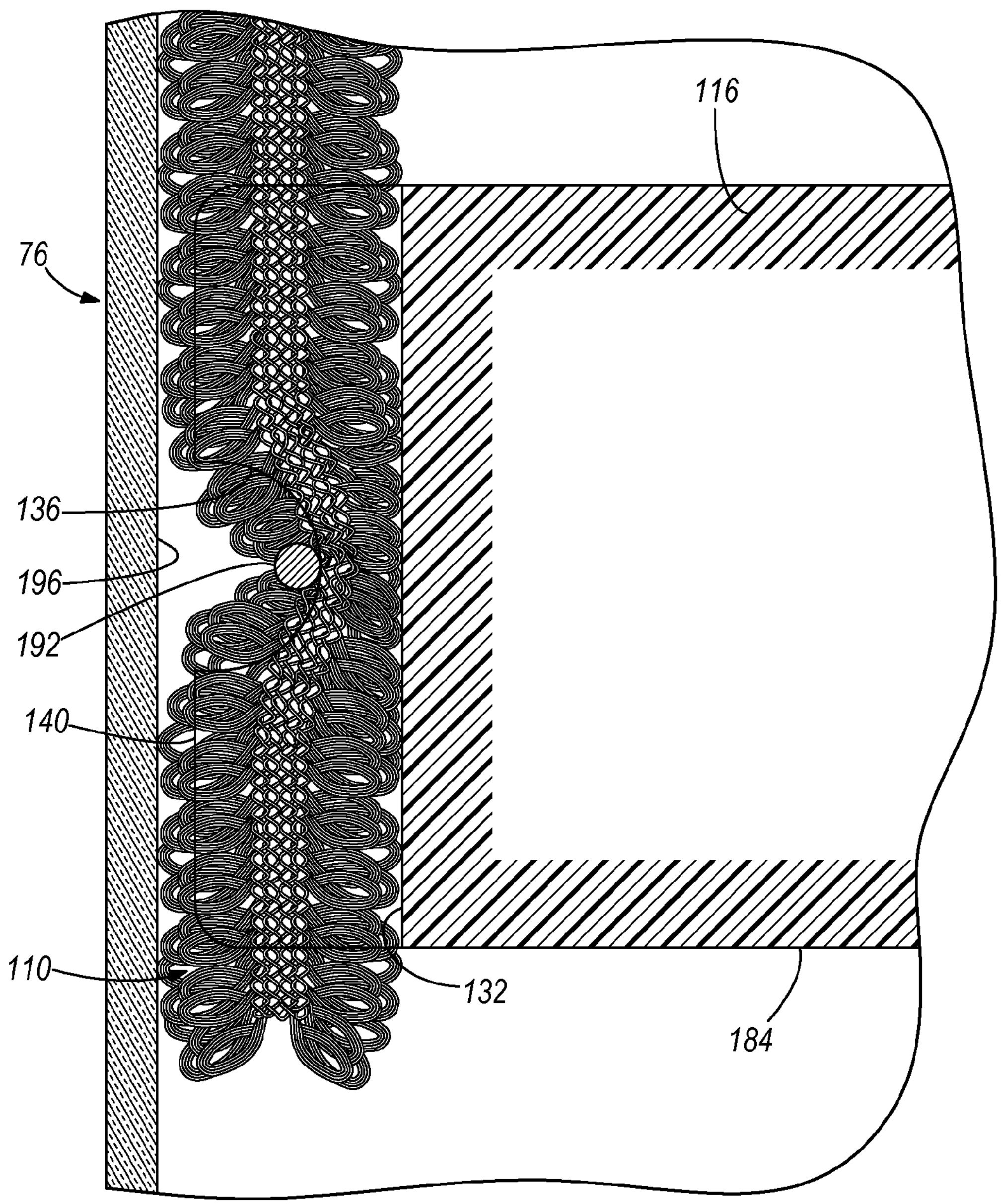
FIG. 26 is a cross-sectional view taken along line 26-26 in FIG. 25.

No matter the manner used to connect the media 110 to the upper and lower connector plates 112, 116, outermost strands of the media 110 extending between the recesses 132 defined in the periphery of the upper and lower connector plates 112, 116 project externally of the outer edges 140 of the upper and lower connector plates 112, 116. By extending externally of the outer edges 140 of the connector plates 112, 116, the media strands 110 engage an interior surface 196 of the housing 76 (the purpose of which will be described in greater detail below) as best illustrated in FIGS. 25 and 26.

Figure 27:
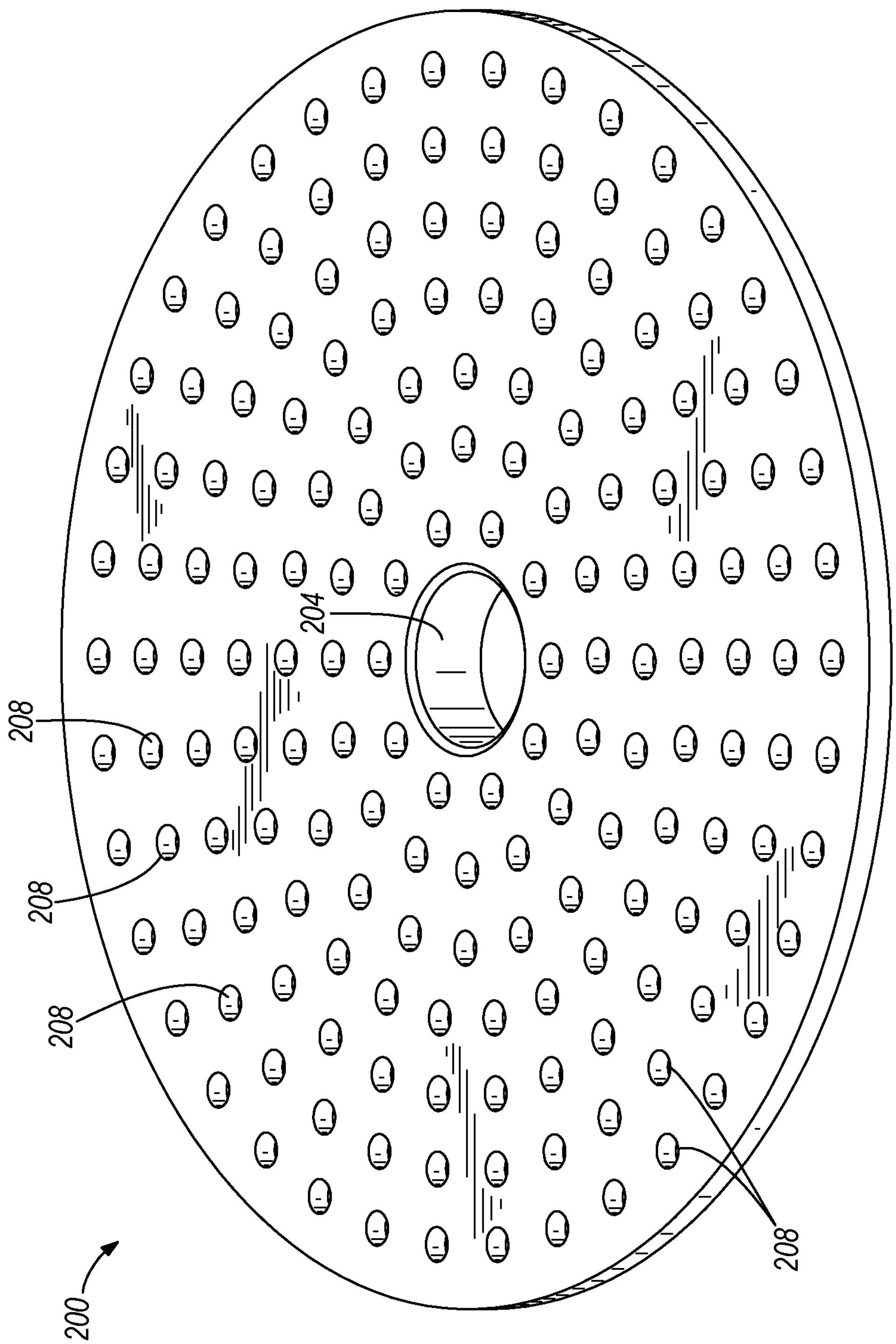
FIG. 27 is a top perspective view of an exemplary bushing of the container shown in FIG. 3.
Figure 29:
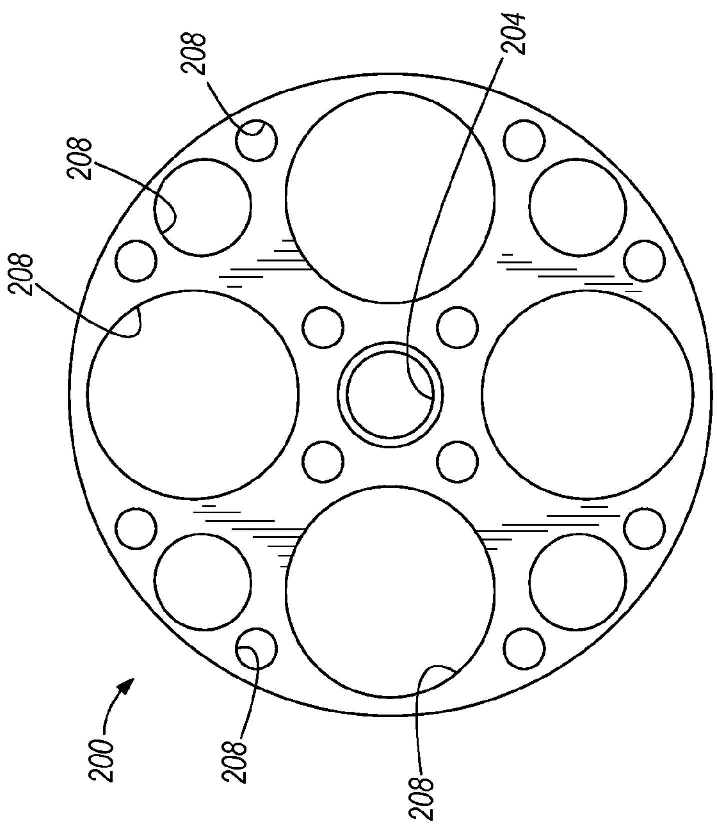
FIG. 29 is a top view of another alternative exemplary embodiment of a bushing of the container shown in FIG. 3.
Figure 28:
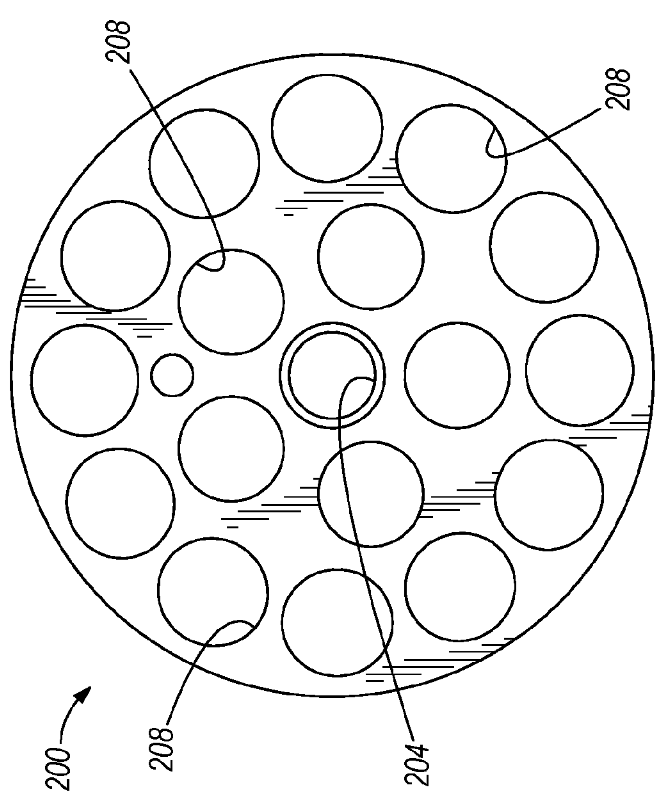
FIG. 28 is a top view of an alternative exemplary embodiment of a bushing of the container shown in FIG. 3.

Referring now to FIGS. 3, 4, and 27, the container 32 also includes an exemplary bushing 200 positioned within the housing 76. The bushing 200 is substantially circular in shape and disposed near a bottom of the housing 76. The bushing 200 includes a central opening 204 receiving an end of the shaft 120 and provides support to the end of the shaft 120. In addition, the bushing 200 maintains proper positioning of the frame 108 relative to the housing 76. In this example, the shaft 120 is loosely confined within the central opening 204 and the bushing inhibits substantial lateral movement of the shaft 120. The bushing 200 includes a plurality of gas apertures 208 that allow gas introduced into the bottom of the container 32 to permeate through the bushing 200. The bushing 200 may include any number and any size of apertures 208 as long as the bubbles satisfactorily permeate the bushing 200. With particular reference to FIGS. 28 and 29, two additional examples of the bushing 200 are illustrated. As can be seen, the bushings 200 include different configurations and sizes of holes 208.

Referring back to FIGS. 3 and 4, the container 32 further includes a top cap or cover 212 positioned at the top of the housing 76 to close-off and seal the top of the housing 76, thereby sealing the container 32 from the external environment. In some embodiments, the cover 212 is a close-fitted plastic cap such as, for example, a PVC clean-out coupling that is capable of screwing into and unscrewing from the housing 76. Alternatively, the cover 212 may be a wide variety of objects as long as the object sufficiently seals the top of the housing 76. The cover 212 also includes a central opening 216 and a bearing disposed in the central opening 216 for receiving the shaft 120 and facilitating rotation of the shaft 120 relative to the cover 212 (described in greater detail below). The shaft 120 extends below the cover 212 into the housing 76 and a portion of the shaft 120 remains above the cover 212. A drive pulley or gear 220 is connected to the portion of the shaft 120 disposed above the cover 212 and is rigidly secured to the shaft 120 to prevent relative movement of the gear 220 and the shaft 120. The gear 220 is coupled to a drive mechanism, which includes a drive member 224 and a belt or chain 228. The drive member 224 is operable to rotate the gear 220 and shaft 120, thereby rotating the frame 108 relative to the housing 76 (described in greater detail below). In the illustrated exemplary embodiment, the drive member 224 may be an AC or DC motor. Alternatively, the drive member 224 may be a wide variety of other types of drive members such as, for example, a fuel power engine, a wind powered drive member, a pneumatic powered drive member, a human powered drive member, etc.

As indicated above, it may be desirable to provide an artificial light system 37 to supplement or substitute natural sunlight 72 for purposes of driving photosynthesis of the microorganisms used to treat wastewater. The artificial light system 37 may take many shapes and forms, and may operate in a variety of manners. Several exemplary artificial light systems 37 are illustrated and described herein, however, these exemplary artificial light systems 37 are not intended to be limiting and, accordingly, other artificial light systems are contemplated and are within the spirit and scope of the present invention.

Figure 30:
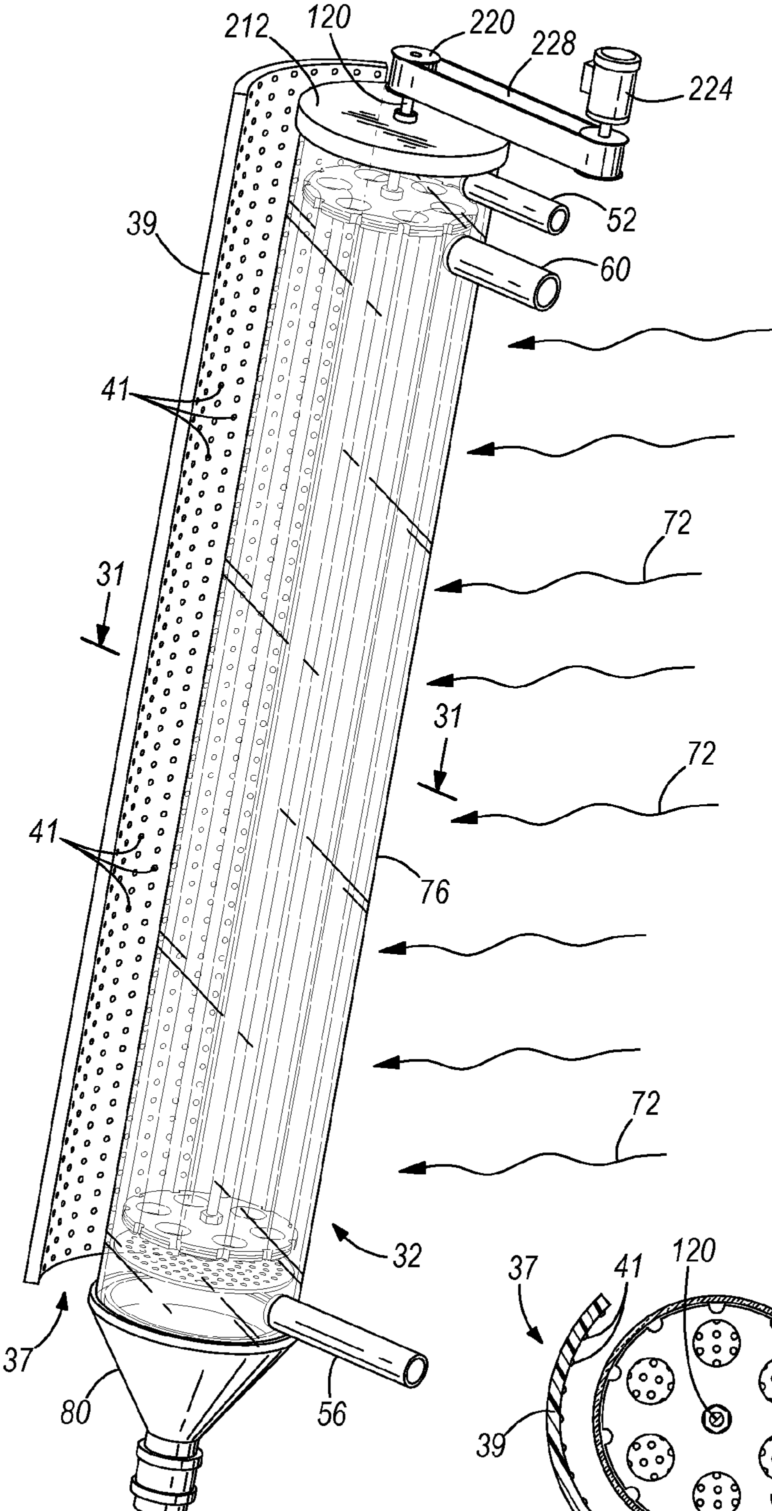
FIG. 30 is a top perspective view of a container and an exemplary artificial light system.
Figure 31:
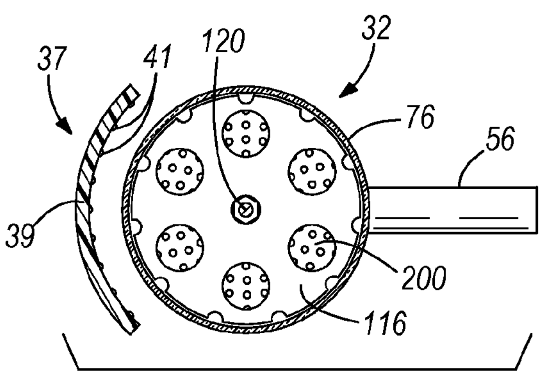
FIG. 31 is a cross-sectional view taken along line 31-31 of FIG. 30.

With reference to FIGS. 30 and 31, an exemplary embodiment of the artificial light system 37 is shown. This exemplary artificial light system 37 is one of many types of artificial light systems contemplated and is not intended to be limiting. The exemplary artificial light system 37 is capable of extending the period of time the microorganisms are exposed to light or is capable of supplementing the natural sunlight 72. In the illustrated example, the artificial light system 37 includes a base 39 and a light source such as an array of light emitting diodes (LEDs) 41 connected to the base 39. The base 39 and LEDs 41 may be positioned on a dark side of each container 32 or any other side of the container 32. LEDs 41 have been known to operate at low voltages, thereby consuming very little energy, and do not generate undesirable quantities of heat. The dark side of a container 32 is the side of the container 32 that receives the least amount of sunlight 72. For example, in a container 32 positioned in the northern hemisphere of the Earth during the winter season, the Sun is low in the sky to the south, thereby emitting the most sunlight 72 toward a southern side of the container 32. In this example, the dark side would be the north side of the container 32. Accordingly, in such an example, the array of LEDs 41 is positioned on the north side of the container 32.

In some embodiments, the LEDs 41 may have a frequency range between about 400 nanometers (nm) to about 700 nanometers. The artificial lighting system 37 may include only single frequency LEDs 41 thereon or may include a variety of different frequency LEDs 41, thereby providing a broad spectrum of frequencies. In other embodiments, the LEDs 41 may utilize only a limited portion of the light spectrum rather than the entire light spectrum With such limited use of the light spectrum, LEDs consume less energy. Exemplary portions of the light spectrum utilized by the LEDs may include the blue spectrum (i.e., frequencies between about 400 and about 500 nanometers) and the red spectrum (i.e., frequencies between about 600 and about 800 nanometers). LEDs may emit light from other portions of the light spectrum and at other frequencies and still be within the intended spirit and scope of the present invention.

In some exemplary embodiments, the base 39 may be reflective in nature for reflecting sunlight 72 onto the dark side of the container 32 or some other portion of the container 32. In such embodiments, sunlight 72 passing through, missing, or otherwise not being emitted into or onto the container 32 may engage the reflective base 39 and reflect onto and into the container 32.

In other embodiments, the artificial light system 37 may include light sources 41 other than LEDs such as, for example, fluorescents, incandescent, high pressure sodium, metal halide, quantum dots, lasers, light conducting fibers, etc. In yet other embodiments, the artificial light system 37 may include a plurality of fiber optic light channels arranged around the container 32 to emit light onto the container 32. In such embodiments, the fiber optic light channels may receive light in a variety of manners including LEDs or other light emitting devices or from a solar light collection apparatus oriented to receive sunlight 72 and transfer the collected sunlight 72 to the light channels via fiber optic cables.

In addition, the light emitted by the artificial light system 37 may be emitted either continuously or may be flashed at a desired rate. Flashing the LEDs 41 mimics conditions in natural water such as light diffraction by wave action and inconsistent light intensities caused by varying water clarity. In some examples, the light may be flashed at a rate of about 37 KHz, which has been shown to produce a 20% higher microorganism yield than when the LEDs 41 emit continuous light. In other examples, the light may be flashed between a range of about 5 KHz to about 37 KHz.

Figure 32:
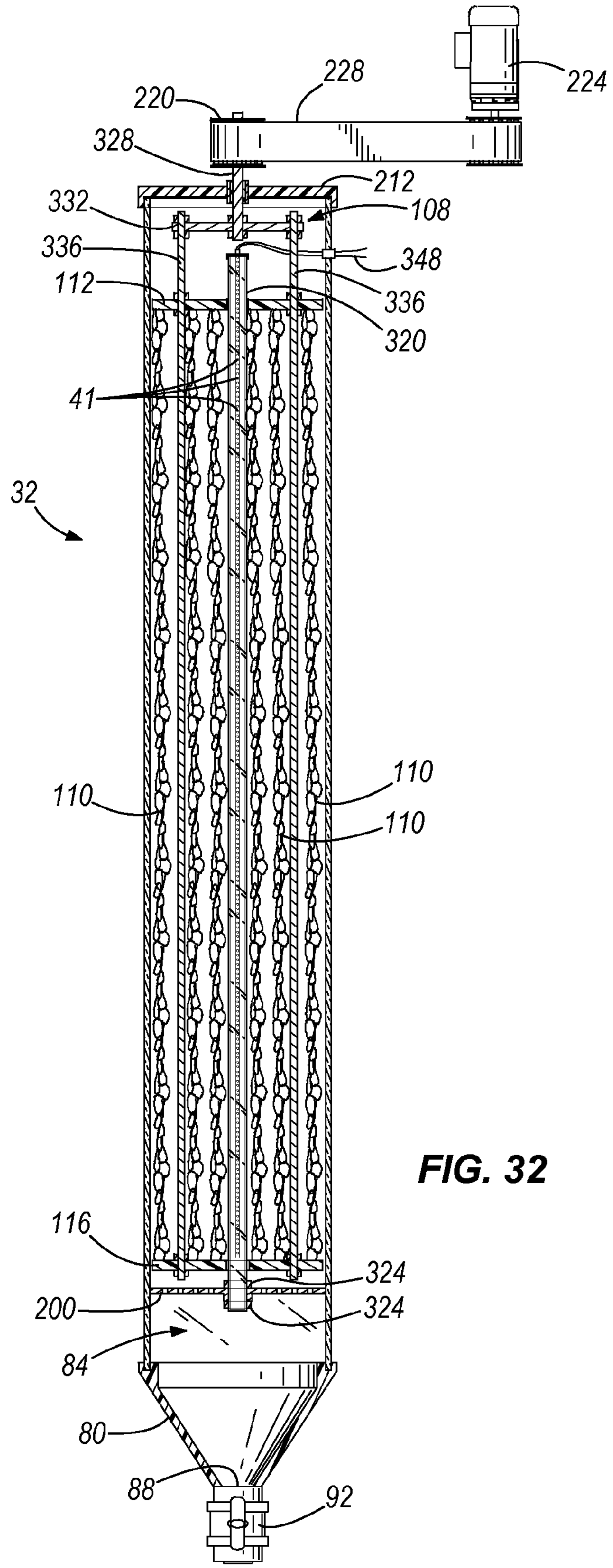
FIG. 32 is a cross-sectional view taken along a longitudinal plane of a container and another exemplary artificial light system.
Figure 33:
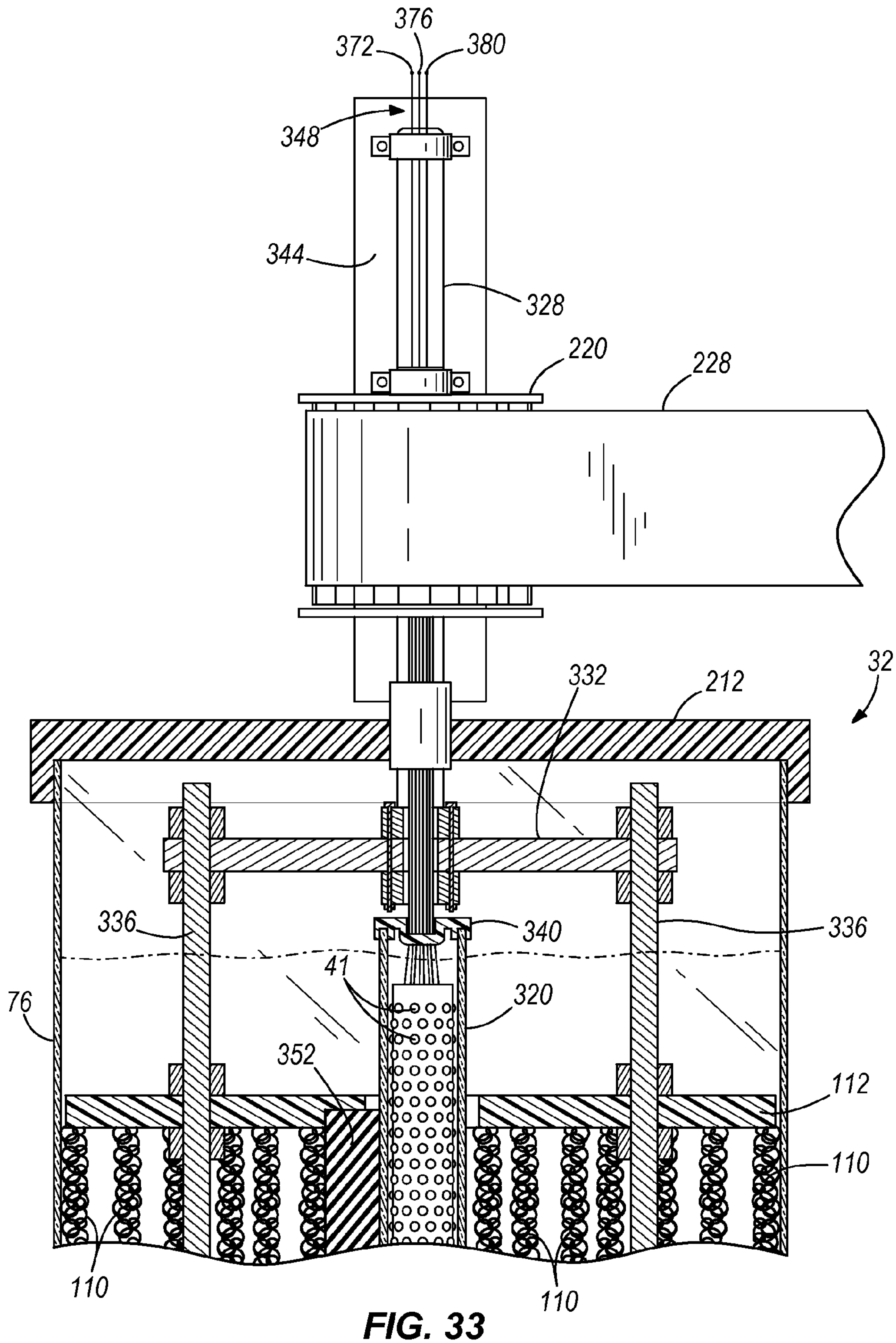
FIG. 33 is an enlarged view of a portion of the container and the artificial light system shown in FIG. 32.

Referring now to FIGS. 32 and 33, another exemplary embodiment of a container 32 and an artificial light system 37 is shown. Components similar between the container and the artificial light system illustrated in FIGS. 30 and 31 and the container and the artificial light system illustrated in FIGS. 32 and 33 may be identified with the same reference numbers or may be identified with different reference numbers.

In this illustrated exemplary embodiment, the artificial light system 37 includes a transparent or translucent hollow tube 320 positioned at or near a center of the container 32 and a light source 41, such as an array of light emitting diodes (LEDs), disposed within the tube 320. Alternatively, other types of light sources 41 may be disposed within the tube 320 and include, for example, fluorescents, incandescents, high pressure sodium, metal halide, quantum dots, fiber optics, electroluminescents, strobe type lights, lasers, etc. This artificial light system 37 provides light to the container 32 and microorganisms from the inside-out, which is the opposite direction of sunlight 72 penetration into the container 32. The light from the artificial light system 37 may be used to supplement or substitute sunlight 72 and provides direct light to the interior of the container 32. In some instances, sunlight 72 penetration to the interior of the container 32 may be challenging because the sunlight 72 must penetrate through the housing 76, wastewater, and microorganisms disposed in the container 32 in order to reach the interior of the container 32 or the sunlight 72 may not have a particularly high intensity (e.g., on a cloudy day, sunrise, and sunset).

The tube 320 is stationary relative to the housing 76 of the container 32 and the frame 108 rotates around the tube 320. A bottom end of the tube 320 extends through a central aperture 124 of the lower connector plate 116 and is secured to the central opening 204 in the bushing 200. The central aperture 124 of the lower connector plate 116 is sufficiently large to provide a space between an interior edge of the aperture 124 and the tube 320. The second end of the tube 320 may be secured to the bushing 200 in a variety manners as long as the securment is rigid and does not allow movement between the tube 320 and the bushing 200 during operation. In some embodiments, an exterior wall of the tube 320 includes external threads and an interior edge of the bushing central opening 204 includes complementary internal threads. In this embodiment, the tube 320 threads into the bushing central opening 204 and is threadably secured to the bushing 200. In other embodiments, the tube 320 may include threads on the exterior surface thereof, extend through the central aperture 124 of the lower connector plate 116 and one or more nuts or other threaded fasteners 324 may be threaded onto the tube 320 to secure the tube 320 to the bushing 200. In such an embodiment, a first nut 324 may be positioned above the bushing 200, a second nut 324 may be positioned below the bushing 200, and the nuts 324 may be tightened toward the bushing 200 to secure the tube 320 to the bushing 200. In still other embodiments, the bottom end of the tube 320 may be secured to the bushing 200 in a variety of other manners such as, for example, bonding, welding, adhering, or any other type of securment that prevents movement between the tube 320 and the bushing 200. A top end of the tube 320 extends through a central aperture 124 of the upper connector plate 112 with the central aperture 124 sufficiently large to provide a space between an interior edge of the central aperture 124 and the tube 320. The manner in which the top end of the tube 320 is supported will be described in greater detail below.

With continued reference to FIGS. 32 and 33, the frame 108 is required to have a different configuration to accommodate the tube 320 of the artificial light system 37 at the center of the container 32. In this illustrated exemplary embodiment, the frame 108 includes the upper and lower connector plates 112, 116, a hollow drive tube 328, a lateral support plate 332, and a plurality of support rods 336. The drive tube 328 is coupled to the pulley 220, drive belt 228, and motor 224, and is driven in a similar manner to the shaft 120. The lateral support plate 332 is secured to the drive tube 328 and rotates with the drive tube 328. The support plate 332 may be secured to the drive tube 328 in a variety of different manners as long as the support plate 332 and drive tube 328 rotate together. For example, the support plate 332 may be welded, bonded, adhered, threaded, or otherwise secured to the drive tube 328. The lateral support plate 332 may have a variety of different shapes and configurations including, for example, cylindrical, cross-shaped (see FIG. 46), etc. The plurality of support rods 336 are secured at their top ends to the support plate 332 and secured at their bottom ends to the lower connector plate 116. The support rods also pass through the upper connector plate 112 and may be secured thereto as well. In the illustrated exemplary embodiment, the frame 108 includes two support rods 336. However, the frame 108 may include any number of support rods 336 and still be within the spirit and scope of the present invention. During rotation of the frame 108, the motor 224 drives the belt 228 and pulley 220, which then rotate the drive tube 328. Rotation of the drive tube 328 rotates the support plate 332, thereby causing the support rods 336 to rotate and ultimately the upper and lower connector plates 112, 116 and the media 110.

With particular reference to FIG. 33, an exemplary manner for transferring electrical power to the LEDs 41 disposed in the tube 320 will be described. It is desirable that the interior of the tube 320 remain dry and absent from moisture to prevent damage to the LEDs 41 or other electronics of the system 20. In the illustrated exemplary embodiment, the top end of the tube 320 surrounds a bottom end of the drive tube 328 and a seal 340 is disposed between an exterior surface of the drive tube 328 and an interior surface of the tube 320, thereby creating an effective seal to prevent wastewater from entering the tube 320. This sealing arrangement between the tube 320 and the drive tube 328 also provides support to the top end of the tube 320. A support device 344 may be provided around the drive tube 328 to provide additional support since the drive tube 328 is undergoing force exerted by the drive belt 228 and pulley 220.

In order to provide electrical power to the LEDs 41 within the tube 320, a plurality of electrical wires 348 must run from an electrical power source to the LEDs 41. In the exemplary embodiment, the drive tube 328 is hollow and the electrical wires 348 extend into a top end of the drive tube 328, through the drive tube 328, out the bottom end of the drive tube 328, into the tube 320, and finally connect to the LEDs 41. As indicated above, the drive tube 328 rotates and the tube 320 and LEDs 41 do not rotate. Rotation of the electrical wires 348 would cause the wires 348 to twist and eventually break, disconnect from the LEDs 41, or otherwise interrupt the electrical power supply from the electrical power source to the LEDs 41. Accordingly, it is desirable for the electrical wires 348 to remain stationary within the drive tube 328 as the drive tube 328 rotates. This may be achieved in a variety of manners. For example, the electrical wires 348 may extend through a center of the drive tube 328 in a manner that does not cause contact between the wires 348 and an interior surface of the drive tube 328. By preventing contact between the wires 348 and the interior surface of the drive tube 328, the drive tube 328 will be able to rotate relative to the wires 348 without contacting the wires 348 and without twisting the wires 348. Also, for example, a secondary tube or device may be concentrically positioned within the drive tube 328, may be displaced inward from the interior surface of the drive tube 328, and may be stationary within the drive tube 328, thereby causing the drive tube 328 to rotate around the secondary tube or device. In such an example, the electrical wires 348 run through the secondary tube or device and are prevented from engaging the interior surface of the drive tube 328 by the secondary tube or device. Many other manners are contemplated for preventing twisting of the electrical wires 348 and are within the spirit and scope of the present invention.

With continued reference to FIG. 33, a wiper blade 352 is provided to contact and wipe against an outer surface of the tube 320. The wiper blade 352 is connected at its top end to the upper connector plate 112 and at its bottom end to the lower connector plate 116. Rotation of the frame 108 causes the wiper blade 352 to rotate, thereby causing the wiper blade 352 to wipe against the outer surface of the tube 320. This wiping clears any microorganisms or other buildup or debris attached to the outer surface of the tube 320. Having the tube 320 clear of microorganisms and other buildup or debris provides the tube 320 with optimum lighting performance. Significant buildup on the exterior surface of the tube 320 can adversely affect the effectiveness of the artificial light system 37 of this embodiment.

It should be understood that the artificial light system 37 illustrated in FIGS. 32 and 33 may be used on its own or in combination with any other artificial light system 37 disclosed herein. For example, the system 20 may include a first artificial light system 37 as illustrated in FIGS. 30 and 31 for illuminating the container 32 from the exterior and may include the artificial light system 37 illustrated in FIGS. 32 and 33 for illuminating the container 32 from the interior.

Figure 34:
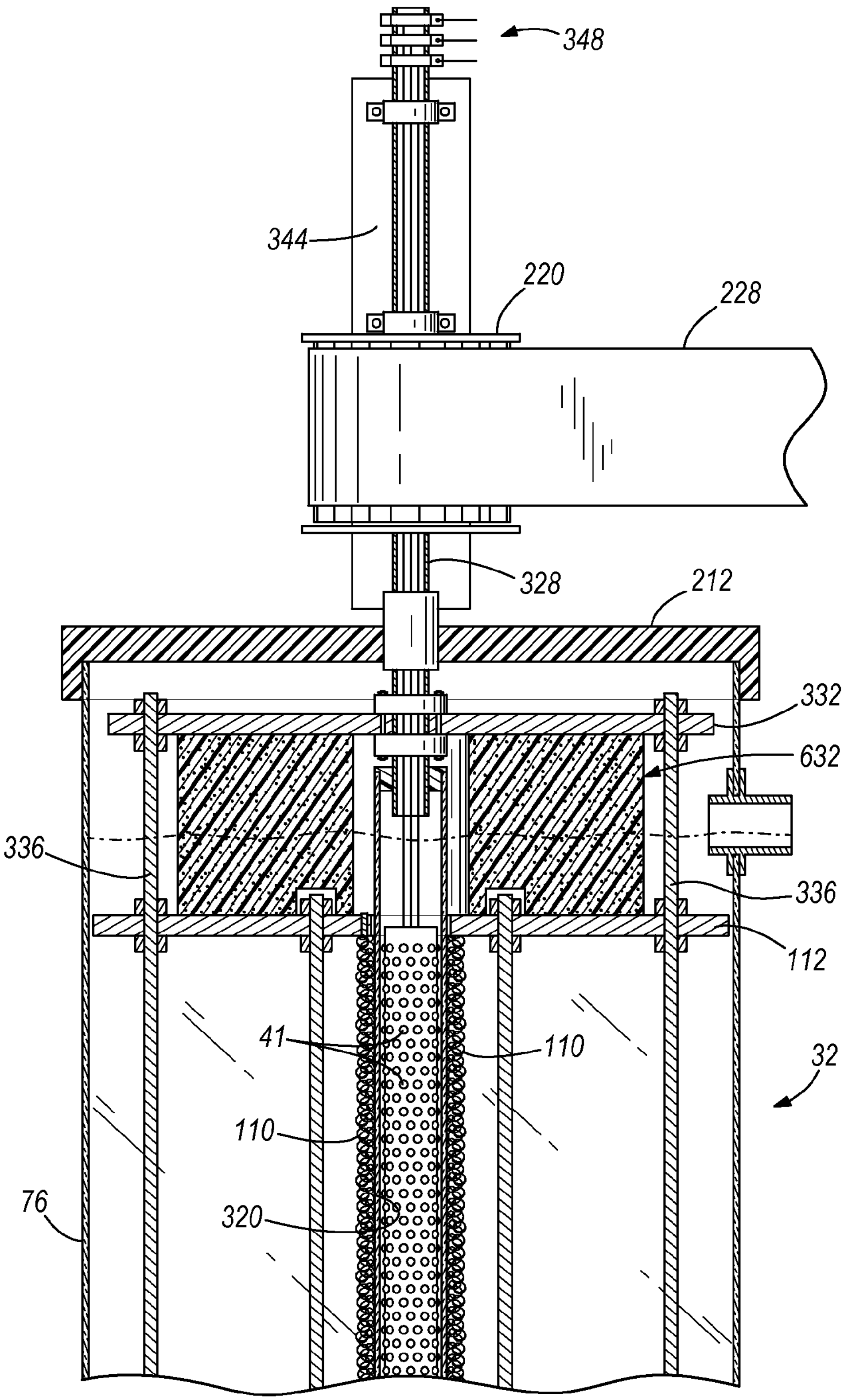
FIG. 34 is an enlarged view of a portion of the container and the artificial light system shown in FIG. 32, shown with an alternative manner of wiping a portion of the artificial light system.

With reference to FIG. 34, an alternative manner of wiping the outer surface of the tube 320 is illustrated. In this illustrated exemplary embodiment, inner media segments or strands 110 are disposed adjacent to and engage the outer surface of the tube 320. Rotation of the frame 108 causes the media strands 110 to wipe against the outer surface of the tube 320 and clear microorganisms or other buildup and debris from the outer surface of the tube 320. For purposes of simplicity, only the inner media strands 110 are illustrated in FIG. 34 even though other strands of media 110 would be present in the container 32.

Figure 35:
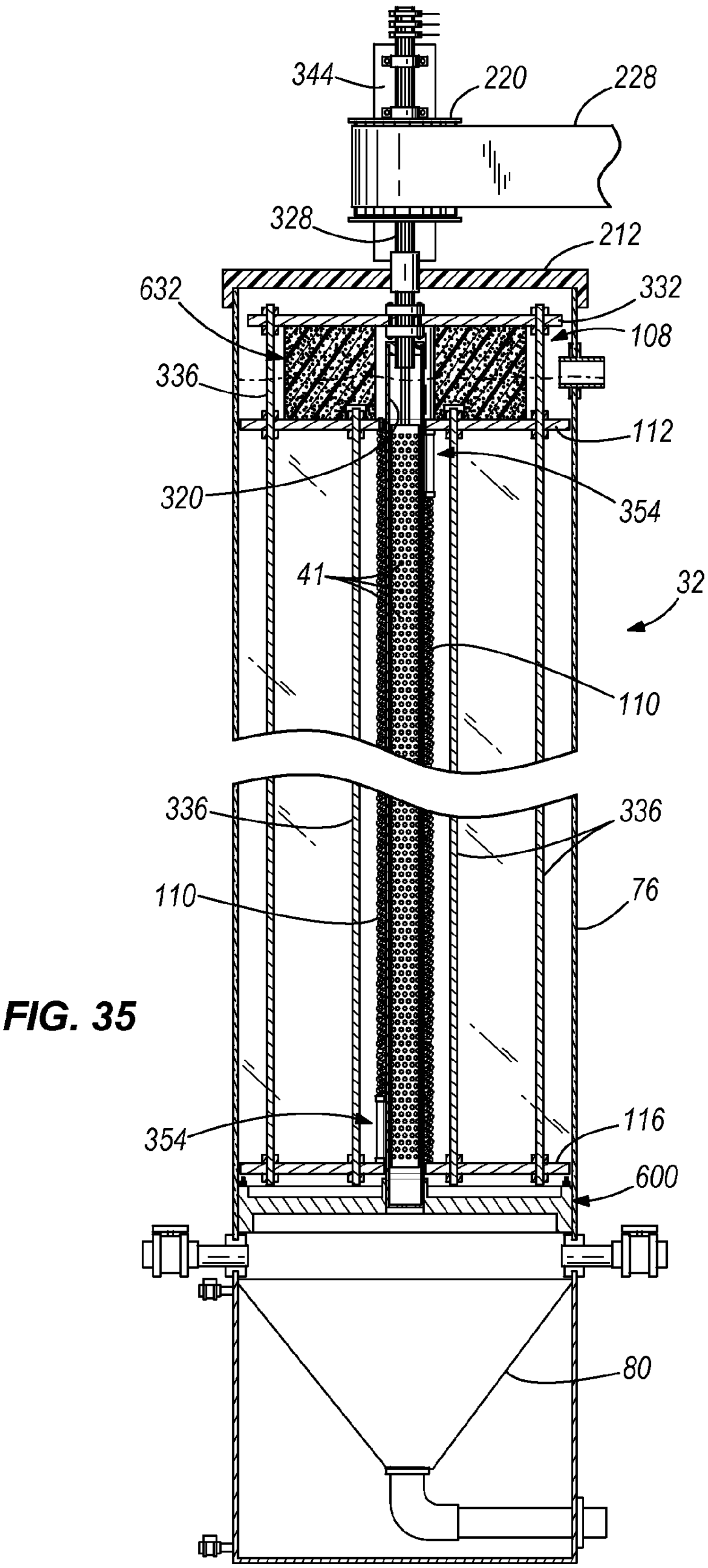
FIG. 35 is a cross-sectional view taken along a longitudinal plane of the container and the artificial light system shown in FIG. 32, shown with another alternative manner of wiping a portion of the artificial light system.
Figure 36:
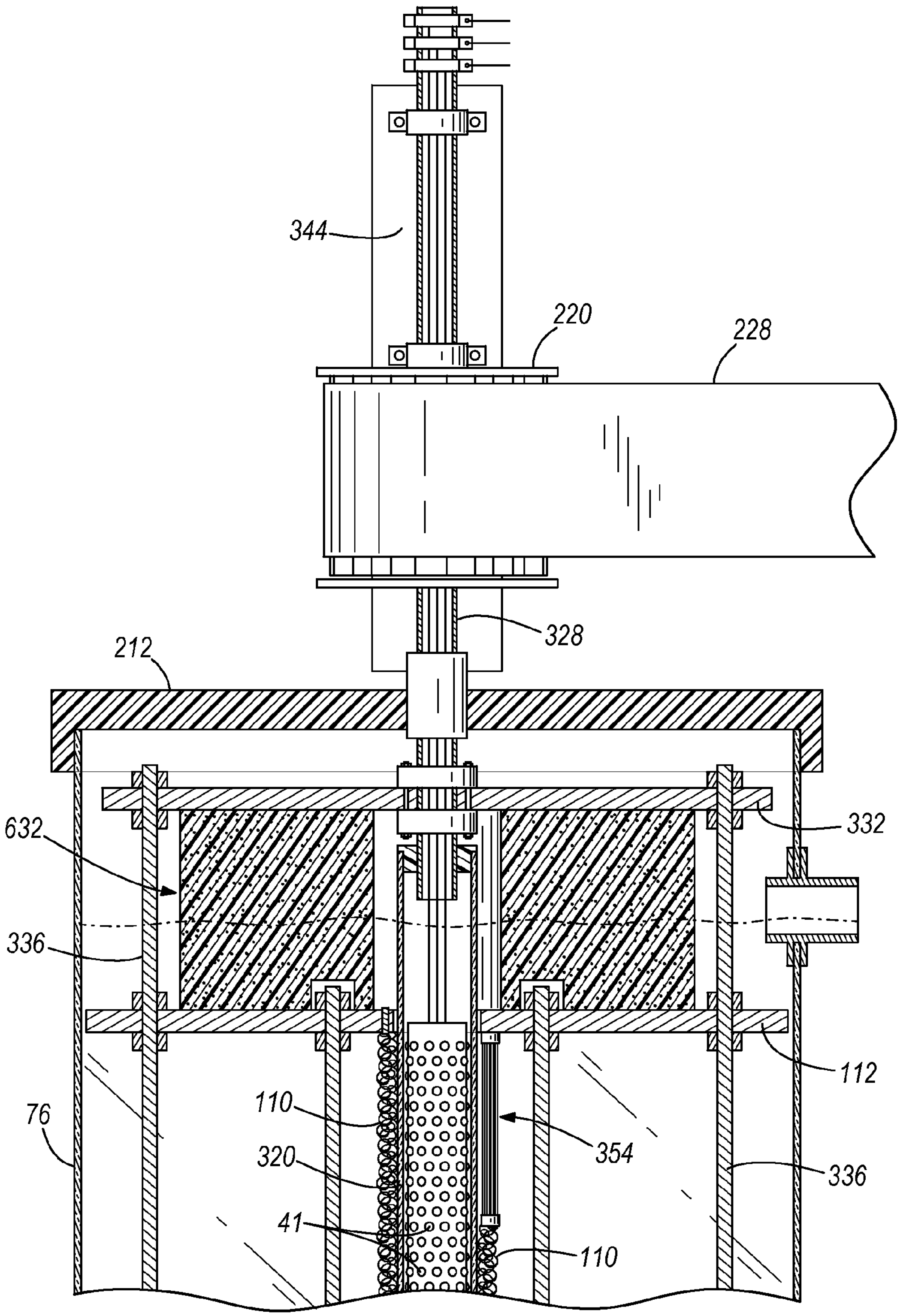
FIG. 36 is an enlarged view of a portion of the container and the artificial light system shown in FIG. 35.
Figure 37:
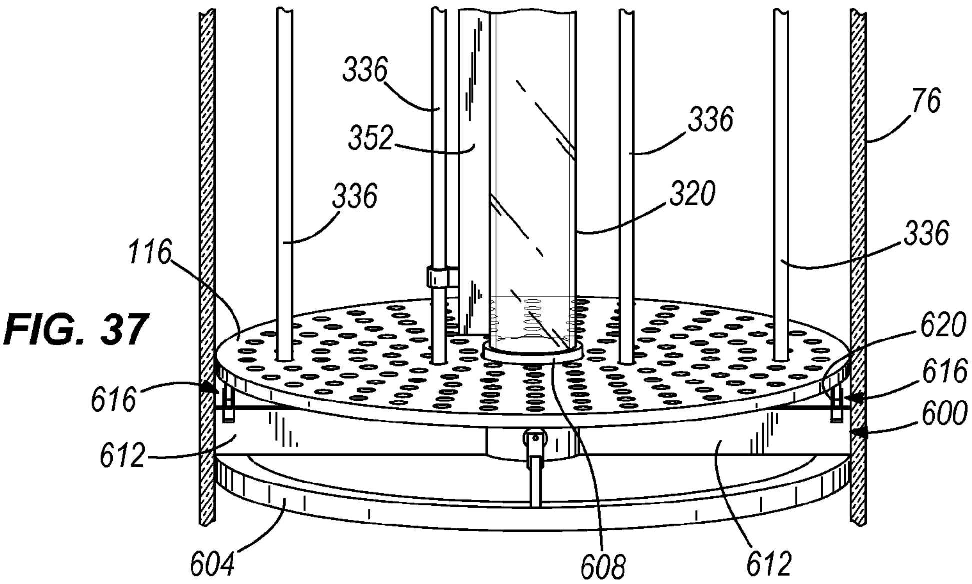
FIG. 37 is a top perspective view of a portion of the container and a frame support device shown in FIG. 35.
Figure 38:
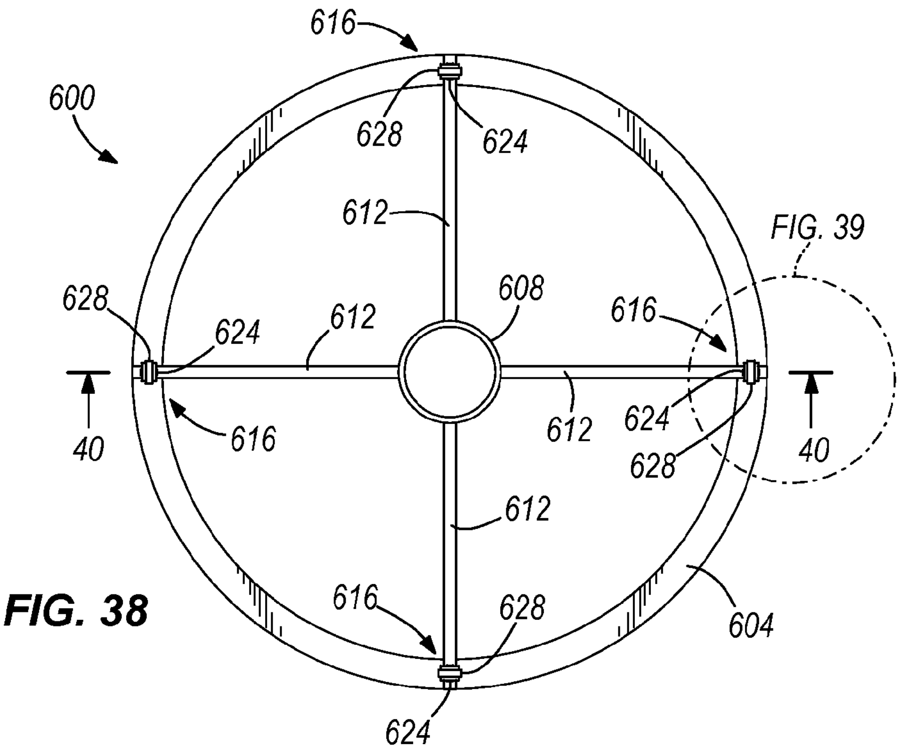
FIG. 38 is a top view of the frame support device shown in FIG. 37.
Figure 40:
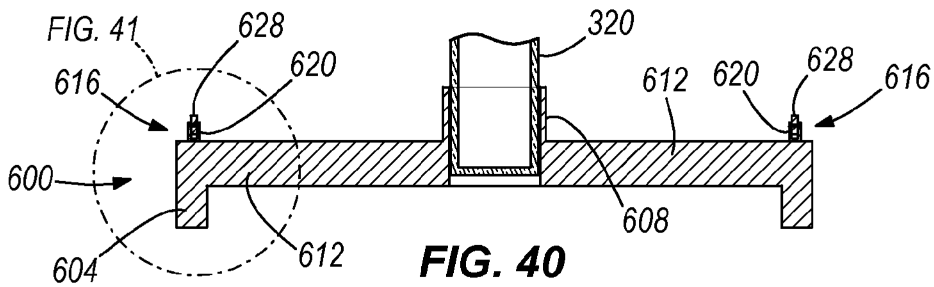
FIG. 40 is a cross-sectional view of the frame support device taken along line 40-40 in FIG. 38.
Figure 39:
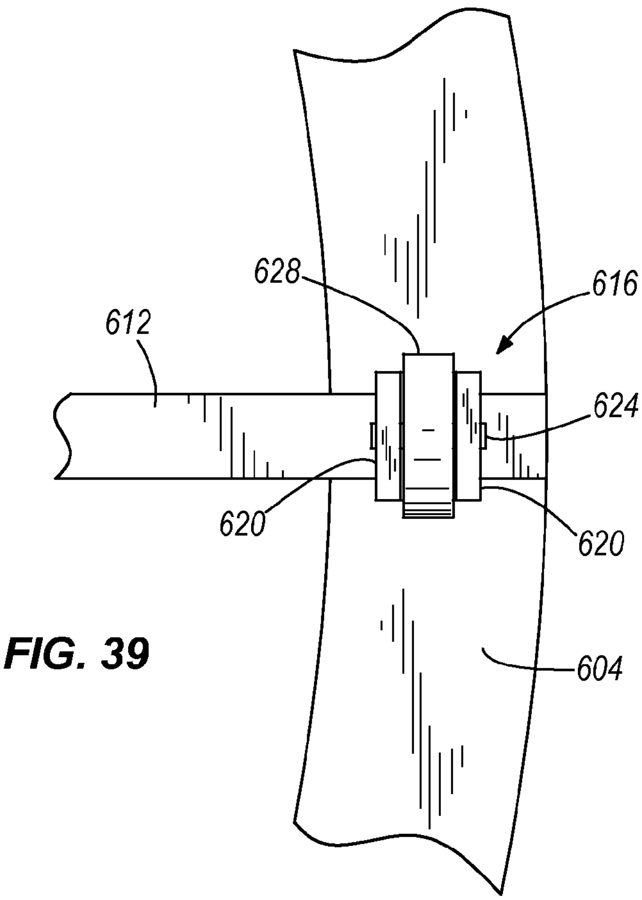
FIG. 39 is an enlarged portion of FIG. 38.
Figure 41:
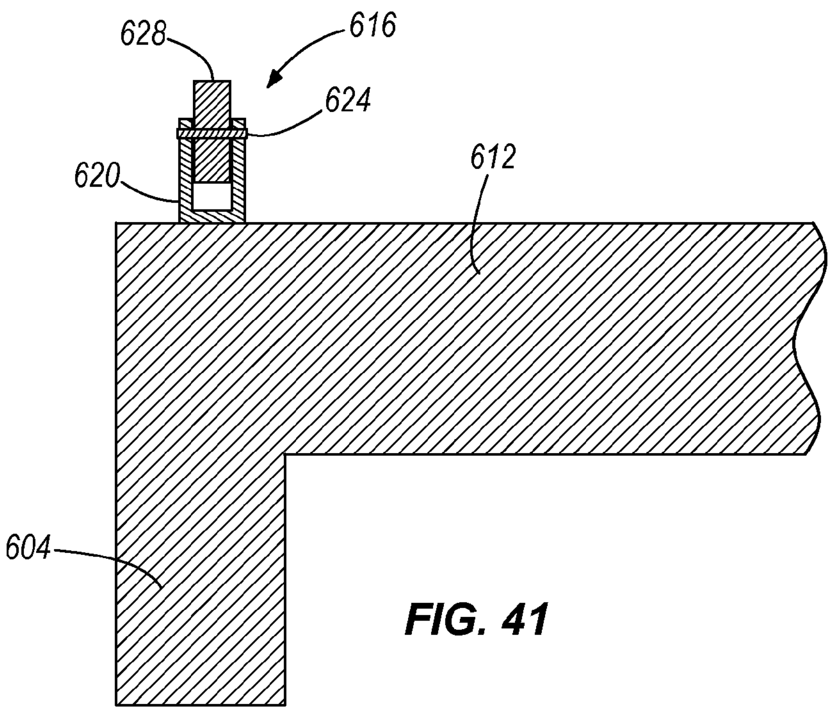
FIG. 41 is an enlarged portion of FIG. 40.
Figure 42:
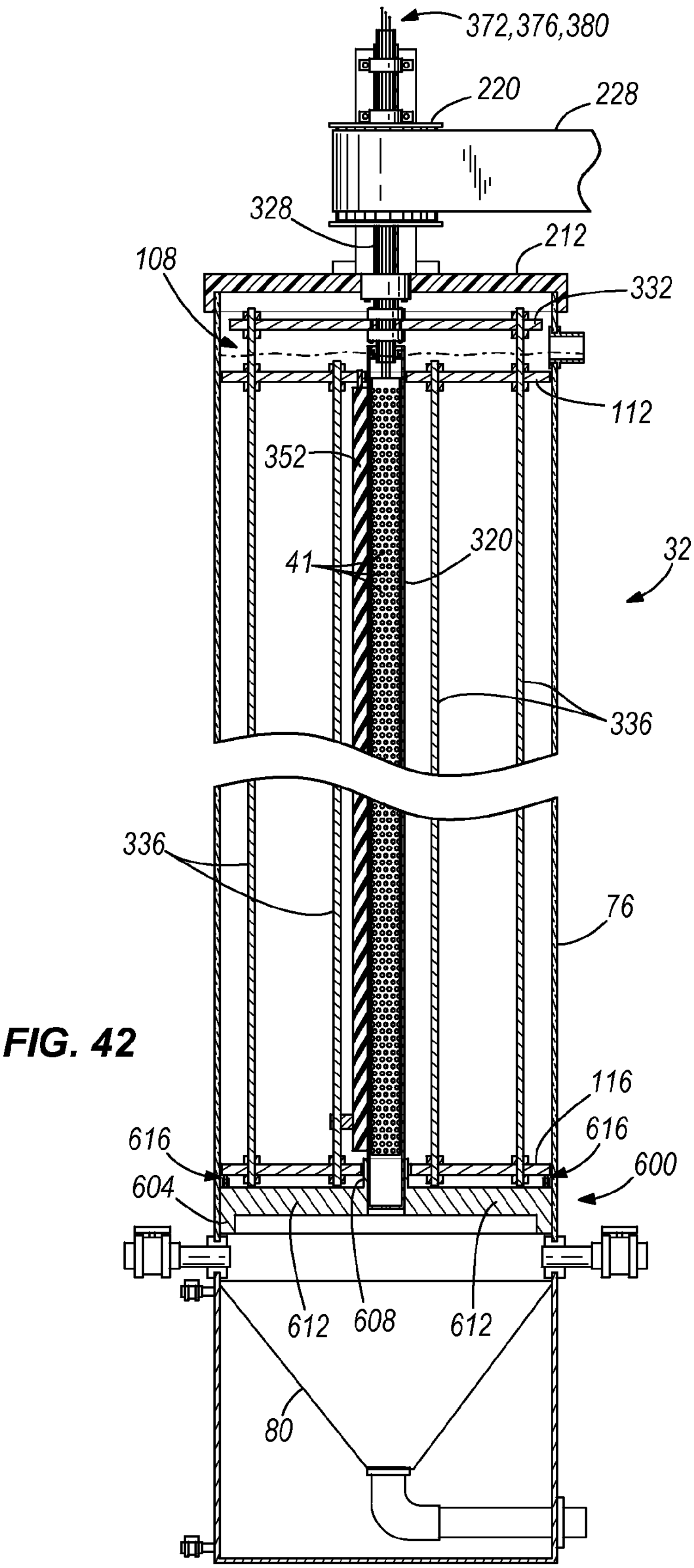
FIG. 42 is a cross-sectional view taken along a longitudinal plane of the container and the frame support device shown in FIG. 37.

With reference to FIGS. 35 and 36, another alternative manner of wiping the outer surface of the tube 320 is illustrated. In this illustrated exemplary embodiment, the media strands 110 are positioned similarly to those illustrated in FIG. 34. That is, inner media strands 110 are positioned adjacent and in contact with the outer surface of the tube 320. Similar to FIG. 34, only the inner media strands 110 are illustrated in FIGS. 35 and 36 for simplicity even though other strands of media 110 would be present in the container 32. In some instances, rotation of the frame 108 may cause the inner media strands 110 to bow outward away from and out of contact with the outer surface of the tube 320 due to centrifugal force. To inhibit this outward bowing of the inner media strands 110, a rigid device 354 may be coupled to each of the inner media strands 110. The rigid devices 354 may be made of a variety of materials including, for example, plastic, metal, hard rubber, etc. Examples of rigid devices 354 that may be utilized include bungee cords, shock cords, plastic wire, metal wire, etc. The rigid devices 354 may extend the entire length of the inner media strands 110 between the upper and lower connector plates 112, 116 or may extend a portion of the length of the inner media strands 110. For example, the rigid devices 354 may extend downward from the upper connector plate 112, upward from the lower connector plate 116, or both downward from the upper connector plate 112 and upward from the lower connector plates 116, along only a portion of the inner media strands 110 such as, for example, six inches. With reference to the illustrated exemplary embodiment in FIGS. 35 and 36, a first rigid device 354 extends downward from the upper connector plate 112 a portion of the length of a first inner media strand 110 and a second rigid device 354 extends upward from the lower connector plate 116 a portion of the length of a second inner media strand 110. In this illustrated exemplary embodiment, the rigid devices 354 may not wipe against the outer surface of the tube 320. Accordingly, by offsetting the first and second rigid devices 354, the upper portion of the second inner media strand 110 will wipe the outer surface of the tube 320 in line with the first rigid device 354 and the bottom portion of the first inner media strand 110 will wipe against the outer surface of the tube 320 in line with the second rigid device 354. This arrangement ensures that substantially the entire outer surface of the tube 320 will be wiped by inner media strands 110. Alternatively, the rigid devices 354 may be arranged to wipe against the outer surface of the tube 320.

Other alternatives for wiping the outer surface of the tube 320 are possible and are within the intended spirit and scope of the present invention.

Referring now to FIGS. 37-42, an alternative manner for supporting the frame 108 and artificial light system 37 of FIGS. 32 and 33 is illustrated. In this illustrated exemplary embodiment, the system 20 includes a frame support device 600 having a circular support shelf 604, a central receptacle 608, a plurality of arms 612 extending from the central receptacle 608 toward the circular support shelf 604, and a plurality of roller devices 616 supported by the arms 612. The circular support shelf 604 is supported within the container housing 76 such that it is prevented from moving downward, thereby providing vertical support to the frame 108 resting thereon. The circular support shelf 604 may be supported within the housing 76 in a variety of different manners such as, for example, a press-fit, friction-fit, or interference fit, welding, fastening, adhering, bonding, or by an indentation or shelf extending from the inner surface of the housing 76 into the interior of the housing 76 upon which the circular support shelf 604 is supported, fastened, bonded, etc.

The central receptacle 608 is centrally located to receive a bottom end of the tube 320 and seal the bottom end of the tube 320 in a water tight manner, thereby preventing the ingress of wastewater into the tube 320. The bottom end of the tube 320 may be coupled to the receptacle 608 in a variety of manners such as, for example, welding, fastening, adhering, bonding, press-fit, friction-fit, interference-fit, or other types of securement. In some embodiments, the coupling itself between the bottom end of the tube 320 and the receptacle 608 is sufficient to provide the water tight seal. In other embodiments, a sealing device such as, for example, a bushing, a water pump seal, an O-ring, packing material, etc., may be utilized to create the water tight seal between the bottom end of the tube 320 and the receptacle 608. In the illustrated exemplary embodiment, the frame support device 600 includes four arms 612. Alternatively, the frame support device 608 may include other quantities of arms 612 and be within the intended spirit and scope of the present invention. The arms 612 extend outward from the receptacle 608 and are supported from below on their distal ends by the support shelf 604. In some embodiments, the distal ends of the arms 612 are bonded, welded, adhered, otherwise secured to, or unitarily formed with the support shelf 604. In other embodiments, the distal ends of the arms 612 may solely rest upon the support shelf 604 or be received in recesses defined in the shelf 604 to inhibit rotation of the arms 612 and the central receptacle 608. In the illustrated exemplary embodiment, a single roller device 616 is secured to a top of each of the distal ends of the arms 612. The roller devices 616 include a base 620, an axle 624, and a roller 628 rotatably supported by the axle 624. The axles 624 are parallel to the arms 612 and the rollers 628 are oriented perpendicularly to the axles 624 and arms 612. The roller devices 616 are positioned to engage a bottom surface of the lower connector plate 116 and allow the lower connector plate 116 to roll over and relative to the frame support device 600. In this manner, the frame support device 600 provides vertical support to the frame 108 and allows the frame 108 to rotate relative to the frame support device 600. It should be understood that the frame support device 600 may include other numbers of roller devices 616 oriented in other manners such as, for example, multiple roller devices 616 per arm 612, roller devices 616 positioned on less than all the arms 612, roller devices 616 positioned on alternating arms 612, etc. It should also be understood that other devices may be used in place of the roller devices 616 to facilitate movement of the lower connector plate 116 relative to the frame support device 600, while providing vertical support to the frame 108.

It should further be understood that a frame support device 600 may also be utilized with the upper connector plate 112. In such an instance, the upper frame support device 600 would be positioned directly underneath the upper connector plate 112, engage the bottom surface of the upper connector plate 112 to provide vertical support, and allow rotation of upper connector plate 112 relative to the upper frame support device 600. Such an upper frame support device 600 may be configured and may function in much the same manner as the lower frame support device 600.

Figure 43:
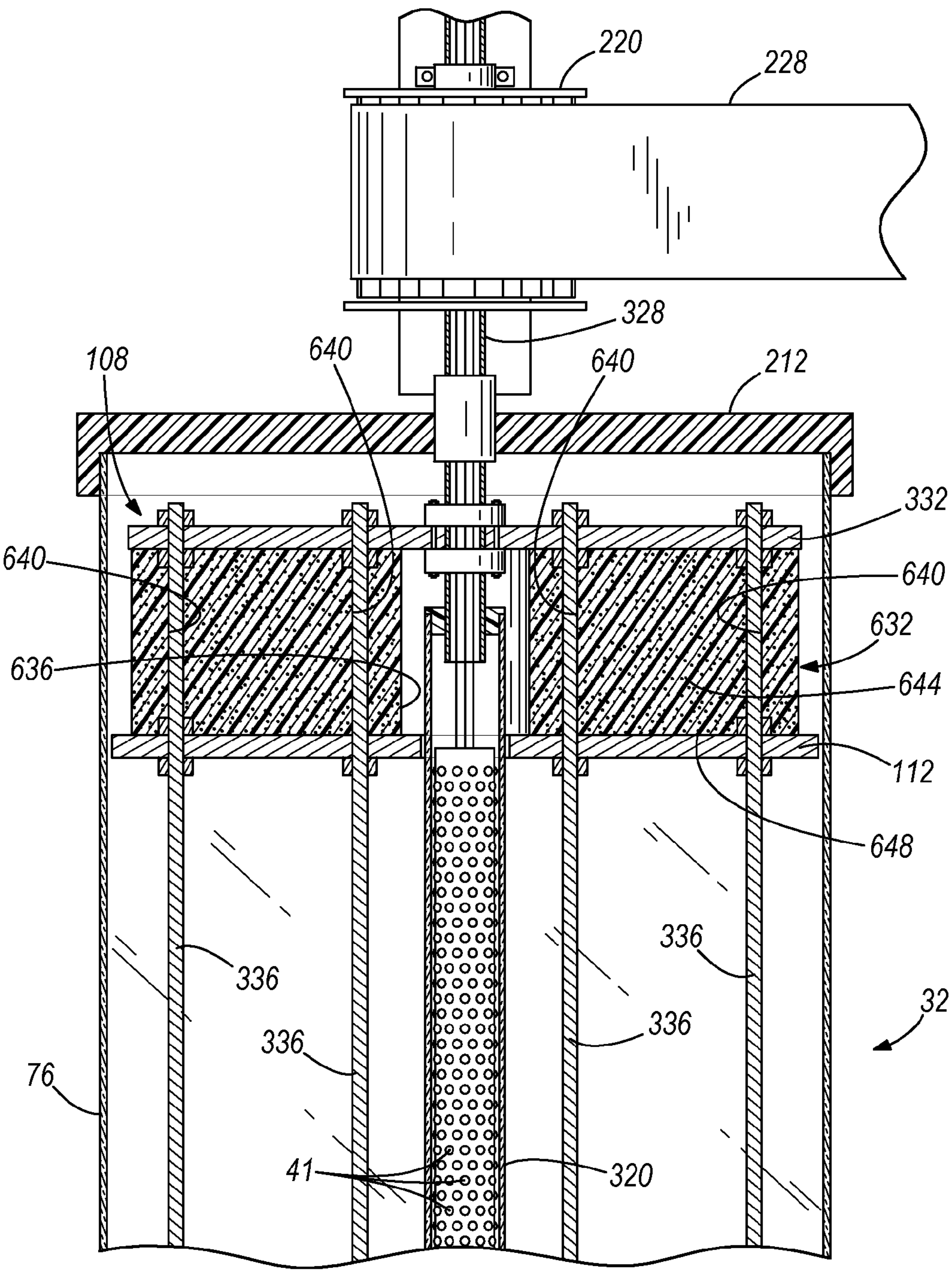
FIG. 43 is a partial cross-sectional view taken along a longitudinal plane of a container including a float device, shown in section, for supporting a frame of the container.
Figure 44:
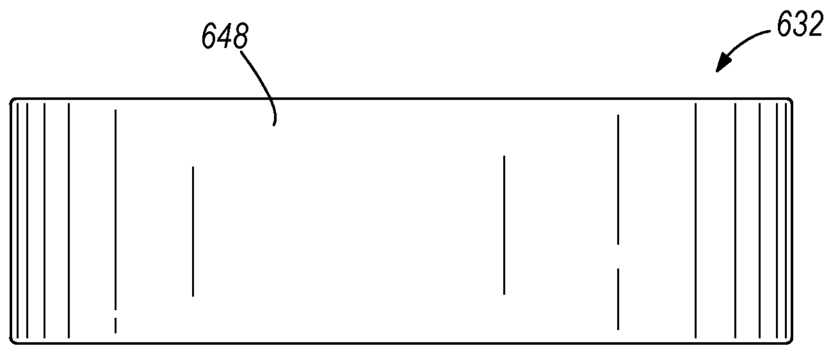
FIG. 44 is an elevation view of the float device shown in FIG. 43.
Figure 45:
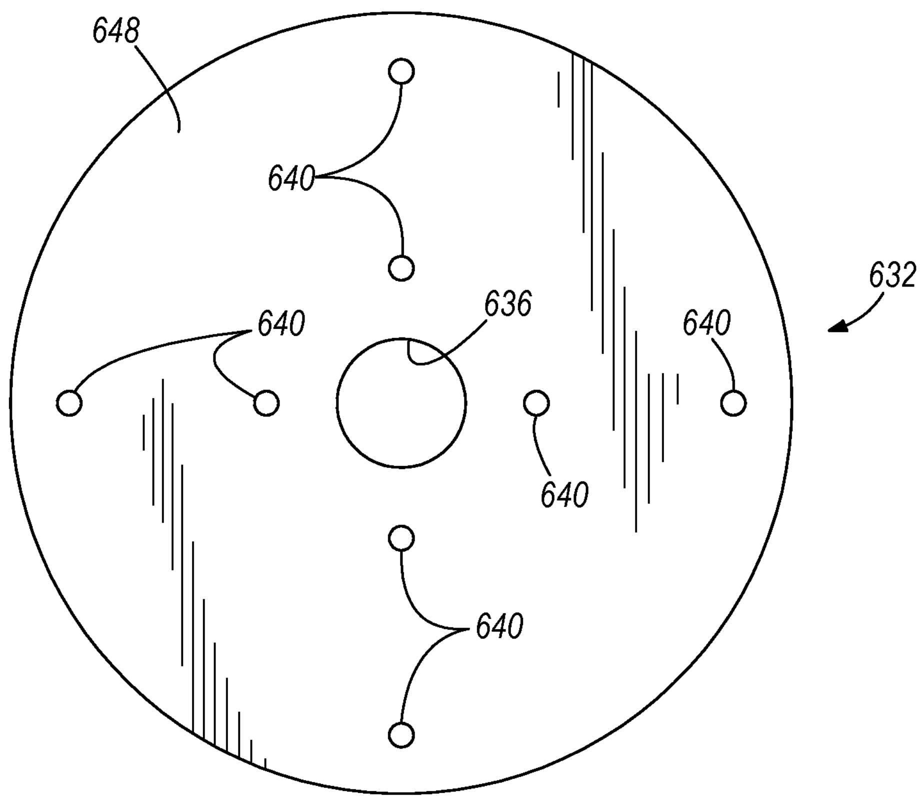
FIG. 45 is a top view of the float device shown in FIG. 43.

With reference to FIGS. 43-46, yet another alternative manner for supporting the frame 108 and artificial light system 37 of FIGS. 32 and 33 is illustrated. In this illustrated exemplary embodiment, the system 20 includes a float device 632 for providing vertical support to the frame 108. It should be understood that the float device 632 may be utilized with any of the container embodiments and frame embodiments disclosed herein. In some exemplary embodiments, the float device 632 may provide a portion of the vertical support required to maintain the frame 108 in the desired position. In other exemplary embodiments, the float device 632 may provide the entire vertical support required to maintain the frame 108 in the desired position. The float device 632 is positioned between the lateral support plate 332 and the upper connector plate 112. In other embodiments, the float device 632 may be positioned under the upper connector plate 112 or under the lower connector plate 116. Also, in further embodiments, the system 20 may include a plurality of float devices 632 such as, for example, two float devices 632. In such an exemplary embodiment, a first float device may be positioned between the lateral support plate 332 and upper connector plate 112 as illustrated in FIG. 43 and a second float device may be positioned under the lower connector plate 116.

The float device 632 may have any shape and configuration as long as it provides a desired amount of vertical support to the frame 108 disposed within the container 32. In the illustrated exemplary embodiment, the float device 632 is substantially cylindrical in shape to compliment the shape of the container housing 76. The thickness or height of the float device 632 may vary depending on the amount of buoyancy desired. The float device 632 includes a central opening 636 for allowing the drive tube 328 and the tube 320 to pass therethrough, and a plurality of openings 640 for allowing support rods 336 to pass through the float device 632. As indicated above, the container 32 may include any number and any configuration of support rods 336 and, similarly, the float device 632 may include any number and any configuration of openings 640 to accommodate the total number of support rods 336.

The float device 632 may be comprised of a wide variety of buoyant materials. In some exemplary embodiments, the float device 632 is comprised of a closed cell material that inhibits absorption of liquids. In such embodiments, the float device 632 may be comprised of a single closed cell material or multiple closed cell materials. Exemplary closed cell materials that the float device 632 may be comprised of include, but are not limited to, polyethylene, neoprene, PVC, and various rubber blends. In other exemplary embodiments, the float device 632 may be comprised of a core 644 and an outer housing 648 surrounding and enclosing the core 644. The core 644 may be comprised of a closed cell material or an open cell material, while the outer housing 648 is preferably comprised of a closed cell material due to its direct contact with wastewater in the container 32. In instances where the core 644 is closed cell material and does not absorb wastewater, the outer housing 648 may or may not be water tight and airtight. In instances where the core 644 is open cell material, the outer housing 648 is preferably water tight and airtight around the core 644 to inhibit wastewater from accessing the core 644 and being absorbed by the core 644. Exemplary closed cell materials that the core 644 may be comprised of include, but are not limited to, polyethylene, neoprene, PVC, and various rubber blends, and exemplary open cell materials that the core 644 may be comprised of include, but are not limited to, polystyrene, polyether, and polyester polyurethane foams. Exemplary materials that the outer housing 648 may be comprised of include, but are not limited to, fiberglass re-enforced plastic, PVC, rubber, epoxy, and other water proof coated formed shells.

Figure 46:
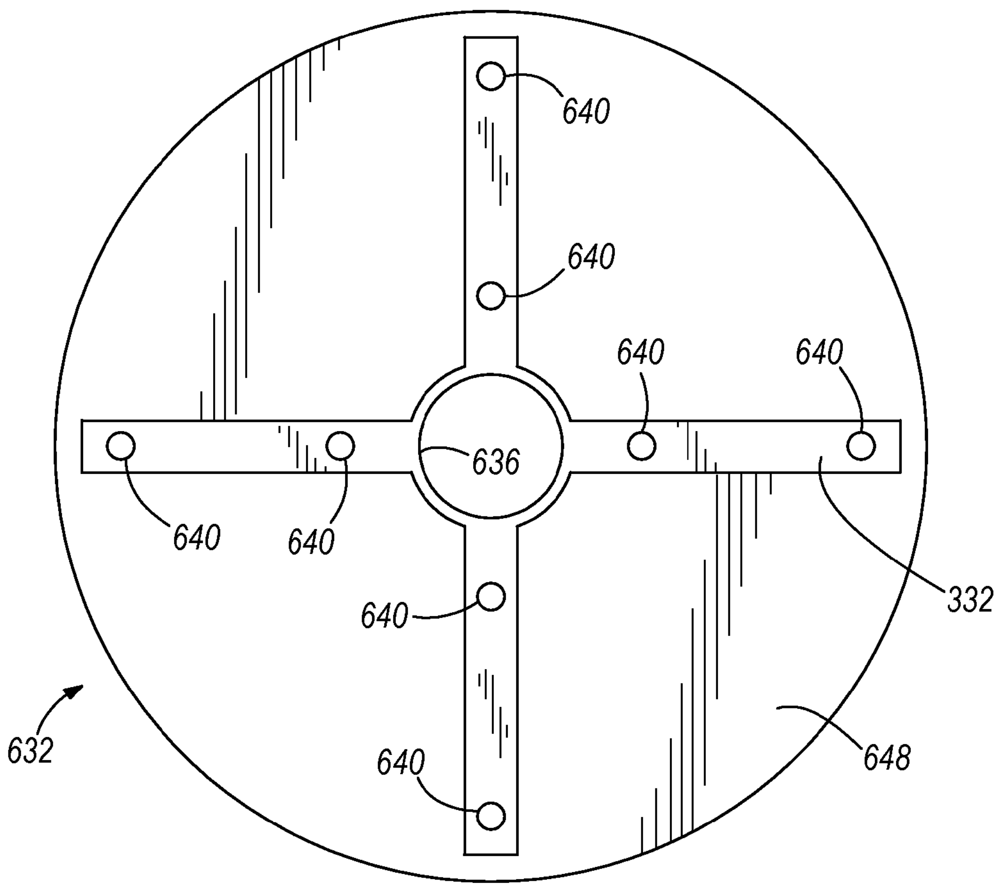
FIG. 46 is a top view of the float device shown in FIG. 43 including an exemplary lateral support plate.

With particular reference to FIG. 46, the float device 632 is illustrated with an exemplary lateral support plate 332. In this illustrated exemplary embodiment, the lateral support plate 332 is substantially cross-shaped. One exemplary reason for providing a cross-shaped lateral support plate 332 is to reduce the amount of material and the overall weight of the lateral support plate 332. By reducing the weight of the lateral support plate 332, the overall frame 108 weighs less and the float device 632 is required to support less weight. In this exemplary cross-shaped embodiment, the material of the lateral support plate 332 is removed between locations where the support rods 336 connect to the lateral support plate 332. As indicated above, the container 32 may include any number and any configuration of support rods 336 and, similarly, the lateral support plate 332 may have any configuration to accommodate the number and configuration of support rods 336.

Figure 47:
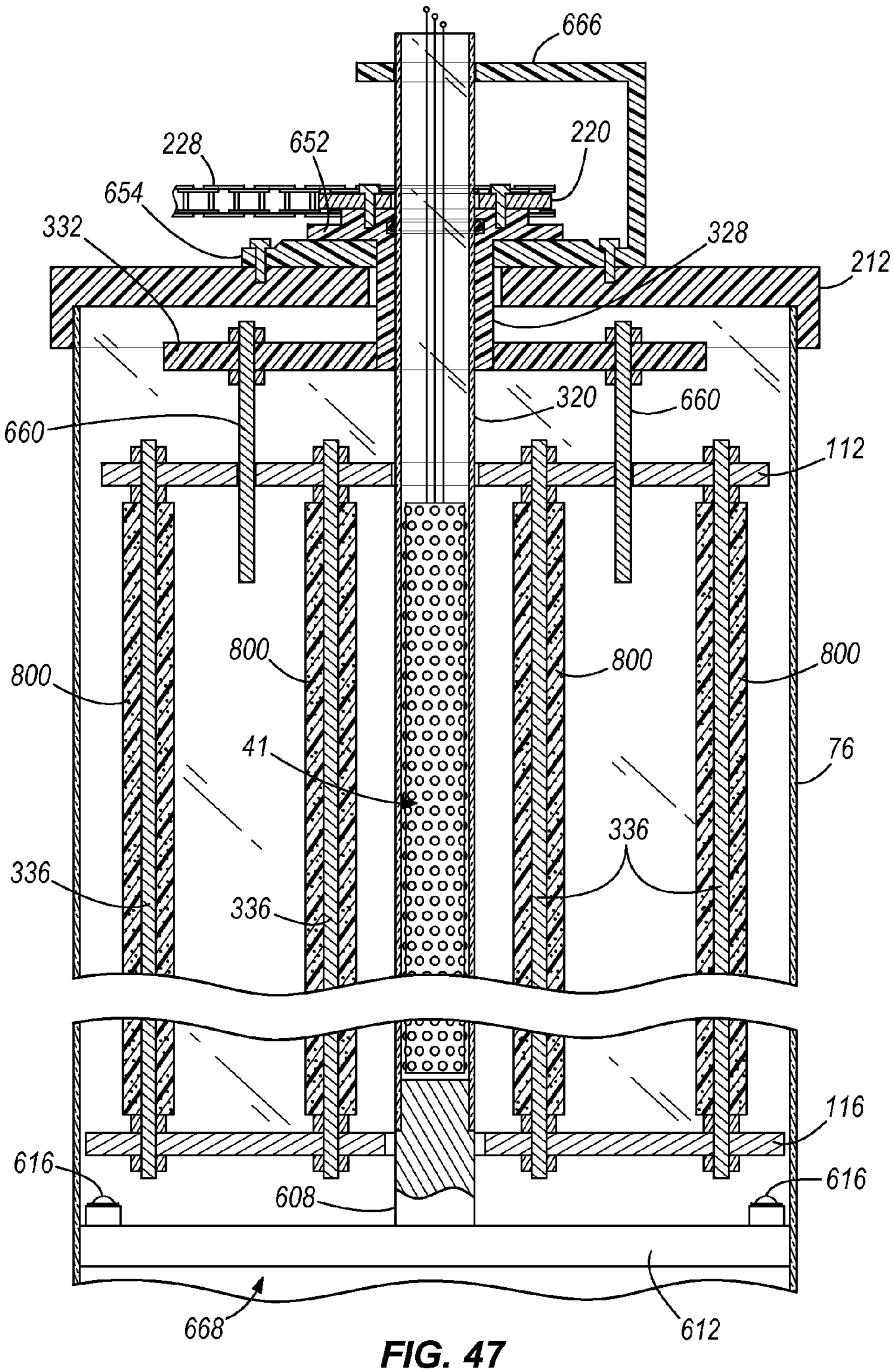
FIG. 47 is a partial cross-sectional view of the container taken along a longitudinal plane, the container including another exemplary float device.

As indicated above, the float device 632 is capable of having a variety of configurations and of being disposed in a variety of locations within the container 32. With reference to FIG. 47, another exemplary float device 800 is illustrated. In this exemplary embodiment, the float device 800 comprises a plurality of float devices with one connected to and surrounding each of the support rods 336. These float devices 800 also extend substantially the entire height of the support rods 336 disposed between the upper and lower connector plates 112, 116. In a similar manner to the float device 632 illustrated in FIGS. 43-46, the exemplary float devices 800 illustrated in FIG. 47 provide vertical support to the frame 108. In some exemplary embodiments, the float devices 800 may provide a portion of the vertical support required to maintain the frame 108 in the desired position. In other exemplary embodiments, the float devices 800 may provide the entire vertical support required to maintain the frame 108 in the desired position.

Figure 48:
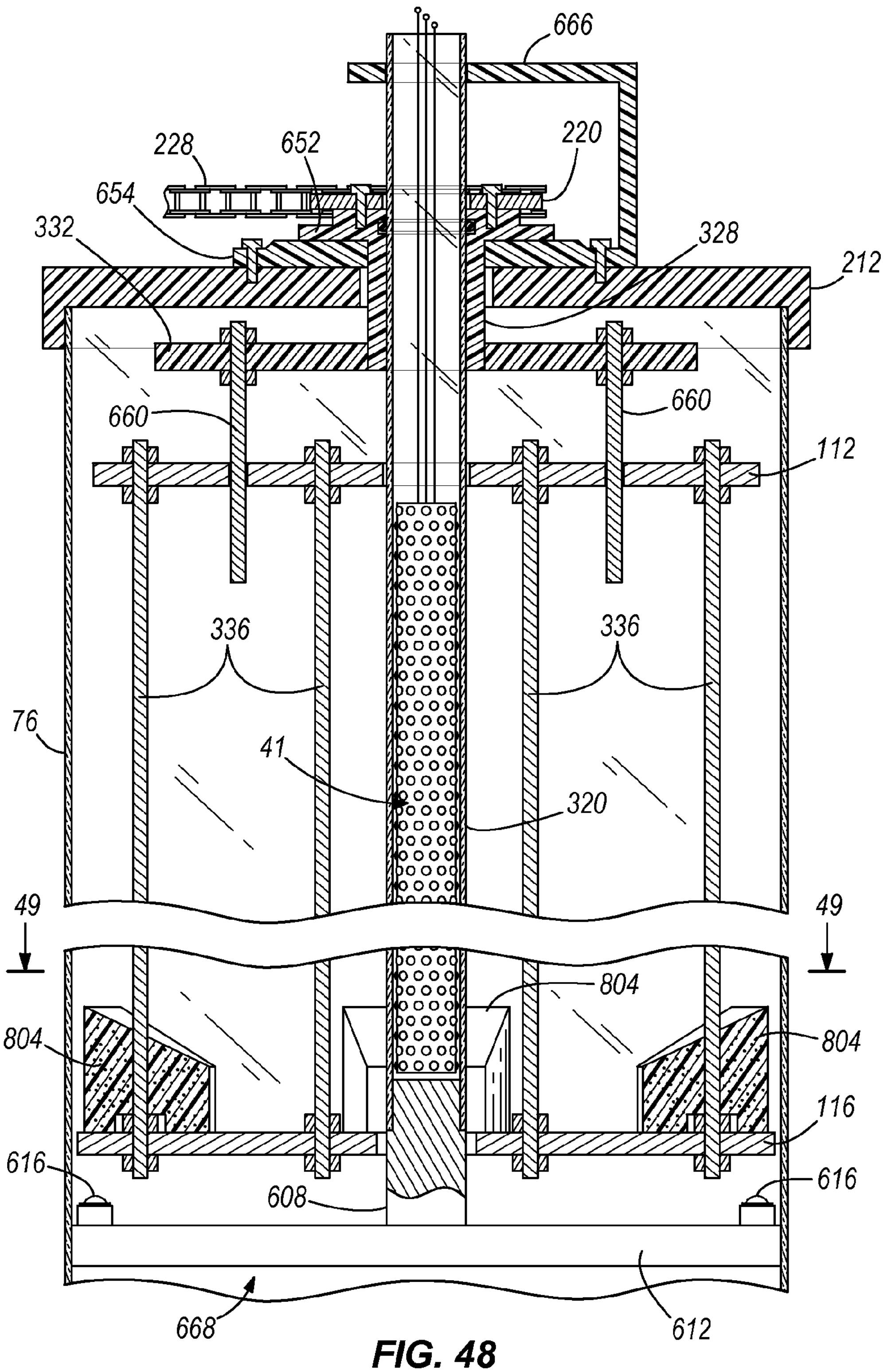
FIG. 48 is a partial cross-sectional view of the container taken along a longitudinal plane, the container including a further exemplary float device.
Figure 49:
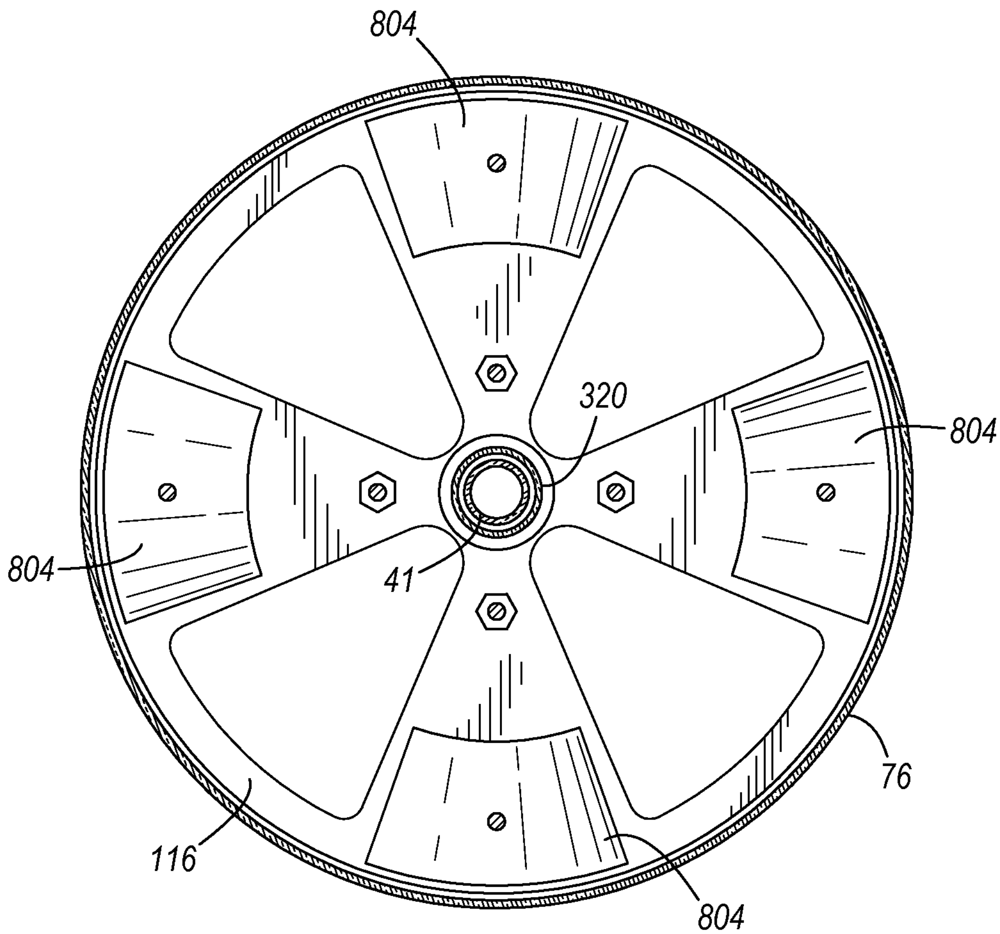
FIG. 49 is a cross-sectional view taken along a horizontal plane of the container and the float device shown in FIG. 48.

With reference to FIGS. 48 and 49, yet another exemplary float device 804 is illustrated. In this exemplary embodiment, the float device 804 comprises a plurality of float devices connected to a top surface of the lower connector plate 116. In a similar manner to the float device 632 illustrated in FIGS. 43-46, the exemplary float devices 804 illustrated in FIGS. 48 and 49 provide vertical support to the frame 108. Alternatively, the float devices 804 may be connected to a bottom surface of the lower connector plate 116 or a top or bottom surface of the upper connector plate 112. In some exemplary embodiments, the float devices 800 may provide a portion of the vertical support required to maintain the frame 108 in the desired position. In other exemplary embodiments, the float devices 804 may provide the entire vertical support required to maintain the frame 108 in the desired position.

Referring now to FIGS. 50-53, another exemplary embodiment of the container 32 is illustrated. In this exemplary embodiment, the container 32 includes an alternative drive mechanism for rotating the frame 108 and media 110. In the illustrated embodiment, the drive mechanism includes a motor (not shown), a drive chain 228, a sprocket or gear 220, a plate 652 coupled to the gear 220, a centering ring 654 encircling the plate 652 to ensure that plate 652 remains centered, and a drive tube 328 coupled to the plate 652. The motor drives the chain 228 in a desired direction, thereby rotating the gear 220. Since the gear 220 is coupled to the plate 652 and the plate 652 is coupled to the drive tube 328, rotation of the gear 220 ultimately rotates the drive tube 328. The tube 320 is fixed-in-place in the center of the container 32 and the gear 220, plate 652, centering ring 654, and drive tube 328 all encircle and rotate around the central tube 320. A sealing member 656 such as, for example, an O-ring is disposed in a recess 658 defined in the gear 220, encircles the tube 320, and engages an exterior surface of the tube 320 to seal around the tube 320. The sealing member 656 inhibits wastewater within the container 32 from leaking out of the container 32 between the tube 320 and the drive mechanism. Alternatively, the sealing member 656 may be disposed in a recess defined in other components of the drive mechanism such as, for example, the plate 652, the drive tube 328, etc., and may engage the exterior surface of the tube 320 to seal around the tube 320.

Figure 50:
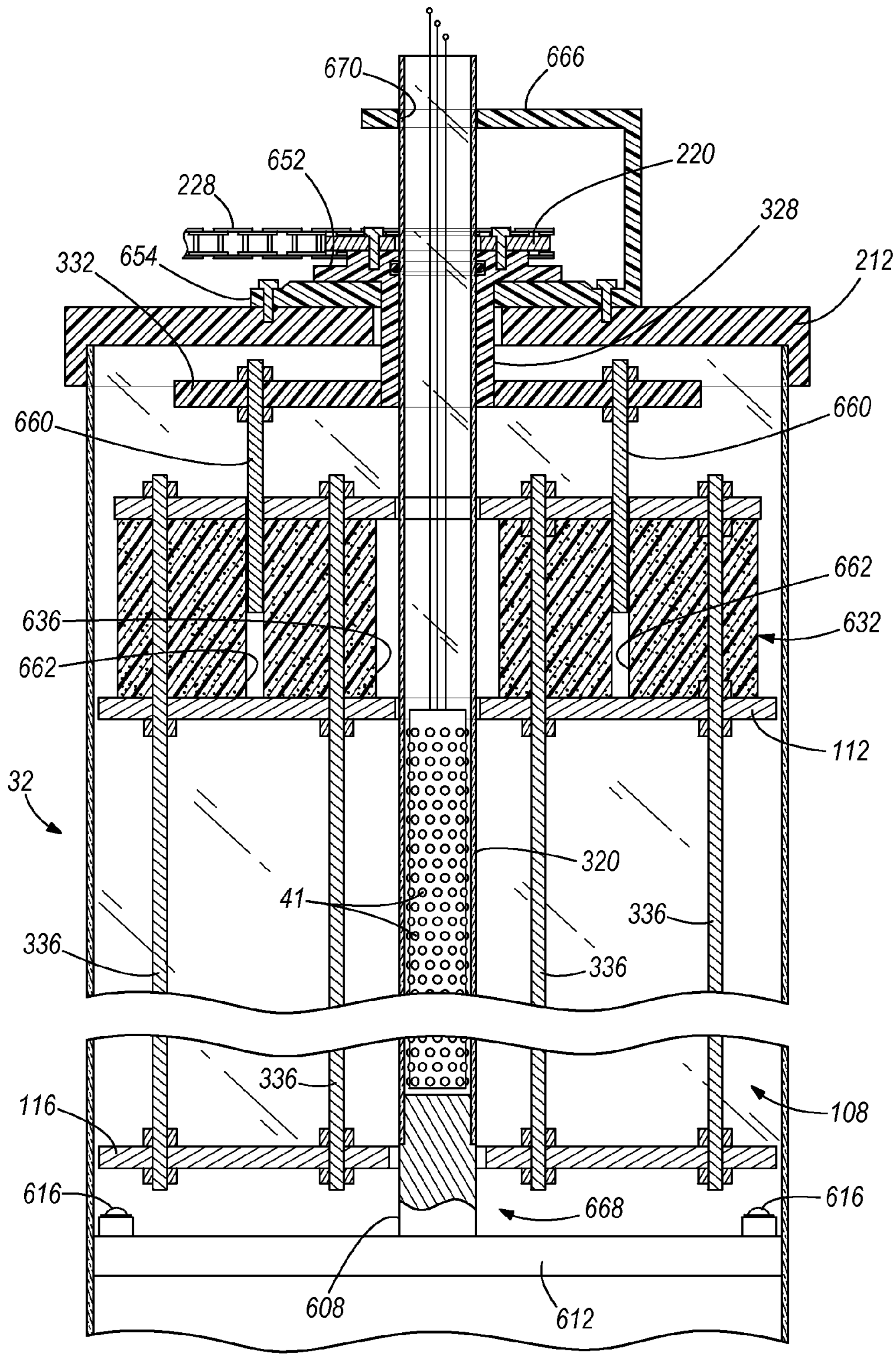
FIG. 50 is a partial cross-sectional view taken along a longitudinal plane of another exemplary alternative container.
Figure 51:
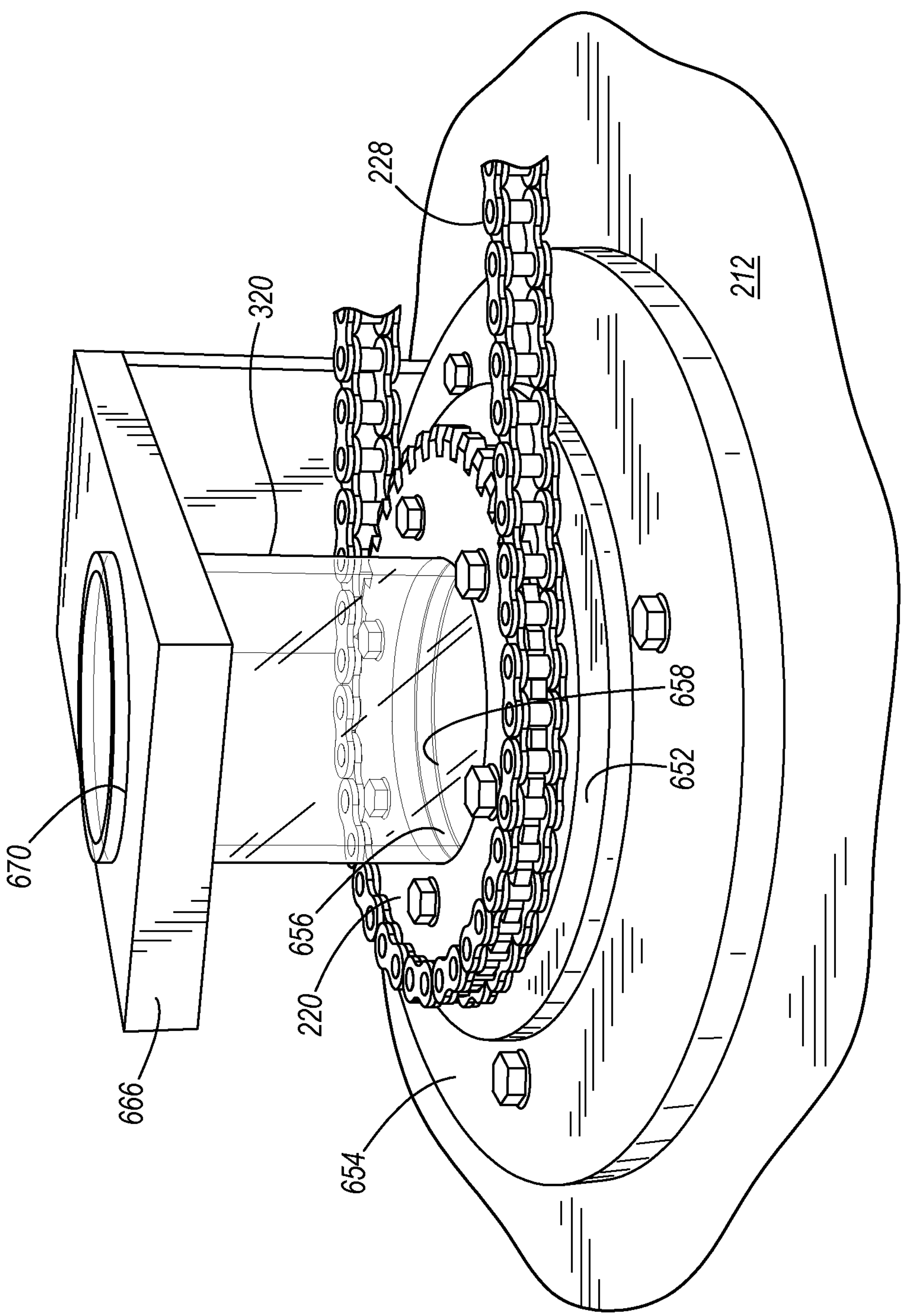
FIG. 51 is a top perspective view of a portion of the container and an exemplary alternative drive mechanism shown in FIG. 50.
Figure 52:
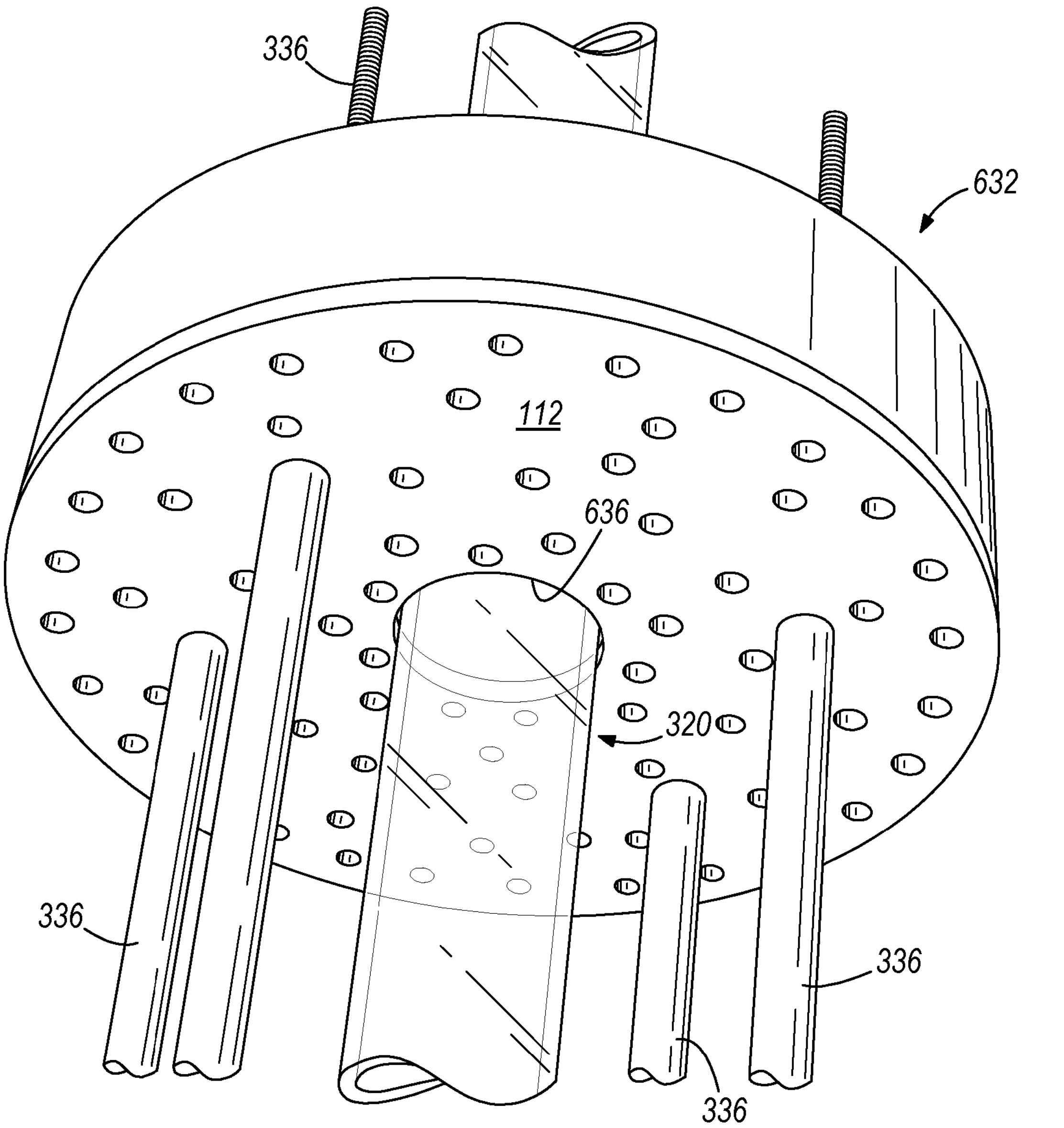
FIG. 52 is a bottom perspective view of a portion of the container shown in FIG. 50.
Figure 53:
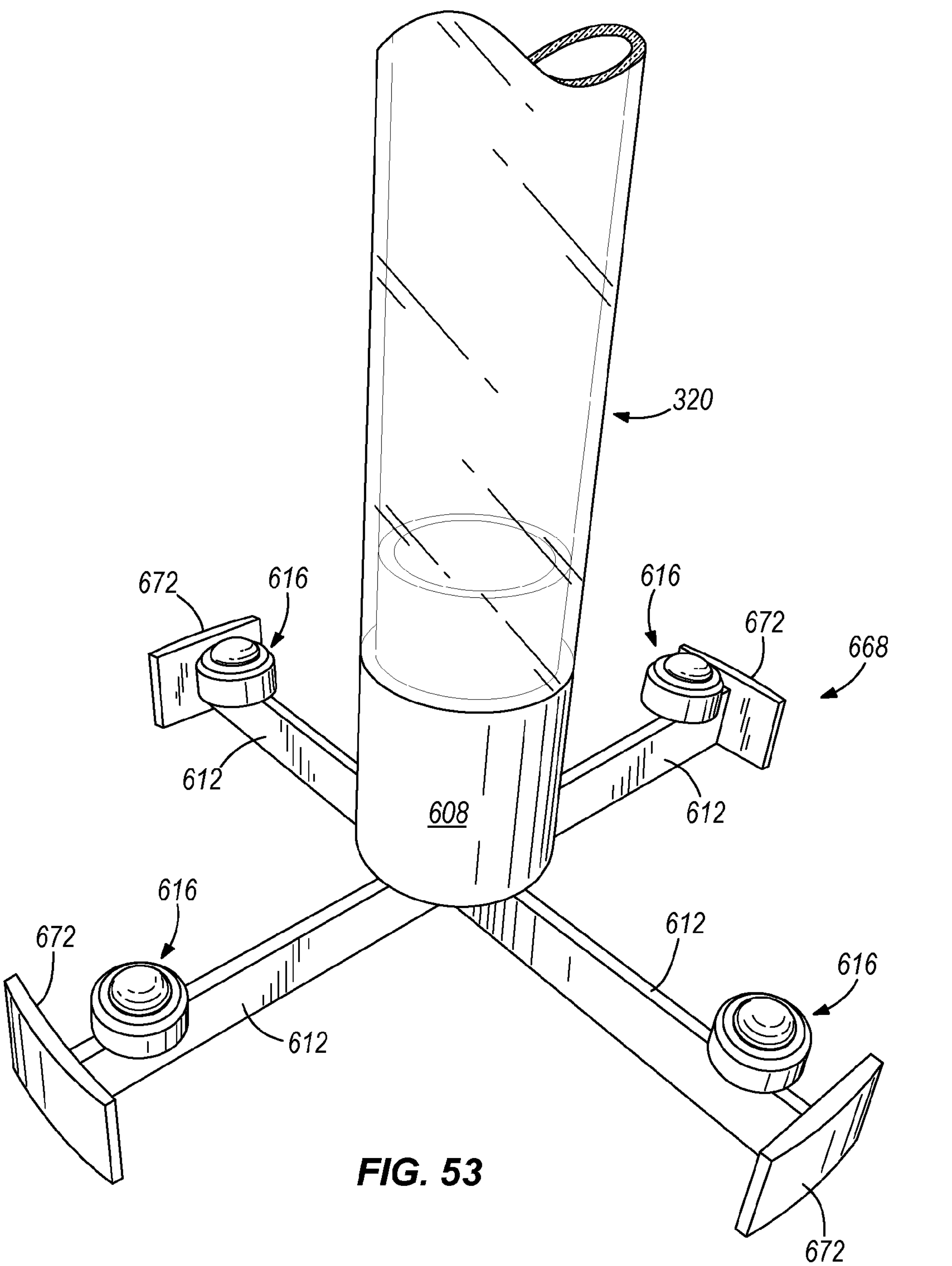
FIG. 53 is a top perspective view of a portion of the container shown in FIG. 50.

With particular reference to FIG. 50, the drive mechanism also includes a support plate 332 coupled to and rotatable with the drive tube 328. Extending downward from the support plate 332 are two dowels 660 that insert into apertures 662 defined in the float device 632. The dowels 660 couple the drive mechanism to the float device 632 such that rotation of the drive mechanism facilitates rotation of the float device 632 and the frame 108. However, vertical movement of the float device 632 relative to the dowels 660 is uninhibited. Such vertical movement of the float device 632 occurs as the level of wastewater changes within the container 32. Referring to FIG. 52, the float device 632 includes a central opening 636 through which the tube 320 extends. The central opening 636 is sufficiently sized to allow the float device 632 to rotate relative to the tube 320 without significant friction between the exterior surface of the tube 320 and the float device 632. While the illustrated exemplary embodiment includes two dowels 660, any number of dowels 660 may be used to couple the drive mechanism to the float device 632. In addition, the drive mechanism may be coupled to the frame 108 in manners other than the illustrated configuration of the dowels 660 and float device 632.

As indicated above, the tube 320 is fixed in place and does not rotate. Referring now to FIGS. 50-53, the container 32 includes a first support 666 secured to cover 212 for supporting the top of the tube 320 and a second support 668 for supporting the bottom of the tube 320. The top support 666 includes an aperture 670 in which the top of the tube 320 is positioned. The aperture 670 is adequately sized to tightly engage the exterior surface of the tube 320 to inhibit movement of the top of the tube 320 relative to the top support 666. The bottom support 668 includes a central receptacle 608, a plurality of arms 612 extending from the central receptacle 608, and a plurality of roller devices 616 supported by the arms 612. The tube 320 is rigidly secured to the central receptacle 608 to inhibit movement between the tube 320 and the receptacle 608. The arms 612 include a curved plate 672 at their ends to engage the interior surface of the container 32 to inhibit substantial lateral movement of the bottom support 668 relative to the container housing 76. In some exemplary embodiments, the container 32 may have a polygonal shape and the sides of the container 32 may be flat. In such exemplary embodiments, the plates 672 will not be curved and will instead be flat to engage the flat surfaces of the container 32 in a flush manner.

Returning to the illustrated exemplary embodiment, since the frame 108 is lifted within the container 32 due to buoyancy of the float device 632 on the wastewater, drainage of the wastewater from the container 32 causes the frame 108 to lower in the container 32 until the lower connector plate 116 rests upon the roller devices 616. If rotation of the frame 108 is desired while wastewater is drained from the container 32, the roller devices 616 facilitate such rotation. In the illustrated embodiment, the bottom support 668 includes four roller devices 616. In other embodiments, the bottom support 668 may include any number of roller devices 616 to accommodate rotation of the frame 108. The bottom support 668 may be made of stainless steel or other relatively dense material to provide the bottom support 668 with a relatively heavy weight, which counteracts buoyant forces exerted upwardly to the tube 320 when the container 32 is filled with wastewater. The relatively heavy weight of the bottom support 668 also facilitates insertion of the internal components of the container 32 into a wastewater filled container 32. Such internal components may include, for example, the bottom support 668, the tube 320, the frame 108, the media 110, and a portion of the drive mechanism.

The tube 320 described in connection with the exemplary embodiment illustrated in FIGS. 50-53 is capable of having the same functionality as any of the other tubes 320 disclosed in the other tube embodiments. For example, the tube 320 of this embodiment is capable of containing light elements similar to those illustrated in FIGS. 32 and 33-43.

Figure 54:
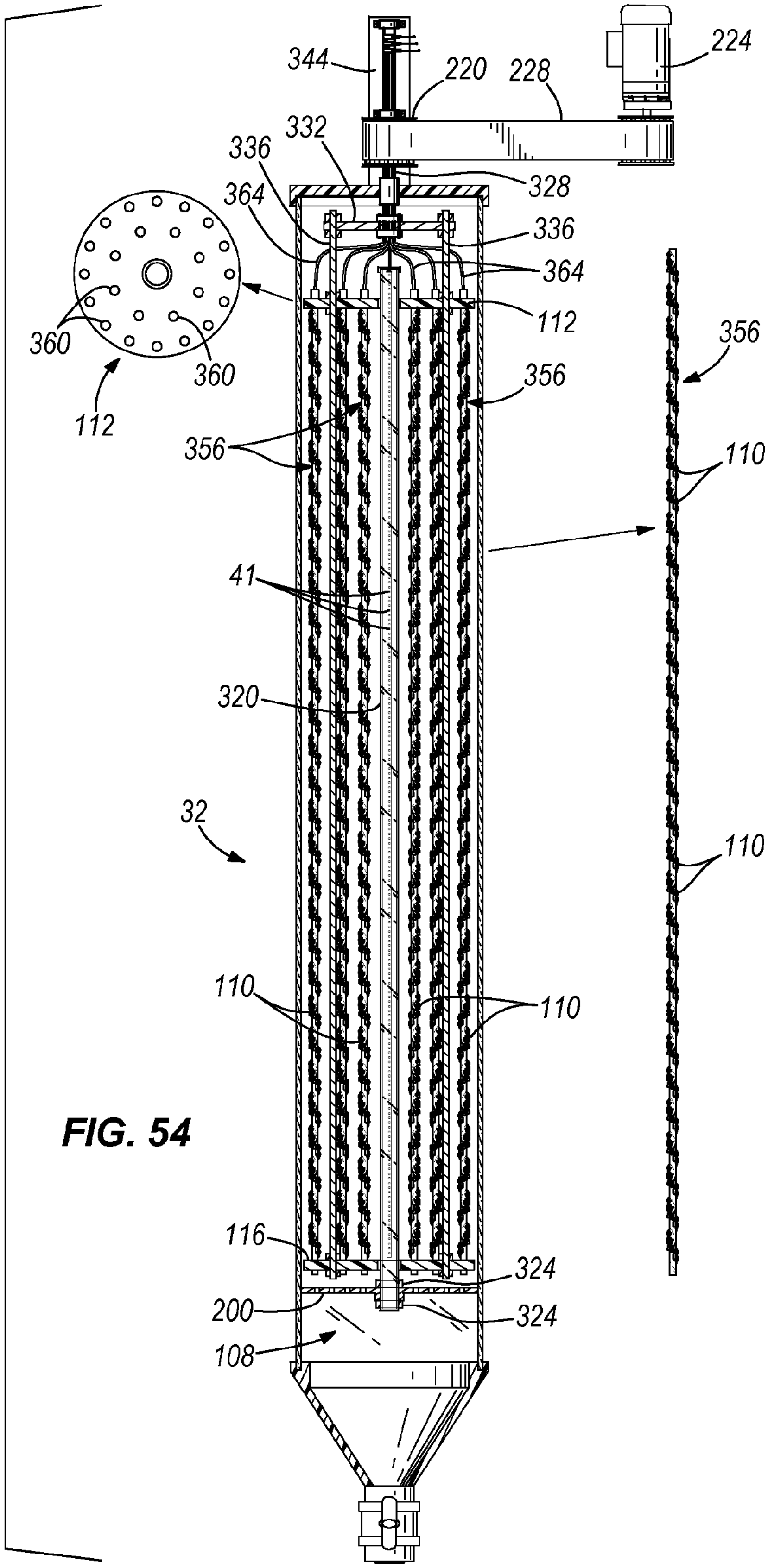
FIG. 54 is a cross-sectional view taken along a longitudinal plane of a container and yet another exemplary artificial light system.
Figure 55:
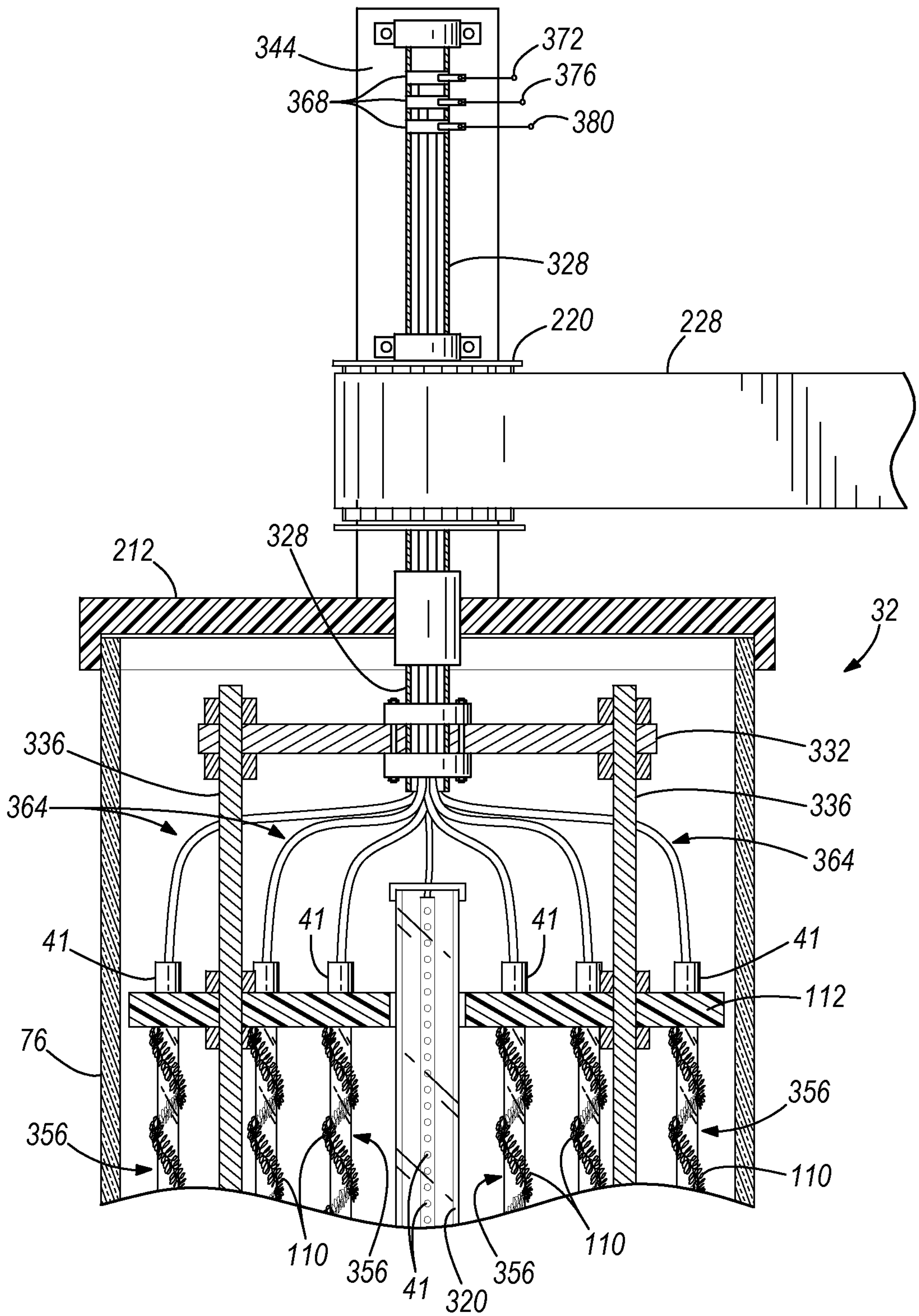
FIG. 55 is an enlarged view of a portion of the container and the artificial light system shown in FIG. 54.
Figure 56:
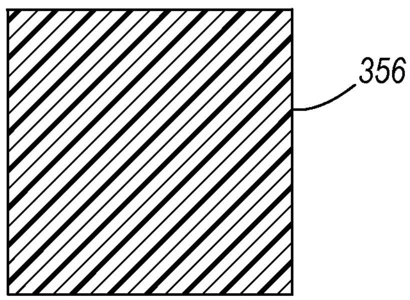
FIG. 56 is a cross-sectional view taken along a horizontal plane of an exemplary light element of the artificial light system shown in FIG. 54.
Figure 57:
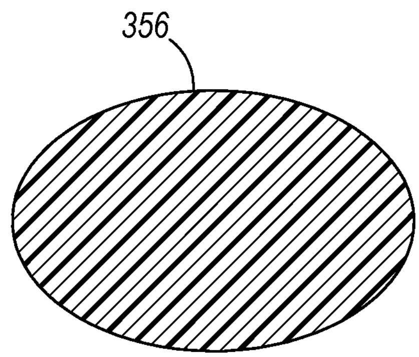
FIG. 57 is a cross-sectional view taken along a horizontal plane of another exemplary light element of the artificial light system shown in FIG. 54.
Figure 58:
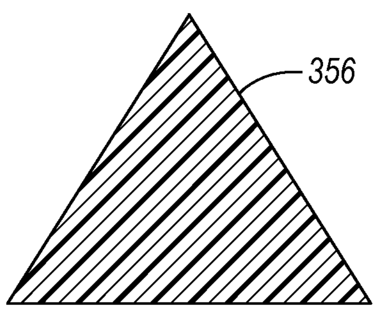
FIG. 58 is a cross-sectional view taken along a horizontal plane of still another exemplary light element of the artificial light system shown in FIG. 54.
Figure 59:
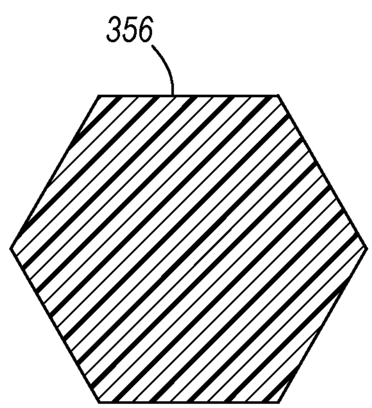
FIG. 59 is a cross-sectional view taken along a horizontal plane of yet another exemplary light element of the artificial light system shown in FIG. 54.

Referring now to FIGS. 54 and 55, yet another exemplary embodiment of an artificial light system 37 is shown. Components similar between the container and the artificial light systems illustrated in FIGS. 30-33 and the container and the artificial light system illustrated in FIGS. 54 and 55 may be identified with the same reference numbers or may be identified with different reference numbers.

The artificial light system 37 illustrated in FIGS. 54 and 55 may either include a central tube 320 and associated light source 41 similar to the tube 320 and light source illustrated in FIGS. 32 and 33 (see FIG. 54) or the artificial light system 37 may not include the tube 320 and light source illustrated in FIGS. 32 and 33 (see FIG. 55). In the embodiment of the artificial light system 37 illustrated in FIG. 54 including the tube 320 and light source 41, the tube 320 and light source 41 are similar to the tube 320 and light source 41 illustrated in FIGS. 32 and 33.

With continued reference to FIGS. 54 and 55, the artificial light system 37 includes a plurality of light elements 356 connected between upper and lower connector plates 112, 116. The light elements 356 are capable of emitting light within the container 32. In the illustrated exemplary embodiment, the light elements 356 are cylindrically shaped rods having a circular cross-sectional shape and are made of a material that easily emits light such as, for example, glass, acrylic, etc. Alternatively, the light elements 356 may have other shapes and be made of other materials, and such illustrated and described examples are not intended to be limiting. For example, with reference to FIGS. 56-59, the light elements 356 are shown having various other exemplary cross-sectional shapes such as square, oval, triangular, hexagonal. It should be understood that the light elements 356 are capable of having other cross-sectional shapes including shapes having any number of sides or any arcuate perimeter.

In some exemplary embodiments, the material that comprises the light elements 356 includes an infrared inhibitor or infrared filter applied to the light elements 356 or included in the composition of the light element material in order to reduce or limit the heat buildup that occurs in the light elements 356 as light passes therethrough. The light elements 356 are connected at their ends respectively to the upper and lower connector plates 112, 116, which are configured to include a hole 360 for receiving an end of each light element 356 (see top view of upper connector plate 112 in FIG. 54). The artificial light system 37 may include any number of light elements 356 and the upper and lower connector plates 112, 116, may include a complementary number of holes 360 therein to accommodate the ends of the light elements 356. One or more media strands 110 is/are wrapped around each of the light elements 356 to bring the media 110 into close proximity with the light elements 356. Since the light elements 356 are secured to the upper and lower connector plates 112, 116, the light elements 356 rotate with the frame 108.

With particular reference to FIG. 55, the artificial light system 20 includes a plurality of light sources 41, one associated with each of the light elements 356, for providing light to the light elements 356. In the illustrated exemplary embodiment, the light sources 41 are LEDs. In other embodiments, the light sources 41 may be other types of lights and still be within the spirit and scope of the present invention. For example, the light source 41 may be fluorescents, incandescents, high pressure sodium, metal halide, quantum dots, fiber optics, electroluminescents, strobe type lights, lasers, or any other type of lighting.

The light sources 41 are preferably contained within a water proof housing or are otherwise sealed to prevent wastewater from penetrating into the light sources 41. The light sources 41 are positioned at and emit light into the top ends of the light elements 356. Light emitted into the light elements 356 travels through the light elements 356, emits from the light elements 356 into the container 32, and onto the media 110 and microorganisms. Alternatively, the light sources 41 may be positioned at other locations of the light elements 356 such as, for example, the bottom end or intermediary positions between the top and bottom ends, to emit light into the light elements 356.

Electrical power is supplied to the light sources 41 from an electrical power source via electrical wires 364. As indicated above, the light elements 356 rotate with the frame 108. Accordingly, electrical power needs to be supplied to the light sources 41 without twisting the electrical wires 364. Similar to the embodiment of the artificial light system 37 illustrated in FIGS. 32 and 33, the present exemplary embodiment of the artificial light system 37 includes a hollow drive tube 328. The drive tube 328 transfers the rotational force exerted from the motor 224 ultimately to the frame 108. In the present exemplary embodiment, the electrical wires 364 must rotate with the light sources 41 to prevent the electrical wires 364 from twisting. Accordingly, the drive tube 328, electrical wires 364, and frame 108 all rotate together. Continual, uninterrupted electrical power is required to be supplied to the electrical wires 364 connected to the light sources 41 in order to ensure uninterrupted operation of the light sources 41. This continual, uninterrupted electrical power may be provided to the light sources 41 in a variety of different manners and the illustrated and described exemplary embodiments are not intended to be limiting. In the illustrated exemplary embodiment, the artificial light system 37 includes a plurality of copper rings 368 fixed to an exterior surface of the drive tube 328, one ring for engaging each of a positive contact 372, a negative contact 376, and a ground contact 380. The copper rings 368 are isolated from one another to prevent a short circuit from occurring. The positive and negative contacts 372, 376 are coupled to the electrical source and the ground contact 380 is coupled to a ground, and each contact 372, 376, 380 engages an outer surface of a respective ring 368. The contacts 372, 376, 380 are biased toward the rings 368 to ensure continual engagement between the contacts 372, 376, 380 and the rings 368. As the drive tube 328 and rings 368 rotate, the rings 368 move under the contacts 372, 376, 380 and the contacts 372, 376, 380 slide along the exterior surface of the rings 368. The biasing of the contacts 372, 376, 380 toward the rings 368 ensures that the contacts 372, 376, 380 will continually engage the rings 368 during movement. Other manners of providing continual, uninterrupted electrical power to the light sources 41 are contemplated and are within the spirit and scope of the present invention.

In some exemplary embodiments of the artificial light system 37 illustrated in FIGS. 54 and 55, the light elements 356 have a smooth or polished exterior surface. In other exemplary embodiments, the light elements 356 have a scratched, scored, chipped, dented, or otherwise imperfect exterior surface to assist with diffraction of the light from the interior of the light elements 356 to the exterior of the light elements 356. In yet other exemplary embodiments, the light elements 356 may be formed in a shape promoting diffraction of the light from the interior of the light elements 356 to the exterior of the light elements 356.

It should be understood that the artificial light system 37 illustrated in FIGS. 54 and 55 may be used on its own or in combination with any other artificial light system 37 disclosed herein. For example, the system 20 may include a first artificial light system 37 as illustrated in FIGS. 30 and 31 for illuminating the container 32 from the exterior and may include the artificial light system 37 illustrated in FIGS. 54 and 55 for illuminating the container 32 from the interior.

Figure 60:
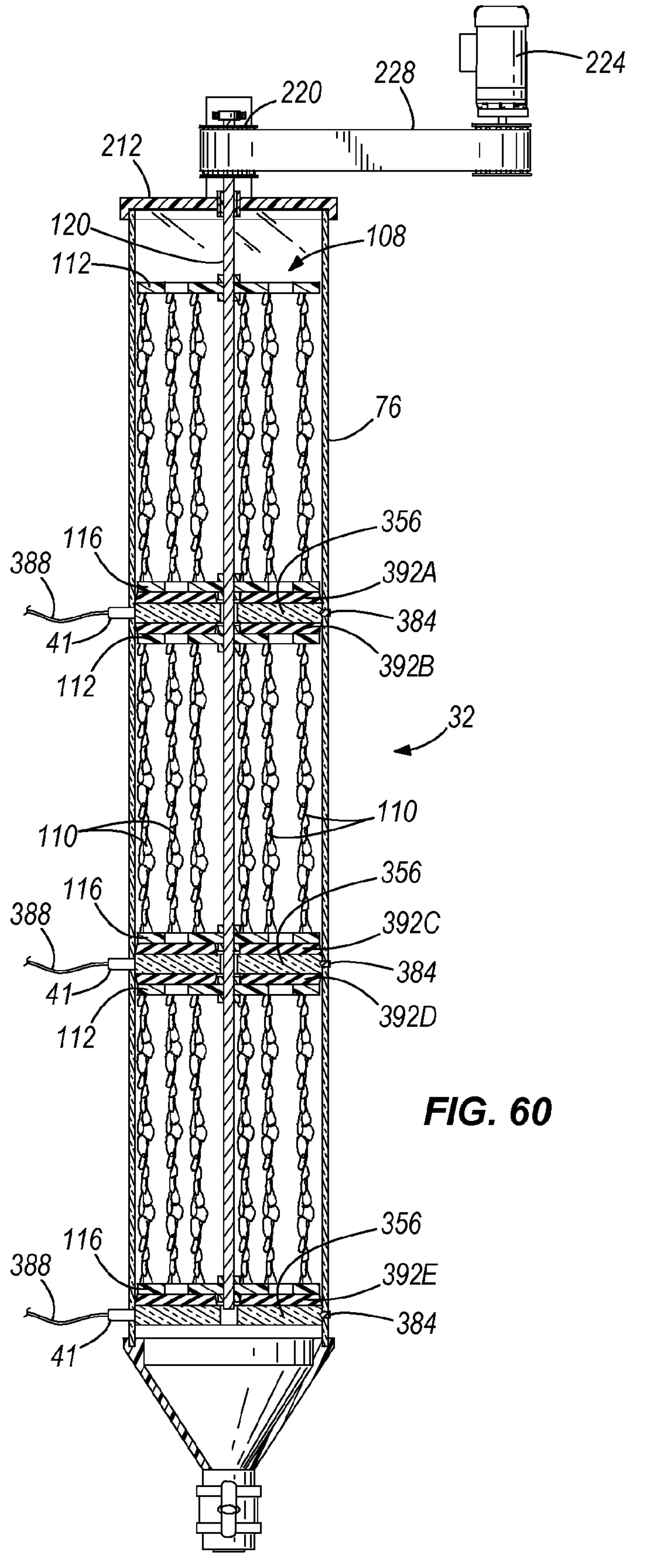
FIG. 60 is a cross-sectional view taken along a longitudinal plane of a container and a further exemplary artificial light system.

Referring now to FIG. 60, a further exemplary embodiment of an artificial light system 37 is shown. Components similar between the container and the artificial light systems illustrated in FIGS. 30-55 and the container and the artificial light system illustrated in FIG. 60 may be identified with the same reference numbers or may be identified with different reference numbers.

This artificial light system 37 includes a plurality of light elements 356 disposed at various heights along the container 32. The light elements 356 are capable of emitting light within the container 32. In the illustrated exemplary embodiment, the light elements 356 are cylindrically shaped discs made of a material that easily emits light such as, for example, glass, acrylic, etc. Alternatively, the light elements 356 may have other shapes and may be made of other materials, and such illustrated and described examples are not intended to be limiting. In the illustrated exemplary embodiment, the artificial light system 37 includes three light elements 356, however, the number of light elements 356 illustrated in this embodiment is for illustrative purposes and is not intended to be limiting. The system 37 may include any number of light elements 356 and still be within the spirit and scope of the present invention. The light elements 356 are secured in place within the container 32 and do not move relative to the container 32. In the illustrated exemplary embodiment, the light elements 356 are secured in place by friction stops 384, one for each light element 356. Alternatively, the light elements 356 may be secured in place by any number of friction stops 384 and by other manners of securment. For example, the light elements 356 may be secured in place in the container 32 by a friction-fit or press-fit, fasteners, bonding, adhering, welding, or any other manner of securment. The light elements 356 are generally round in shape and have a similar diameter to the diameter of the container 32. The artificial light system 37 also includes a plurality of light sources 41, at least one light source 41 for each light element 356, providing light to the light elements 356. The light sources 41 may be a variety of different types of light sources including, for example, LEDs, fluorescents, incandescents, high pressure sodium, metal halide, quantum dots, fiber optics, electroluminescents, strobe type lights, lasers, light conducting fibers, etc. The light sources 41 are positioned to emit light into or onto the light elements 356 and the light elements 356 then emit light into the container 32. The light sources 41 are coupled to electrical power via electrical wires 388.

Since the light elements 356 are stationary and essentially divide the container 32 into sections (three sections in the illustrated exemplary embodiment), the frame 108 and media 110 must be altered to accommodate such sections. Rather than the frame 108 including a single upper connector plate 112 and a single lower connector plate 116, the frame includes upper and lower connector plates 112, 116 for each section. More particularly, the frame 108 includes six total connector plates comprised of three upper connector plates 112 and three lower connector plates 116. Media 110 is strung between each set of upper and lower connector plates 112, 116 in any of the manners described herein and any other possible manners. Accordingly, the media 110 is specific to each individual section (i.e., media present in the top section is not strung to the second or third sections, and vice versa).

With continued reference to FIG. 60, the frame 108 is rotated in a similar manner to that described above in connection with the frame 108 illustrated in FIGS. 3 and 4. Accordingly, the shaft 120 rotates the connector plates 112, 116 and media 110 in each section. A plurality of wipers 392 are secured to the connector plates 112, 116 and wipe against an exterior surface of the light elements 356 to assist with cleaning the exterior surface and enhancing light emission from the light elements 356. The wipers 392 are secured to surfaces of the connector plates 112, 116 adjacent top and bottom surfaces of the light elements 356. In the illustrated exemplary embodiment, a first wiper 392A is secured to a bottom surface of the lower connector plate 116 in the top section of the container 32, a second wiper 392B is secured to a top surface of the upper connector plate 112 in the middle section, a third wiper 392C is secured to a bottom surface of the lower connector plate 116 in the middle section, a fourth wiper 392D is secured to a top surface of the upper connector plate 112 in the bottom section, and a fifth wiper 392E is secured to a bottom surface of the lower connector plate 116 in the bottom section. With this configuration of wipers 392, the necessary exterior surfaces of the light elements 356 are wiped and cleaned to enhance light emission into the container 32. The wipers 392 may be made of a variety of different materials such as, for example, rubber, plastic, and other materials.

Similar to the light elements 356 described above with reference to FIGS. 54 and 55, the light elements 356 illustrated in FIG. 60 may have a smooth or polished exterior surface, or a scratched, scored, chipped, dented, or otherwise imperfect exterior surface to assist with diffraction of the light from the interior of the light elements 356 to the exterior of the light elements 356. Additionally, the light elements 356 may be formed in a shape promoting diffraction of the light from the interior of the light elements 356 to the exterior of the light elements 356.

It should be understood that the artificial light system 37 illustrated in FIG. 60 may be used on its own or in combination with any other artificial light system 37 disclosed herein. For example, the system 20 may include a first artificial light system 37 as illustrated in FIGS. 30 and 31 for illuminating the container 32 from the exterior and may include the artificial light system 37 illustrated in FIG. 60 for illuminating the container 32 from the interior.

Figure 61:
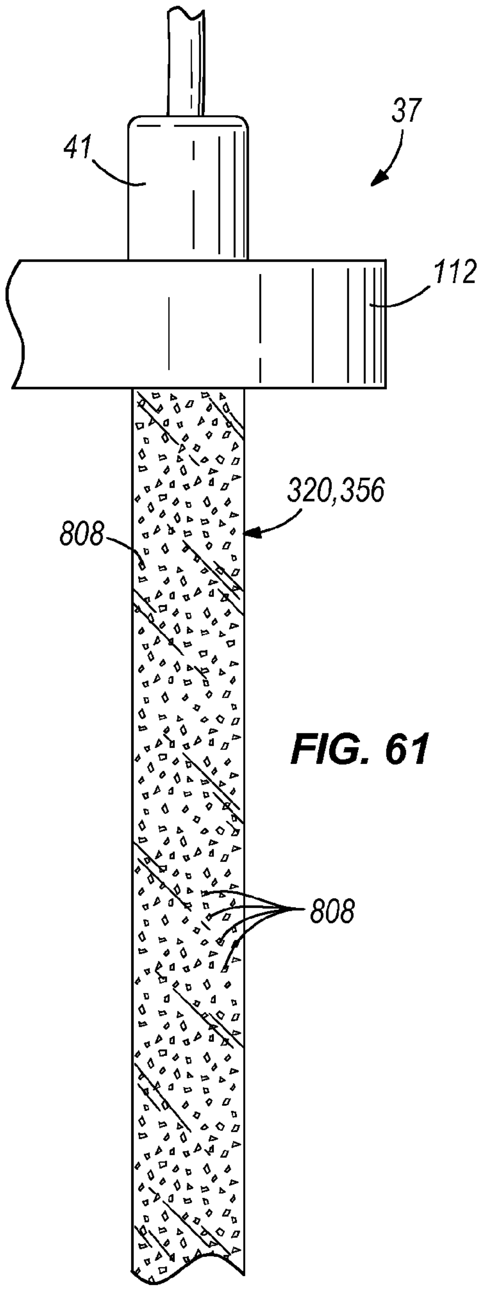
FIG. 61 is a partial side view of another exemplary artificial light system.

Referring now to FIG. 61, a further exemplary embodiment of an artificial light system 37 is shown. Components similar between the container and the artificial light systems illustrated in FIGS. 30-60 and the container 32 and the artificial light system 37 illustrated in FIG. 61 may be identified with the same reference numbers or may be identified with different reference numbers.

Principles of the exemplary artificial light system 37 illustrated in FIG. 61 and described herein may be accommodated in either a center tube 320 or in a light element 356. More particularly, the center tube 320 and light element 356 may be comprised of a solid transparent or translucent material and include numerous reflective elements 808 therein fixed in place within the solid material. A light emitting source 41 such as, for example, an LED 41 may emit light into the center tube 320 and light element 356, and the emitted light is reflected and/or refracted from the interior to the exterior of the center tube 320 and light element 356. The reflected and/or refracted light enters the interior of the container housing 76 and provides light to the microorganisms disposed in the container 32. The solid material of the center tube 320 and light element 356 may be a wide variety of transparent or translucent materials and be within the intended spirit and scope of the present invention. Exemplary materials include, but are not limited to, glass, acrylic, plastic, fiber optic, etc. Similarly, the reflective elements 808 may be comprised of a wide variety of materials and elements and be within the intended spirit and scope of the present invention. Exemplary materials include, but are not limited to, guanine crystals, Mylar flecks, glitter, glass shavings and beads, metal shavings (e.g., silver, stainless steel, aluminum), fish scales, or any other relatively small flecks, crystals, or pieces of reflective material.

Figure 62:
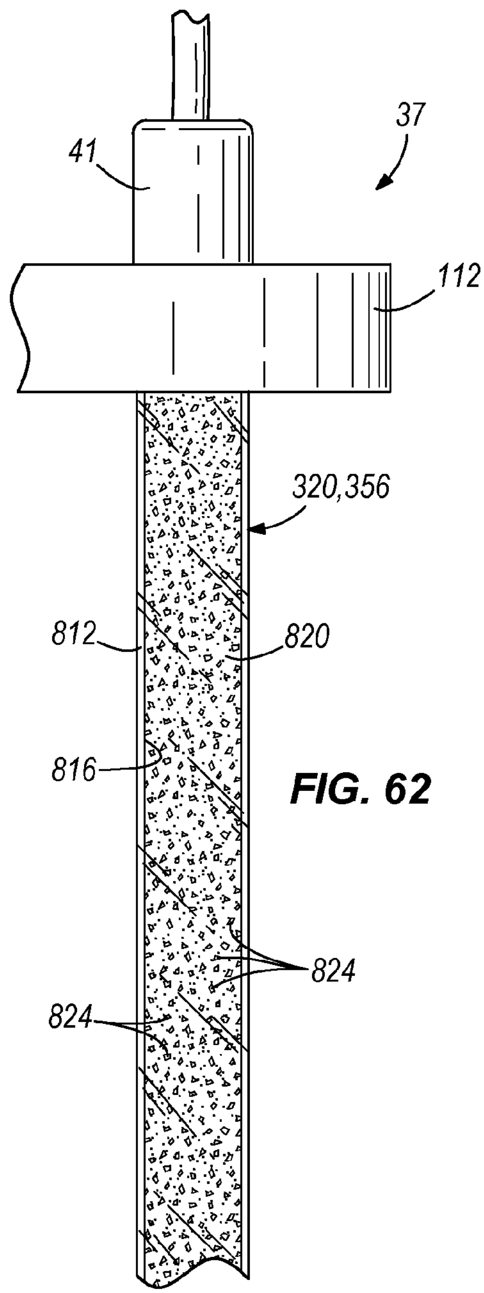
FIG. 62 is a partial side view of yet another exemplary artificial light system.

Referring now to FIG. 62, a further exemplary embodiment of an artificial light system 37 is shown. Components similar between the container and the artificial light systems illustrated in FIGS. 30-61 and the container 32 and the artificial light system 37 illustrated in FIG. 62 may be identified with the same reference numbers or may be identified with different reference numbers.

Principles of the exemplary artificial light system 37 illustrated in FIG. 62 and described herein may be accommodated in either a center tube 320 or in a light element 356. More particularly, the center tube 320 and light element 356 may comprise a hollow outer housing 812 defining a cavity 816 therein, a transparent or translucent liquid 820 disposed within the cavity 816, and numerous reflective elements 824 suspended within the liquid 820. The liquid 820 has sufficient viscosity to substantially fix the reflective elements 824 in place or at least sufficiently slow the rate of movement to inhibit the reflective elements 824 from settling or moving to undesirable configurations. The outer housing 812 is sealed to prevent liquid from entering or exiting the housing 812. A light source 41 such as, for example, an LED 41 may emit light into the center tube 320 and light element 356, and the emitted light is reflected and/or refracted from the interior to the exterior of the center tube 320 and light element 356. The reflected and/or refracted light enters the interior of the housing 76 and provides light to the microorganisms disposed in the container 32. The liquid 820 within the center tube 320 and light element 356 may be a wide variety of transparent or translucent liquids 820 and be within the intended spirit and scope of the present invention. Exemplary liquids 820 include, but are not limited to, perchloroethylene, water, alcohol, mineral oil, etc. Similarly, the reflective elements 824 may be comprised of a wide variety of materials and elements and be within the intended spirit and scope of the present invention. Exemplary materials include, but are not limited to, guanine crystals, Mylar flecks, glitter, glass shavings and beads, metal shavings (e.g., silver, stainless steel, aluminum), fish scales, or any other relatively small flecks, crystals, or pieces of reflective material.

Figure 63:
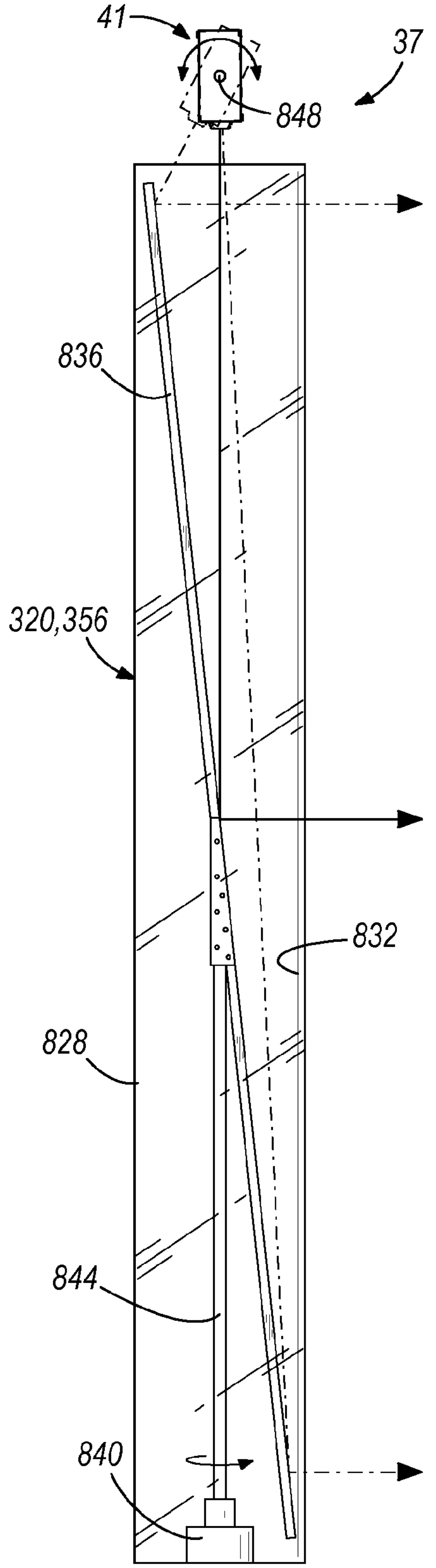
FIG. 63 is a side view of still another exemplary artificial light system.
Figure 64:
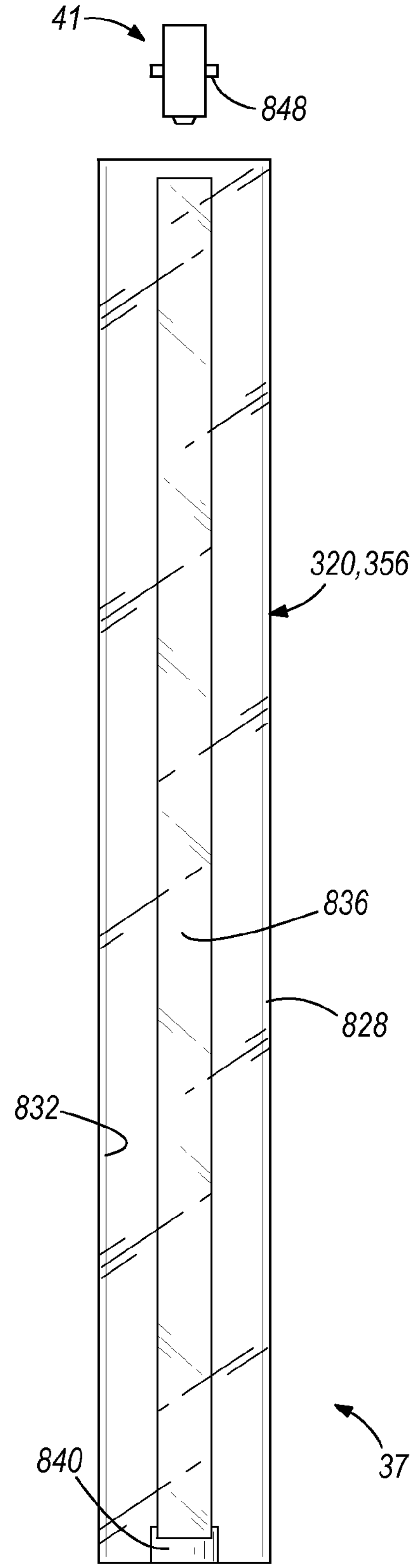
FIG. 64 is a front view of the artificial light system shown in FIG. 63.

Referring now to FIGS. 63 and 64, a further exemplary embodiment of an artificial light system 37 is shown. Components similar between the container and the artificial light systems illustrated in FIGS. 30-62 and the container 32 and the artificial light system 37 illustrated in FIGS. 63 and 64 may be identified with the same reference numbers or may be identified with different reference numbers.

Principles of the exemplary artificial light system 37 illustrated in FIGS. 63 and 64 and described herein may be accommodated in either a center tube 320 or in a light element 356. More particularly, the center tube 320 and light element 356 may comprise a hollow outer housing 828 defining a cavity 832 therein, a reflective member 836 disposed within the cavity 832, a motor 840, and a rotational axle 844 coupled between the motor 840 and the reflective member 836. The outer housing 828 is sealed to prevent liquid from entering the housing 828. Reflective member 836 is oriented in an upright, slightly angled position that angles from one side of the housing 828 near the top to the other side near the bottom. Motor 840 imparts rotation on the rotational axle 844, which in turn rotates the reflective member 836 within the center tube 320 and the light element 356. In the illustrated exemplary embodiment, the motor 840 is positioned within and near a bottom of the center tube 320 and light element 356. Alternatively, the motor 840 may be positioned in other locations within the center tube 320 and light element 356 or may be disposed externally of the center tube 320 and the light element 356, and may have appropriate coupling elements to impart rotation on the rotational axle 844. A light source 41 such as, for example, an LED 41 may emit light into the center tube 320 and light element 356, and is mounted on and pivotal about a pivot axle 848. The light source 41 is adapted to rock back and forth about the pivot axle 848 to emit light onto the reflective member 836 at varying heights thereof. Light from the light source 41 is reflected and/or refracted by the reflective member 836 from the interior to the exterior of the center tube 320 and light element 356. The reflected and/or refracted light enters the interior of the housing 76 and provides light to the microorganisms disposed in the container 32. The angle and rotation of the reflective member 836 coupled with the rocking of the light source 41 provides light distribution throughout the container 32. The illustrated exemplary angle of the reflective member 836 is only one of many possible angles of orientation and is not intended to be limiting. Many other orientation angles are possible and are within the intended spirit and scope of the present invention. The reflective member 836 may be a wide variety of different elements as long as the reflective member 836 reflects or refracts light. Exemplary reflective members 836 include, but are not limited to, a minor, polymer matrix composites (e.g., glass beads embedded in a plastic member), reflective Mylar, polished aluminum, silvered glass, or any other reflective apparatus.

Figure 65:
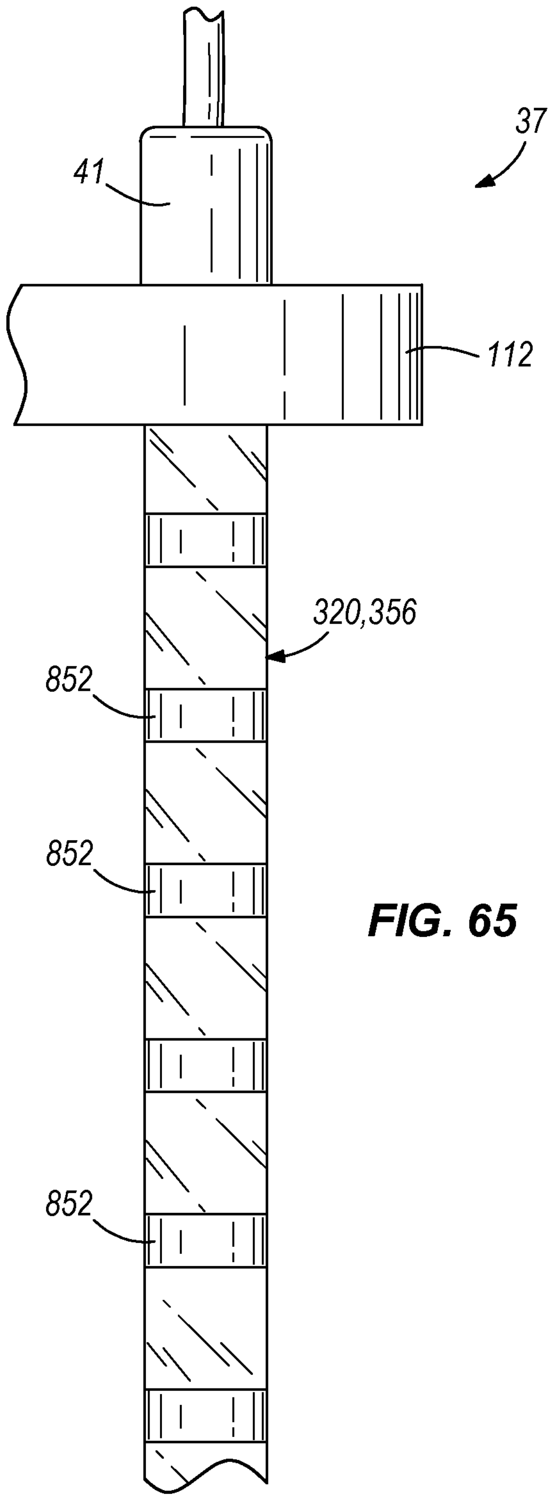
FIG. 65 is a partial side view of a further exemplary artificial light system.

Referring now to FIG. 65, a further exemplary embodiment of an artificial light system 37 is shown. Components similar between the container and the artificial light systems illustrated in FIGS. 30-64 and the container 32 and the artificial light system 37 illustrated in FIG. 65 may be identified with the same reference numbers or may be identified with different reference numbers.

Principles of the exemplary artificial light system 37 illustrated in FIG. 65 and described herein may be accommodated in either a center tube 320 or in a light element 356. More particularly, the center tube 320 and light element 356 may be comprised of a solid transparent or translucent material and include numerous spaced-apart horizontal bands 852 encompassing the center tube 320 and light element 356. Bands 852 may have an opaque, non-reflective outer surface and may include reflective interior surface facing the center tube 320 and light element 356. Alternatively, bands 852 may not be opaque. A light source 41 such as, for example, an LED 41 may emit light into the center tube 320 and light element 356, and the emitted light may be reflected and/or refracted from the interior to the exterior of the center tube 320 and light element 356 at locations between the bands 852. The reflected and/or refracted light enters the interior of the housing 76 and provides light to the microorganisms disposed in the container 32. Reflective interior surfaces of bands 852 reflect light within the center tube 320 and light element 356, and assist with reflecting light out of the center tube 320 and light element 356, thereby facilitating reflection of more light from the center tube 320 and light element 356. The solid material of the center tube 320 and light element 356 may be a wide variety of transparent or translucent materials and be within the intended spirit and scope of the present invention. Exemplary materials include, but are not limited to, glass, acrylic, plastic, fiber optic, etc. The bands 852 may be comprised of a wide variety of elements and be within the intended spirit and scope of the present invention. Exemplary elements include, but are not limited to, tape, paint, Mylar, glass polymer matrix composites such as glass embedded in plastic matrix, or any other element. In the illustrated exemplary embodiment, the opaque elements are in the configuration of spaced-apart horizontal bands 852. Alternatively, the opaque elements may have other configurations and be within the spirit and scope of the present invention. For example, the opaque elements may be disposed on the exterior of the center tube 320 and light element 356 and have the configuration of vertical bands, angled bands, spiraling bands, spots, other intermittently disposed shapes, etc.

Figure 66:
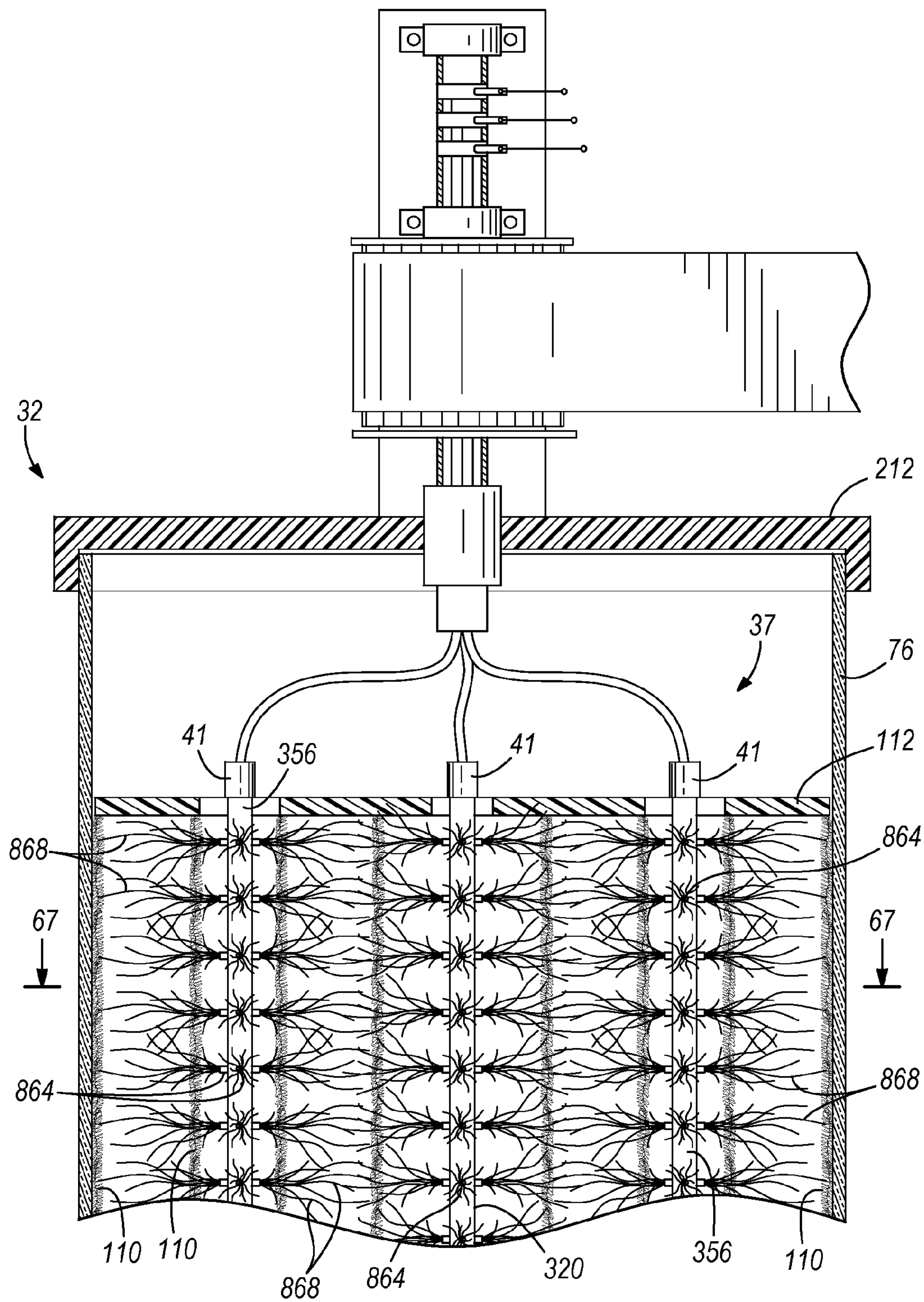
FIG. 66 is a partial cross-sectional view taken along a longitudinal plane of a container and yet a further exemplary artificial light system.
Figure 67:
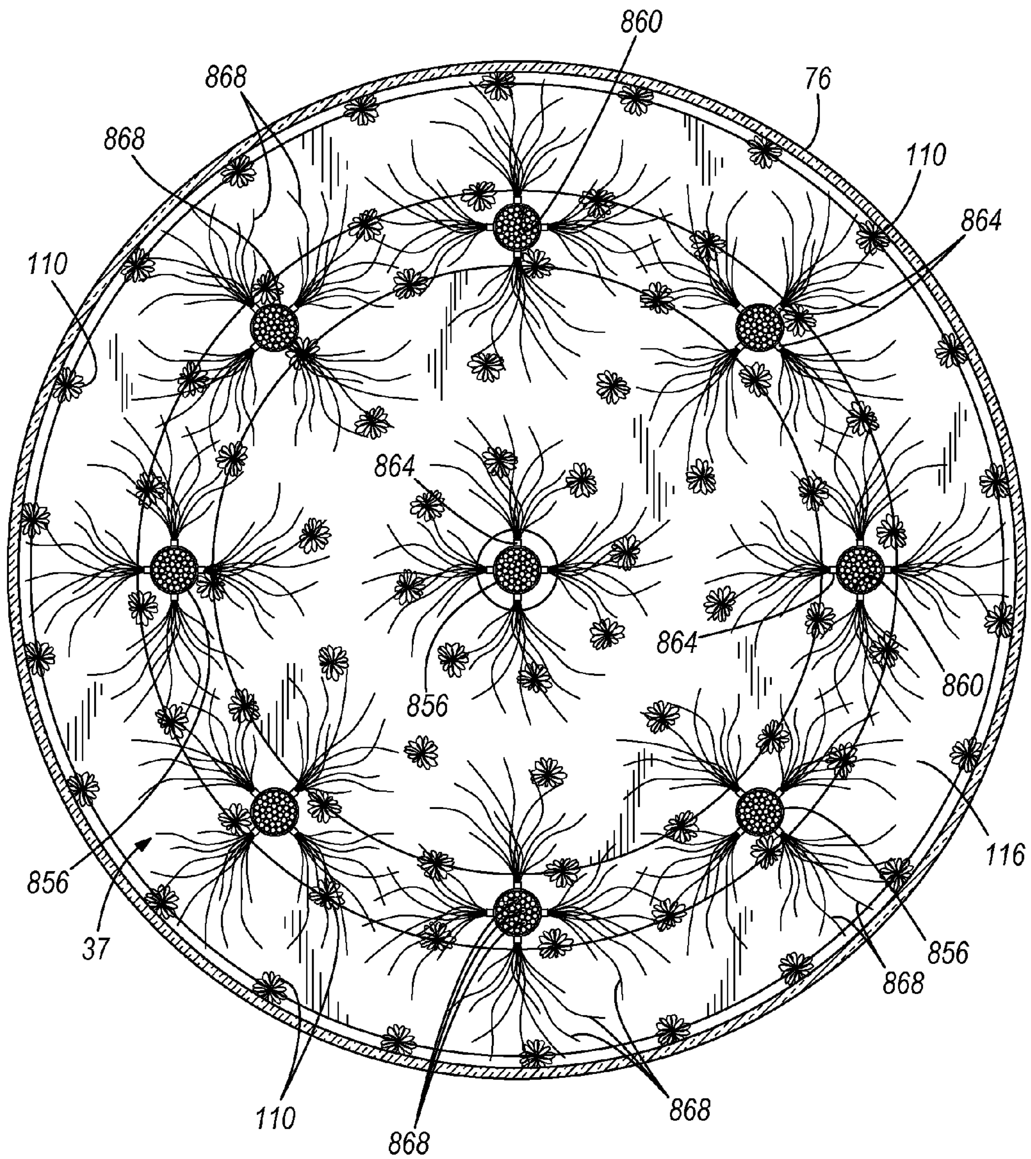
FIG. 67 is a cross-sectional view taken along line 67-67 in FIG. 66.

Referring now to FIGS. 66 and 67, a further exemplary embodiment of an artificial light system 37 is shown. Components similar between the container and the artificial light systems illustrated in FIGS. 30-65 and the container 32 and the artificial light system 37 illustrated in FIGS. 66 and 67 may be identified with the same reference numbers or may be identified with different reference numbers.

Principles of the exemplary artificial light system 37 illustrated in FIGS. 66 and 67 and described herein may be accommodated in either a center tube 320 or in a light element 356. More particularly, the center tube 320 and light elements 356 may comprise a hollow housing wall 856 defining a cavity 860 therein and a plurality of apertures 864 defined through the housing wall 856. A bundle of light carrying elements 868 is positioned in the housing cavity 860. First ends of the light carrying elements 868 are disposed at or near a top of the center tube 320 and light element 356, and other ends of the light carrying elements 868 extend through various apertures 864 defined in the housing wall 856 and into the interior of the container 32. A light source 41 such as, for example, an LED 41 may emit light into the top ends of the light carrying elements 868. The emitted light travels through the light carrying elements 868 and emits out of the bottom ends of the light carrying elements 868 into the interior of the container 32.

In the illustrated exemplary embodiment, a plurality of light carrying elements 868 extend through each aperture 864 and may have varying lengths relative to one another. A water tight seal is created between the light carrying elements 868 and the apertures 864 to inhibit wastewater from entering the center tube 320 and light element 356 through the apertures. In the illustrated exemplary embodiment, the apertures 864 have a configuration comprising spaced-apart sets of four apertures 864 with the four apertures 864 aligned in a similar horizontal plane and spaced-apart from each other at 90 degree increments around the center tube 320 and light element 356. Alternatively, the apertures 864 may have other configurations and be within the intended spirit and scope of the present invention. For example, the apertures 864 may have any configuration in the housing wall 856 of the center tube 320 and light element 356 including, but not limited to, sets of co-planar apertures having any spacing relative to other sets of co-planar apertures, any number of apertures defined in a horizontal plane at any spaced-apart increment from one another, in a random pattern, etc. The light carrying elements 868 may be a wide variety of different types of light carrying elements 868 and be within the intended spirit and scope of the present invention. For example, the light carrying elements 868 may be, but not limited to, fiber optic cable, glass fiber, acrylic rod, glass rod, etc. The bundle of light carrying elements 868 may include any number of light carrying elements 868 and the diameter of the center tube 320 and light elements 356 may be appropriately sized to accommodate any desired quantity of light carrying elements 868. In addition, individual light carrying elements 868 may have a wide variety of shapes and corresponding diameters or widths. For example, the light carrying elements 868 may have a wide variety of horizontal cross-sectional shapes including, but not limited to, circular, square, triangular, or any other polygonal or arcuately perimetered shape. Similarly, the light carrying elements 868 may have a wide variety of corresponding diameters (for circles) or widths (for shapes other than circles) such as, for example, 0.25 to about 2.0 millimeters. Further, any number of light carrying elements 868 may extend through each aperture 864 defined in the housing wall 856 and the aperture 864 may be appropriately sized to accommodate any desired quantity of light emitting elements 868.

With continued reference to FIGS. 66 and 67, bottom ends of the light carrying elements 868 are disposed in the wastewater of the container 32 and are susceptible to buildup of microorganisms and/or other debris present in the wastewater, thereby deteriorating the quantity of light emitted out of the bottom ends. To inhibit buildup on the bottom ends of the light carrying elements 868, the frame 108 rotates and media 110 engages the bottom ends or some other portion of the light carrying elements 868 to dislodge or wipe buildup from the bottom ends. Thus, bottom ends of the light carrying elements 868 remain free or substantially free of buildup.

Figure 68:
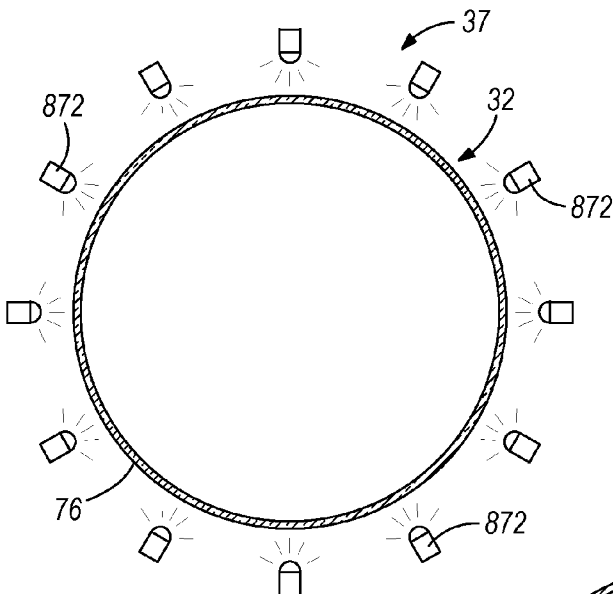
FIG. 68 is a cross-sectional view taken along a horizontal plane of a container and another exemplary artificial light system.

Referring now to FIG. 68, yet a further exemplary embodiment of an artificial light system 37 is shown. Components similar between the container and the artificial light systems illustrated in FIGS. 30-67 and the container 32 and the artificial light system 37 illustrated in FIG. 68 may be identified with the same reference numbers or may be identified with different reference numbers.

In the illustrated exemplary embodiment, the artificial light system 37 includes a plurality of strobe lights 872 incrementally disposed around an exterior of the container 32. Strobe lights 872 are flashing lights that commonly comprise xenon gas and may be adjustable to flash at varying speeds. Strobe lights 872 may emit a relatively large quantity of photons compared to other types of artificial light, thereby providing significant quantities of photons to the microorganisms to drive photosynthesis at a more rapid pace. In some exemplary embodiments, the strobe lights 872 may be flashed at a rate of about 20 kHz. In other exemplary embodiments, the strobe lights 872 may be flashed at a rate of about 2-14 kHz. These exemplary rates of flashing are not intended to be limiting and, therefore, the strobe lights 872 may flash at any rate and be within the intended spirit and scope of the present invention. The illustrated exemplary configuration and number of strobe lights 872 are not intended to be limiting. Thus, any number of strobe lights 872 may be disposed around the exterior of the container 32 in any increment and at any position and still be within the intended spirit and scope of the present invention.

Figure 69:
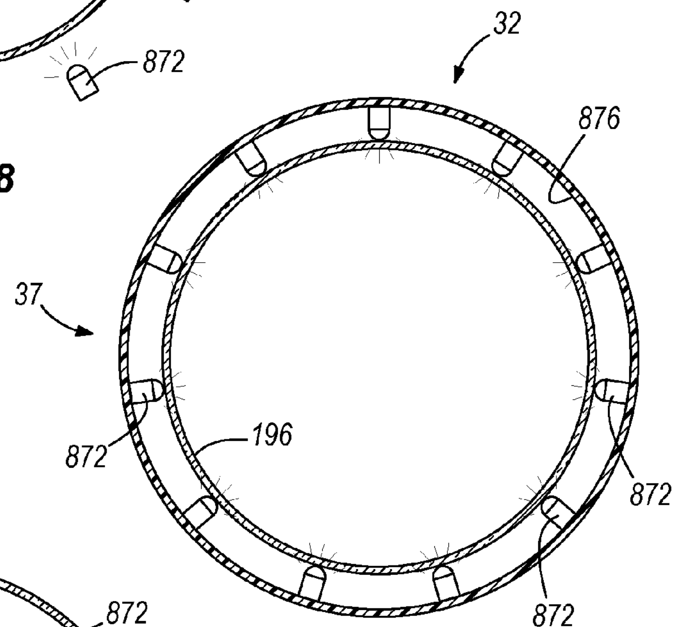
FIG. 69 is a cross-sectional view taken along a horizontal plane of a container and yet another exemplary artificial light system.

Referring now to FIG. 69, still a further exemplary embodiment of an artificial light system 37 is shown. Components similar between the container and the artificial light systems illustrated in FIGS. 30-68 and the container 32 and the artificial light system 37 illustrated in FIG. 69 may be identified with the same reference numbers or may be identified with different reference numbers.

In the illustrated exemplary embodiment, the artificial light system 37 includes a plurality of strobe lights 872 incrementally disposed in a housing wall 76 of the container 32. Strobe lights 872 associated with this illustrated exemplary embodiment may be similar in structure and function to the strobe lights 872 described above and associated with FIG. 68 and, therefore, will not be described again herein. Strobe lights 872 are preferably sealed in the housing wall 76 to prevent wastewater from contacting the strobe lights 872. In some exemplary embodiments, the housing wall 76 may comprise two spaced apart concentric walls providing a cavity 876 therebetween in which the strobe lights 872 may be positioned. In other exemplary embodiments, the housing wall 76 may be a unitary one-piece wall and may define a plurality of cavities therein for receiving the strobe lights 872. Again, the cavities are preferably configured to prevent wastewater from contacting the strobe lights 872. The illustrated exemplary configuration and number of strobe lights 872 are not intended to be limiting. Thus, any number of strobe lights 872 may be disposed within the housing wall 76 of the container 32 in any increment and at any position and still be within the intended spirit and scope of the present invention.

Figure 70:
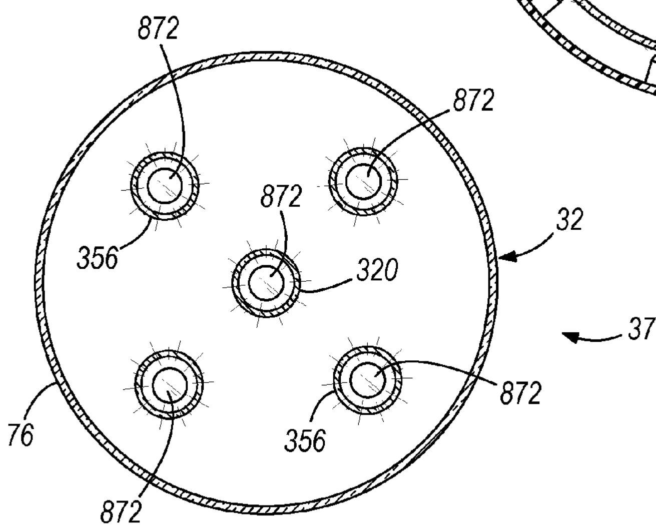
FIG. 70 is a cross-sectional view taken along a horizontal plane of a container and still another exemplary artificial light system.

Referring now to FIG. 70, another exemplary embodiment of an artificial light system 37 is shown. Components similar between the container and the artificial light systems illustrated in FIGS. 30-69 and the container 32 and the artificial light system 37 illustrated in FIG. 70 may be identified with the same reference numbers or may be identified with different reference numbers.

In the illustrated exemplary embodiment, the artificial light system 37 includes a plurality of strobe lights 872 disposed within the container 32. Strobe lights 872 associated with this illustrated exemplary embodiment are similar in structure and function to the strobe lights 872 described above and associated with FIGS. 68 and 69 and, therefore, will not be described again herein. Strobe lights 872 are preferably protected from engagement with the wastewater within the container 32. In some exemplary embodiments, the strobe lights 872 may be disposed within hollow light elements 356 and the center tube 320, and appropriately sealed to prevent wastewater from accessing the strobe lights 872. In other exemplary embodiments, strobe lights 872 may be encompassed or sealed in a liquid tight manner and positioned within the container 32. The illustrated and described exemplary configurations and number of strobe lights 872 are not intended to be limiting. Thus, any number of strobe lights 872 may be disposed within the container 32 in any increment and at any position and still be within the intended spirit and scope of the present invention.

Figure 71:
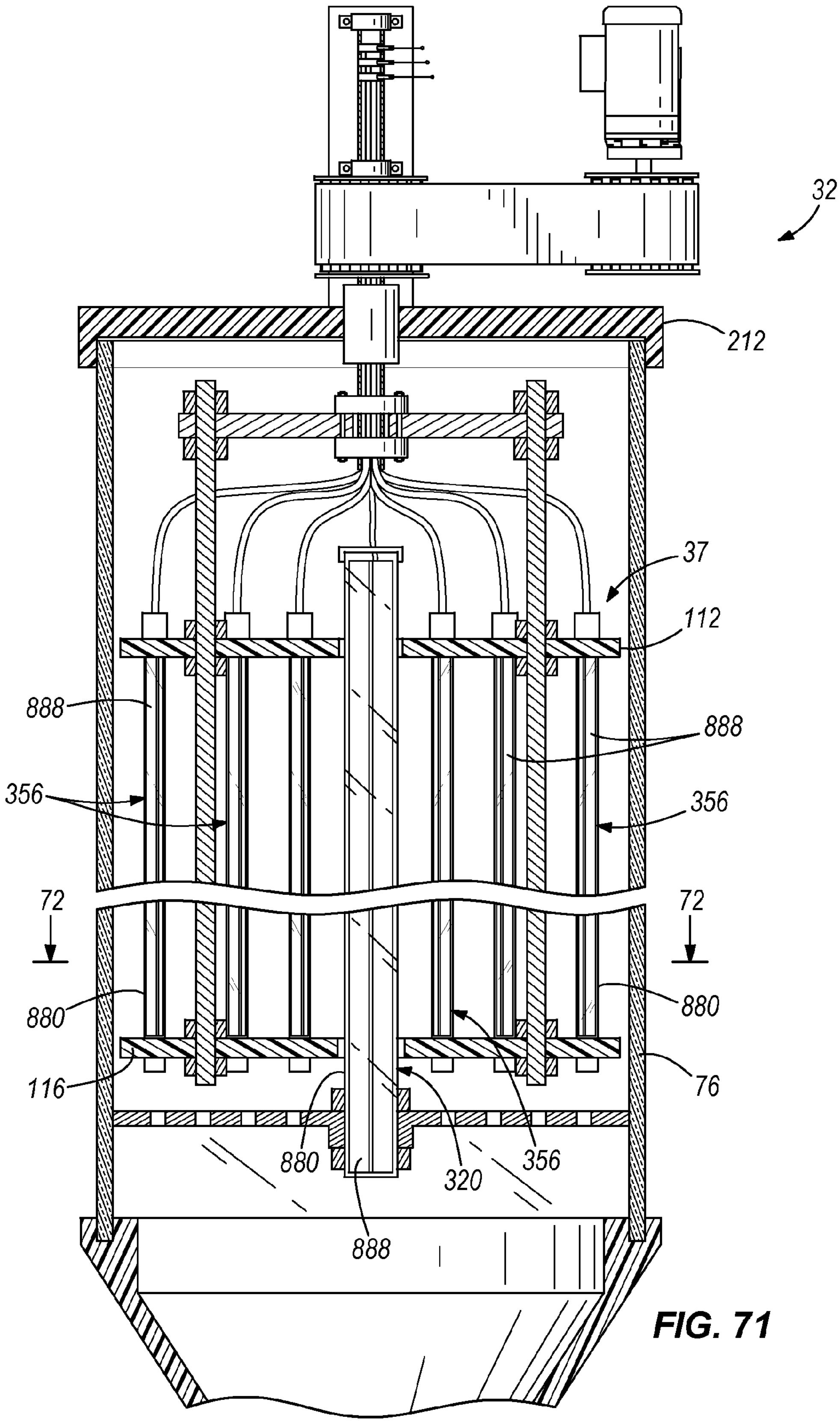
FIG. 71 is a partial cross-sectional view taken along a longitudinal plane of a container and a further exemplary artificial light system.
Figure 72:
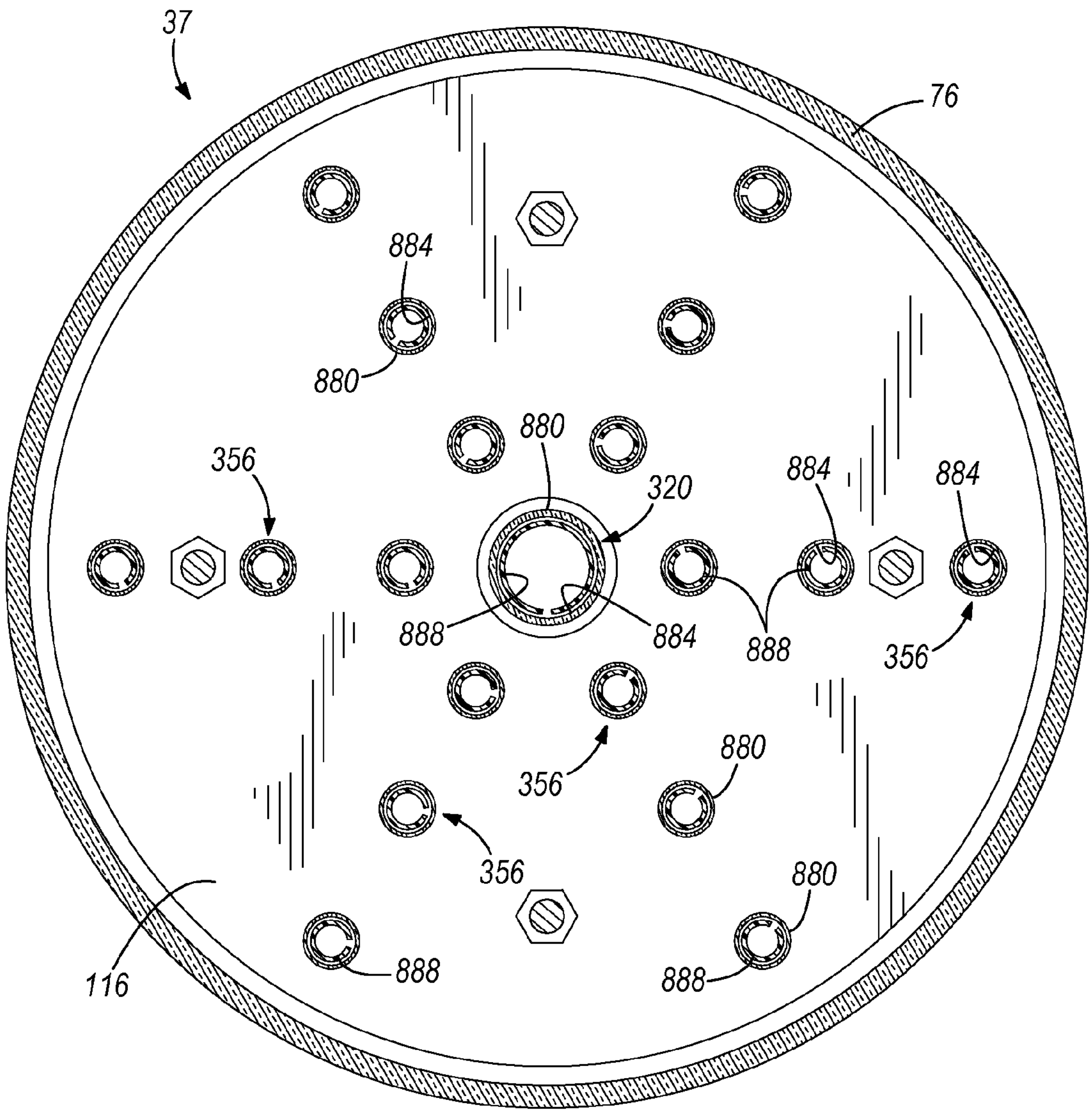
FIG. 72 is a cross-sectional view taken along line 72-72 in FIG. 71.

Referring now to FIGS. 71 and 72, a further exemplary embodiment of an artificial light system 37 is shown. Components similar between the container and the artificial light systems illustrated in FIGS. 30-70 and the container 32 and the artificial light system 37 illustrated in FIGS. 71 and 72 may be identified with the same reference numbers or may be identified with different reference numbers.

Principles of the exemplary artificial light system 37 illustrated in FIGS. 71 and 72 and described herein may be accommodated in either a center tube 320 or in a light element 356. More particularly, the center tube 320 and light element 356 may each comprise a hollow housing 880 defining a cavity 884 therein. In the illustrated exemplary embodiment, the artificial light system 37 includes a plurality of electroluminescent light elements 888 in the form of panels with one panel positioned in each of the center tube 320 and the light element 356. Electroluminescent panels 888 are flexible and may be flexed into desirable shapes such as, for example, rolled into cylindrical rolls as illustrated in FIGS. 71 and 72. Alternatively, electroluminescent panels 888 may be flexed into other shapes such as, for example, any polygonal shape or any arcuately perimetered shape. Electroluminescent light elements 888 are made of materials that emit light when energized by an alternating electric field. In the illustrated exemplary embodiment, the artificial light system 37 includes nineteen electroluminescent light elements 888, which is not intended to be limiting. Alternatively, the artificial light system 37 of FIGS. 71 and 72 is capable of having any number of electroluminescent light elements 888 arranged in any configuration within the container 32. In addition, the electroluminescent light elements 888 are capable of having many forms other than the illustrated exemplary panel form. For example, the electroluminescent light elements 888 may be formed in cones, semicircular shapes, strips, or any other cut pattern shape.

Figure 73:
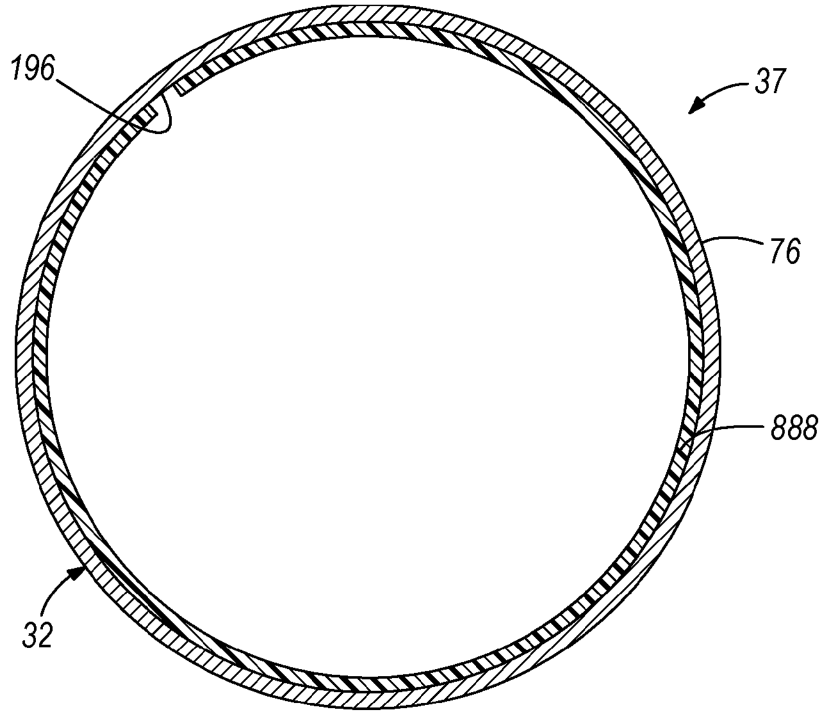
FIG. 73 is a cross-sectional view taken along a horizontal plane of a container and yet a further exemplary artificial light system.

Referring now to FIG. 73, another exemplary embodiment of an artificial light system 37 is shown. Components similar between the container and the artificial light systems illustrated in FIGS. 30-72 and the container 32 and the artificial light system 37 illustrated in FIG. 73 may be identified with the same reference numbers or may be identified with different reference numbers.

In the illustrated exemplary embodiment, the artificial light system 37 includes an electroluminescent light element 888 in the form of a panel disposed in the container 32 and in contact with the interior surface 196 of the container housing 76. Electroluminescent light element 888 associated with this illustrated exemplary embodiment is similar in structure and function to the electroluminescent light elements 888 described above and associated with FIGS. 71 and 72 and, therefore, will not be described again herein. Electroluminescent light element 888 covers a substantial portion of the interior surface 196 of the container 32, which may block sunlight from penetrating into the container 32. Consequently, the housing 76 of the container 32 may be made of an opaque or translucent material since substantial quantities of sunlight will not be able to access the interior of the container 32 through the housing wall 76. Alternatively, the housing 76 of the container 32 may be made of transparent materials similar to those used in other transparent walled containers 32. With electroluminescent light element 888 disposed completely around the interior of the container 32, artificial light (or photons) is provided in substantially equal quantities from all around the container 32, which provides a more even distribution of light throughout the container 32. Sunlight is often to one side or another of a container 32, which consequently, throughout most of the day, provides more light to one side of the container 32 than the other. It should be understood that the electroluminescent light element 888 may be oriented within and along the interior surface 196 of the container housing 76 in different manners and extend along less than the entire interior of the container housing 76. It should also be understood that more than one electroluminescent light element 888 may be disposed within and extend along the interior of the container housing 76 and the plurality of electroluminescent light elements 888 may have any shape and may, in combination, engage any proportion of the interior surface 196 of the container housing 76.

Figure 74:
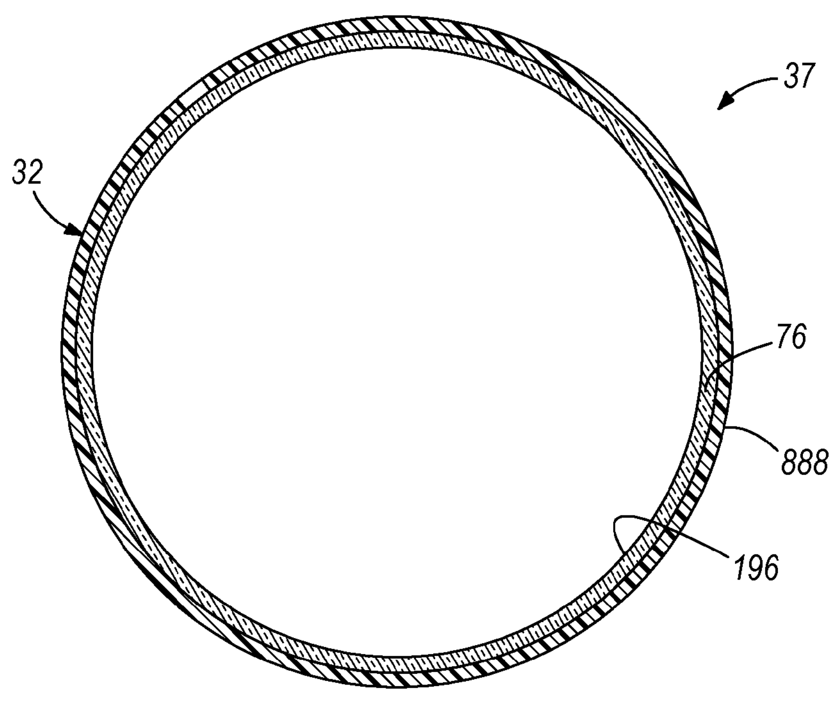
FIG. 74 is a cross-sectional view taken along a horizontal plane of a container and still a further exemplary artificial light system.

Referring now to FIG. 74, a further exemplary embodiment of an artificial light system 37 is shown. Components similar between the container and the artificial light systems illustrated in FIGS. 30-73 and the container 32 and the artificial light system 37 illustrated in FIG. 74 may be identified with the same reference numbers or may be identified with different reference numbers.

In the illustrated exemplary embodiment, the artificial light system 37 includes an electroluminescent light element 888 in the form of a panel disposed around and in contact with an exterior of the container 32. Alternatively, the electroluminescent light element 888 may be spaced outwardly from the exterior of the container 32. Electroluminescent light element 888 associated with this illustrated exemplary embodiment is similar in structure and function to the electroluminescent light elements 888 described above and associated with FIGS. 71-73 and, therefore, will not be described again herein. In the illustrated exemplary embodiment, electroluminescent light element 888 completely surrounds or encircles the container 32. It should be understood that the electroluminescent light element 888 may be oriented externally of the container 32 in different manners and extend around less than the entire container 32. It should also be understood that more than one electroluminescent light element 888 may be disposed externally of and extend around the container 32, and the plurality of electroluminescent light elements 888 may have any shape and may, in combination, extend around any proportion of the container 32.

A variety of different manners of providing artificial light to the interior of the containers 32 are disclosed herein. Some of these manners include utilizing quantum dots to emit light from a center light tube 320 and to emit light into or from light elements 356. In other exemplary embodiments, quantum dots may be imbedded in the container housing 76, disposed on an inner surface 196 of the container housing 76, and disposed on an exterior surface of the container housing 76 to emit light into the interior of the container 32.

Figure 75:
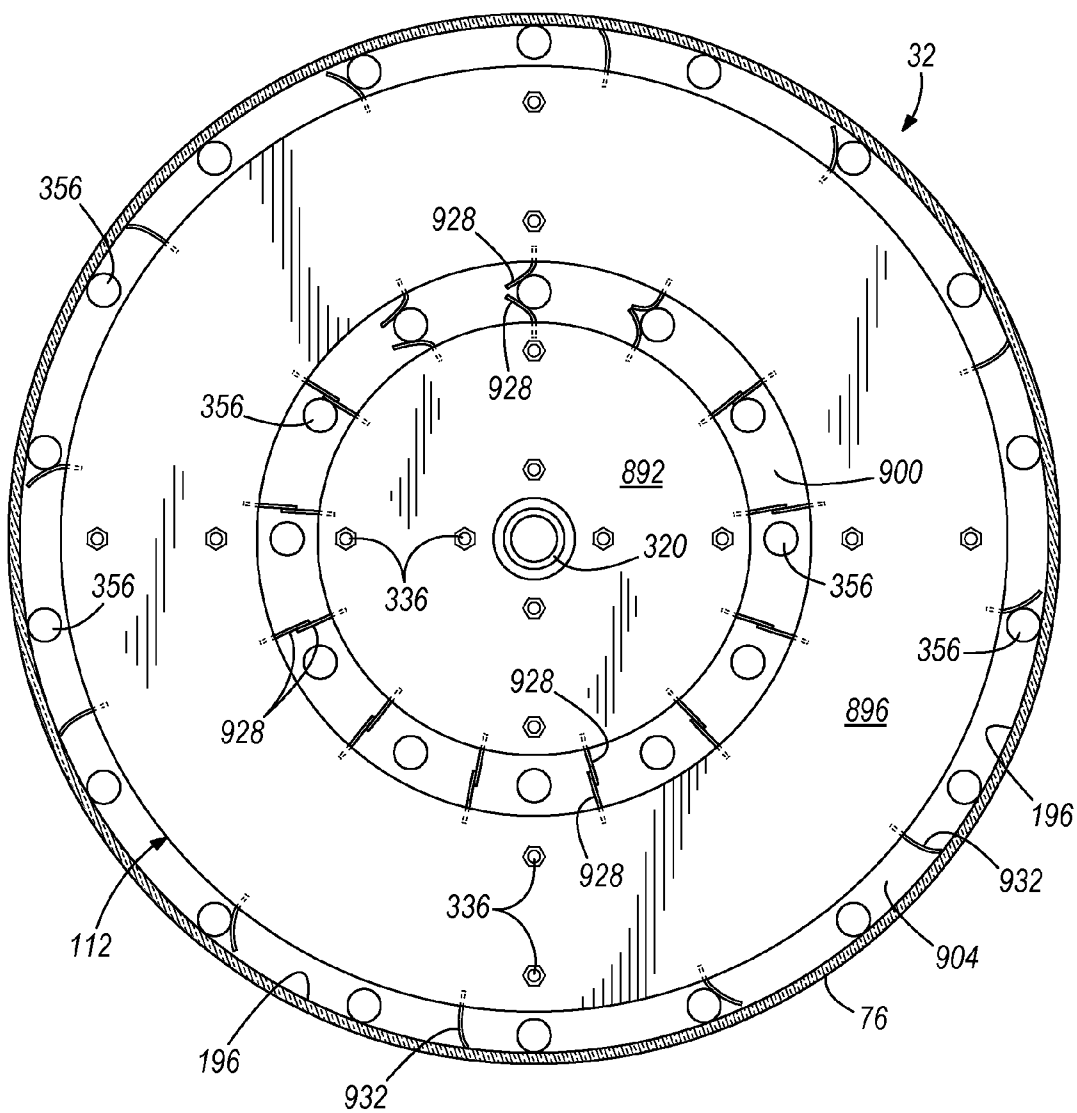
FIG. 75 is a cross-sectional view taken along a horizontal plane of a container and another exemplary media frame including split upper and lower media plates.
Figure 76:
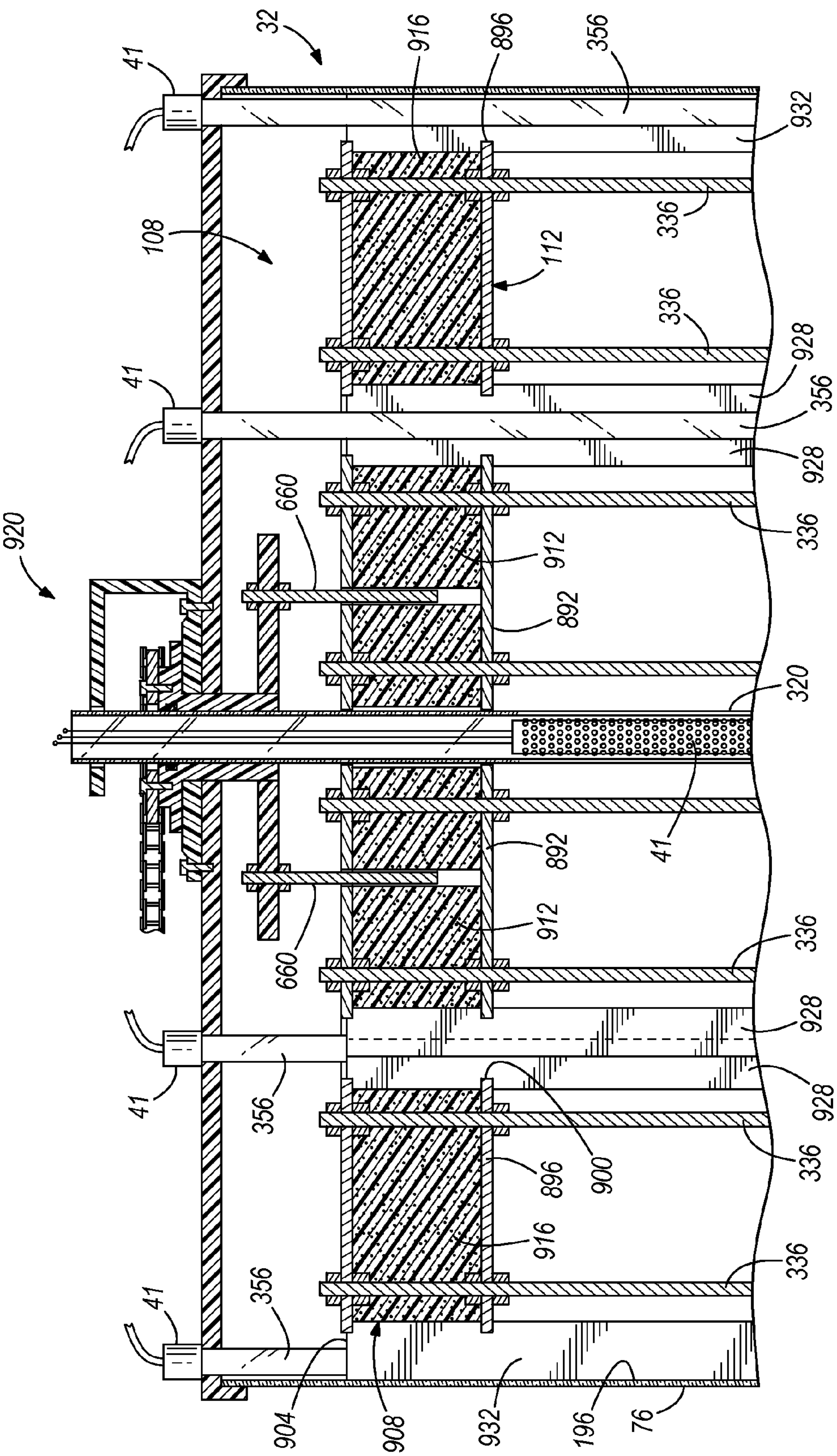
FIG. 76 is a partial cross-sectional view taken along a longitudinal plane of the container and media frame shown in FIG. 75.
Figure 77:
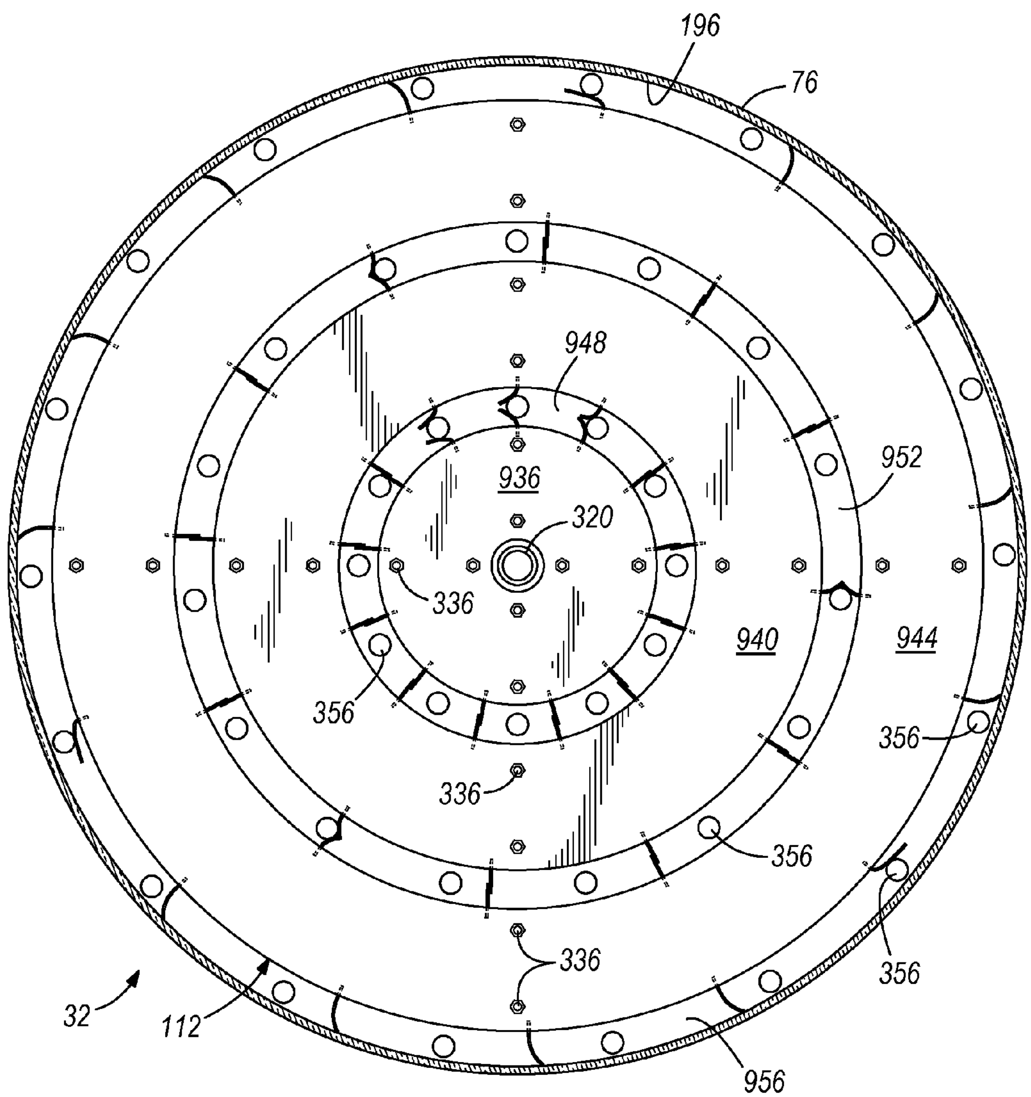
FIG. 77 is a cross-sectional view taken along a horizontal plane of a container and a further exemplary media frame including split upper and lower media plates.

With reference to FIGS. 75 and 76, another exemplary media frame 108 is shown. Components similar between the containers and the media frames previously disclosed, and the container 32 and the media frame 108 illustrated in FIGS. 75 and 76 may be identified with the same reference numbers or may be identified with different reference numbers.

In the illustrated exemplary embodiment, the media frame 108 includes split upper and lower connector plates 112, 116. Upper and lower connector plates 112, 116 are substantially similar and, therefore, only the upper connector plate 112 will be described in detail. It should be understood that any description of structure, function, or alternatives relating to the upper connector plate 112 also may relate to the lower connector plate 116.

The upper connector plate 112 includes an inner member 892 and an outer member 896, which is concentrically positioned about and spaced from the inner member 892. An inner gap 900 is provided between the inner and outer members 892, 896, and an outer gap 904 is provided between an outer surface of the outer member 896 and the interior surface 196 of the container housing 76. A plurality of light elements 356 are disposed in both the inner and outer gaps 900, 904, which are adequately sized to inhibit the inner and outer members 892, 896 from rubbing against the light elements 356 as the upper connector plate 112 rotates (described in greater detail below). In some embodiments, a protective layer of material may encircle the light elements 356 at portions of the light elements 356 disposed between the inner and outer members 892, 896, and portions of light elements 356 disposed between outer member 896 and the inner surface 196 of the container housing 76, to inhibit wear of the light elements 356. The light elements 356 associated with this illustrated exemplary embodiment may be any of the light elements 356 illustrated and described herein.

A float device 908 is coupled to the media frame 108 to provide flotation to the media frame 108. In the illustrated exemplary embodiment, the float device 908 includes an inner float member 912 coupled to an upper surface of the inner member 892 and an outer float member 916 coupled to an upper surface of the outer member 896. In some embodiments, the inner and outer float members 912, 916 may be coupled to bottom surfaces of the inner and outer members 892, 896. In other embodiments, the float device 908 may be coupled to the lower connector plate 116. In further embodiments, the float device 908 may be coupled to both the upper and lower connector plates 112, 116. In such an embodiment, the float device 908 may include an upper portion and a lower portion respectively coupled to the upper and lower connector plates 112, 116.

A drive mechanism 920 couples with the media frame 108 to impart rotation to the media frame 108. In the illustrated exemplary embodiment, the drive mechanism 920 is similar to the drive mechanism illustrated in FIGS. 50 and 51. More particularly, dowels 660 couple to the inner member 892. Alternatively, dowels 660 may couple to the outer member 896 or the drive mechanism may include dowels 660 that couple to both the inner and outer members 892, 896. In the illustrated exemplary embodiment, the drive mechanism 920 only couples and imparts rotation to the inner member 892 of the upper connector plate 112.

In order to impart rotation to the outer member 896 of the upper connector plate 112, a plurality of flexible tabs 928 are coupled to both the outer surface of the inner member 892 and the inner surface of the outer member 896. Tabs 928 are sufficiently long to overlap with each other such that when the inner member 892 is rotated via the drive mechanism 920, the tabs 928 coupled to the inner member 892 engage the tabs 928 coupled to the outer member 896 and rotate the outer member 896 along with the inner member 892. Additional tabs 932 are connected to an outer surface of the outer member 896 and may be sufficiently long to engage an inner surface 196 of the container housing 76. As the upper connector plate 112 and tabs 928, 932 rotate, tabs 928 contact the light elements 356 disposed in the inner gap 900, and tabs 932 engage the inner surface 196 of the container housing 76 and light elements 356 disposed in the outer gap 904. Tabs 928, 932 are sufficiently flexible to deform when contacting the light elements 356 and return to their pre-deformed orientation upon disengagement with the light elements 356. As the tabs 928, 932 rotate, tabs 928, 932 wipe against the light elements 356, in combination with the media 110 wiping against the light elements 356, to dislodge debris that may have built up on the light elements 356. In the illustrated exemplary embodiment, the tabs 928, 932 extend the entire distance between the upper and lower connector plates 112, 116. In other embodiments, the tabs 928, 932 may be much shorter in length and may only extend between the inner and outer members 892, 896. In such embodiments, the tabs 928, 932 do not wipe a substantial height of the light elements 356 and the light elements 356 are primarily wiped by the media 110 extending between the upper and lower connector plates 112, 116. In other embodiments, the tabs 928, 932 may be coupled to the float device 908 rather than the upper and/or lower connector plates 112, 116.

The upper and lower connector plates 112, 116 associated with FIGS. 75 and 76 include two members separated by a gap. It should be understood that the upper and lower connector plates 112, 116 are capable of including any number of members and still be within the spirit and scope of the present invention. For example, with reference to FIG. 77, the upper and lower connector plates 112, 116 may include three members. More particularly, the upper and lower connector plates 112, 116 may include an inner member 936, a middle member 940, and an outer member 944, with a first gap 948 between the inner and middle members 936, 940, a second gap 952 between the middle and outer members 940, 944, and a third gap 956 between the outer member 944 and the inner surface 196 of the container housing 76. Light elements 356 and tabs may be disposed in all three of the gaps in similar manners and for similar reasons to that described above.

Figure 78:
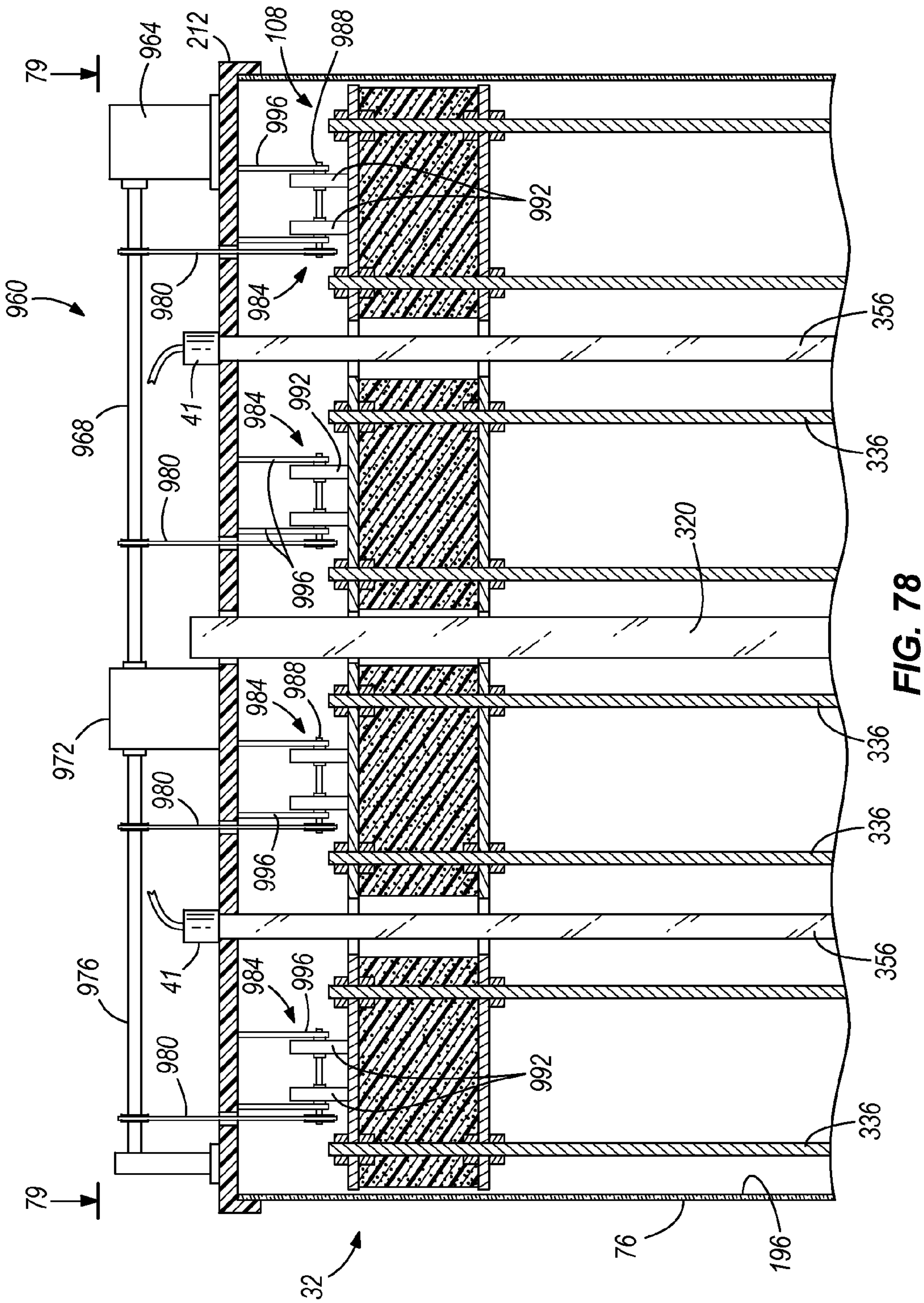
FIG. 78 is a cross-sectional view taken along a longitudinal plane of the container and media frame shown in FIG. 75 with another exemplary drive mechanism.
Figure 79:
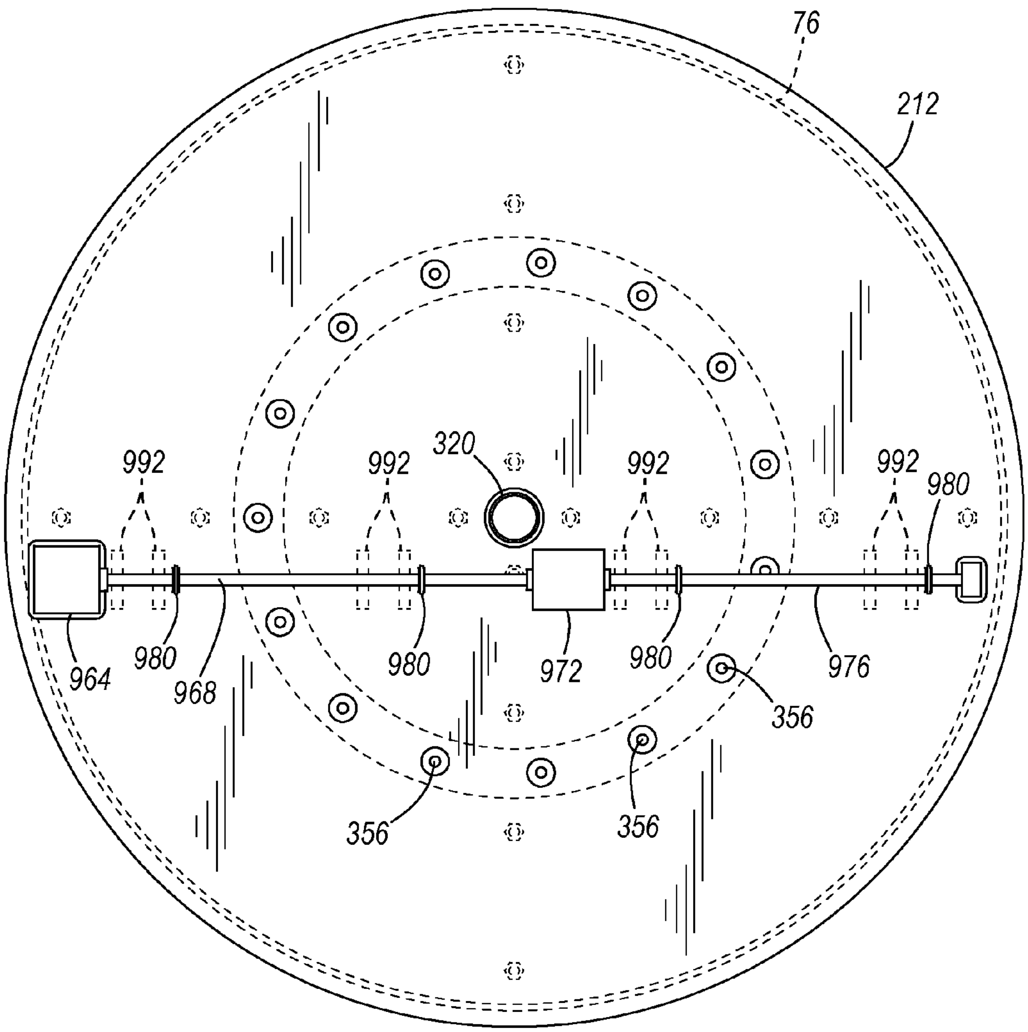
FIG. 79 is a top view as viewed from line 79-79 in FIG. 78.

Referring now to FIGS. 78 and 79, an alternative drive mechanism 960 is shown. Components similar between the containers and drive mechanisms previously disclosed, and the container 32 and the drive mechanism 960 illustrated in FIGS. 78 and 79 may be identified with the same reference numbers or may be identified with different reference numbers.

Drive mechanism 960 is illustrated in use with a media frame 108 including split upper and lower connector plates 112, 116 similar to the split connector plates illustrated in FIGS. 75 and 76. It should be understood that the drive mechanism 960 is capable of being used with any of the other media frames disclosed herein such as, for example, those media frames including unitary upper and lower connector plates and other split connector plates having more than two members.

In the illustrated exemplary embodiment, the drive mechanism 960 includes a motor 964, a motor output shaft 968, a counter rotation gear box 972, a counter output shaft 976, a plurality of drive transfer members 980, and a plurality of drive wheel assemblies 984. The motor 964 is connected to top cover 212 of the container 32 and rotates the motor output shaft 968 in a first direction. The motor output shaft 968 couples to the counter rotation gear box 972, which takes the rotation of the motor output shaft 968 and facilitates rotation of the counter output shaft 976 in a second direction opposite the first direction. Two of the drive transfer members 980 couple to the motor output shaft 968 and two of the drive transfer members 980 couple to the counter output shaft 976. The drive transfer members 980 couple to respective drive wheel assemblies 984 for transferring the driving movement of the motor 964 and counter output shafts 976 to the drive wheel assemblies 984. Each of the illustrated exemplary drive wheel assemblies 984 includes an axle 988, a pair of wheels 992 coupled to the axle 988, and support members 996 for providing support to the wheel assemblies 984. Drive transfer members 980 couple to respective axles 988 to rotatably drive the axles 988 in respective first or second directions. Wheels 992 rotate with the axles 988 and engage a top surface of one of the inner or outer members 892, 896. Sufficient friction exists between the wheels 992 and top surfaces of the inner and outer members 892, 896 such that rotation of the wheels 992 causes rotation of the inner and outer members 892, 896.

In the illustrated exemplary embodiment, two wheel assemblies 984 engage each of the inner and outer members 892, 896 with one wheel assembly 984 on each side of the vertical center rotational axis of the frame 108. With this configuration, wheel assemblies 984 on opposite sides of the vertical center rotational axis must be driven in opposite directions, otherwise, drive wheel assemblies 984 will be fighting against each other. Thus, the counter rotation gear box 972 is provided to take the directional rotation of the motor output shaft 968 and rotate the counter output shaft 976 in an opposite direction, thereby driving the two wheel assemblies 984 coupled to the counter output shaft 976 in an opposite direction to the two wheel assemblies 984 coupled to the motor output shaft 968. In this manner, the drive wheel assemblies 984 on both sides of the vertical center rotational axis of the frame 108 are working together to cooperatively drive the split frame. The illustrated exemplary embodiment of the drive mechanism 960 eliminates a need for inner and outer members 892, 896 to be coupled together in order to impart rotational movement from one member to the other member.

It should be understood that the illustrated exemplary embodiment of the drive mechanism 960 is only one of many embodiments of the drive mechanism 960. The drive mechanism 960 is capable of having numerous other configurations as long as the drive mechanism 960 is capable of driving split connector plates 112, 116 such as those illustrated in FIGS. 75-79. For example, the drive mechanism 960 may include other numbers of wheels 992, may include different numbers of drive wheel assemblies 984 for driving each member of the split connector plates 112, 116, may include driving elements other than wheels, may include different drive transfer members, may be connected to and supported on/in the container 32 in different manners, etc.

Figure 80:
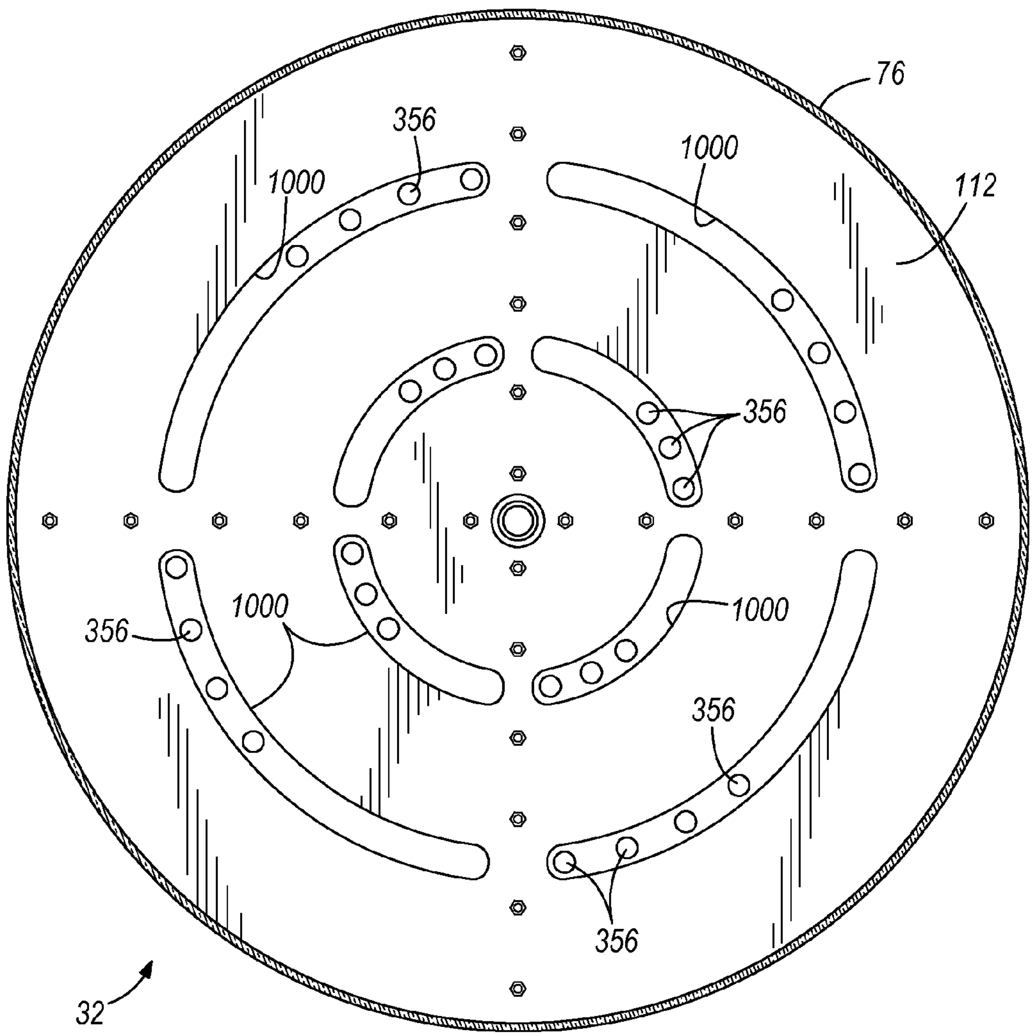
FIG. 80 is a cross-sectional view taken along a horizontal plane of a container and yet another exemplary media frame that oscillates and includes partially split upper and lower media plates.

With reference to FIG. 80, a further exemplary media frame 108 is shown. Components similar between the containers and the media frames previously disclosed, and the container 32 and the media frame 108 illustrated in FIG. 80 may be identified with the same reference numbers or may be identified with different reference numbers.

In the illustrated exemplary embodiment, the media frame 108 includes upper and lower connector plates 112, 116 having a plurality of slots 1000 defined therethrough. Upper and lower connector plates 112, 116 are substantially the same. A plurality of light elements 356 extend vertically between the upper and lower connector plates 112, 116 and are positioned in the slots 1000, which are appropriately sized to receive the light elements 356 and inhibit the upper and lower connector plates 112, 116 from rubbing or otherwise engaging the light elements 356. In the illustrated exemplary embodiment, upper and lower connector plates 112, 116 each include eight slots 1000 with three light elements 356 disposed in each of inner slots 1000 and four light elements 356 disposed in each of outer slots 1000. Alternatively, upper and lower connector plates 112, 116 may include other quantities of slots 1000 and other quantities of light elements 356 disposed in the slots 1000.

A drive mechanism similar to one of the drive mechanisms disclosed herein or any other drive mechanism is coupled to the frame 108 and is capable of rotating the frame 108 in both directions such that the frame 108 oscillates back and forth. More particularly, drive mechanism rotates the frame 108 in a first direction, stops the frame 108, then rotates the frame 108 in an opposite direction, stops the frame 108, and again rotates the frame 108 in the first direction. This repeats as desired. To accommodate this frame oscillation, slots 1000 are arcuately shaped and are not completely filled with light elements 356 (i.e., an arcuate distance between one of the end light elements 356 and the other end light element 356 in the same set of light elements 356 is smaller than the arcuate length of the slot 1000 in which they are disposed). This extra space between the light elements 356 and the ends of the slot 1000 allows the frame 108 to oscillate. In the illustrated exemplary embodiment, the slots 1000 and spacing of light elements 356 is such that the frame 108 is capable of oscillating about 45 degrees. Alternatively, slots 1000 and spacing of light elements 356 may be such that the frame 108 is capable of oscillating at other degrees.

Figure 81:
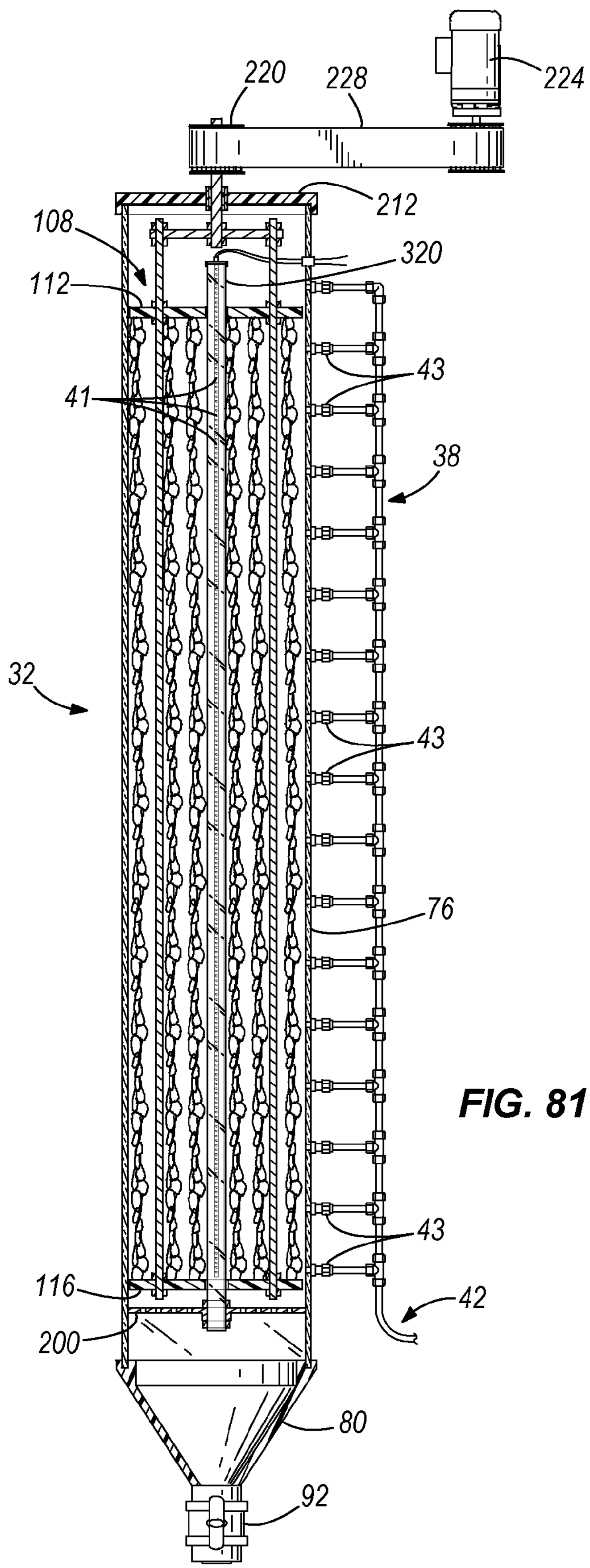
FIG. 81 is a cross-sectional view taken along a longitudinal plane of a container, the container shown with a flushing system.

Referring now to FIG. 81, an exemplary embodiment of the flushing system 38 is shown. This exemplary flushing system 38 is one of many types of flushing systems contemplated and is not intended to be limiting. The exemplary flushing system 38 is operable to assist with removing microorganisms and wastewater debris from the media 110 or for cleaning the interior of the container 32 in the event an invasive species or other contaminant has infiltrated the container 32. The flushing system 38 allows the interior of the container 32 to be rinsed or cleaned without disassembling the container 32 or other components of the system 20. The exemplary flushing system 38 includes a pressurized water source (not shown), a pressurized water inlet tube 42 in fluid communication with the pressurized water source, and a plurality of spray nozzles 43 in fluid communication with the tube 42. The spray nozzles 43 are incrementally disposed along the height of the container housing 76 at any desired spacing and are positioned in holes or cutouts in the container housing 76. An airtight and water tight seal is created between each of the spray nozzles 43 and the associated hole to prevent air and water from leaking into or from the container 32. In some embodiments, the spray nozzles 43 are positioned in the holes such that tips of the spray nozzles 43 are flush with or recessed from the interior surfaces 196 of the container housings 76 such that the nozzles 43 do not protrude into the container housings 76. This ensures that the media 110, when rotated, does not engage and potentially snag the spray nozzles 43. Operation of the flushing system 38 will be described in greater detail below.

While the containers 32 are treating wastewater, it is important that the containers 32 maintain an environment beneficial to the treatment of the wastewater. One environmental parameter paramount to the effective treatment of wastewater is the wastewater temperature. The containers 32 must maintain the wastewater therein within a particular temperature range that promotes efficient microorganism consumption of the waste. Appropriate temperature ranges may depend on the type of microorganism or wastewater within the containers 32. For example, the wastewater temperature within the containers 32 may be between about 20° C. and about 32° C. The present exemplary wastewater temperature range is one of many various temperature ranges in which the wastewater within the containers 32 may be maintained to promote effective microorganism waste consumption and is not intended to be limiting. The wastewater is capable of being controlled within different temperature ranges for different types of microorganisms and wastewater.

Figure 82:
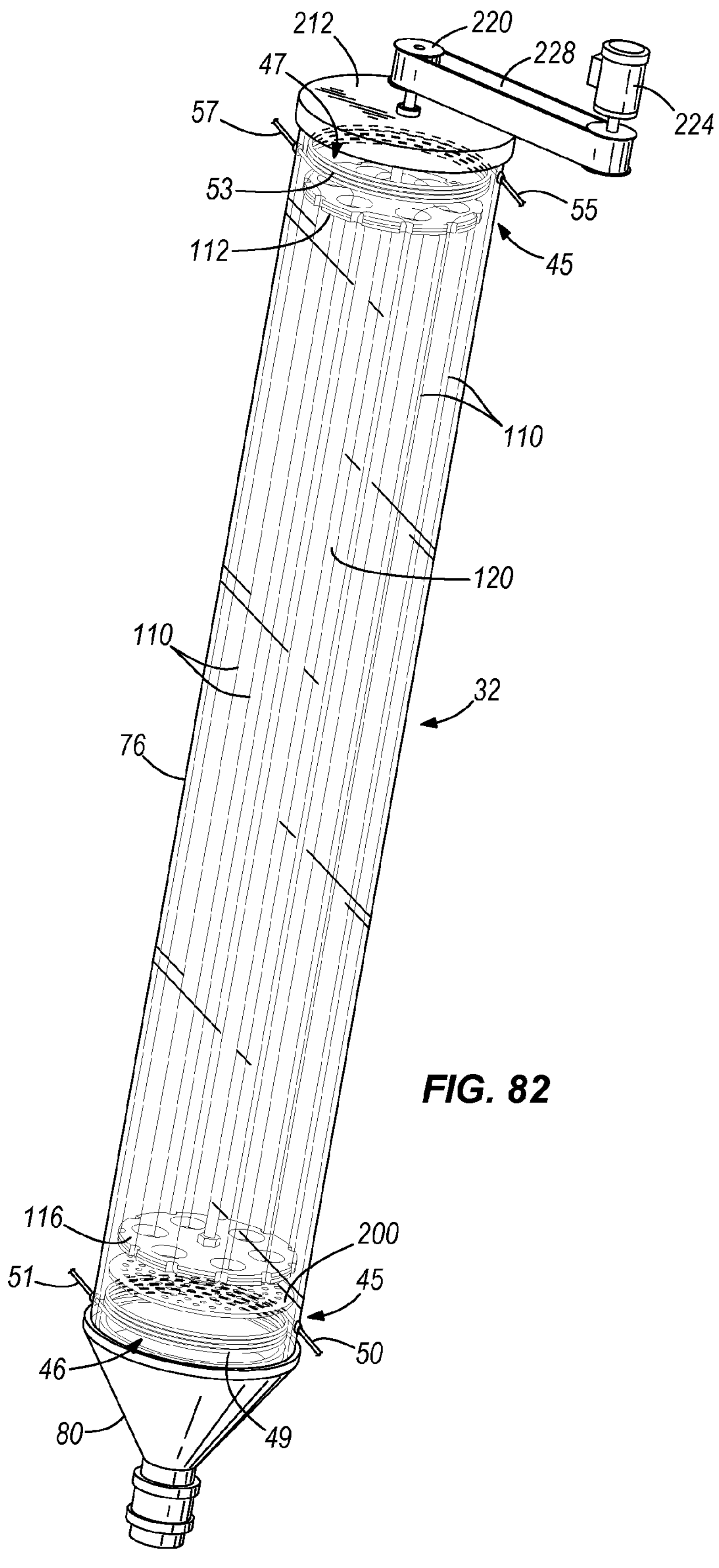
FIG. 82 is a top perspective view of a container with an exemplary temperature control system of the wastewater treatment system.
Figure 83:
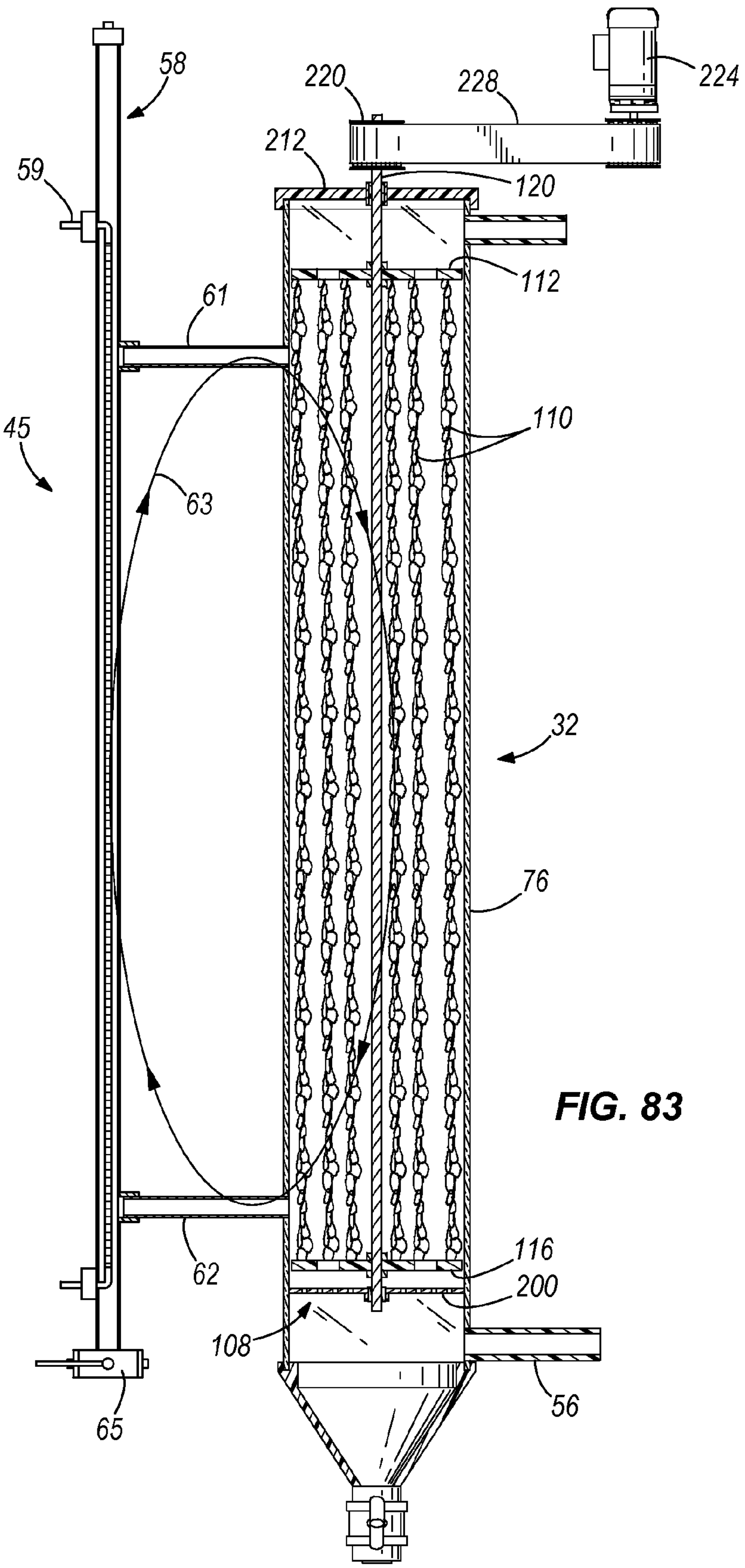
FIG. 83 is a cross-sectional view taken along a longitudinal plane of a container, the container shown with another exemplary temperature control system of the wastewater treatment system.

A variety of different temperature control systems may be utilized to assist with controlling the wastewater temperature within the containers 32. With reference to FIGS. 82 and 83, two exemplary temperature control systems 45 are illustrated and will be described herein. These exemplary temperature control systems 45 are two of many types of temperature control systems 45 contemplated and are not intended to be limiting.

With particular reference to FIG. 82, a single container 32 and an associated temperature control system 45 is illustrated. The temperature control system 45 associated with each container 32 is substantially identical and, therefore, only a single temperature control system 45 will be illustrated and described. The temperature control system 45 includes a heating portion 46 and a cooling portion 47. The heating portion 46 heats the wastewater when necessary and the cooling portion 47 cools the wastewater when necessary. The heating portion 46 is disposed within and near a bottom of the container 32. This orientation of the heating portion 46 takes advantage of the natural thermal laws whereas heat always rises. Accordingly, when the heating portion 46 is activated, wastewater heated by the heating portion 46 rises up through the container 32 and pushes the cooler wastewater down toward the heating portion 46 where the cooler wastewater is heated. The cooling portion 47 is disposed within and near a top of the container 32. Similarly, this orientation of the cooling portion 47 also takes advantage of the natural thermal laws. Accordingly, when the cooling portion 47 is activated, wastewater cooled by the cooling portion 47 is displaced by rising wastewater having a higher temperature than the cooled wastewater. Displacement of the cooled wastewater causes the cooled wastewater to move downward in the container 32. The frame 108 and media 110 may be rotated to assist with mixing of the wastewater to create a substantially uniform wastewater temperature throughout the container 32.

The heating portion 46 includes a heating coil 49, a fluid inlet 50, and a fluid outlet 51. The inlet 50 and outlet 51 respectively allow the introduction and exhaustion of fluid into and out of the heating coil 49. The fluid introduced into the heating coil 49 through the inlet 50 has an elevated temperature compared to the temperature of the wastewater disposed within the container 32 in order to heat the wastewater. The fluid may be a variety of different types of fluids including, but not limited to, liquids, such as water, and gases. The cooling portion 47 includes a cooling coil 53, a fluid inlet 55, and a fluid outlet 57. The inlet 55 and outlet 57 respectively allow the introduction and exhaustion of fluid into and out of the cooling coil 53. The fluid introduced into the cooling coil 53 through the inlet 55 has a lower temperature than the temperature of the wastewater disposed within the container 32 in order to cool the wastewater. The fluid may be a variety of different types of fluids including, but not limited to, liquids, such as water, and gases.

Referring now to FIG. 83, an alternative example of the temperature control system 45 is illustrated. Similar to the example illustrated in FIG. 82, a single container 32 and an associated temperature control system 45 is illustrated. The temperature control system 45 associated with each container 32 is substantially identical and, therefore, only a single temperature control system 45 will be illustrated and described. The temperature control system 45 includes an insulated riser pipe 58 and an exchanger tube 59 passing into and through the insulated riser pipe 58. The insulated riser pipe 58 is in fluid communication with the container 32 through an upper transfer pipe 61 and a lower transfer pipe 62. Wastewater from the container 32 is within the riser pipe 58 and the upper and lower transfer pipes 61, 62. If the wastewater within the container 32 requires cooling, a fluid cooler than the temperature of the wastewater within the container 32 is passed through the exchanger tube 59. The wastewater within the riser pipe 58 surrounds the exchanger tube 59 and is cooled. The cooled wastewater within the riser pipe 58 is displaced by warmer wastewater within the container 32, thereby causing a counter-clockwise circulation of wastewater within the container 32 and the riser pipe 58. In other words, the cooled wastewater moves downward in the riser pipe 58, and into the bottom of the container 32 through the lower transfer pipe 62, while the warmer wastewater within the container 32 moves out of the container 32, into the upper transfer pipe 61, and into the riser pipe 58. If the temperature of the wastewater within the container 32 requires heating, a fluid warmer than the temperature of the wastewater within the container 32 is passed through the exchanger tube 59. The wastewater within the riser pipe 58 surrounds the exchanger tube 59 and is warmed. The warmed wastewater within the riser pipe 58 rises, thereby causing a clockwise circulation of the wastewater (as represented by arrow 63) within the container 32 and the riser pipe 58. In other words, the warmed wastewater moves upward in the riser pipe 58, and into the top of the container 32 through the upper transfer pipe 61, while the cooler wastewater within the container 32 moves out of the container 32, into the lower transfer pipe 62, and into the riser pipe 58. In some embodiments, a more aggressive circulation of wastewater may be desired. In such embodiments, a sparger or air inlet 65 is positioned near the bottom of the riser pipe 58 to introduce air into the wastewater located within the riser pipe 58. The introduction of air into the bottom of the riser pipe 58 causes the wastewater within the riser pipe 58 to rise faster, thereby circulating the wastewater through the riser pipe 58 and the container 32 at an increased rate. In some embodiments, a filter may be provided at junctions of the upper and lower transfer pipes 61, 62 and the container housing 76 to inhibit microorganisms or other wastewater debris from entering the riser pipe 58 and potentially reducing flow capabilities or completely blocking the riser pipe 58.

Figure 84:
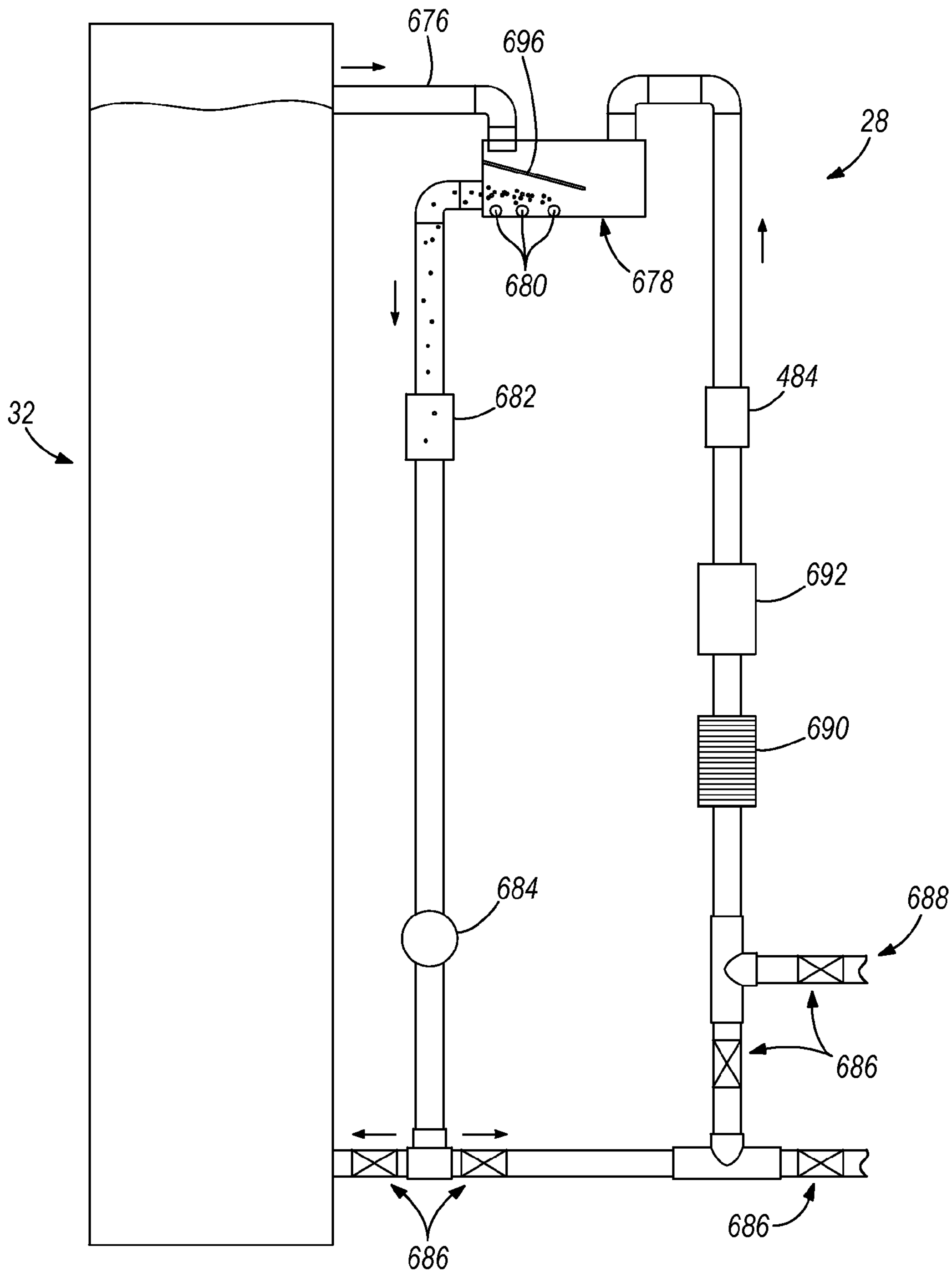
FIG. 84 is an elevation view of a container and a portion of an exemplary liquid management system.

With reference to FIG. 84, a container 32 and a portion of an exemplary liquid management system 28 is shown. In the illustrated exemplary embodiment, the liquid management system 28 includes a wastewater spillway pipe 676, a mixing tank 678, a gas injector or diffuser 680, a pH injector 682, a pump 684, a first set of valves 686, additional process plumbing 688, a filter 690, a sterilizer 692, and a pH sensor electrode 484. The spillway pipe 676 is positioned near a top of the container 32 and receives wastewater from the top of the container 32 that rises above the level of the spillway pipe 676. Wastewater from the spillway pipe 676 is introduced into the mixing tank 678 and gas is introduced into the wastewater present in the mixing tank 678 via the gas diffuser 680. A plate 696 is disposed in the mixing tank 678 above the gas diffuser 680 to assist with directing gas rising upward out of the wastewater back toward the wastewater and toward downstream pipes of the liquid management system 28. The introduced gas is generally referred to as a gas feed stream and may comprise about 12% of carbon dioxide by volume. Alternatively, the feed stream may comprise other percentages of carbon dioxide. Also, in the alternative, the feed stream may be comprised of other gases.

The pump 684 moves the combined wastewater and bubbled gas through the pipes and creates a pressure differential in the pipes to facilitate said movement. Wastewater pressure increases as the combined wastewater and bubbled gas are pumped downward by the pump 684. This increased wastewater pressure passes the bubbled gas into the wastewater and transforms the gas bubbles into bicarbonate within the wastewater. Some microorganism have a much easier time absorbing carbon dioxide or other gases from bicarbonate in the wastewater than from larger gas bubbles in the wastewater. The wastewater and bicarbonate mixture may now be pumped into the bottom of the container 32 or may be diverted for further processing. The first set of valves 686 is selectively controlled to divert the wastewater and bicarbonate mixture as desired. In some instances, it may be desirable to pump all the wastewater and bicarbonate mixture into the container 32. In other instances, it may be desirable to pump none of the wastewater into the container and pump all of the wastewater for further processing. In yet other instances, it may be desirable to pump some of the wastewater and bicarbonate mixture into the container 32 and pump some of the mixture for further processing. In the event a constant volume of wastewater is desired in the container 32, the amount of wastewater spilling-off the top of the container 32 should equal the amount of wastewater being pumped back into the bottom of the container 32.

The wastewater and bicarbonate mixture pumped into the container 32 enters the container 32 near a bottom of the container 32 and mixes with the wastewater already present in the container 32. This newly introduced mixture provides a new source of bicarbonate for the microorganisms.

Wastewater not diverted into the container 32 may be diverted downstream to a variety of additional processes. The additional process plumbing 688 of the liquid management system 28 is generically represented in FIG. 84 and may assume any configuration in order to accommodate a wide variety of wastewater treatment processes. For example, the additional process plumbing 688 may divert the wastewater through a wastewater clarifier, a heat exchanger, solids removal equipment, ultra filtration and/or other membrane filtration, centrifuges, etc. Other processes and associated plumbing are possible and are within the intended spirit and scope of the present invention.

The wastewater may also be diverted through a filter 690 such as, for example, a carbon filter for removing impurities and contaminants from the wastewater. Exemplary impurities and contaminants may include invasive microbes that may have negative effects on microorganisms such as bacterial and virus infection and predation. The liquid management system 28 may include a single filter or multiple filters and may include types of filters other than the exemplary carbon filter.

The wastewater may further be diverted through a sterilizer 692 such as, for example, an ultraviolet sterilizer, which also removes impurities and contaminants from the wastewater. The liquid management system 28 may include a single sterilizer or multiple sterilizers and may include types of sterilizers other than the exemplary ultraviolet sterilizer.

The wastewater may additionally be diverted by a pH sensor 484 for determining the pH of the wastewater. If the wastewater has a higher than desired pH, the pH of the wastewater may be lowered to a desired level. Conversely, if the wastewater has a lower than desired pH, the pH of the wastewater may be raised to a desired level. The pH of the wastewater may be adjusted in a variety of different manners. Only some of the many manners for adjusting the pH of the wastewater will be described herein. The description of these exemplary manners of adjusting the pH is not intended to be limiting. In a first example, the pH injector 682 is used to adjust the pH of the wastewater. In this example, the pH injector 682 is disposed in the pipe between the mixing tank 678 and the pump 684. Alternatively, the pH injector 682 may be disposed in other locations in the liquid management system 28. The pH injector 682 injects an appropriate type and quantity of substance into the wastewater stream passing through the pipe to change the pH of the wastewater to the desired level. In another example, the gas diffuser 680 may be used to adjust the pH level of the wastewater. The quantity of carbon dioxide present in wastewater affects the pH of the wastewater. Generally, the more carbon dioxide present in wastewater, the lower the pH level of the wastewater. Thus, the quantity of carbon dioxide introduced into the wastewater via the gas diffuser 680 may be controlled to raise or lower the pH level of the wastewater as desired. More particularly, when the pH sensor 484 takes a pH reading and it is determined that the pH level of the wastewater is higher than desired, the gas diffuser 680 may increase the rate at which carbon dioxide is introduced into the wastewater. Conversely, when the pH level of the wastewater is lower than desired, the gas diffuser 680 may decrease the rate at which carbon dioxide is introduced into the wastewater. In a further example, the pH injector 682 may be used to inject carbon dioxide into the wastewater in addition to the carbon dioxide introduced by the gas diffuser 680. In this way, the pH injector 682 and gas diffuser 680 cooperate to maintain a desired pH level.

After the wastewater is diverted through wastewater treatment processes such as those described herein, the wastewater may be pumped back into the mixing tank 678 where the wastewater is mixed with new wastewater introduced into the mixing tank 678 from the spillway pipe 676. The wastewater may then flows downstream as described above. Alternatively, the wastewater may be diverted directly into the container 32 rather than into the mixing tank 678.

It should be understood that the wastewater treatment processes used for removing impurities and contaminants from the wastewater decrease the adverse effects that such impurities and contaminants have on microorganisms and improve water clarity Improved water clarity allows light to better penetrate the wastewater, thereby increasing the microorganisms exposure to light.

It should also be understood that the container's ability to support the microorganisms on the media 110 during the wastewater treatment process and maintain a low concentration of microorganisms in the wastewater, increases the effectiveness of the wastewater treatment processes described above and illustrated in FIG. 84. More particularly, moving wastewater with a low concentration of microorganisms therein through the components of the liquid management system 28 illustrated in FIG. 84 inhibits fouling and clogging of the components with microorganisms. In other words, very few microorganisms are present in the wastewater to foul or clog the pipes, gas diffuser, pump, filter, etc. In addition, a low concentration of microorganisms in the wastewater inhibits the filter, the sterilizer, etc. from removing or killing a large quantity of microorganisms, which would ultimately adversely affect the efficiency of wastewater treatment. In some exemplary embodiments, the concentration of microorganisms supported on the media versus the concentration of microorganisms suspended in the wastewater is 26:1. In other exemplary embodiments, the concentration of microorganisms supported on the media versus the concentration of microorganisms suspended in the wastewater may be 10,000:1. The system 20 is capable of providing lower and higher microorganism concentration ratios than the exemplary ratios disclosed herein and such ratios are within the intended spirit and scope of the present invention.

With reference to FIG. 85, an exemplary support structure 396 is illustrated for supporting a container 32 in a vertical manner. This exemplary support structure 396 is for illustrative purposes and is not intended to be limiting. Other support structures for supporting a container 32 in a vertical manner are contemplated and are within the spirit and scope of the present invention. In the illustrated exemplary embodiment, the support structure 396 includes a base 400 supportable on a ground or floor surface, an upright member 404 extending upward from the base 400, and a plurality of couplings 408 supported by the upright member 404 and extending from the upright member 404 at different heights to engage the container 32 at multiple locations. The base 400 supports both the container 32 and the upright member 404 from below. The upright member 404 includes a pair of vertical beams 412 and a plurality of cross beams 416 extending between the vertical beams 412 to provide support, strength, and stability to the vertical beams 412. In the illustrated exemplary embodiment, the support structure 396 includes four couplings 408, each coupling 408 comprising a band 420 extending around the container housing 76 and a bushing 424 disposed between the band 420 and the container housing 76. The base 400 provides the substantial amount of vertical support for the container 32, while the upright member 404 and the couplings 408 provide the substantial amount of horizontal support for the container 32.

Figure 86:
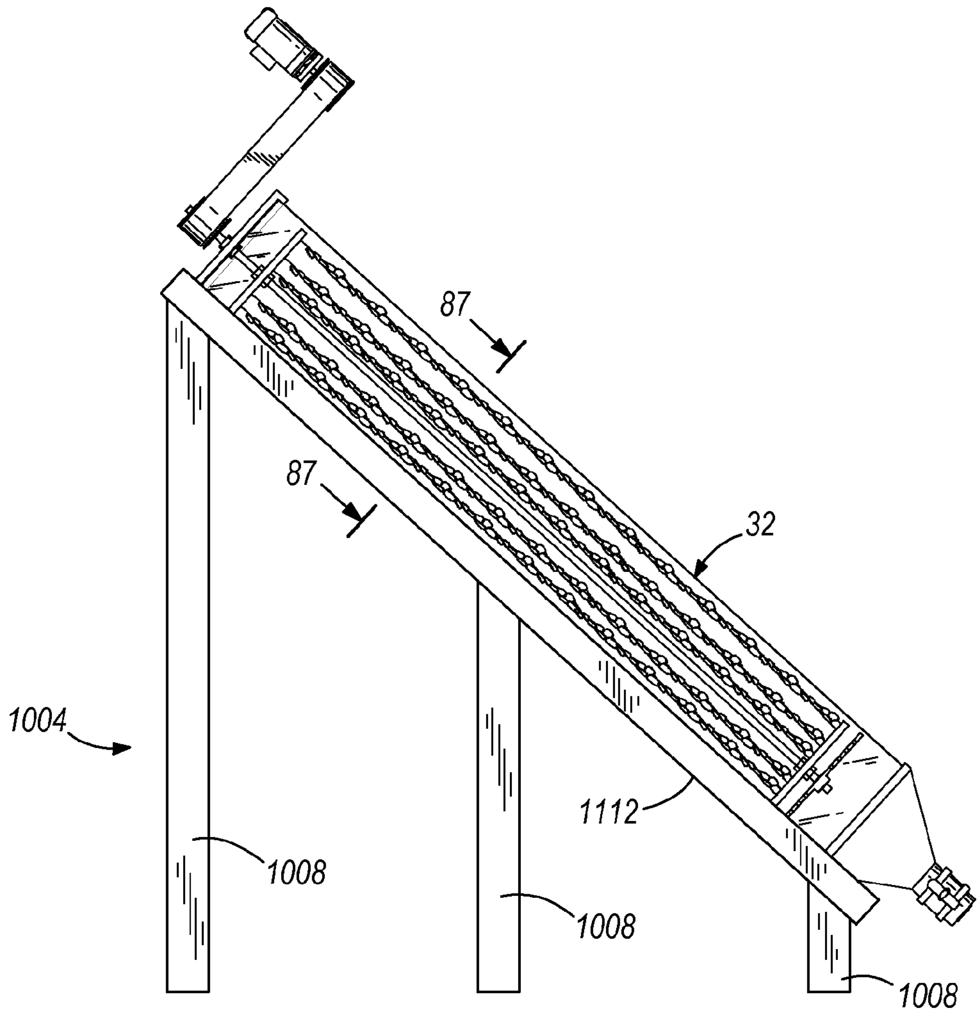
FIG. 86 is an elevation view of an exemplary container and an exemplary support structure for supporting the container at an angle between vertical and horizontal.
Figure 87:
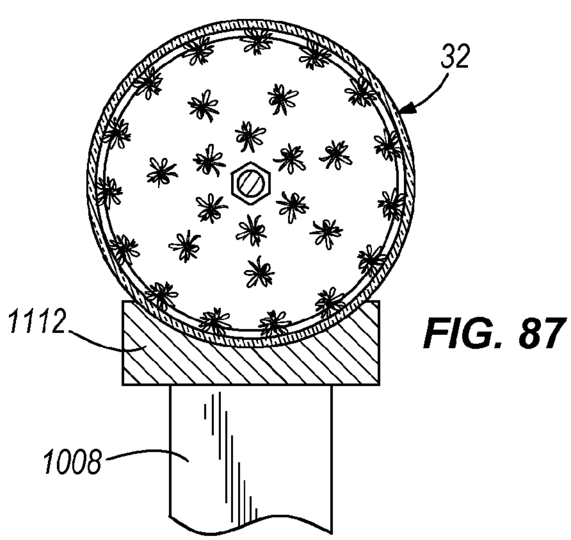
FIG. 87 is a cross-sectional view taken along line 87-87 in FIG. 86.

With reference to FIGS. 86 and 87, an exemplary support structure 1004 is illustrated for supporting a container 32 at an angle between vertical and horizontal. This exemplary support structure 1004 is for illustrative purposes and is not intended to be limiting. Other support structures for supporting a container 32 at an angle between vertical and horizontal are contemplated and are within the spirit and scope of the present invention. In the illustrated exemplary embodiment, the support structure 1004 includes a plurality of vertical supports 1008 supported on a ground or floor surface, and a support member 1012 supported by the vertical support members 1008 and engaging the container 32 to provide support thereto.

Figure 88:
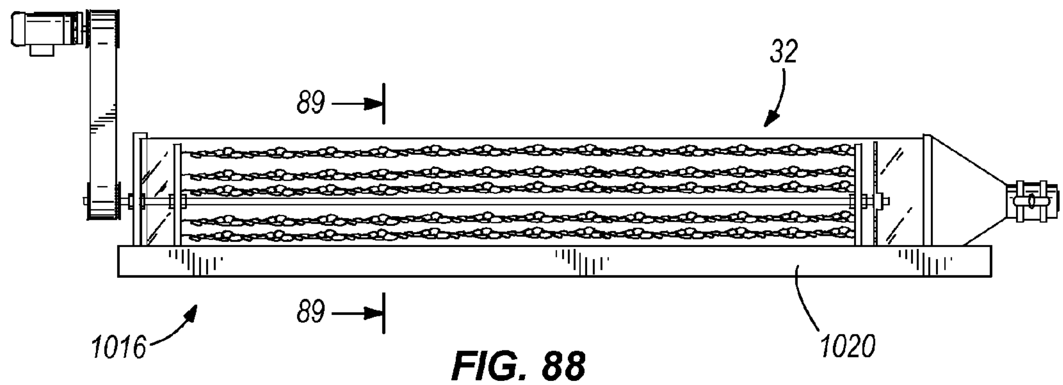
FIG. 88 is an elevation view of an exemplary container and an exemplary support structure for supporting the container in a horizontal manner.
Figure 89:
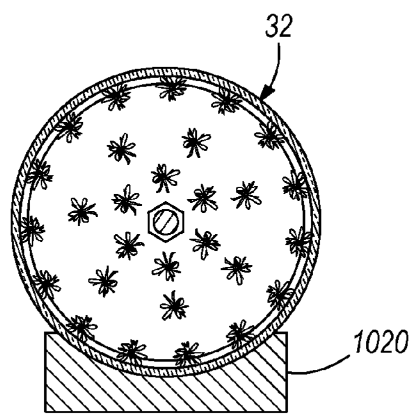
FIG. 89 is a cross-sectional view taken along line 89-89 in FIG. 88.

With reference to FIGS. 88 and 89, an exemplary support structure 1016 is illustrated for supporting a container 32 in a horizontal manner This exemplary support structure 1016 is for illustrative purposes and is not intended to be limiting. Other support structures 1016 for supporting a container 32 in a horizontal manner are contemplated and are within the spirit and scope of the present invention. In the illustrated exemplary embodiment, the support structure 1016 includes a support member 1020 supported on a ground or floor surface and engages the container 32 to provide support thereto. Alternatively, the support structure 1016 may include one or more vertical supports disposed between a ground or floor surface and the support member 1020 in order to elevate the support member 1020 and container 32 above the ground or floor surface.

Referring back to FIG. 85 and additional reference to FIGS. 90-94, an environmental control device (ECD) 428 is illustrated and assists with maintaining a desirable environment for treating wastewater within the container 32. The illustrated ECD 428 is for illustrative purposes and is not intended to be limiting. Other shapes, sizes, and configurations of the ECD 428 are contemplated and are within the intended spirit and scope of the present invention.

Figure 90:
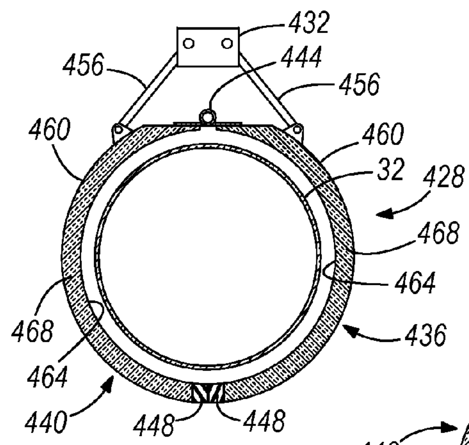
FIG. 90 is a cross-sectional view of a portion of the container and the environmental control device taken along line 90-90 in FIG. 85, the environmental control device is shown in a fully closed position.
Figure 91:
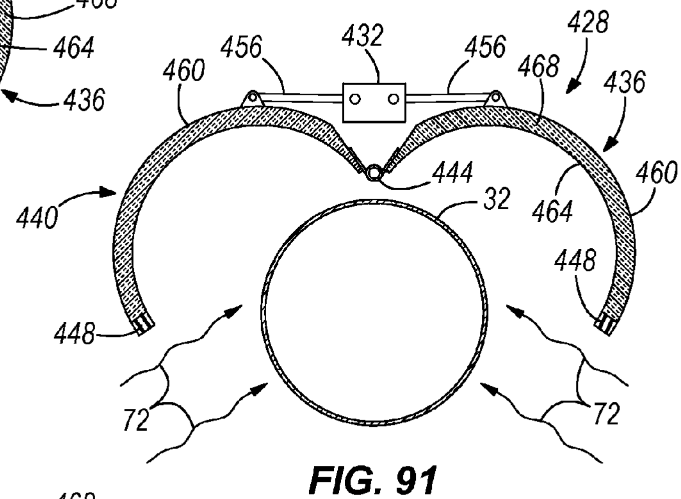
FIG. 91 is a cross-sectional view of a portion of the container and the environmental control device similar to that shown in FIG. 90, the environmental control device is shown in a fully opened position.

With particular reference to FIGS. 85 and 90, the illustrated exemplary ECD 428 has a “clam-shell” type shape. More particularly, the ECD 428 includes first and second semi-circular members 436, 440, a hinge or other pivotal joint 444 connected to first adjacent ends of the first and second semi-circular members 436, 440, and a sealing member 448 connected to each of second adjacent ends of the first and second semi-circular members 436, 440. The hinge 444 allows the first and second members 436, 440 to pivot relative to each other about the hinge 444 and the sealing members 448 abut each other when the first and second members 436, 440 are both fully closed to provide a seal between the first and second members 436, 440.

With reference to FIG. 85, the ECD 428 includes three sets of first and second members 436, 440, one set between each of the couplings 408. In the illustrated exemplary embodiment, the ECD 428 comprises three sets of first and second members 436, 440 to accommodate the use of four couplings 408. As indicated above, the support structure 396 may include any number of couplings 408 and, accordingly, the ECD 428 may include any number of sets of first and second members 436, 440 having any length to accommodate the space between the number of couplings 408. For example, the support structure 396 may include only two couplings 408, the bottom coupling 408 and the top coupling 408, and the ECD 428 may only require one tall set of first and second members 436, 440 to surround the container 32 along substantially its entire height between the top and bottom couplings 408.

With continued reference to FIGS. 85 and 90, the ECD 428 includes a motor 432 for opening and closing the first and second members 436, 440, a drive shaft 452 coupled to the motor 432, and a plurality of linkage arms 456 coupled to the drive shaft 452 and an associated one of the first and second members 436, 440. Activation of the motor 432 drives the drive shaft 452, which applies a force on the linkage arms 456 to either open or close the first and second members 436, 440. The motor 432 is coupled to and controllable by the controller 40. In the illustrated exemplary embodiment, a single motor 432 is used to open and close all of the sets of first and second members 436, 440. Alternatively, the ECD 428 may include one motor 432 per set of first and second members 436, 440 to independently open and close sets of the first and second members 436, 440, or one motor 432 for each first member 436 and one motor 432 for each second member 440 to drive the first and second members 436, 440 independently of each other, or any number of motors 432 to drive any number of first and second members 436, 440 or sets of first and second members 436, 440. With each motor 432 included, a separate drive shaft 452 will be associated with each motor 432 to output the driving force of each motor 432. Alternatively, each motor 432 may include multiple drive shafts 452. For example, a motor 432 may include two drive shafts 452, a first drive shaft 452 for opening and closing a first member 436 and a second drive shaft 452 for opening and closing a second member 440.

Referring now to FIGS. 90-93, the first and second members 436, 440 are movable to a variety of different positions and may both be moved together or may be moved independently of each other. The first and second members 436, 440 may be positioned in a fully closed position (see FIG. 90), a fully opened position (see FIG. 91), a half-opened position with the first member 436 fully opened and the second member 440 fully closed (see FIG. 92), another half-opened position with the second member 440 fully opened and the first member 436 fully closed (see FIG. 93), or any of a variety of other positions between the fully opened and the fully closed positions.

With continued reference to FIGS. 90-93, each of the first and second members 436, 440 includes an outer surface 460, an inner surface 464, and a core 468 between the outer and inner surfaces 460, 464. The outer surface 460 may be made of a variety of materials such as, for example, stainless steel, aluminum, fiber reinforced plastic (FRP), polypropylene, PVC, polyethylene, polycarbonate, carbon fiber, etc. The outer surface 460 may be white or light colored and may be capable of reflecting light. The outer surface 460 may also be smooth to resist dirt or other debris from attaching thereto. The core 468 may be made of a variety of materials such as, for example, blanket of closed neoprene, encapsulated insulation, formed insulation material, molded foam, etc. The core 468 preferably has the characteristics to insulate the container from both hot and cold conditions as desired. The inner surface 464 may be made of a variety of materials such as, for example, stainless steel, aluminum, fiber reinforced plastic (FRP), polypropylene, PVC, polyethylene, polycarbonate, carbon fiber, etc. In some embodiments, the outer and inner surfaces 460, 464 may be made of the same material and share the same characteristics. The inner surface 464 preferably has reflective characteristics in order to reflect light rays in a desired manner (describe in greater detail below). To provide such reflective characteristics, the inner surface 464 may be made of a reflective material or may be coated with a reflective substance. For example, the inner surface 464 may include a thin layer of minor material, MYLAR®, glass bead impregnated, embedded silvered aluminum plate, a reflective paint, etc.

As indicated above, the ECD 428 is capable of assisting with controlling the environment within the container 32 for wastewater treatment. More particularly, the ECD 428 is capable of affecting the temperature within the container 32 and affecting the amount of sunlight contacting the container 32.

Regarding temperature control, the ECD 428 has the capability to selectively insulate the container 32. With the first and second members 436, 440 in the fully closed position (see FIGS. 85 and 90), the container 32 is surrounded by the first and second members 436, 440 along a substantial portion of its height. When the ambient temperature outside is below a desired temperature within the container 32, the first and second members 436, 440 may be moved to their fully closed position to insulate the container 32 and assist with keeping the colder ambient air from cooling the temperature within the container 32. When the ambient temperature outside is above a desired temperature within the container 32, the first and second members 436, 440 may again be moved to their fully closed position to reflect the intense sunlight rays and prevent the sunlight rays from contacting the container 32. Alternatively, when the ambient temperature outside is above a desired temperature within the container 32, the first and second members 436, 440 may be moved to their fully opened position (see FIG. 91), or some intermediary position between fully closed and fully opened, to move the insulated first and second members 436, 440 away from the container 32 and allow cooling of the container 32 (e.g., cool by convection). The first and second members 436, 440 may be moved to any desired positions to assist with maintaining the temperature within the container 32 at a desired temperature.

Regarding affecting the amount of sunlight contacting the container 32, the first and second members 436, 440 may be moved to any desired position to allow a desired amount of sunlight to contact the container 32. The first and second members 436, 440 may be moved to their fully closed position to prevent sunlight 72 from contacting the container 32 (see FIG. 90), the first and second members 436, 440 may be moved to their fully opened positions so as not to interfere with the amount of sunlight 72 contacting the container 32 (i.e., allowing the full amount of sunlight to contact the container—see FIG. 91), or the first and second members 436, 440 may be moved to any positions between the fully closed and fully opened positions to allow a desired amount of sunlight to contact the container 32 (see FIGS. 92 and 93).

As indicated above, the inner surface 464 of the ECD 428 is made of a reflective material capable of reflecting sunlight 72. The reflective capabilities of the inner surface 464 may improve the efficiency at which the sunlight 72 contacts the container 32. More particularly, sunlight 72 emitted toward the container 32 may: contact the container 32 and microorganisms therein; pass through the container 32 without contacting the microorganisms; or miss the container 32 and microorganisms altogether. For the latter two scenarios, the ECD 428 may assist with reflecting the sunlight not contacting the microorganisms into contact with the microorganisms.

Figure 92:
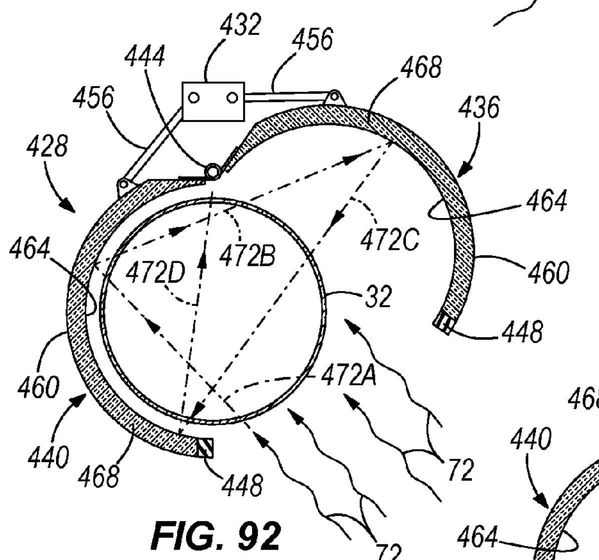
FIG. 92 is a cross-sectional view of a portion of the container and the environmental control device similar to that shown in FIG. 90, the environmental control device is shown in a half-opened position.
Figure 93:
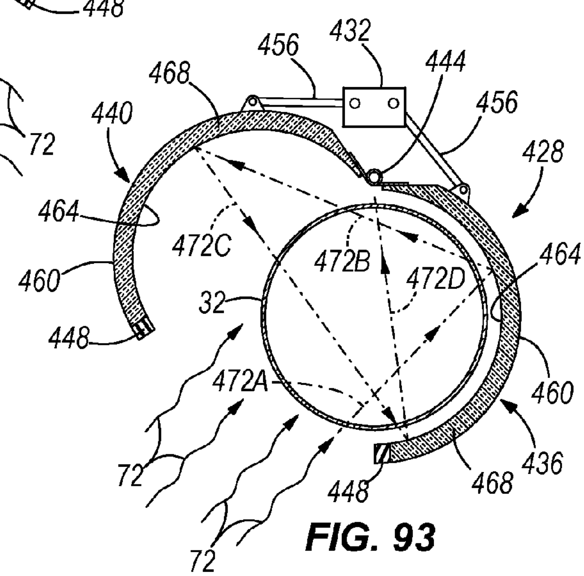
FIG. 93 is a cross-sectional view of a portion of the container and the environmental control device similar to that shown in FIG. 90, the environmental control device is shown in another half-opened position.

With reference to FIGS. 92 and 93, two exemplary reflective paths 472 along which sunlight 72 may be reflected back into contact with the microorganisms are illustrated. These illustrated exemplary reflective paths 472 are only two paths of many paths along which the inner surface 464 of the ECD 428 may reflect sunlight. These reflective paths 472 are shown for illustrative purposes and are not intended to be limiting. Many other reflective paths 472 are possible and are within the intended spirit and scope of the present invention. With reference to the illustrated exemplary reflective paths 472, sunlight 72 may pass through the containers 32 without contacting microorganisms within the containers 32, as represented by first portions 472A of the paths, and contact the inner surfaces 464 of the first and second members 436, 440 of the ECD 428. The inner surfaces 464 reflect the sunlight 72 in a second direction as represented by second portions 472B of the paths. As can be seen, the second portions 472B of the paths pass through the containers 32. Some of this sunlight 72 will contact microorganisms within the containers 32, while some of the sunlight 72 will again pass through the containers 32 without contacting the microorganisms. This sunlight 72 passing through the containers 32 will engage the inner surfaces 464 of the other members 436, 440 and reflect back towards the containers 32 as represented by third portions 472C of the paths. The reflected sunlight 72 again passes through the containers 32 and some of the sunlight 72 contacts microorganisms within the containers 32, while some of the sunlight 72 again passes through the containers 32 without contacting microorganisms. This sunlight 72 passing through the containers 32 engages the inner surfaces 464 of the members 436, 440 originally engaged by the sunlight 72 and reflects again through the containers 32 as represented by fourth portions 472D of the paths. Some of this sunlight 72 contacts microorganisms within the containers 32, while some of the sunlight 72 still passes through without contacting microorganisms. Sunlight reflection may continue until the sunlight 72 contacts the microorganisms or until the sunlight 72 is reflected away from the containers 32 and the inner surfaces 464 of the first and second members 436, 440. As can be seen, the reflective inner surfaces 464 of the first and second members 436, 440 provide additional opportunities for sunlight 72 to contact the microorganisms within the container 32 and promote photosynthesis. Without the reflective capabilities of the ECD 428, sunlight 72 passing through or passing by the containers 32 would not have another opportunity to contact the microorganisms within the container 32.

Figure 94:
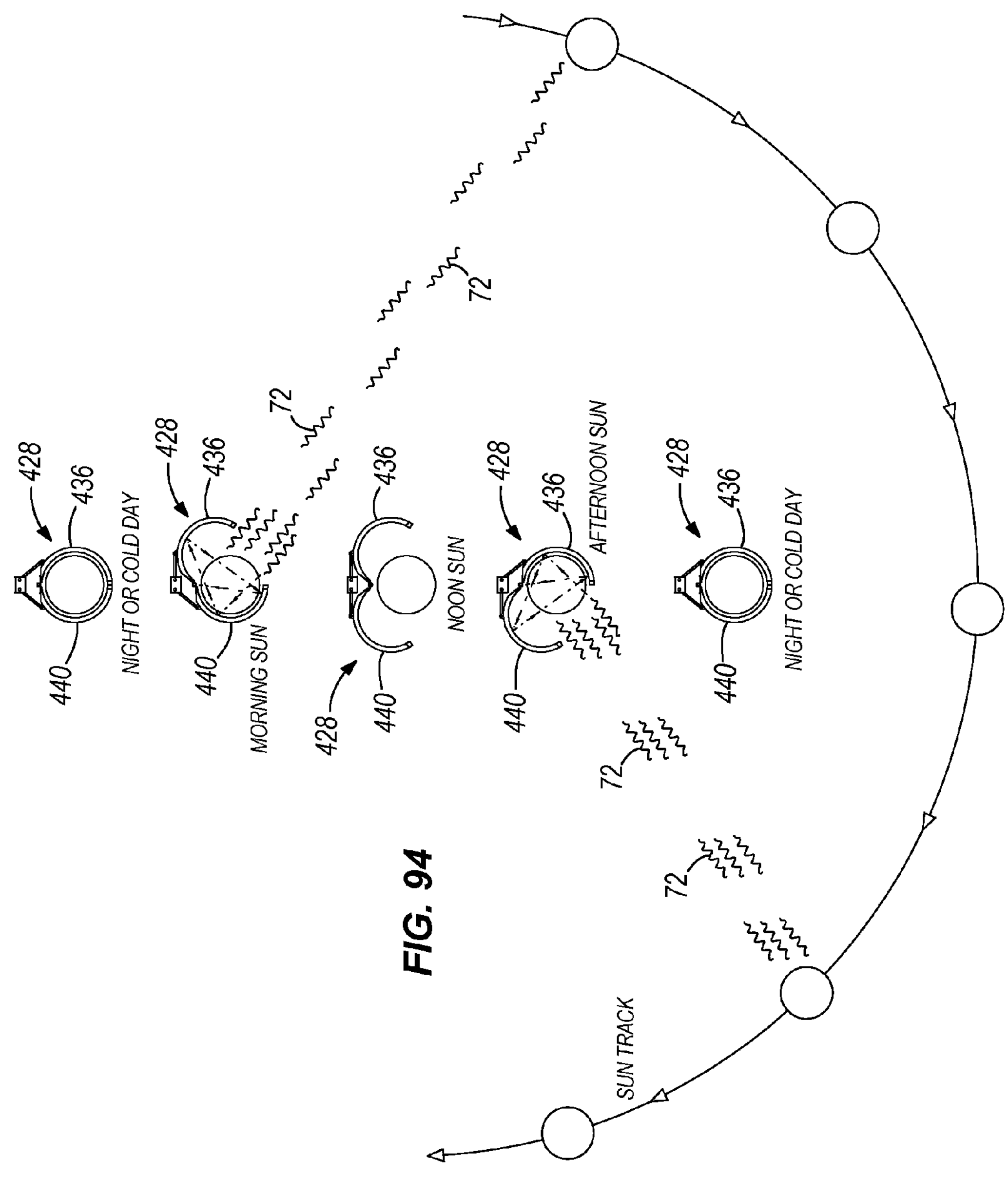
FIG. 94 is a schematic view of a plurality of exemplary orientations of the environmental control device and an exemplary path of the Sun throughout a single day's time.

Referring now to FIG. 94, the ECD 428 may be utilized to optimize the temperature within the container 32 and optimize the amount of sunlight 72 contacting the container 32 and the microorganisms throughout the day. The figures of the ECD 428 represent exemplary positions occupied by the ECD 428 during different times of the day. FIG. 94 also illustrates a schematic representation of a path of the Sun throughout a single day. The orientations of the ECD 428 illustrated in FIG. 94 are for illustrative purposes and are not intended to be limiting. The orientations of the ECD 428 illustrated in FIG. 94 exemplify a portion of the many orientations the ECD 428 is capable of occupying. Many other orientations are contemplated and are within the spirit and scope of the present invention.

The top figure of the ECD 428 shows the ECD 428 in an exemplary orientation that may be occupied during nighttime or during a cold day in order to insulate the container 32 and maintain a desirable temperature within the container 32. The second figure from the top shows the ECD 428 in an exemplary orientation that may be occupied during the morning. In the morning, the Sun is generally positioned to one side of the container 32 and it may be desirable to have one of the members to the side of the Sun opened (first member 436 as illustrated) to allow sunlight 72 to contact the container 32 and keep the other member to the opposite side of the Sun closed (second member 440 as illustrated) in order to provide the reflective capabilities described above. The third figure from the top shows the ECD 428 in an exemplary orientation that may be occupied during noon or the middle of the day. During the middle of the day, the Sun is usually high in the sky and directly over (or in front of as illustrated in FIG. 94) the container 32. With the Sun in such a position, it may be desirable to have both the first and second members 436, 440 open to allow the greatest amount of sunlight 72 to contact the container 32. The first and second members 436, 440 may also provide reflective capabilities as described above for reflecting sunlight 72 toward the container 32. The fourth figure from the top shows the ECD 428 in an exemplary orientation that may be occupied during the afternoon. In the afternoon, the Sun is generally positioned to one side of the container 32 (opposite the morning sun) and it may be desirable to have one of the members to the side of the Sun opened (second member 440 as illustrated) to allow sunlight 72 to contact the container 32 and keep the other member to the opposite side of the Sun closed (first member 436 as illustrated) in order to provide the reflective capabilities described above. The bottom figure shows the ECD 428 again in an exemplary orientation occupied during nighttime or on cold days. As indicated above, the orientations of the ECD 428 illustrated in FIG. 94 are only exemplary orientations that may be occupied during a day. The ECD 428 may occupy different orientations during various times throughout a day for various reasons such as, for example, the environmental conditions surrounding the container 32, the type of microorganisms within the container 32, the desired wastewater performance of the container 32, etc.

Figure 95:
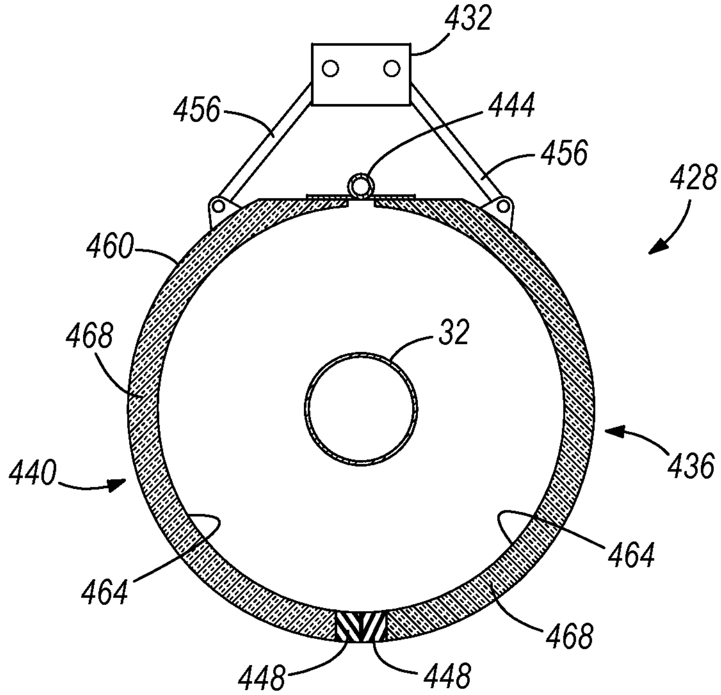
FIG. 95 is a cross-sectional view similar to FIG. 90 of a portion of the container and another exemplary environmental control device, the environmental control device is shown in a fully closed position.
Figure 96:
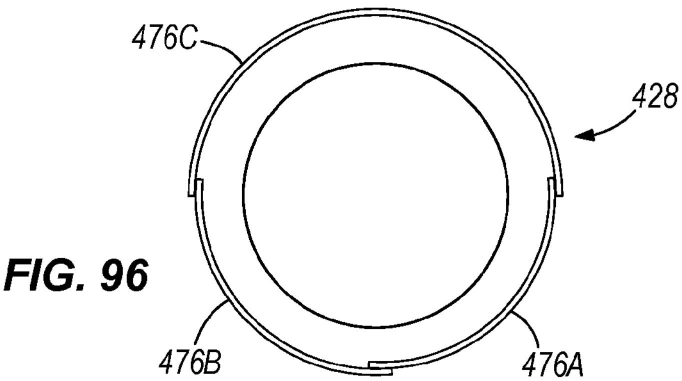
FIG. 96 is a schematic view of another exemplary environmental control device shown in a first position.
Figure 97:
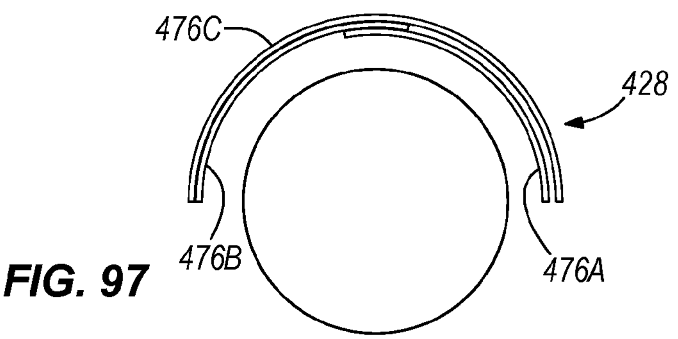
FIG. 97 is another schematic view of the environmental control device illustrated in FIG. 96, the environmental control device is shown in a second position or fully opened position.
Figure 98:
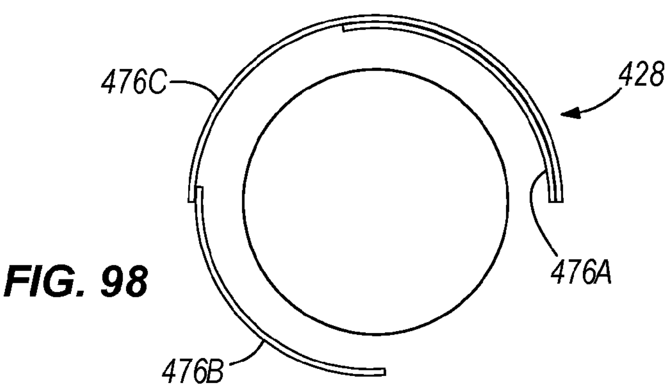
FIG. 98 is yet another schematic view of the environmental control device illustrated in FIG. 96, the environmental control device is shown in a third position or a partially opened position.
Figure 99:
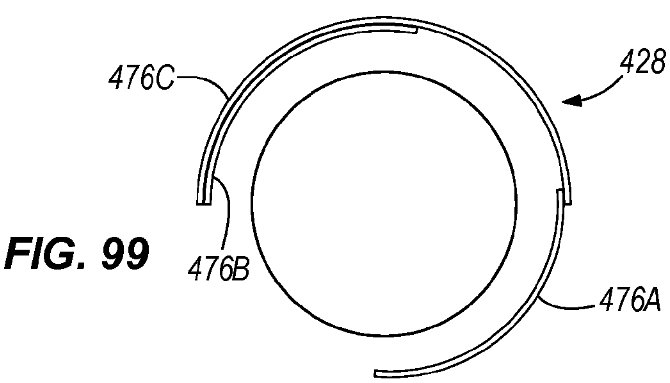
FIG. 99 is a further schematic view of the environmental control device illustrated in FIG. 96, the environmental control device is shown in a fourth position or another partially opened position.

The ECD 428 illustrated in FIGS. 85 and 90-94 includes first and second members 436, 440 sized to conform closely to the size of the container 32. More particularly, only a small gap exists between the interior surface of the first and second members 436, 440 and the outer surface 196 of the container housing 76. The illustrated size of the first and second members 436, 440 is for exemplary purposes and is not intended to be limiting. It should be understood that the first and second members 436, 440 may have any size relative to the size of the container 32. For example, FIG. 95 shows a container 32 having a similar size to the container 32 illustrated in FIGS. 90-93 and shows first and second members 436, 440 substantially larger than those illustrated in FIGS. 90-93. The larger first and second members 436, 440 may be operated in similar manners to the first and second members shown in FIGS. 90-93, however, the larger first and second members 436, 440 may be opened to provide a larger reflective area for reflecting larger quantities of sunlight toward the container 32.

The ECD 428 illustrated in FIGS. 85 and 90-94 also includes first and second members 436, 440 having a similar shape to the shape of the container 32. More particularly, the container 32 has a substantially cylindrical shape and is circular in horizontal cross-section, and the first and second members 436, 440, when closed, form a substantially circular horizontal cross-section around the container 32. It should be understood that the first and second members 436, 440 may have different horizontal cross-sectional shapes than the container 32. For example, the container 32 may have a circular horizontal cross-sectional shape and the first and second members 436, 440 may have a non-circular cross sectional shape such as, for example, any polygonal shape or any arcuately perimetered shape. Additionally, the container 32 may have any polygonal or any arcuately perimetered shape and the first and second members 436, 440 may have any polygonal or any arcuately perimetered shape as long as they are different shapes from one another.

It should also be understood that the ECD 428 is capable of having configurations other than the illustrated exemplary clam-shell configuration. For example, the ECD 428 may include a plurality of semi-circular members 476 that together concentrically surround the container 32 and are slidable around the container 32 such that the members 476 overlap or nest within each other when moved to their open positions (see FIGS. 96-99). In the illustrated example, the first and second members 476A, 476B move relative to each other and the container 32 to expose the container 32 as desired. A third member 476C is disposed behind the container 32, typically on a side of the container 32 opposite the position of the Sun, and may be stationary or movable.

Figure 101:
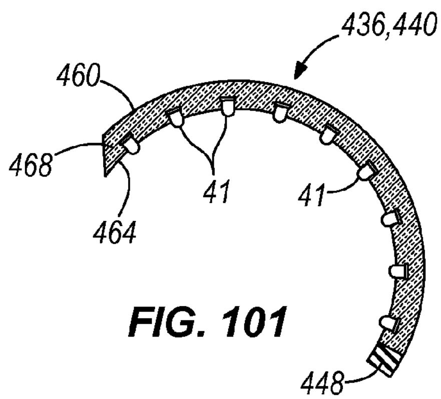
FIG. 101 is a cross-sectional view of the exemplary artificial light system taken along line 101-101 in FIG. 100.
Figure 100:
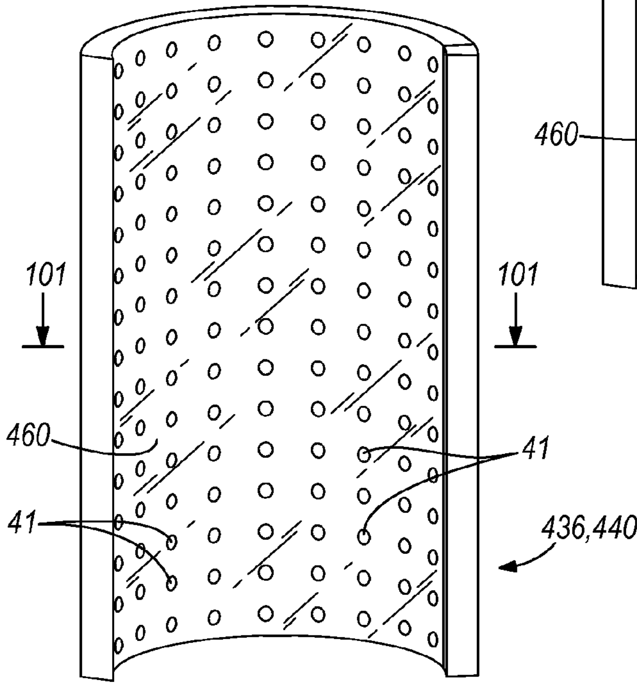
FIG. 100 is a top perspective view of a portion of an environmental control device including an exemplary artificial light system.

Referring now to FIGS. 100 and 101, the ECD 428 may include an artificial light system 37. Components similar between the previously disclosed container, artificial light systems, and ECD, and the container, artificial light systems, and ECD illustrated in FIGS. 100 and 101 may be identified with the same reference numbers or may be identified with different reference numbers.

In the illustrated exemplary embodiment, the artificial light system 37 includes a light source 41 comprised of an array of LEDs coupled to the inner surface 464 of the first and second members 436, 440 (only one member shown). Alternatively, other types of light sources 41 may be coupled to inner surface 464 of the members 436, 440 such as, for example, fluorescents, incandescents, high pressure sodium, metal halide, quantum dots, fiber optics, electroluminescents, strobe type lights, lasers, etc. The LEDs 41 are electrically connected to an electrical power source and to the controller 40. The LEDs 41 operate and may be controlled in same manner as the other artificial light systems 37 described herein to emit light onto the container 32 and the microorganisms. In some embodiments, the LEDs 41 may be imbedded in the inner surface 464 such that the LEDs 41 are flush with the interior surface 464. In such embodiments, the inner surface 464 may be stamped with perforations that match the desired LED array formation to receive the LEDs 41 and position the LEDs flush with the inner surface 464.

Figure 103:
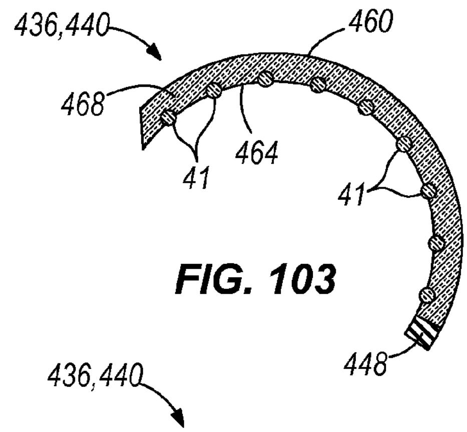
FIG. 103 is a cross-sectional view of the exemplary artificial light system taken along line 103-103 in FIG. 102.
Figure 102:
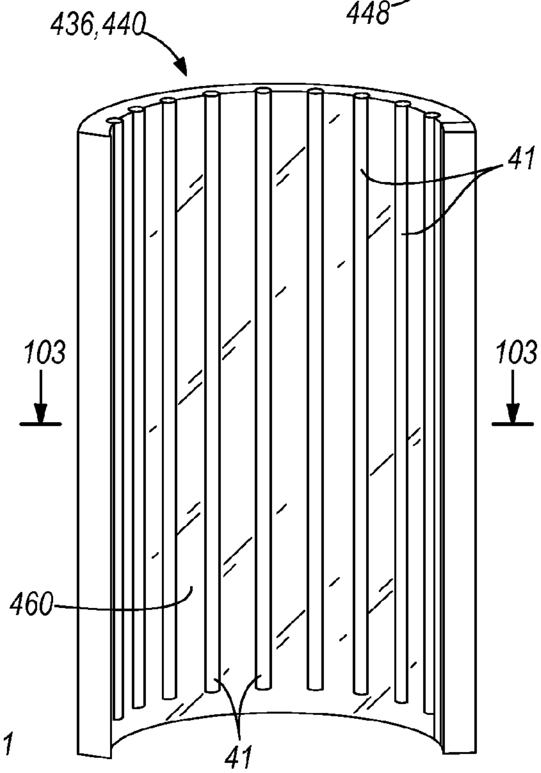
FIG. 102 is a top perspective view of a portion of an environmental control device including another exemplary artificial light system.

Referring to FIGS. 102 and 103, the ECD 428 includes an alternative embodiment of an artificial light system 37. Components similar between the previously disclosed container, artificial light systems, and ECD, and the container, artificial light systems, and ECD illustrated in FIGS. 102 and 103 may be identified with the same reference numbers or may be identified with different reference numbers.

In this illustrated exemplary embodiment, the artificial light system 37 includes a light source 41 comprised of a plurality of fiber optic light channels imbedded in the inner surface 464 of the first and second members 436, 440 (only one member shown). The fiber optic light channels 41 may receive light in a variety of manners including LEDs or other light emitting devices or from a solar light collection apparatus oriented to receive sunlight 72 and transfer the collected sunlight 72 to the light channels 41 via fiber optic cables. The light channels 41 may be controlled by the controller 40 as desired.

Figure 104:
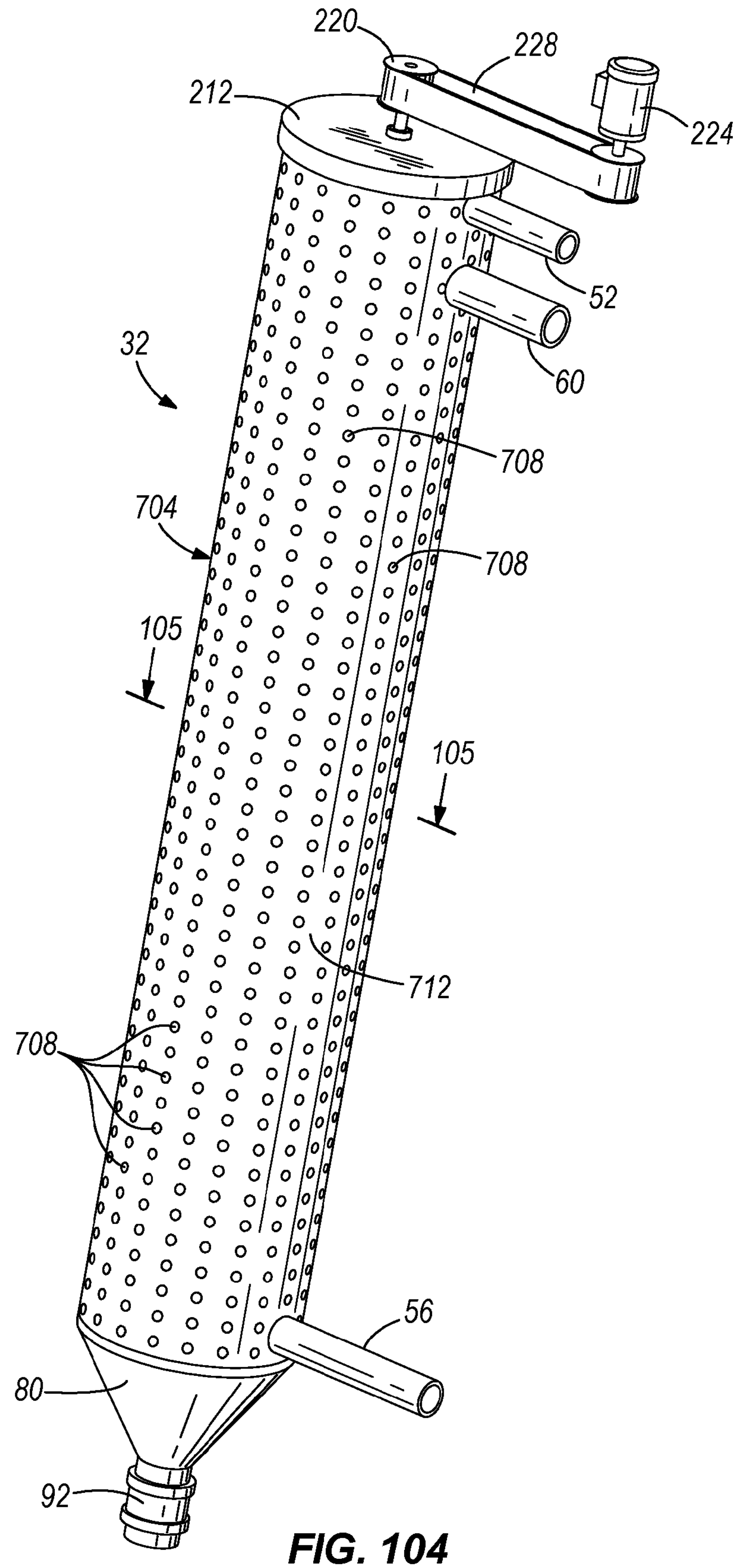
FIG. 104 is a top perspective view of another exemplary embodiment of a container.
Figure 105:
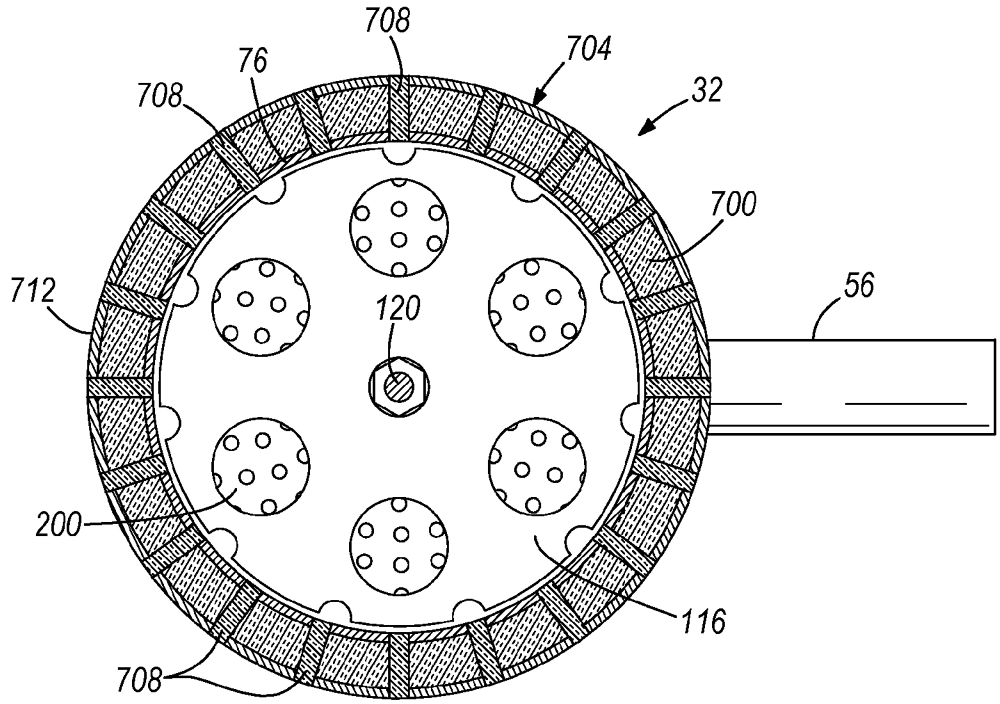
FIG. 105 is a cross-sectional view taken along line 105-105 in FIG. 104.

Referring now to FIGS. 104 and 105, another exemplary embodiment of a container 32 is illustrated. In this illustrated exemplary embodiment, the housing 76 is made of an opaque material that does not allow a substantial quantity of light to penetrate the housing 76. The housing 76 may be made of a variety of different materials such as, for example, metal, opaque plastics, concrete, fiberglass, lined structures, etc. The container 32 also includes an insulation layer 700 surrounding the housing 76 for thermally insulating the container 32 and an outer layer 704 positioned externally of and surrounding the insulation layer 700 for protecting the insulation layer 700. The insulation layer 700 may be comprised of a variety of different materials such as, for example, plastic, fiberglass, rock wool, closed and open celled polystyrene, polyurethane foam, cellulose fiber, etc., and the outer layer 704 may be comprised of a variety of different materials such as, for example, plastic, fiberglass, metal, paint, sealing agents, etc. It should be understood that in some exemplary embodiments where at least one of the insulation layer 700 and the outer layer 704 is comprised of an opaque material, the housing 76 of the container 32 may be translucent or transparent.

With continued reference to FIGS. 104 and 105, the container 32 further includes a plurality of light elements 708 for transmitting light from the exterior of the container 32 to an interior of the container 32 for use by the microorganisms to facilitate wastewater treatment. In some exemplary embodiments, the material that comprises the light elements 708 may include an infrared inhibitor or infrared filter applied to the light elements 708 or included in the composition of the light element material in order to reduce or limit the heat buildup that occurs in the light elements 708 as light passes therethrough. In the illustrated exemplary embodiment, the light elements 708 are positioned in holes defined through the housing 76, the insulation layer 700, and the outer layer 704. Each light element 708 is flush at its ends with the interior surface 196 of the housing 76 and an outer surface 712 of the outer layer 704. The light elements 708 are sealed within the holes in an air and water tight fashion to prevent wastewater within the container 32 from leaking into the holes. In other exemplary embodiments, the light elements 708 may abut or be disposed adjacent an outer surface of the housing 76 and emit light through the transparent or translucent housing 76. In such alternative embodiments, holes are not required to be drilled in the housing 76 for accommodating the light elements 708. The light elements 708 may be made of a variety of light transmitting materials such as, for example, glass fiber, fiber optic, plastics such as acrylic, etc., in order to receive light externally of the container 32 and transmit the collected light toward the interior of the container 32 for use by the microorganisms for treating wastewater within the container 32. Also, the light elements 708 may be made of materials that do not degrade or are otherwise adversely affected by exposure to light or to wastewater disposed within or outside of the container 32. In the illustrated exemplary embodiment, the light elements 708 are adapted to receive natural light from the Sun. Also, in the illustrated exemplary embodiment, the end of each of the light elements 708 adjacent the outer layer 704 (i.e., the exterior end) is flush with the outer surface 712 of the outer layer 704.

Figure 106:
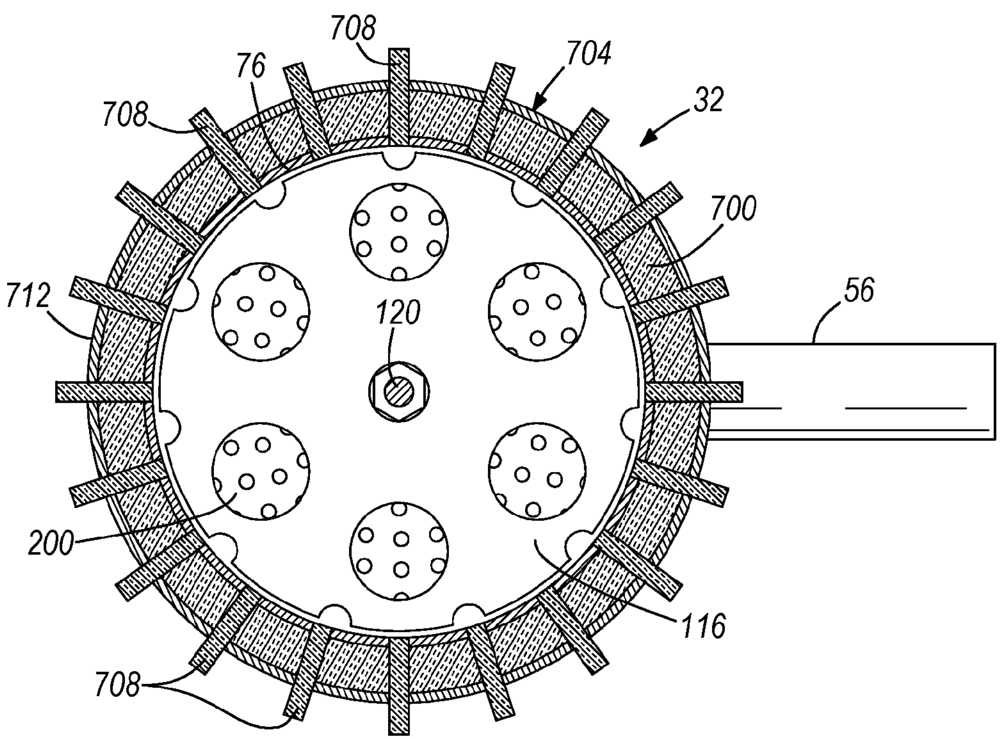
FIG. 106 is a cross-sectional view similar to FIG. 105 showing yet another exemplary embodiment of a container.

With reference to FIG. 106, the exterior end of each of the light elements 708 may extend beyond the outer surface 712 of the outer layer 704. In such embodiments, the exterior end of the light elements 708 may be angled toward the Sun in order to optimally align the exterior end with the Sun.

With containers 32 constructed in the manner described above and illustrated in FIGS. 104-106, the containers 32 may be made of materials that are less expensive, more durable, and more resistant to thermal and environmental conditions. These containers 32 may eliminate a desire to have a secondary structure surrounding the containers 32 to provide protection from thermal and environmental conditions. Incorporation of the light elements 708 facilitates light transmission into the containers 32 when the containers 32 are constructed in the manner described with reference to FIGS. 104-106.

Figure 107:
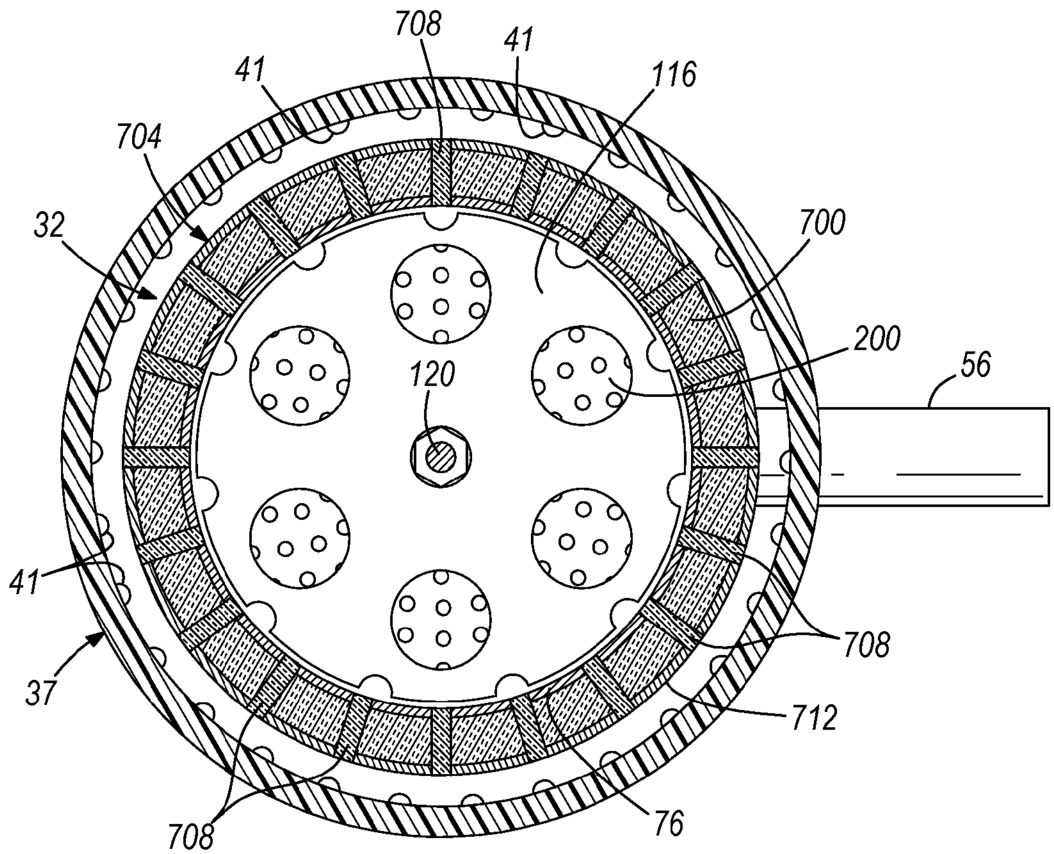
FIG. 107 is a cross-sectional view similar to FIG. 105 showing still another exemplary embodiment of a container and an artificial light system.

Referring now to FIG. 107, another alternative exemplary embodiment of a container 32 is illustrated. The container 32 illustrated in FIG. 107 has many similar elements to the containers 32 illustrated in FIGS. 104-106 and such similar elements may be identified with similar reference numbers or may be identified with different reference numbers.

In FIG. 107, an artificial light system 37 is disposed externally of and emits light toward the container 32. In the illustrated exemplary embodiment, the artificial light system 37 completely surrounds a periphery of the container 32. In other exemplary embodiments, the artificial light system 37 may not completely surround a periphery of the container 32. In yet other exemplary embodiments, a plurality of artificial light systems 37 may be disposed at various locations around the container 32. No matter the embodiment, the artificial light system 37 is used to provide light to the light elements 708, which receive the light and transmit the light toward an interior of the container 32. The artificial light system 37 may be the sole source of light provided to the container 32 or the artificial light system 37 may be used in conjunction with natural sunlight to satisfy the lighting needs of the container 32.

Now that the structure of the wastewater treatment system 20 has been described, exemplary operations of the system 20 will now be described. The following description relating to operations of the wastewater treatment system 20 only exemplifies a sample of the variety of possible manners for operating the system 20. The following description is not intended to be limiting upon the wastewater treatment system 20 and the manners of operation.

Referring back to FIGS. 1 and 2, oxygen is harvested from or provided by one or more of a variety of different gas sources 44. The gas is delivered to the containers 32 via a network of pipes 48 of the gas management system 24. Before the gas is delivered to the containers 32, the containers 32 should be filled with a sufficient level of wastewater and an initial amount of microorganisms (otherwise known as seeding microorganisms). The wastewater is provided to the containers 32 via wastewater inlet pipes 56 of the liquid management system 28 and the microorganisms may be introduced into the containers 32 in a variety of manners. If the containers 32 are "virgin" containers (i.e., no wastewater treatment has occurred in the containers or the containers have been cleaned to completely remove the presence of microorganisms and wastewater), microorganisms may be introduced into the liquid management system 28 and delivered to the containers 32 with the wastewater supply. Alternatively, if the containers 32 have previously been used for wastewater treatment, microorganisms may already be present in the containers 32 from the prior wastewater treatment process. In such instances, only wastewater needs to be supplied to the containers 32. After the containers 32 are sufficiently supplied with wastewater and microorganisms, the gas comprising oxygen therein is supplied to the containers 32 via the gas management system 24. As illustrated in FIGS. 1 and 2, the gas and liquid management systems 24, 28 are electronically coupled to and controlled by the controller 40.

The media 110 utilized in the wastewater treatment system 20 facilitates efficient and productive wastewater treatment for a variety of reasons. First, the media 110 is comprised of a material that is suitable for microorganism growth. In other words, the media 110 is not composed of a material that hinders growth of or kills the microorganisms. Second, the media 110 consists of a material to which the microorganisms may attach and upon which the microorganisms may rest during their consumption of waste products from the wastewater. Third, the media 110 provides a large amount of dense surface area on which the microorganisms may grow. In other words, a significant amount of the space within the housing 76 is occupied by the media 110, thereby establishing efficient use of the cavity 84 within the housing 76. With a large amount of the microorganisms supported on the media 110, only small amounts of microorganisms remain suspended in the wastewater. The small amount of microorganisms allows the wastewater to be removed from and reintroduced into the containers 32, without removal of the microorganisms, for additional treatment processes as illustrated in FIG. 43. Fourth, the large quantity of media 110 within the cavity 84 of the housing 76 acts to inhibit and slow ascent of the gas and oxygen to the top of the housing 76, thereby increasing the amount of time the oxygen resides in the wastewater proximate the microorganisms supported on the media 110. Increasing the time oxygen resides proximate the microorganisms, increases the rate at which the microorganisms absorb oxygen and the rate at which the wastewater is treated. Fifth, the media 110 provides protection to the microorganisms supported thereon just before and during extraction of the wastewater from the containers 32 (described in greater detail below). While a variety of benefits of the media 110 are described herein, this list is not exhaustive and is not meant to be limiting. The media 110 may provide other benefits to wastewater treatment.

With continued reference to FIGS. 1 and 2 and additional reference to FIG. 3, the frames 108 are rotatable within the containers 32 relative to their respective housings 76. In some exemplary embodiments, a single motor 224 is coupled to multiple frames 108 to rotate the multiple frames 108 relative to their respective housings 76. Alternatively, a separate motor 224 may be used to drive each frame 108 or any number of motors 224 may be utilized to drive any number of frames 108. No matter the number of motors 224 or the manner in which the motor(s) 224 drive the frames 108, the motor(s) 224 is (are) all electronically coupled to the controller 40 and controllable by the controller 40 to activate and deactivate the motor(s) 224 accordingly. In the following description, only a single motor 224 will be referenced. As indicated above, the motor 224 is part of the drive mechanism, which also includes a belt or chain 228 coupled between the motor 224 and the gears 220, with the gears 220 coupled to ends of the shafts 120. When rotation of the frames 108 is desired, the controller 40 activates the motor 224 to drive the belt 228, gears 220, and shafts 120, thereby rotating the frames 108 and the media 110 attached to the frames 108 relative to the housings 76. In some exemplary embodiments, the frames 108 may be rotated in a single direction. In other exemplary embodiments, the frames 108 may rotate in both directions.

Rotation of the frames 108 and media 110 is desirable for several reasons. First, the frames 108 and media 110 may rotate to agitate the wastewater within the containers 32 and/or to expose the microorganisms to natural and/or artificial lighting systems 37 as desired. Rotation of the frames 108 in this manner redistributes the wastewater within the containers 32 to provide the microorganisms with access to untreated or less treated wastewater. In addition, rotation of the frames 108 in this manner exposes all of the media 110 and all of the microorganisms to the light 37, 72 in a substantially proportional manner or in a manner that is most efficient for use by the microorganisms. Further, rotation of the frames 108 in this manner also moves the media 110 and microorganisms out of the light 37, 72 and into a shaded or dark portion of the containers 32, thereby providing the dark phase necessary to facilitate the photosynthesis process. The frames 108 and media 110 can be rotated in a variety of methods and speeds. In some embodiments, rotation of the frames 108 may be incremental such that rotation is started and stopped at desired increments of time and desired increments of distance. In other embodiments, the frames 108 rotate in a continuous uninterrupted manner such that the frames 108 are always rotating during the wastewater treatment process. Thus, the outermost strands of media 110 may continuously wipe the interior surfaces 196 of the housings 76. In either of the embodiments described above, the rotation of the frames 108 is relatively slow such that the microorganisms supported on the media 110 are not dislodged from the media 110.

Rotation of the frames 108, as discussed above, also provides another benefit to the wastewater treatment system 20. The outer most strands of media 110 extending between the recesses 132 defined in the upper and lower connector plates 112, 116 contact the interior surface 196 of the housings 76. As the frames 108 rotate, the outermost media strands 110 wipe against the interior surfaces 196 of the housings 76 and clear any wastewater debris or microorganisms attached to the interior surfaces 196. Such accumulated debris and/or microorganisms may cause fouling of the containers 32, which would then require cleaning Such cleaning requires time, which could otherwise be used to treat wastewater. Additionally, such accumulated debris and/or microorganisms may significantly reduce the amount of light 37, 72 penetrating the housings 76 and entering the cavities 84, thereby negatively affecting photosynthesis of the microorganisms. Accordingly, this wiping of the interior surfaces 196 improves light 37, 72 penetration through the housings 76 and into the cavities 84 to maintain microorganism growth. Continual or periodic wiping of the interior surface 196 decreases the downtime required to clean the containers 32. For example, during wastewater treatment, the frames 108 may be rotated at a rate in a range between about one 360° rotation every few hours to about one 360° rotation in less than one minute. These exemplary rotations are for illustrative purposes and are not intended to be limiting. The frames 108 are capable of being rotated at a variety of other rates, which are within the spirit and scope of the present invention.

Rotation of the frames 108, as discussed above, provides yet another benefit to the wastewater treatment system 20. Rotation of the frames 108 cause carbon dioxide bubbles within the wastewater and stuck to the media 110 or microorganisms to dislodge and ascend toward the top of the containers 32. The carbon dioxide may then be exhausted from the containers 32 via the gas discharge pipes 52. High carbon dioxide levels within the containers 32 may inhibit the wastewater treatment process, thereby decreases productivity of the system 20. Rotation of the frames 108 in the first manner described above may be sufficient to dislodge the carbon dioxide from the media 110 and microorganisms. Alternatively, the frames 108 may be jogged quickly, step rotated, or rotated quickly to remove the carbon dioxide.

The frames 108 are also rotatable in a second manner for another purpose. More specifically, the frames 108 may be rotated in order to dislodge the microorganisms, biomass, or other elements from the media 110. An abundance of microorganisms or biomass on the media 110 or in the wastewater may be detrimental to wastewater treatment. For example, when microorganisms are supplied with a continuous amount of nutrient rich wastewater, the microorganisms may proliferate and cause inefficiencies or problems such as, for example, "short circuiting" where microbial biomass blocks and inhibits wastewater treatment microorganisms from good contact with wastewater. Rotation of the frames 108 in a relatively fast manner creates sufficient centrifugal and hydrostatic forces to dislodge the microorganisms, biomass, other elements, etc., from the media 110, but not too fast where the wastewater treatment microorganisms may be damaged. An exemplary rate at which the frames 108 and media 110 are rotated in this manner is about one rotation per second. Alternatively, the frames 108 and media 110 could be rotated at other speeds as long as the microorganisms are dislodged from the media 110 in a desirable manner. Rotational rates of the frame 108 and media 110 may be dependent upon the species of microorganism within the container 32. For example, the frame 108 and media 110 may rotate at a first speed for a first species of microorganism and may rotate at a second speed for a second species of microorganism. Different rotational rates may be necessary to dislodge the microorganisms from the media 110 due to the characteristics of the microorganism species. Some microorganism species may stick or adhere to the media 110 to a greater extent than other microorganism species. In some embodiments, the rotation of the frames 108 is controlled to dislodge a majority of the microorganisms from the media 110, but maintain a small amount of microorganisms on the media 110 to act as seeding microorganisms for the next wastewater treatment process. In such embodiments, the introduction of microorganisms into the containers 32 is not required prior to initiating the next wastewater treatment process. In other embodiments, the rotation of the frames 108 is controlled to dislodge all of the microorganisms from the media 110. In such embodiments, microorganisms must be introduced into the containers 32 prior to initiating the next wastewater treatment process. Microorganisms may be introduced into the containers 32 with wastewater via the liquid management system 28.

As indicated above, it is sometimes desirable to dislodge the microorganisms from the media 110 if an overabundance of microorganisms are present in the containers 32. To do so, the controller 40 initiates the motor 224 to rotate the frames 108 at the relatively fast speed. This fast rotation also wipes the outermost media strands 110 against the interior surfaces 196 of the housings 76 to clear off any microorganisms or wastewater debris that may have accumulated on the interior surfaces 196 of the housings 76. With a desired amount of the microorganisms now present in the wastewater, the wastewater and microorganism combination may be removed from the containers 32. The controller 40 communicates with the liquid management system 28 to initiate removal of the wastewater and microorganisms from the containers 32 through the wastewater outlets 100. A pump of the liquid management system 28 directs the wastewater and microorganism combination downstream for further processing.

In some embodiments, the wastewater treatment system 20 includes an ultrasonic apparatus for moving the media 110 relative to the housings 76 in order to cause wiping of the media 110 against the interior surfaces 196 of the housings 76, thereby clearing any accumulated microorganisms or wastewater debris from the interior surfaces 196 of the housings 76, or for dislodging the overabundance of microorganisms from the media 110. The ultrasonic apparatus is controlled by the controller 40 and is capable of operating at a plurality of frequency levels. For example, the ultrasonic apparatus may operate at a relatively low frequency and at a relatively high frequency. Operation of the ultrasonic apparatus at the low frequency may cause movement of the media 110 for purposes of wiping the interior surfaces 196 of the housings 76, but be sufficiently low not to dislodge microorganisms from the media 110. Operation of the ultrasonic apparatus at the high frequency may cause significant or more turbulent movement of the media 110 for purposes of dislodging microorganisms from the media 110. However, operation of the ultrasonic apparatus at the high frequency does not damage the microorganisms. For example, the ultrasonic apparatus may operate at the low frequency between a range of about 40 KHz to about 72 KHz and may operate at the high frequency between a range of about 104 KHz to about 400 KHz. These frequency ranges are exemplary ranges only and are not intended to be limiting. Thus, the ultrasonic apparatus is capable of operating at various other frequencies. The wastewater treatment system 20 may include a single ultrasonic apparatus for moving the media 110 in all of the containers 32, the system 20 may include a separate ultrasonic apparatus for each of the containers 32, or the system 20 may include any number of ultrasonic apparatuses for moving media 110 in any number of containers 32.

In other embodiments, the wastewater treatment system 20 includes other types of devices that are capable of moving the media 110 and/or the frames 108 in order to cause wiping of the media 110 against the interior surfaces 196 of the containers 32 and dislodge the microorganisms from the media 110. For example, the wastewater treatment system 20 may include a linear translator that moves the frames 108 and media 110 in an up and down linear manner In such an example, the linear translator is operated in at least two speeds including a slow speed, in which the frames 108 and media 110 are translated at a sufficient rate to cause the media 110 to wipe against the interior surfaces 196 and not cause the microorganisms to be dislodged from the media 110, and a fast speed, in which the frames 108 and media 110 are translated at a sufficient rate to dislodge the microorganisms from the media 110 without damaging the media 110. The wastewater treatment system 20 may include a single linear translator for moving the media 110 in all of the containers 32, the system 20 may include a separate linear translator for each of the containers 32, or the system 20 may include any number of linear translators for moving media 110 in any number of containers 32. As another example, the wastewater treatment system 20 may include a vibrating device that vibrates the frames 108 and media 110, and is operated in at least two speeds including a slow speed, in which the frames 108 and media 110 are sufficiently vibrated to wipe against the interior surfaces 196 and microorganisms are not dislodged from the media 110, and a fast speed, in which the frames 108 and media 110 are sufficiently vibrated to dislodge the microorganisms from the media 110. The wastewater treatment system 20 may include a single vibrating device for moving the media 110 in all of the containers 32, the system 20 may include a separate vibrating device for each of the containers 32, or the system 20 may include any number of vibrating devices for moving media 110 in any number of containers 32.

In yet other embodiments, the wastewater treatment system 20 is capable of utilizing the gas management system 24 to move the media 110 and/or the frames 108 in order to cause wiping of the media 110 against the interior surfaces 196 of the containers 32 and dislodge the microorganisms from the media 110. In such embodiments, the gas management system 24 is controllable by the controller 40 to release oxygen and accompanying gases into the containers 32 in at least three manners. The first manner includes a relatively low release of gas in both amount and rate into the containers 32. Gas is released in this first manner during periods of time when normal wastewater treatment is desired. The second manner includes a moderate release of gas into the containers 32. Gas is released in this second manner when sufficient movement of the media 110 is desired to cause the media 110 to wipe against the interior surfaces 196 of the housings 76, but not cause the microorganisms to dislodge from the media 110. The third manner includes a high or turbulent release of gas into the containers 32. Gas is released in this third manner when sufficient movement of the media 110 is desired to dislodge the microorganisms from the media 110.

Referring again to FIG. 81, operation of the flushing system 38 will be described. As indicated above, the flushing system 38 assists with removal of the microorganisms from the media 110. The flushing system 38 may be activated either when the container 32 is full of wastewater or after the wastewater has been exhausted from the container 32. When desired, the controller 40 activates the spray nozzles 43 to spray pressurized water from the nozzles 43 and into the container 32. The spray nozzles 43 may be operable to spray water at a pressure of about 20 psi. Alternatively, the spray nozzles 43 may spray water at a pressure between about 5 psi and about 35 psi. The pressurized water sprays onto the media 110 and removes the microorganisms from the media 110. In some embodiments, the frame 108 and media 110 may be rotated while the spray nozzles 43 are spraying the pressurized water. Rotation of the frame 108 and media 110 moves all of the media 110 within the container 32 in front of the spray nozzles 43 to provide an opportunity for removing the microorganisms from all the media 110 and not just the media 110 immediately in front of the spray nozzles 43.

The flushing system 38 may be utilized in other manners such as, for example, to clean the interior of the container 32 in the event an invasive species or other contaminant has infiltrated the container 32. For example, the container 32 may be drained of any wastewater and microorganisms present therein, the flushing system 38 may be activated to spray water into the container 32 until the container 32 is filled with water, the pH of the water is raised to about 12 or 13 on the pH scale by using sodium hydroxite or other substance to ultimately kill any invasive species or other contaminant in the container 32, the frame 108 and media 110 are rotated in one or both directions to create turbulence in the container 32 and wipe against the inside of the container 32, and then the container 32 is drained. These steps may be repeated until all invasive species or contaminants are eradicated. Next, the flushing system 38 rinses the container 32 by introducing clean water into the container 32 until it is adequately filled, the frame 108 and media 110 are again rotated to create turbulence and wipe against the interior of the container 32, the pH of the water is checked, and the water is drained. The container 32 is ready to be reused for wastewater treatment when the container 32 can maintain a pH of about 6.5 to about 8.5. The container 32 may require rinsing several times to achieve a desired pH. In this exemplary operation of the flushing system 38, the container 32 is cleaned without disassembling the container 32 or other components of the system 20, thereby saving time in the event the container 32 is contaminated. In other exemplary embodiments, other pHs may be desirable depending on the specie of microorganism within the container 32.

In other exemplary embodiments, the flushing system 38 may not include the plurality of spray nozzles and instead may include one or more water inlets to introduce water into the container 32 for cleaning and rinsing purposes.

In yet other exemplary embodiments, the wastewater inlet pipe 56 and wastewater inlet 96 already present in the container 32 may be used for introducing water into the container 32 for cleaning and rinsing purposes.

No matter the manner used to dislodge the microorganisms from the media 110, the wastewater treatment system 20 is capable of removing the mixture of wastewater and dislodged microorganisms from the containers 32. To do so, the controller 40 activates the liquid management system 28 to pump the combination of wastewater and microorganisms from the containers 32 via the wastewater outlets 100. Alternatively, wastewater may be drained through opening 88 in the bottom of the container 32. From either or both the opening 88 and/or the wastewater outlets 100, the wastewater and microorganisms are transported downstream via pipes for further treatment. An initial step of post-container 32 treatment may include separating the microorganisms from the wastewater with a settling tank. Additional treatment steps may include solids removal, disinfection processes (e.g., ozonation, ultraviolet radiation, etc.), etc. After removal of the wastewater and microorganism combination from the containers 32, the wastewater treatment system 20 may initiate another wastewater treatment process by introducing new wastewater into the containers 32.

The above described wastewater treatment process may be considered a cycled treatment process. Cycled may be characterized by completely filling the containers 32 with wastewater, running a complete treatment cycle within the containers 32, and completely or substantially draining the treated wastewater from the containers 32. In some embodiments, the wastewater treatment system 20 may perform other types of processes such as, for example, a continuous wastewater treatment process. The continuous process is similar in many ways to the cycled wastewater treatment process, but has some differences that will be described herein. In a continuous process, the containers 32 are not completely drained to remove the wastewater and microorganism combination. Instead, a portion of the wastewater and microorganisms are continuously, substantially continuously, or periodically siphoned or expelled from the containers 32. In some embodiments, the controller 40 controls the liquid management system 28 to add a sufficient amount of wastewater into the containers 32 through inlets 56 to cause the wastewater level within the containers 32 to rise above the outlets 60 in the containers 32. Wastewater and the microorganisms contained within the wastewater are naturally expelled through the outlets 60 and travel downstream for processing. Introducing sufficient wastewater to cause this overflow of wastewater and microorganisms through the outlets 60 may occur at desired increments or may occur continuously (i.e., the wastewater level is always sufficiently high to cause overflow through outlets 60 in the containers 32). In other embodiments, the controller 40 controls the liquid management system 28 to remove a portion of the wastewater and microorganism combination from the containers 32 and introduce a quantity of wastewater into the containers 32 substantially equal to the amount removed in order to replace the removed wastewater. This removal and replenishment of wastewater may occur at particular desired increments or may occur continuously. Other manners of controlling the system may be implemented to continuously treat wastewater. Operation of the wastewater treatment system 20 in any of these continuous manners decreases wastewater treatment downtime experienced when all the wastewater and microorganisms are removed from the containers 32 as occurs in the cycled process. In the continuous processes, wastewater is always present in the containers 32 and microorganisms are continuously treating the wastewater. In some embodiments, the frames 108 and media 110 are rotated at a relatively high speed at desired increments to introduce the microorganisms into the wastewater so that the microorganisms may be expelled from the containers 32 either in an overflow manner or in an incremental removal manner, both of which are described above.

No matter the manner or process used to treat wastewater within the containers 32, the wastewater within the containers 32 may be filtered during the treatment process to remove unwanted elements from the wastewater. High levels of unwanted elements in the wastewater are detrimental to wastewater treatment. Accordingly, removal of the unwanted elements from the wastewater improves wastewater treatment.

Unwanted elements may be removed from the wastewater in a variety of manners. One exemplary manner includes removing wastewater from the containers 32, filtering the unwanted elements from the wastewater, and returning the wastewater to the containers 32. The system 20 of the present invention facilitates wastewater filtration for purposes of removing unwanted elements. As indicated above, a large quantity of the microorganisms present in the containers 32 rest upon or are adhered to the media 110, thereby resulting in a small quantity of microorganisms suspended in the wastewater. With small quantities of microorganisms suspended in the wastewater, the wastewater may easily be removed from the containers 32 without having to filter large quantities of microorganisms from the wastewater, thereby minimizing the potential for loosing, wasting, or prematurely removing microorganisms during the filtration process. Also, with a large quantity of the microorganisms resting on or adhered to the media 110, the microorganisms remain in the container 32 to continue wastewater treatment while the wastewater is being removed, filtered, and reintroduced into the container 32. It should be understood that this exemplary manner of wastewater filtration is only one of many manners possible for filtering unwanted elements from wastewater and is not intended to be limiting. Accordingly, other manners of wastewater filtration are within the intended spirit and scope of the present invention.

Referring now to FIGS. 108-119, another exemplary embodiment of a container 32 is illustrated. In this illustrated exemplary embodiment, the container 32 is substantially larger than other disclosed containers 32. For example, this illustrated container may be about 125 feet in diameter, about 30 feet high and may contain up to about 2,750,214 gallons of wastewater. Alternatively, this illustrated container 32 may be other sizes and be within the spirit and scope of the present invention. This container 32 may be positioned above ground, below ground, or have a top surface level with the ground.

Figure 108:
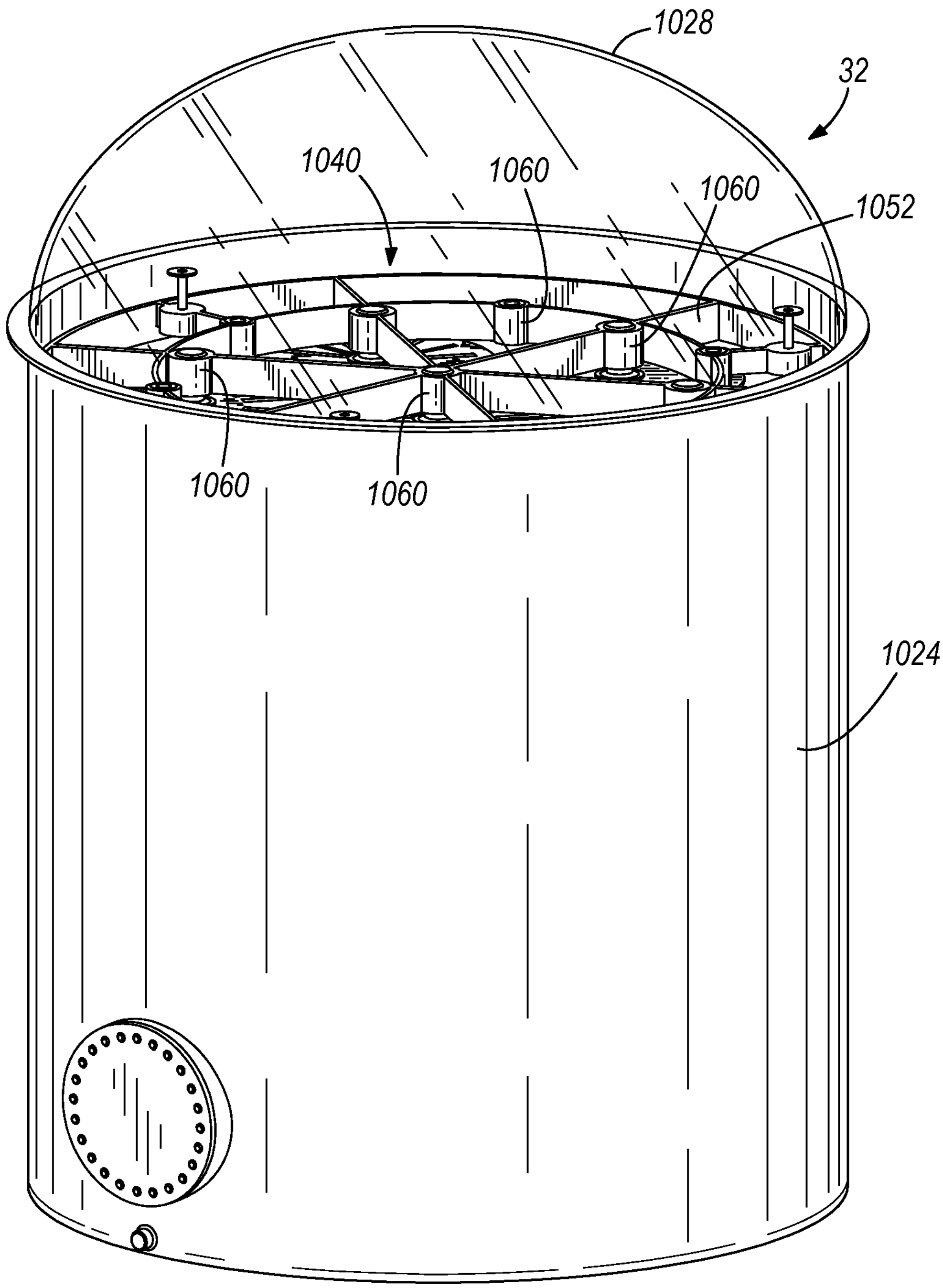
FIG. 108 is a top perspective view of another exemplary container.
Figure 109:
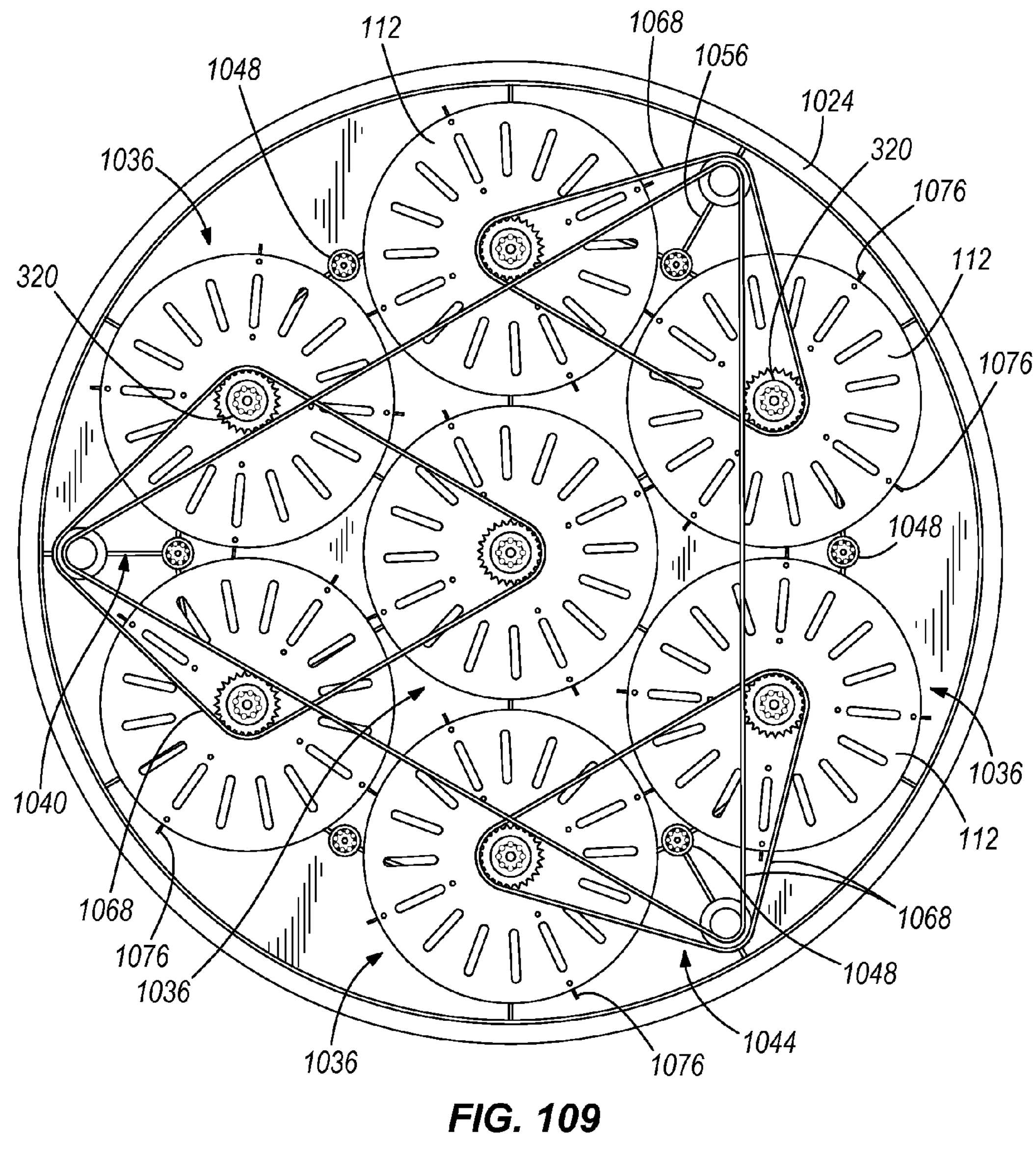
FIG. 109 is a top view of the container shown in FIG. 108, shown with a cover and a portion of a support structure removed.

With particular reference to FIGS. 108 and 109, container 32 includes a housing 1024, a cover 1028, a base 1032, a plurality of rotatable frames 1036, support structure 1040 disposed in the housing 1024 for supporting frames 1036, a drive mechanism 1044 for rotating frames 1036 in both clockwise and counter clockwise directions, and a plurality of light elements 356. In the illustrated exemplary embodiment, housing 1024 is made of an opaque material and light is provided into the container 32 through the transparent or translucent cover 1028 and by artificial light sources such as light elements 356 (described in greater detail below). Alternatively, cover 1028 may be made of an opaque material and light may be provided to the interior of the container 32 solely by artificial light. In some exemplary embodiments, housing 1024 may be made of a transparent or translucent material to allow light to penetrate there through and into the interior of the container 32. In other exemplary embodiments, the container 32 may not include light elements and the cover 1028 may be opaque, thereby eliminating the presence or introduction of light into the container 32. Such embodiments of the container 32 may treat wastewater with organisms not requiring light.

Support structure 1040 includes an upper support member 1052 and a lower support member 1056, both of which are coupled to the housing 1024 and provide support to the rotatable frames 1036. Upper and lower support members 1052, 1056 each provide a plurality of couplings 1060 that respectively couple to upper and lower portions of the frames 1036 and independent light elements 356.

Figure 110:
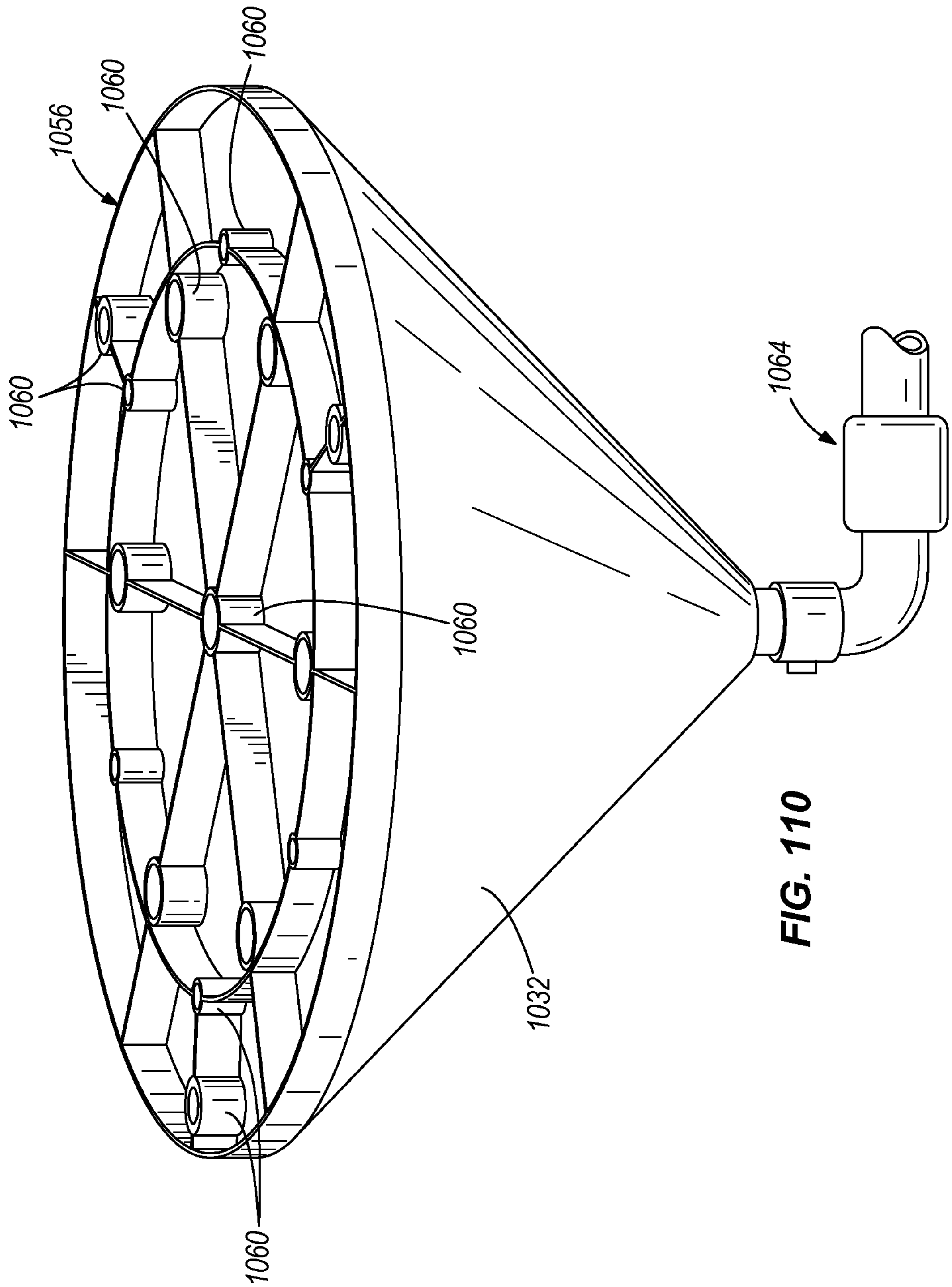
FIG. 110 is a top perspective view of a portion of the container shown in FIG. 108.

Referring to FIG. 110, base 1032 is disposed below lower support member 1056 and is capable of receiving microorganisms, debris, and wastewater that move into it for purposes of transferring microorganisms, debris, and wastewater from the container 32 to downstream processing. In the illustrated exemplary embodiment, a single large base 1032 is positioned below the container 32 to receive all microorganisms, debris, and wastewater within the container 32. Alternatively, multiple smaller bases may be disposed below the container to receive microorganisms, debris, and wastewater within the container. In such an embodiment, for example, one base may be positioned below each rotatable frame to receive microorganisms, debris, and wastewater falling from its respective frame. It should be understood that the container may include any number of bases and be within the spirit and scope of the present invention. Plumbing 1064 is coupled to the base 1032 and performs similarly to other plumbing disclosed herein. For example, plumbing 1064 may create a suction pressure to assist with removal of microorganisms, debris, and wastewater from the container 32.

With particular reference to FIG. 109, cover 1028 and upper support member 1052 have been removed for clarity and the plurality of frames 1036 and drive mechanism 1044 can be seen. In the illustrated exemplary embodiment, container 32 includes seven frames 1036 and drive mechanism 1044 includes a plurality of belts or chains 1068 coupled to the seven frames 1036 to drive the frames 1036 in either direction. It should be understood that container 32 may include other quantities of frames 1036 and the drive mechanism 1044 may include other configurations of belts and chains 1068 and still be within the intended spirit and scope of the present invention. Also, in the illustrated exemplary embodiment, container 32 includes six independent light elements 356 disposed in spaces between rotatable frames 1036. Light elements 356 provide additional artificial light to the interior of the container 32. It should be understood that container 32 may include other quantities of light elements 356, including zero, and still be within the intended spirit and scope of the present invention. It should also be understood that the light elements 356 may be any of the types of light elements 356 disclosed herein or other types of light elements within the spirit and scope of the present invention.

Figure 112:
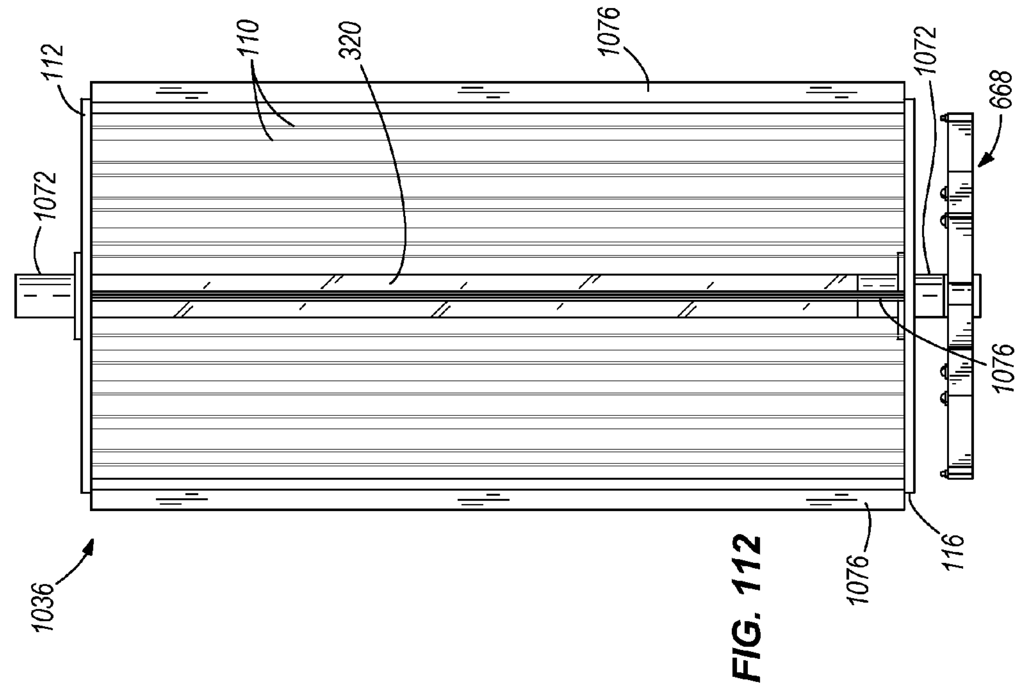
FIG. 112 is an elevation view of the media frame shown in FIG. 111.
Figure 111:
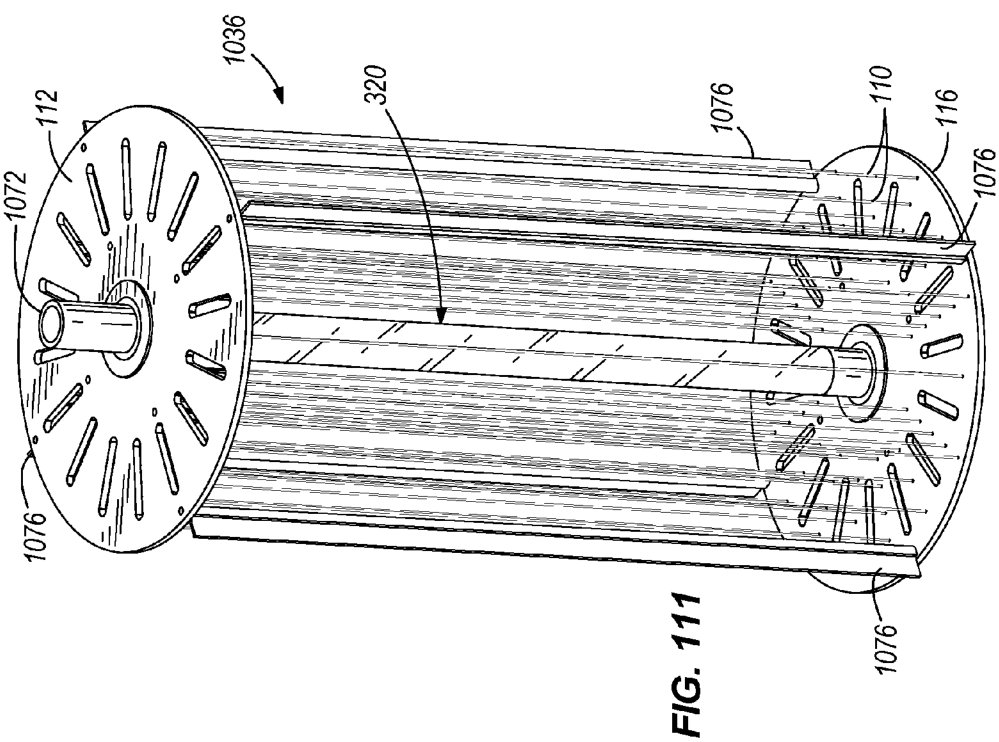
FIG. 111 is a top perspective view of a media frame of the container shown in FIG. 108.

Referring now to FIGS. 109, 111, and 112, rotatable frames 1036 will be described. Plurality of frames 1036 are substantially the same and, for the sake of brevity, only a single frame 1036 will be described herein. Each frame 1036 includes upper and lower connector plates 112, 116, media 110 connected to and extending between upper and lower connector plates 112, 116, a center lighting tube 320, a bottom support 668, upper and lower couplings 1072, and a plurality of wipers 1076.

In the illustrated exemplary embodiment, media 110 is represented in a simplified manner. Media 110 may be any type of media 110 disclosed herein or other types of media within the spirit and scope of the present invention. Also, in the illustrated exemplary embodiment, a center tube 320 is disposed at the center of the frame 1036 for emitting artificial light from a center of the frame 1036. It should be understood that any of the artificial lighting manners disclosed herein or other types of artificial lighting manners within the spirit and scope of the present invention may be positioned within the center tube 320 to emit artificial light. It should also be understood that a light element 356 may be disposed at a center of the frame 1036 rather than a center tube 320 and such light element 356 may be any of the types of light elements 356 disclosed herein or other types of light elements within the spirit and scope of the present invention.

With particular reference to FIG. 112, bottom support 668 has similarities to bottom support 668 described above. In this illustrated exemplary embodiment of the bottom support 668, bottom support 668 includes a central receptacle 608, a plurality of arms 612 extending from the central receptacle 608, and a plurality of roller devices 616 supported by the arms 612. Center tube 320 is rigidly secured to the central receptacle 608 to inhibit movement between the tube 320 and the receptacle 608. Drainage of the wastewater from the container 32 may cause frame 1036 to lower in the container 32 until the lower connector plate 116 rests upon the roller devices 616. If rotation of the frame 1036 is desired after wastewater has been drained from the container 32, the roller devices 616 facilitate such rotation. The bottom support 668 may be made of stainless steel or other relatively dense material to provide the bottom support 668 with a relatively heavy weight, which counteracts buoyant forces exerted upwardly to the frame 1036 when the container 32 is filled with wastewater.

Upper and lower couplings 1060 of the frame respectively couple with couplings defined in the upper and lower support members 1052, 1056. Couplings 1052, 1056, 1060 may interact in a press-fit or interference-fit manner, a positive locking manner, a bonding manner such as, for example, welding, adhering, etc., or any other type of appropriate manner.

Referring now to FIGS. 109, 111, and 112, wipers 1076 are connected to and extend between upper and lower connector plates 112, 116. Wipers 1076 extend beyond the outer circumference of upper and lower connector plates 112, 116 and are oriented to engage and wipe the exterior of independent light elements 356 in order to maintain the exterior free or substantially free of microorganisms and debris. In the illustrated exemplary embodiment, each frame 1036 includes four wipers 1076. Alternatively, each frame 1036 may include any number of wipers 1076 and be within the spirit and scope of the present invention. Wipers 1076 are made of a flexible material that allows deformation when contacting the light elements 356, but allows wipers 1076 to return to their original state when they disengage the light elements 356. Exemplary wiper materials include, but are not limited to, vinyl, plastic, rubber, metal screen, composites of flexible materials, rubberized and/or chemically treated canvas, etc.

Figure 113:
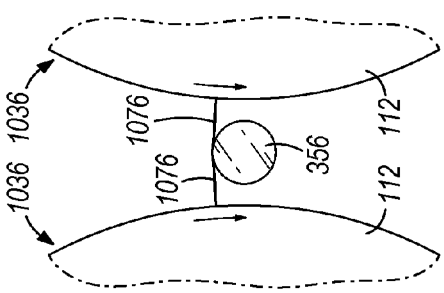
FIG. 113 is an enlarged top view of a portion of the container shown in FIG. 108, this view shows a light element and a pair of wipers in a first position.
Figure 114:
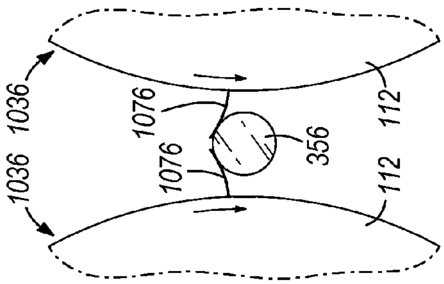
FIG. 114 is an enlarged top view similar to the top view of FIG. 113 showing the light element and the pair of wipers in a second position.
Figure 115:
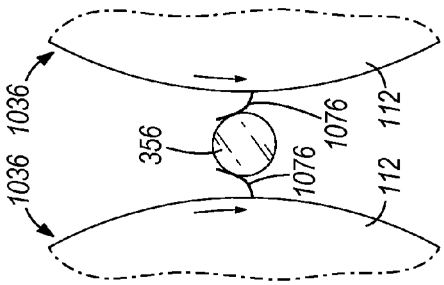
FIG. 115 is an enlarged top view similar to the top view of FIG. 113 showing the light element and the pair of wipers in a third position.
Figure 116:
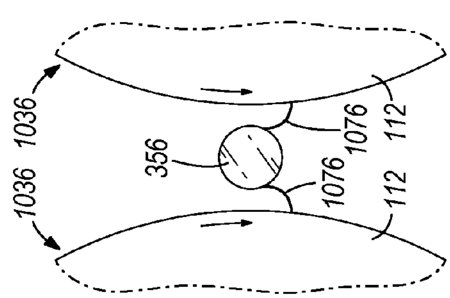
FIG. 116 is an enlarged top view similar to the top view of FIG. 113 showing the light element and the pair of wipers in a fourth position.
Figure 117:
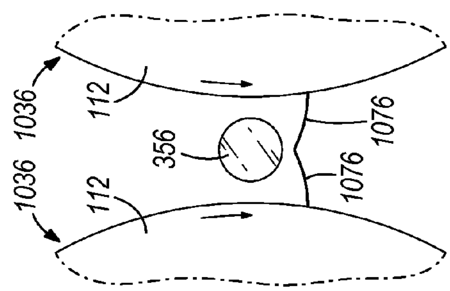
FIG. 117 is an enlarged top view similar to the top view of FIG. 113 showing the light element and the pair of wipers in a fifth position.
Figure 118:
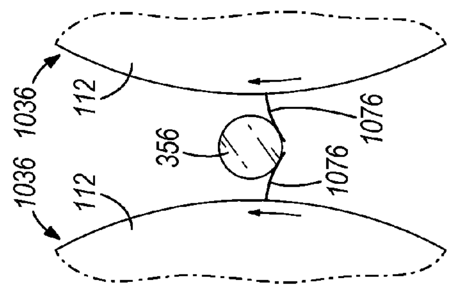
FIG. 118 is an enlarged top view similar to the top view of FIG. 113 showing the light element and the pair of wipers in a sixth position.
Figure 119:
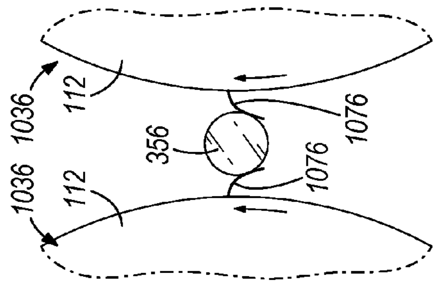
FIG. 119 is an enlarged top view similar to the top view of FIG. 113 showing the light element and the pair of wipers in a seventh position.

With reference to FIGS. 113-119, an exemplary process of wiping a light element 356 is shown at various stages throughout the process. FIG. 113 shows two adjacent frames 1036 rotating toward a light element 356 (left frame 1036 rotating clockwise and right frame 1036 rotating counterclockwise) and the frames' respective wipers 1076 initiating contact with a surface of the light element 356. FIG. 114 shows the frames 1036 advancing through their rotation and wipers 1076 also advancing to begin wiping the light element 356. FIG. 115 shows further advancement of the frames 1036 and further wiping of the light element 356 by the wipers 1076. FIG. 116 shows yet further advancement of the frames 1036 and further wiping of the light element 356 by the wipers 1076. In FIG. 116, wipers 1076 have reached a point where they are almost ready to disengage light element 356 and complete their wiping of the light element 356 with the frames 1036 rotating in this first direction. From FIGS. 113-116, it can be seen that wipers 1076 wipe more than 180 degrees around the circumference of the light element 356. FIG. 117 shows the wipers 1076 after they have disengaged light element 356. As indicated above, drive mechanism 1044 may rotate frames 1036 in both directions. Thus, with reference to FIG. 118, the frames 1036 are shown rotating in opposite directions to that illustrated in FIGS. 113-117 (left frame 1036 now rotating counterclockwise and right frame 1036 now rotating clockwise). FIG. 118 shows the same two wipers 1076 engaging an opposite surface to that engaged in FIG. 113 and beginning to wipe the opposite surface. FIG. 119 shows further advancement of the frames 1036 and further wiping of the light element 356 by the wipers 1076. Frames 1036 continue rotating and wipers 1076 continue wiping in a manner similar to that shown in FIGS. 116 and 117, just in an opposite direction. FIGS. 113-119 illustrate that all 360 degrees of the circumference of the light element 356 is wiped when rotating frames 1036 and wipers 1076 in the above described manner. Thus, the entire circumference of light element 356 may be cleared of microorganisms and/or debris during a wastewater treatment process in order to optimize emission of light from the light element 356.

Figure 120:
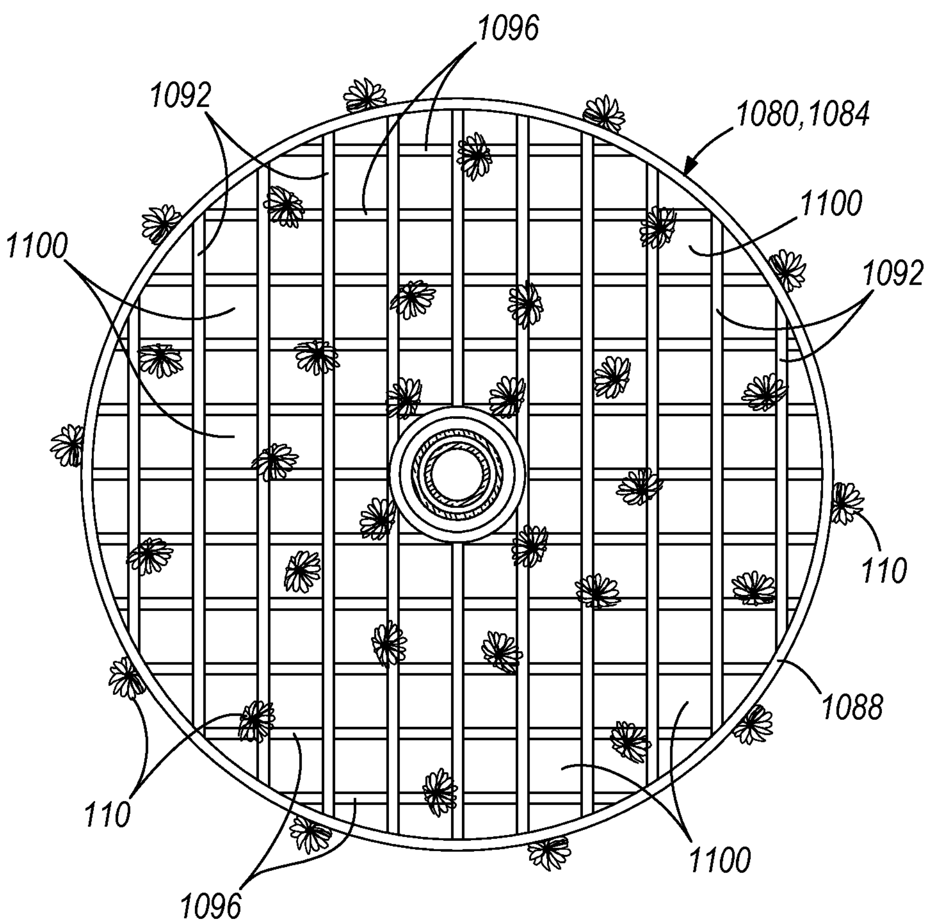
Figure 121:
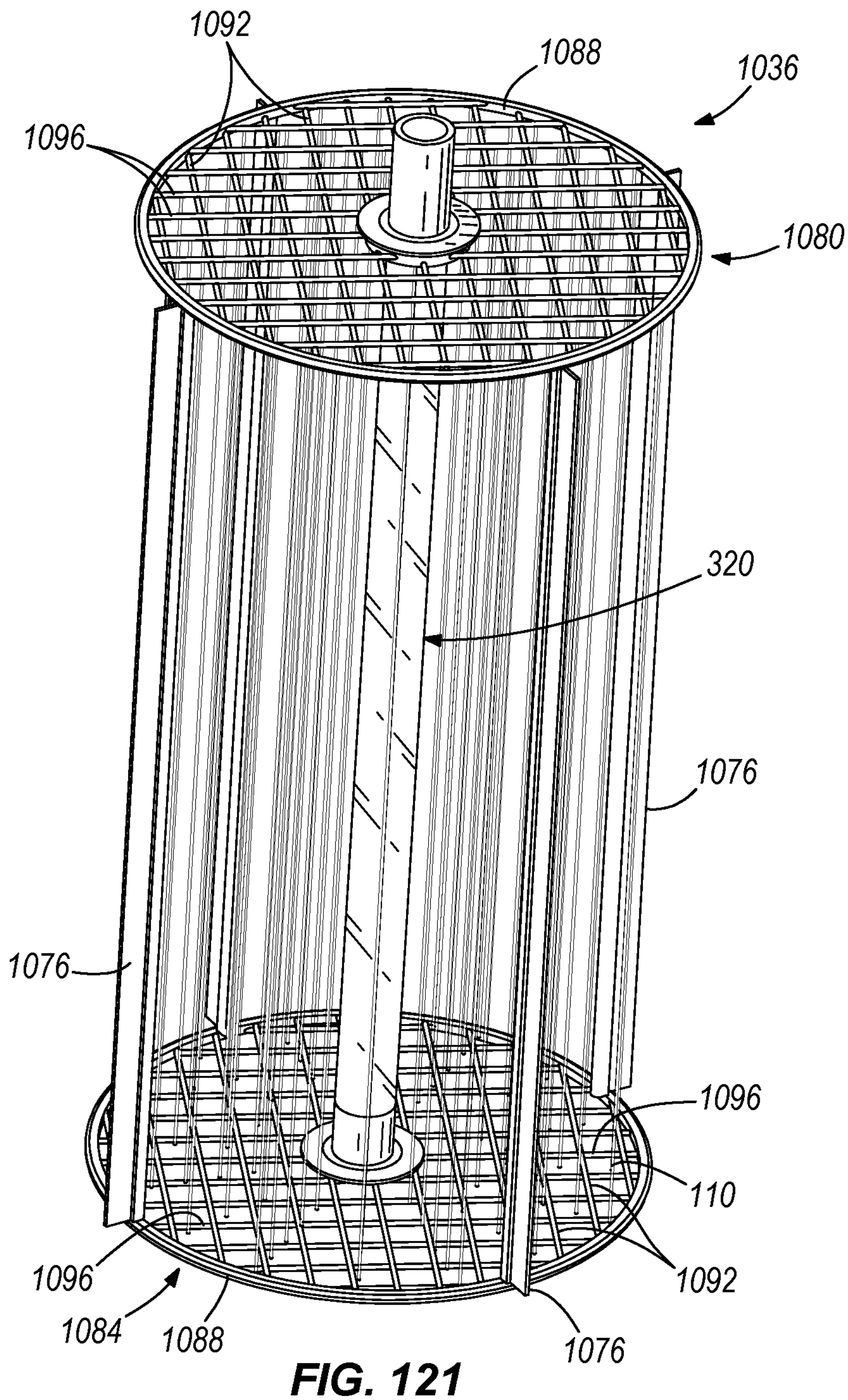

Referring now to FIGS. 120 and 121, another exemplary embodiment of a frame 1036 and connector plates 1080, 1084 are shown. Components similar between the other frames and connector plates described herein and the frame 1036 and connector plates 1080, 1084 illustrated in FIGS. 120 and 121 may be identified with the same reference numbers or may be identified with different reference numbers.

In the illustrated exemplary embodiment, the frame 1036 includes upper and lower connector plates 1080, 1084 of a mesh-type configuration. Since the upper and lower mesh connector plates 1080, 1084 are substantially the same, only one will be described in detail herein. More particularly, the mesh connector plate 1080, 1084 includes an outer circular rim 1088, a plurality of first cross members 1092, and a plurality of second cross members 1096. The first and second cross members 1092, 1096 are substantially perpendicular to each other and cross each other in the manner illustrated. In this manner, a plurality of openings 1100 are defined in the connector plate 1080, 1084. Such openings 1100 allow light from above and below the connector plate 1080, 1084 (depending on whether the connector plate is the upper or lower connector plate) to pass through the connector plate 1080, 1084 and enter the container 32. Other connector plates having less or no openings and more solid material may block light originating from above or below the connector plate and such blocked light would not enter the container. Including mesh connector plates 1080, 1084 is particularly important when light required for the wastewater treatment process originates from above or below the container 32. In the particular illustrated embodiment of the container 32, natural sunlight enters container 32 through the cover 1028 and is able to penetrate past the upper mesh connector plate 1080 and into the container 32. The illustrated exemplary embodiment of the mesh connector plate 1080, 1084 is only one of many configurations of connector plates including openings therethrough to allow light to penetrate through the connector plates. Many other mesh connector plate configurations are possible and are within the intended spirit and scope of the present invention.

It should be understood that a mesh connector plate 1080, 1084 may be utilized with any of the other frames and containers disclosed herein.

It should also be understood that, while not illustrated, frames 1036 may include a float device for providing the frames 1036 with buoyancy and that any of the float devices disclosed herein or any other float devices within the spirit and scope of the present invention may be incorporated with the frames.

It should further be understood that, while the container 32 illustrated in FIGS. 113-119 is substantially larger than other containers disclosed herein, the container 32 illustrated in FIGS. 113-119 may be controlled and operated in all of the manners disclosed herein for treating wastewater. For example, frames 1036 may be rotated at various speeds, wastewater and microorganisms may be introduced and expelled in similar manners, light elements 356 and center lighting tubes 320 may be similar to other light elements and center lighting tubes disclosed herein, types of media 110 included in this container 32 may be similar to other types of media disclosed herein, all types of microorganisms may be used in this container 32 to treat wastewater, this container 32 may include similar gas and liquid management systems 24, 28 as the others disclosed herein, this container 32 may include similar control systems to the others disclosed herein, etc.

With reference to FIG. 122, operation of the controller 40 with the gas management system 24, liquid management system 28, the container 32, the artificial light system 37, and the ECD 428 will be described. The system 20 includes a light sensor 314, such as, for example, digital light sensor model number TSL2550 manufactured by Texas Instruments, Inc., capable of sensing the amount of light contacting the container 32 and/or amount of light in the environment surrounding the container 32. That is, the sensor 314 can identify whether the container 32 is receiving a significant amount of light (e.g., a sunny day in the summer), a small amount of light (e.g., early in the day, late in the day, cloudy, etc.), or no light (e.g., after sunset or nighttime). The sensor 314 sends a first signal to the motor control 302, which controls the motor 224 of the container 32 to rotate the frame 108 and media 110 dependent on the amount of light received by the container 32. For example, if the container 32 is receiving a significant amount of light, it is desirable to rotate the frame 108 and media 110 at a relatively high rate (but not at a rate that dislodges the microorganisms from the media 110), and if the container 32 is receiving a low amount of light, it is desirable to rotate the frame 108 and media 110 at a relatively slow rate in order to provide the microorganisms in the container 32 more time to absorb the light. In addition, the sensor 314 sends a second signal to the artificial light control 300, which communicates and cooperates with the ECD control 313 to control the artificial light system 37 and the ECD 428 as necessary to provide a desired amount of light 37, 72 to the container 32. For example, the artificial light system 37 and the ECD 428 may cooperate to activate the light source 41 of the artificial light system 37 and/or the light source 41 of the ECD 428, thereby emitting a desired amount of light onto the container 32 and microorganisms. In low light or no light conditions, it may be desirable to activate the artificial light system 37 and/or the ECD light source 41 to emit light onto the container 32 and microorganisms therein in order to promote the light phase of photosynthesis in times when the light phase may not be naturally occurring due to the lack of natural sunlight 72. Also, for example, in instances where the ambient temperature may be elevated and direct sunlight 72 is not desired due to the resulting rise in temperature, the first and second members 436, 440 of the ECD 428 may be fully closed and one or more of the light sources 41 may be activated to provide a desired quantity of light. Further, for example, the ECD control 313 may control the positions of the first and second members 436, 440 by communicating with the ECD motor 432 to selectively control the exposure of the container 32 to exterior elements (i.e., sunlight and ambient temperature).

With continued reference to FIG. 122, the operational timer 304 of the motor control 302 determines when and how long the motor 224 is activated and deactivated during the wastewater treatment process occurring in the container 32. For example, the operational timer 304 determines the rate at which the frame 108 and media 110 will rotate in order to treat wastewater in the container 32. The removal timer 306 determines when and how long the motor 224 will rotate the frame 108 and media 110 to dislodge microorganisms and/or wastewater debris from the media 110. The removal timer 306 also determines the rate of rotation of the frame 108 and media 110 during the process of dislodging microorganisms and/or debris. A temperature sensor 316 is disposed within the container 32 to determine the temperature of the wastewater within the container 32 and an ambient temperature sensor 480 is disposed externally of the container 32 to determine the temperature outside of the container 32. As indicated above, proper wastewater temperature may be an important factor for effective wastewater treatment. The wastewater temperature identified by the temperature sensor 316 and the ambient temperature identified by the ambient temperature sensor 480 are sent to the temperature control 308, which communicates and cooperates with the ECD control 313 to control the temperature control system 45 and/or the ECD 428 as necessary to properly control the wastewater temperature within the container 32. The liquid control 310 controls the liquid management system 28, which controls introduction and exhaustion of wastewater into and from the container 32. The gas control 312 controls the gas management system 24, which controls introduction and exhaustion of gas into and from the container 32.

The pH of the wastewater is also an important factor for effectively treating wastewater. Different types of microorganisms and wastewater demand different pH's for effective treatment. The system 20 includes a pH sensor 484 that identifies the pH of the wastewater within the container 32 and communicates the identified pH to the liquid control 310. If the pH is at a proper level for wastewater treatment within the container 32, the liquid control 310 takes no action. If, on the other hand, the pH of the wastewater is at an undesired level, the liquid control 310 communicates with the liquid management system 28 to take the necessary actions to adjust the pH of the wastewater to the appropriate level. In some exemplary embodiments, the pH sensor 484 may be disposed in external piping through which wastewater is diverted from the container 32 (see FIG. 84). In other exemplary embodiments, the pH sensor 484 may be disposed in the container 32. The pH sensor 484 may be a wide variety of types of sensors. In some exemplary embodiments, the pH sensor 484 may be an ion selective electrode and electrically coupled with the liquid control 310, and the system 20 may include an acid pump, a caustic pump, an acid tank containing acid, and a caustic tank containing caustic. In such embodiments, the caustic pump is activated to pump caustic into the container 32 when the pH level drops below a desired level to raise the pH level to the desired level, and the acid pump is activated to pump acid into the container 32 when the pH level rises above a desired level to lower the pH level to the desired level. In other exemplary embodiments, the pH sensor 484 may be in electrical communication with the gas management system 24 and an appropriate gas may be introduced and/or expelled from the container 32 to affect the pH of the wastewater within the container 32.

Referring now to FIGS. 123-126, the containers 32 are capable of having a variety of different shapes such as, for example, square, rectangular, triangular, oval, or any other polygonal or arcuately-perimetered shape and having complimentarily shaped components to cooperate with the shape of the containers 32. Containers 32 having these or other shapes are capable of performing in the same manners as the round containers 32 described herein. In addition, the frames 108 and media 110 are movable to wipe the interior surfaces 196 of the housings 76 and dislodge microorganisms from the media 110. For example, the frames 108 and media 110 may be moved back-and-forth along a linear path to wipe the interior surfaces 196 and dislodge microorganisms from the media 110. Such linear movement may be parallel to the longitudinal axis of the containers 32 (i.e., up and down), perpendicular to the longitudinal axis (i.e., right to left), or some other angle relative to the longitudinal axis of the containers 32. Movement of the frames 108 and media 110 in these manners may be performed by a DC cycling motor capable of switching polarity during the cycle in order to provide the back-and-forth movement. Alternatively, a motor may be connected to a mechanical linkage that facilitates the back-and-forth movement.

Figure 128:
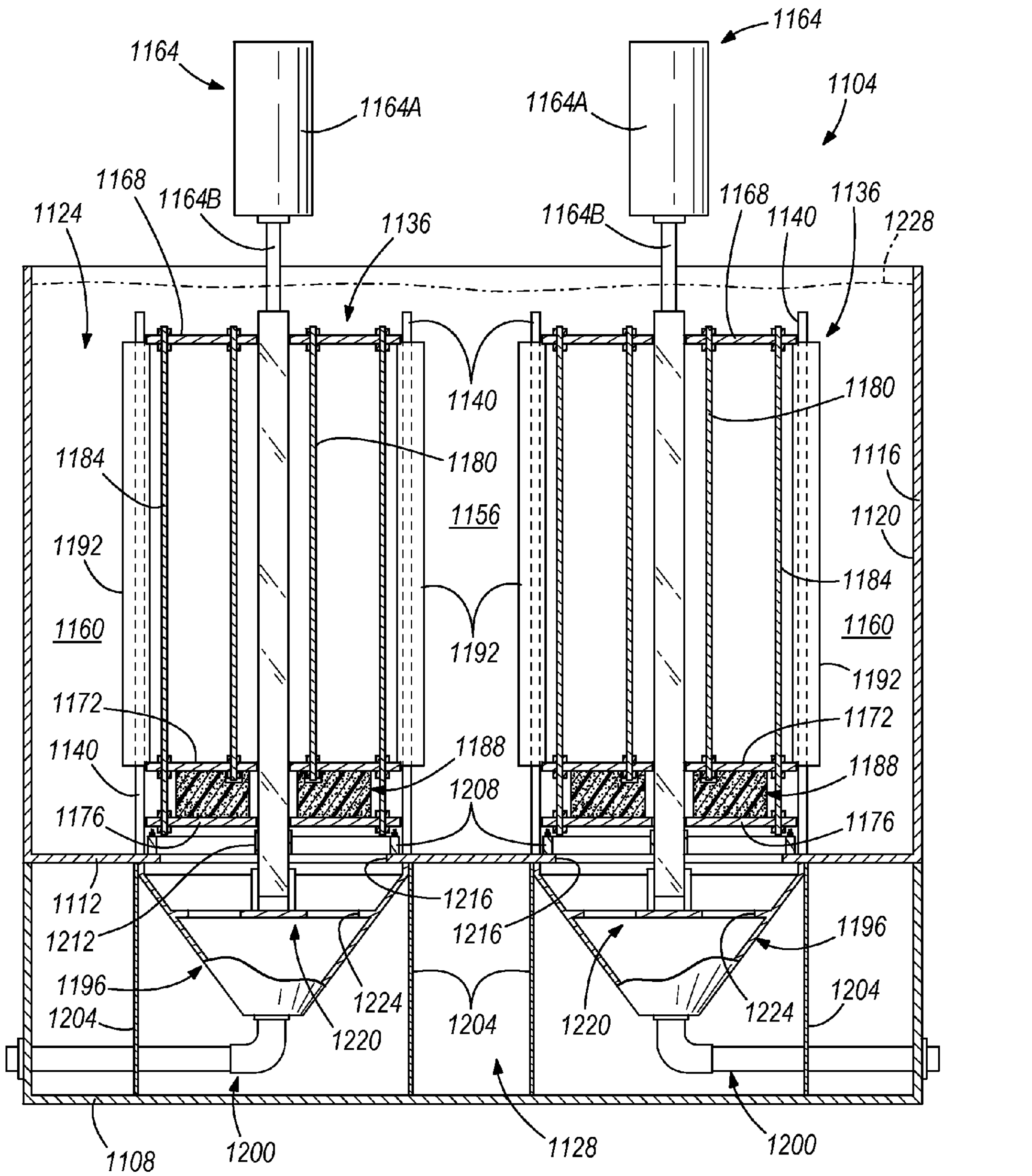

Referring now to FIGS. 127 and 128, another exemplary wastewater treatment system 1104 is illustrated. The illustrated system 1104 is commonly referred to in the industry as a raceway 1104 and will be referenced in this manner herein.

The raceway 1104 includes a first floor 1108, a second floor 1112, and a container or retaining wall 1116. First floor 1108 is the lowest floor in the raceway 1104 that typically engages a floor or ground surface. Second floor 1112 is spaced upward from the first floor 1108 and oriented generally parallel to the first floor 1108. Retaining wall 1116 extends generally vertical and is generally perpendicular to the first and second floors 1108, 1112. First and second floors 1108, 1112 also engage an inner surface 1120 of the retaining wall 1116 to define an upper cavity 1124 above the second floor 1112 and a lower cavity 1128 below the second floor 1112. Upper and lower cavities 1124, 1128 are separate and independent of each other and, therefore, liquid is not transferable from one cavity to the other. In other exemplary embodiments, the upper and lower cavities 1124, 1128 may be fluidly connected such that wastewater may flow from one cavity to the other. Wastewater may be disposed in one or both of the upper and lower cavities 1124, 1128. Microorganisms used to treat wastewater are positioned in the upper cavity 1124 while the lower cavity 1128 may be used to assist with removal of the microorganisms (described in greater detail below).

In the illustrated exemplary embodiment, raceway 1104 includes two sections, a right section 1104A and a left section 1104B. Alternatively, the raceway 1104 may include any number of sections, including one, and be within the spirit and scope of the present invention. The illustrated shape and configuration of the raceway 1104 in FIGS. 127 and 128 is for exemplary purposes and is not intended to be limiting. Raceway 1104 is capable of having many other shapes that are within the intended spirit and scope of the present invention.

Also, in the illustrated exemplary embodiment, raceway 1104 also includes a liquid movement assembly 1132, a plurality of frames 1136 disposed in each section 1104A, 1104B, and a plurality of baffles 1140. Liquid movement assembly 1132 includes a motor 1144, a motor output shaft 1148 coupled to and rotatable by the motor 1144, and a rotor 1152 coupled to and rotatable with the motor output shaft 1148. Raceway 1104 defines an inner channel 1156 and two outer channels 1160. Rotor 1152 is positioned in the inner channel 1156 to drive wastewater in a desired direction.

Two sets of frames 1136A, 1136B are disposed in two parallel spaced apart rows, with one set of frames in each section 1104A, 1104B. In the illustrated exemplary embodiment, each set of frames includes five frames 1136. Alternatively, any number of frames 1136 may be disposed in each row and be within the spirit and scope of the present invention. Inner channel 1156 is defined between the sets of frames 1136A, 1136B and outer channels 1160 are defined between the frames 1136A, 1136B and the retaining wall 1116. Baffles 1140 are disposed in spaces between frames 1136 and at ends of the rows of frames to help define the inner and outer channels 1156, 1160 and assist with moving wastewater in a desired manner.

Plurality of frames 1136 are substantially the same and, for the sake of brevity, only a single frame 1136 will be described herein. Each frame 1136 includes a light collector 1164, a center light tube 320, upper and lower connector plates 1168, 1172, media 110 (not shown) strung between connector plates 1168, 1172, a lateral support plate 1176, a first set of support rods 1180 extending between the upper and lower connector plates 1168, 1172, a second set of support rods 1184 extending between upper connector plate 1168 and lateral support plate 1176, a float device 1188, a plurality of fins 1192, a bottom support 668 having similarities to the bottom support 668 described above, a frusto-conical base 1196, plumbing 1200 to transfer microorganisms, debris, and wastewater from the raceway 1104, and lower cavity support members 1204.

In the illustrated exemplary embodiment, light collector 1164 is capable of collecting light via a collection portion 1164A and transferring light along a transfer portion 1164B to emitters (not shown) positioned along the height of the center light tube 320 to emit light into the raceway 1104. This exemplary manner of providing light to an interior of the raceway 1104 is only one of many different types of manners for lighting the interior of the raceway 1104. For example, any of the previously described manners of providing light, whether it be natural light or artificial light, may be incorporated, either alone or in combination, into the raceway 1104. Additionally, other manners of lighting the raceway 1104 are intended to be within the spirit and scope of the present invention. The illustrated exemplary embodiment of the raceway 1104 has an open top, which allows additional natural sunlight to enter the raceway 1104 through the open top. Alternatively, a transparent or translucent cover may cover the top of the raceway 1104 and still allow penetration of natural sunlight. It should also be understood that the raceway may not include light collectors or other devices to introduce light into the interior of the raceway and, additionally, may include a cover that is opaque or otherwise inhibits light penetration into the raceway. In such instances, the raceway may include microorganisms not requiring light for treatment of wastewater.

In the illustrated exemplary embodiment, float device 1188 is oriented between the lower connector plate 1172 and the lateral support plate 1176. By positioning the float device 1188 near a bottom of the frame 1136, the float device 1188 does not block natural sunlight from penetrating into the upper cavity 1124. In other exemplary embodiments, the float device 1188 may be positioned at other locations along the frame 1136 including, but not limited to, immediately below the upper connector plate 1168, above the upper connector plate 1168, any position between the upper and lower connector plates 1168, 1172, etc. The float device 1188 may also have a variety of different configurations such as, for example, those configurations described above, or any other appropriate configuration and be within the spirit and scope of the present invention.

Fins 1192 are connected to and extend between upper and lower connector plates 1168, 1172. Fins 1192 extend outward from the connector plates 1168, 1172 and radially from a longitudinal center rotational axis of the frame 1136. Alternatively, fins 1192 may connect and be positioned relative to the upper and lower connector plates 1168, 1172 in a variety of different manners and be within the intended spirit and scope of the present invention. Fins 1192 extend sufficiently outward from the connector plates 1168, 1172 so as to be disposed in the flow of wastewater moving in the inner channel 1156 and the outer channels 1160.

As indicated above, bottom support 668 has similarities to bottom support 668 described above. In this illustrated exemplary embodiment of the bottom support 668, the bottom support 668 includes an outer rim 1208, a central receptacle 608 and a plurality of roller devices 616 supported by outer rim 1208. The center light tube 320 passes through central receptacle 608, which secures to the central receptacle 608 and inhibits lateral movement of the tube 320. Bottom end of the tube 320 is ultimately secured to a base receptacle 1212, which is supported by the base 1196. Since the frame 1136 is lifted within the raceway 1104 due to buoyancy of the float device 1188, drainage of the wastewater from the raceway 1104 causes the frame 1136 to lower in the raceway 1104 until the lateral support plate 1176 rests upon the roller devices 616. If rotation of the frame 1136 is desired after wastewater has been drained from the raceway 1104, the roller devices 616 facilitate such rotation. The bottom support 668 may include any number of roller devices 616 to accommodate rotation of the frame 1136. Voids or spaces 1216 are defined in bottom support 668 between outer rim 1208 and central receptacle 608 to allow microorganisms, debris, and wastewater to drop down through the bottom support 668 and into the frusto-conical base 1196.

Frusto-conical base 1196 is positioned at the bottom of the frame 1136 in the lower cavity 1128 of the raceway 1104. In the illustrated exemplary embodiment, base 1196 is made of a rigid, non-flexible material. A top of base 1196 is open and in fluid communication with the upper cavity 1124 of the raceway 1104 in order to receive microorganisms, debris, and wastewater from the upper cavity 1124. A bottom of base 1196 is also open and in fluid communication with plumbing 1200 to exhaust microorganisms, debris, and wastewater from the raceway 1104. Base 1196 includes a base plate 1220 and base receptacle 1212 that provide support to a bottom end of center light tube 320. Voids or spaces 1224 are defined in base plate 1220 to allow microorganisms, debris, and wastewater to drop down through the base plate 1220 and toward the open bottom of base 1196.

In the illustrated exemplary embodiment, lower cavity support members 1204 are positioned in the lower cavity 1128, extend between first and second floors 1108, 1112, and connect to first and second floors 1108, 1112 to provide vertical support for the frame 1136 and the second floor 1112. Lower cavity support members 1204 may have different configurations and may support the frames 1136 in different manners and still be within the intended spirit and scope of the present invention. Additionally, frames 1136 may include support structure other than lower cavity support members for providing support thereto. In other words, frames 1136 may be supported in the raceway 1104 in a variety of different manners and still be within the spirit and scope of the present invention.

With further reference to FIGS. 127 and 128, operation of the raceway 1104 will now be described. Upper cavity 1124 may be filled with wastewater to a desired level 1228 and a seeding microorganism may be introduced into upper cavity 1124. Liquid movement assembly 1132 may be selectively activated to move the wastewater within the raceway 1104 as desired. For example, motor 1144 may be activated to rotate rotor 1152, which in turn moves the wastewater in one direction within the inner channel 1156 (in the downward direction as illustrated in FIG. 127). Wastewater reaches a first end 1232 of the inner channel 1156 and splits, with some of the wastewater moving into one of the outer channels 1160 and some of the wastewater moving into the other of the outer channels 1160. The wastewater then continues movement through the outer channels 1160 until the wastewater reaches a second end 1236 of inner channel 1156. At second end 1236 of inner channel 1156, wastewater from the two outer channels 1160 merge and move through the inner channel 1156 toward the rotor 1152. This movement of the wastewater continues while liquid movement assembly 1132 is activated. Deactivation of the liquid movement assembly 1132 ceases to actively move the wastewater within the raceway 1104 and the wastewater will ultimately move toward a stagnant state. Baffles 1140 are positioned in spaces between frames 1136 to more clearly define the inner and outer channels 1156, 1160 and assist with organized wastewater flow in the inner and outer channels 1156, 1160. Without baffles, wastewater may move through the raceway in a more random manner. Fins 1192 extend from the frames 1136 a sufficient distance to enable them to be engaged by moving wastewater in the inner and outer channels 1156, 1160, which result in rotation of the frames 1136. Accordingly, when it is desirable to rotate the frames 1136, liquid movement assembly 1132 is activated. Conversely, when it is desirable to have the frames 1136 not rotate, liquid movement assembly 1132 is deactivated. Frames 1136 may be rotated at a variety of speeds for similar reasons to those described above in connection with the frames 108 positioned within the containers 32. For example, frames 1136 may be rotated at a first relatively slow speed, in which microorganisms supported on the media 110 may be substantially equally exposed to light, equally exposed to wastewater, and not dislodged from the media 110, and a second relatively fast speed, in which microorganism are dislodged from the media 110 to position the microorganisms in the wastewater. To rotate the frames 1136 at multiple speeds, liquid movement assembly 1132 may be activated at varying speeds to move the wastewater at varying speeds. Microorganisms disposed in the wastewater may fall to a bottom of the upper cavity 1124 and into the base 1196. Microorganisms falling into the base 1196 will be transferred out of the base 1196 by plumbing 1200. In some embodiments, it may be desirable to create suction via the plumbing 1200 in order to promote microorganisms moving into the base 1196 from upper cavity 1124. To initiate another wastewater treatment process, raceway 1104 is refilled with wastewater and microorganisms left behind from the prior treatment process act as seeding microorganisms. Alternatively, microorganisms may again be introduced into the raceway 1104.

Figure 129:
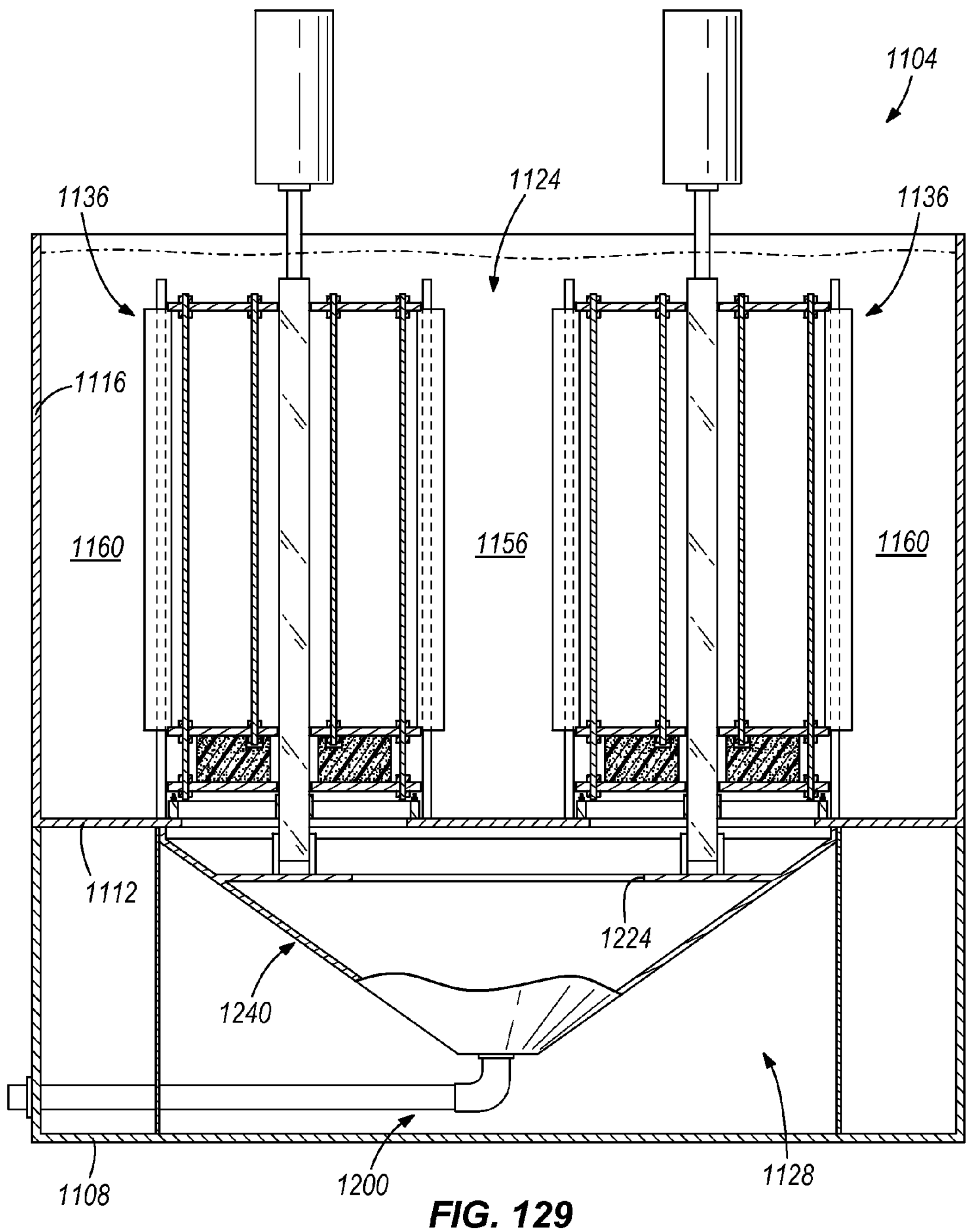

Referring now to FIG. 129, another exemplary embodiment of a frame base 1240 is shown. Components similar between the raceway and frame base illustrated in FIGS. 127 and 128 and the raceway 1104 and the frame base 1240 illustrated in FIG. 129 may be identified with the same reference numbers or may be identified with different reference numbers.

In the exemplary embodiment illustrated in FIG. 129, raceway 1104 includes a single frame base 1240 disposed in the lower cavity 1128 below all of the frames 1136. In this embodiment, microorganisms and debris on all frames 1136 falls into a single frame base 1240. Similar to raceway 1104 illustrated in FIGS. 127 and 128, a suction may be created with plumbing 1200 in order to promote microorganisms and debris to move into the base 1240.

Figure 130:
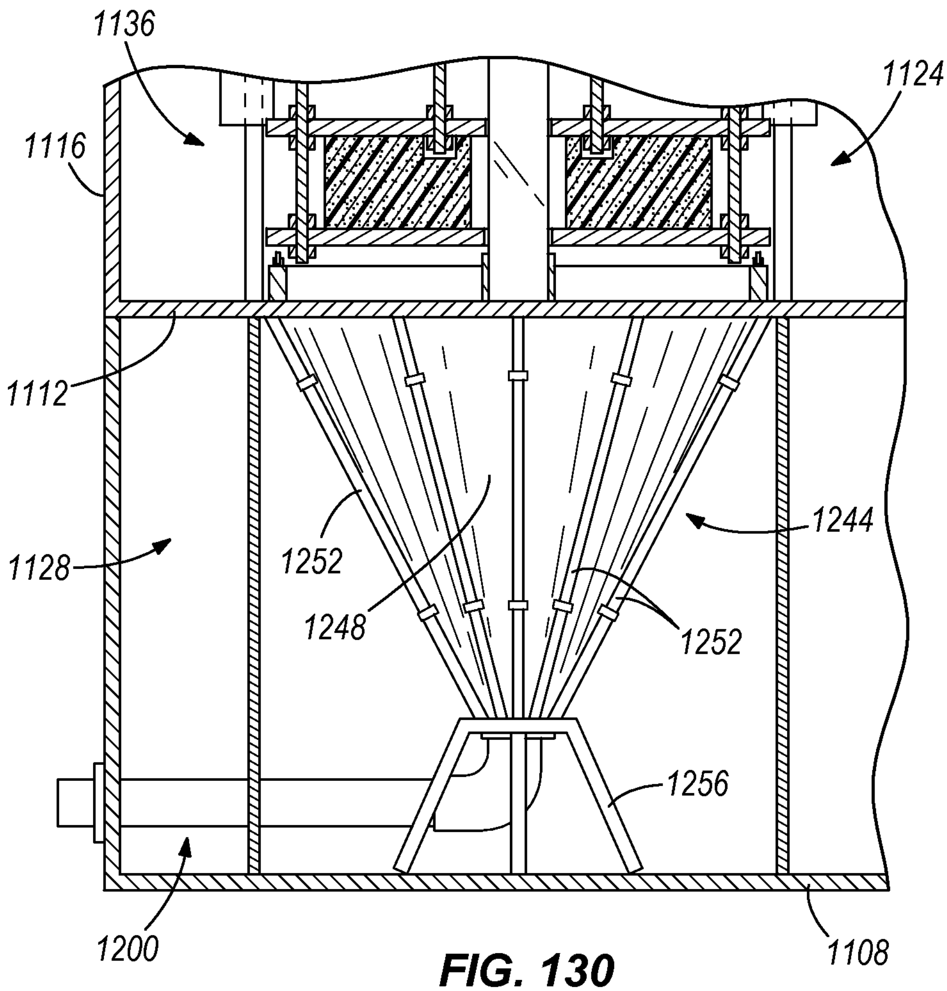

Referring now to FIG. 130, a further exemplary embodiment of a frame base 1244 is shown. Components similar between the raceway and frame bases illustrated in FIGS. 127-129 and the raceway 1104 and the frame base 1244 illustrated in FIG. 130 may be identified with the same reference numbers or may be identified with different reference numbers.

In this illustrated exemplary embodiment, frame base 1244 is flexible and may be vibrated in a variety of manners to assist with expulsion of microorganisms and debris from the base 1244. Microorganisms have a tendency to buildup in the base 1244 due to the frusto-conical shape of the base 1244 and form, what is referred to in the industry as, a "rat hole", in which microorganisms are removed from a bottom of the base 1244 via the plumbing, but microorganisms above the bottom of the base 1244 become packed in the base 1244 in a manner that does not allow the packed microorganisms to fall to the bottom for removal by plumbing. In such an instance, Microorganisms are not removed from raceway 1104. To remedy this situation, the illustrated exemplary embodiment of flexible base 1244 may be vibrated to dislodge the packed microorganisms and debris, thereby causing the microorganisms and debris to fall to the bottom of base 1244 for removal by plumbing 1200. Flexible base 1244 includes a flexible wall 1248, wall support members 1252, and a support stand 1256 supportable on first floor 1108 of raceway 1104. Flexible wall 1248 is made of a material that is sufficiently flexible, but also is sufficiently durable to withstand vibration during normal operating conditions. Exemplary flexible materials include, but are not limited to, vinyl, rubber, rubberized and/or chemically treated canvas, composite sandwich of materials, alternating bands of flexible materials, etc. Wall support members 1252 provide the necessary support to the flexible wall 1248 to maintain the desired shape of the flexible wall 1248 and ensure the flexible wall 1248 does not fail. Support stand 1256 provides support to wall support members 1252 and is engagable with the first floor 1108.

As indicated above, flexible base 1244 may be vibrated in a variety of manners. In some exemplary embodiments, liquid such as, for example, wastewater or regular water may be introduced into and agitated within lower cavity 1128, which will result in agitation or vibration of the flexible wall 1248. Liquid within lower cavity 1128 may be agitated as desired to vibrate flexible wall 1248. In other exemplary embodiments, other types of vibrating devices may be used such as, for example, one or more mechanical vibrating members, ultrasonic vibrating members, etc., and may be coupled to the flexible wall 1248, wall support members 1252, or some other portion of the base 1244 to vibrate the flexible wall 1248 as desired.

Figure 131:
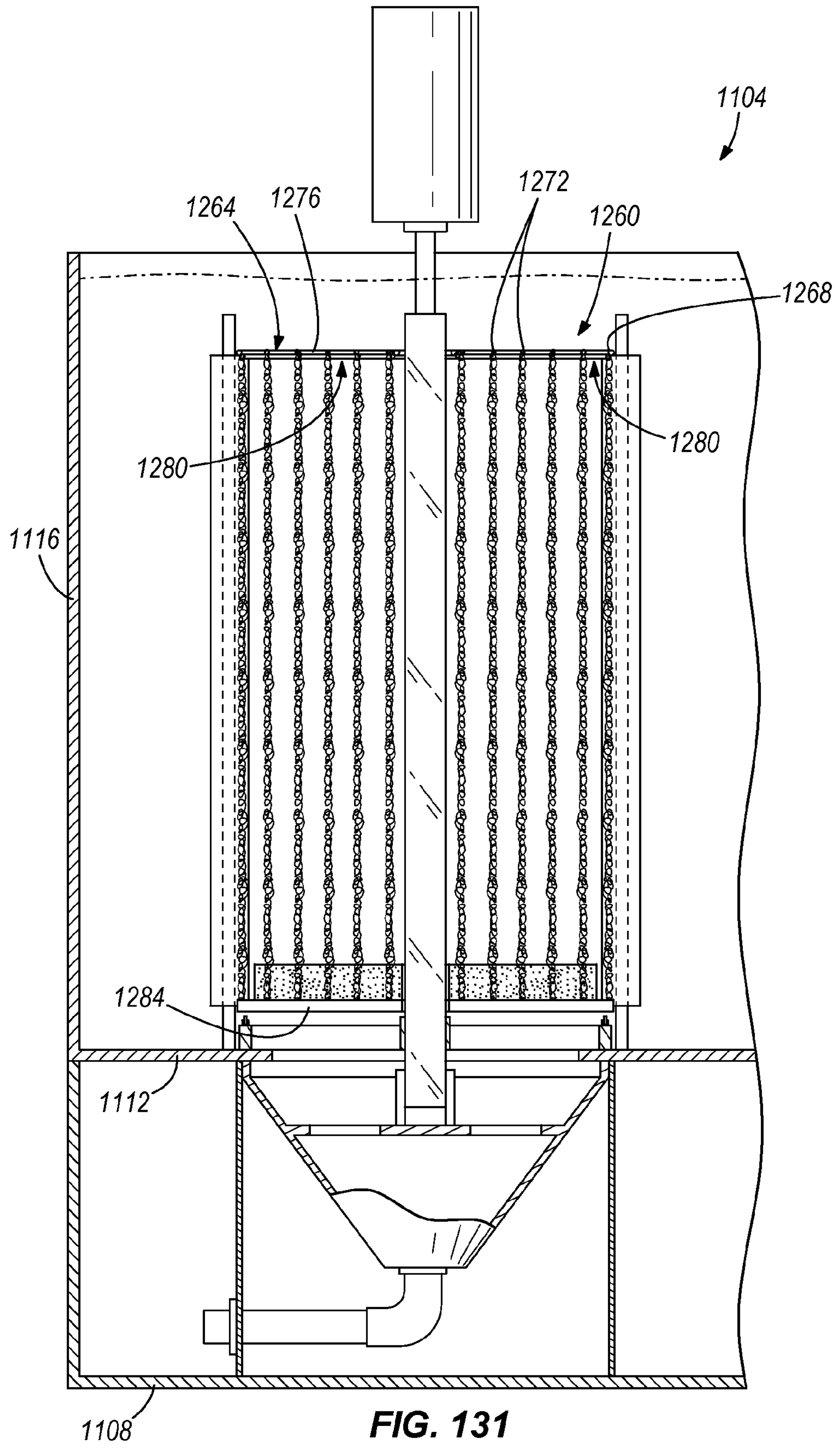

Referring now to FIG. 131, another exemplary embodiment of a frame 1260 and a connector plate 1264 are shown. Components similar between the other frames and connector plates described herein and the frame 1260 and connector plate 1264 illustrated in FIG. 131 may be identified with the same reference numbers or may be identified with different reference numbers.

In the illustrated exemplary embodiment, the frame 1260 includes an upper connector plate 1264 of a mesh-type configuration. This upper mesh connector plate 1264 may be similar to the mesh connector plates 1080, 1084 illustrated in FIGS. 120 and 121 or other disclosed alternatives. More particularly, mesh connector plate 1260 includes an outer circular rim 1268, a plurality of first cross members 1272, and a plurality of second cross members 1276. The first and second cross members 1272, 1276 are substantially perpendicular to each other and cross each other in the manner illustrated. In this manner, a plurality of openings 1280 are defined in the connector plate 1264. Such openings 1280 allow light from above the upper mesh connector plate 1264 to pass through the upper connector plate 1264 and enter the raceway 1104. Other connector plates having less openings and more solid material may block light originating from above the connector plate and such blocked light may not enter the raceway. Including an upper mesh connector plate 1264 may be particularly important in raceway applications because some of the varieties of microorganisms used to treat wastewater may require light and such light may originate from above the raceway 1104 (e.g., natural sunlight). The illustrated exemplary embodiment of the upper mesh connector plate 1264 is only one of many configurations of connector plates including openings therethrough to allow light to penetrate through the connector plates. Many other mesh connector plate configurations are possible and are within the intended spirit and scope of the present invention. In addition, lower connector plate 1284 may also have a similar or different mesh configuration than the upper mesh connector plate 1264.

Referring now to FIGS. 132-134, multiple additional exemplary embodiments of a raceway 1104 and liquid movement assemblies are shown. Components similar between the raceway and liquid movement assembly illustrated in FIGS. 127 and 128 and the raceways 1104 and liquid movement assemblies illustrated in FIGS. 132-134 may be identified with the same reference numbers or may be identified with different reference numbers.

Referring to FIG. 132, liquid movement assembly 1288 includes a plurality of pumps 1292 positioned in outer channels 1160 of raceway 1104, with one pump 1292 disposed near each frame 1136 and each pump 1292 having its exhaust near fins 1192 of the frame 1136. This embodiment creates a similar wastewater movement path as that described above and illustrated in FIGS. 127 and 128. Alternatively, the plurality of pumps 1292 may be positioned in inner channel 1156, with one pump 1292 disposed near each frame 1136 and each pump 1292 having its exhaust adjacent fins 1192 of the frame 1136.

Referring to FIG. 133, liquid movement assembly 1296 includes a single pump 1300 and a manifold 1304, both of which are positioned in inner channel 1156. Manifold 1304 includes a single inlet 1308 in fluid communication with an exhaust of the pump 1300 and a plurality of exhaust openings 1312, one exhaust opening 1312 for each frame 1136. Each exhaust opening 1312 is disposed near fins 1192 of its respective frame 1136 to move wastewater into engagement with the fins 1192. This embodiment creates a similar wastewater movement path as that described above and illustrated in FIGS. 127, 128, and 132. Alternatively, the pump 1300 and manifold 1304 may be positioned in one of the outer channels 1160, or liquid movement assembly 1296 may include two sets of a pump 1300 and a manifold 1304, with one set of a pump 1300 and manifold 1304 positioned in one outer channel 1160 and the other set of pump 1300 and manifold 1304 positioned in the other outer channel 1160. In such an embodiment, exhaust openings 1312 of the manifolds 1304 are configured to correspond to the locations of respective frame fins 1192. That is, for example, each manifold 1304 may include five exhaust openings 1312 in only one side thereof to align with fins 1192 of its five respective frames 1136.

Referring to FIG. 134, liquid movement assembly 1316 may be disposed a distance from the frames 1136. In such an embodiment, liquid movement assembly 1316 controls wastewater flow from the distance, but the raceway 1104 is configured to direct the moving wastewater past the frames 1136 and into contact with the fins 1192 in order to rotate frames 1136. This liquid movement assembly 1316 may have any configuration as long as it is capable of rotating frames 1136 in a desirable manner.

Referring now to FIG. 135, a further exemplary embodiment of a wastewater treatment system 1320 is shown. The illustrated system 1320 is commonly referred to in the industry as a raceway 1320 and will be referred to in this manner herein. Components similar between the raceway illustrated in FIGS. 127 and 128 and the raceway 1320 illustrated in FIG. 135 may be identified with the same reference numbers or may be identified with different reference numbers.

The illustrated exemplary embodiment of this raceway 1320 includes modular frame units, which are uniform to one another and may be individually installed as desired to provide a user with flexibility and variety when designing and installing raceways 1320. Each modular frame unit includes a frame 1136 and a housing 1324. Frame 1136 is substantially similar to frame described above and illustrated in FIGS. 127 and 128. Housing 1324 includes a first wall 1328 and a second wall 1332 spaced apart from each other and disposed on opposite sides of the frame 1136. First and second walls 1328, 1332 each include a pair of turned-in flanges 1336, 1340 extending toward frames 1136. Space is provided between turned-in flanges 1336, 1340 of opposite first and second walls 1328, 1332 in order to provide exposure of the fins 1192 to wastewater movement occurring in the inner and outer channels 1156, 1160. First and second walls 1328, 1332 perform a similar function to the baffles 1140 described above and illustrated in FIGS. 127 and 128 in that the first and second walls 1328, 1332 assist with defining inner and outer channels 1156, 1160 and assist with moving wastewater in a desired manner.

Referring now to FIG. 136, still another exemplary embodiment of a wastewater treatment system 1344 is shown. The illustrated system 1344 is commonly referred to in the industry as a raceway 1344 and will be referred to in this manner herein. Components similar between the raceways illustrated in FIGS. 127, 128, and 135 and the raceway 1344 illustrated in FIG. 136 may be identified with the same reference numbers or may be identified with different reference numbers.

In the illustrated exemplary embodiment, a plurality of raceways 1344 are illustrated and are positioned in body of water 1348 such as, for example, a wastewater pond, wastewater holding tank, etc. Each raceway 1344 is modular and, accordingly, any number of raceways 1344 may be positioned in the body of water 1348 (i.e., any number that will fit into the body of water). Each raceway 1344 includes a container or retaining wall 1352 supported by a plurality of spaced-apart support members 1356. The retaining wall 1352 cordons off a portion of the body of water 1348 to provide a smaller, more manageable quantity of wastewater that will be controlled by liquid movement assembly 1360. Also, microorganisms disposed in the raceways 1344 are more easily controlled than if no retaining walls 1352 existed. With the cordoned off raceways 1344, liquid movement assemblies 1360 may move wastewater within the raceways 1344 in a similar manner to that described above and illustrated in FIGS. 127 and 128. In the illustrated exemplary embodiment, the body of water 1348 provides all the wastewater to be treated in the raceways 1344. A separate wastewater source may not be required in this embodiment. Plumbing may be routed to each raceway 1344 positioned in the body of water 1348 in order to remove wastewater, microorganisms, and/or debris from each raceway 1344. Alternatively, the wastewater, microorganisms, and/or debris may be released from the cordoned off raceway 1344 and allowed to mix with the body of water 1348 outside the cordoned off raceway 1344. In such an alternative, plumbing is routed to the body of water 1348 to remove the microorganisms and/or debris from the body of water 1348.

Referring now to FIG. 137, a further exemplary embodiment of a wastewater treatment system 1364 is shown. Components similar between the wastewater treatment systems illustrated in FIGS. 1 and 2 and the wastewater treatment system 1364 illustrated in FIG. 137 may be identified with the same reference numbers or may be identified with different reference numbers.

The system 1364 illustrated in FIG. 137 has many similarities with the systems illustrated in FIGS. 1 and 2. At least some of the differences will be described herein in detail. In illustrated exemplary embodiment, system 1364 utilizes a different compound to assist the microorganisms with treating wastewater than the systems illustrated in FIGS. 1 and 2. More particularly, the illustrated system 1364 introduces organic carbon compounds 1368 into the containers 32 for the microorganisms to consume. Certain microorganisms may use organic carbon compounds for growth and energy. Such microorganisms also may not require light for growth and energy because the organic carbon compound provides both carbon and energy required by the microorganism for survival. Exemplary microorganisms include, but are not limited to, *Chlorella pyrenoidosa, Phaeodactylum tricornutum, Chlamydomonas reinhardtii, Chlorella vulgaris, Brachiomonas submarina, Chlorella minutisima, C. regularis, C. sorokiniana*, etc., and other types of heterotrophic and mixotrophic microorganisms. Organic carbon compounds may be in a variety of forms that are consumable by the microorganisms. Exemplary organic carbon compounds include, but are not limited to, sugars, glycerol, corn syrup, distiller grains from ethanol producing facilities, glucose, acetate, TCH, cycle intermediates (e.g., citric acid and some amino acids), etc. Such organic carbon may also be introduced into the containers 32 with the wastewater via the liquid management system 28.

It should be understood that the system 1364 illustrated in FIG. 137 may have similar structural elements, similar functions, and be controlled in similar manners to the other systems disclosed herein.

Referring now to FIGS. 138-141, yet another exemplary wastewater treatment system 1400 is illustrated. Similarities between the system 1400 illustrated in FIGS. 138-141 and other systems described herein and illustrated in the drawings may be identified with similar reference numbers or may be identified with different reference numbers.

With particular reference to FIGS. 138-140, the system 1400 includes a container or retaining wall 1404, a cover 1408 coupled to and covering the retaining wall 1404, a support structure 1412 positioned within the retaining wall 1404, a plurality of media frames 108 coupled to the support structure 1412, media 110 coupled to the plurality of media frames 108, a drive mechanism 1416 coupled to the plurality of media frames 108, a liquid management system 28, and a gas management system 24.

In the illustrated exemplary embodiment, the retaining wall 1404 is substantially rectangular in shape and includes a front 1420, a rear 1424, two ends 1428, and a bottom 1432 that collectively define a retaining wall cavity 1436. The retaining wall 1404 may be made of a variety of materials including, for example, packed earth, metal, concrete, fiberglass, asphalt, or any other material capable of supporting and retaining contents of the system 1400. A liner 1440 (see FIG. 140) may be a separate element from the retaining wall 1404, positioned in the retaining wall cavity 1436, in contact with and coupled to interior surfaces of the retaining wall to cover the wall, and ultimately inhibit exposure of the retaining wall to the contents within the retaining wall cavity 1436. Alternatively, the liner 1440 maybe a treatment performed to interior surfaces of the retaining wall 1404. Either way, it is preferable that the liner 1440 has hydrophobic characteristics and/or is impervious to liquids. Additionally, the liner 1440 may be smooth. In some exemplary embodiments, the liner 1440 may be made of ethylene propylene diene monomer (EPDM). In other exemplary embodiments, the liner 1440 may be made of polyvinyl chloride, polyethylene, polypropylene, or any other appropriate material. The liner 1440 may have a variety of different thicknesses depending on the material used and the desired performance of the liner 1440. In an exemplary embodiment, the liner 1440 may be made of EPDM and may have a thickness of about 45 mils. In other exemplary embodiments, the liner 1440 may be a chemical treatment of the interior surfaces of the retaining wall 1404 to make the interior surfaces of the retaining wall 1404 liquid proof. Exemplary chemicals include, but are not limited to, gunnite. These examples are not intended to be limiting and the liner 1440 is capable of being made of other materials, having other thickness, having other characteristics, and still be within the intended spirit and scope of the present invention.

The top of the retaining wall 1404 is open and the cover 1408 is coupled to the retaining wall 1404 to cover the open top of the retaining wall 1404. In the illustrated exemplary embodiment, the cover 1408 includes structural members 1444 and material 1448 spanning between the structural members 1444. In some exemplary embodiments, the material 1448 is made of a transparent or translucent material such as, for example, plexiglass, polyfilm, polycarbonate, glass, any other plastic, or any other type of transparent or translucent material. In other exemplary embodiments, the material 1448 of the cover 1408 may be made of opaque materials such as, for example, opaque plastics, metal, or any other type of opaque material.

The material 1448 of the cover 1408 may have a variety of different thicknesses depending on the material used and the structural requirements. In some exemplary embodiments, the thickness of the material 1448 may be 2, 4, or 6 mils. In other exemplary embodiments, the material 1448 may have a double layer configuration in which two layers of material 1448 are used. In such exemplary embodiments, each layer may be 2, 4, or 6 mils. It should be understood that the material 1448 may be comprised of any number of layers and each layer may have any thickness, and be within the intended spirit and scope of the present invention.

Returning to the illustrated exemplary embodiment, the cover 1408 is formed in a 3-dimensional triangular shape and includes a hypotenuse surface 1452, a vertical surface 1456, and two end surfaces 1460. This particular triangular shape substantially corresponds to a 30-60-90 triangle with the 30 degree angle between the hypotenuse 1452 and the top of the retaining wall 1404, the 60 degree angle between the hypotenuse 1452 and the vertical surface 1456, and the 90 degree angle between the vertical surface 1456 and the top of the retaining wall 1404. In some exemplary embodiments, the hypotenuse surface 1452 of the triangular cover 1408 may face a hemisphere occupied by the Sun throughout most of the day. For example, if the system 1400 is orientated in the northern hemisphere of Earth, the hypotenuse 1452 may face toward the southern hemisphere since the Sun occupies the southern hemisphere throughout the day and throughout most of the year. Conversely, if the system 1400 is positioned in the southern hemisphere of Earth, the hypotenuse 1452 may face the northern hemisphere since the Sun occupies the northern hemisphere throughout the day and throughout most of the year. In such embodiments, the hypotenuse 1452 is so arranged to increase the penetration of light through the cover 1408 and into the interior of the system 1400 by offering low resistance (or low reflection) to the light. Also, in such embodiments, the vertical surface 1456 of the triangular cover 1408 may include a reflective surface to inhibit light from escaping through it and to reflect light back into the cavity 1436 of the retaining wall 1404. Further, in such embodiments, end surfaces 1460 of the triangular cover 1408 may include similar reflective surfaces in some embodiments and may not include reflective surfaces in other embodiments.

In embodiments where the cover 1408 has material 1448 that is opaque or otherwise inhibits at least a portion of light from passing therethrough, orientation and shape of the cover 1408 with respect to the Sun is of lesser concern. Also, in such embodiments, the cover may have any shape, whether the shape is conducive to light penetration or a hindrance to light penetration since light penetration is not desired or needed.

The shape and configuration of the cover 1408 illustrated in FIGS. 138-140 is only one of many possible shapes and configurations of covers that may be used with the system 1400. Any shape and configuration of cover may be used with the system 1400 and be within the intended spirit and scope of the present invention. For example, with reference to FIG. 149, the cover 1408' may be substantially semi-cylindrical in shape and includes two end surfaces 1460' and an arcuate top surface 1464. Alternatively, the cover 1408 may include other shapes and configurations such as, for example, flat, cubical, 3-dimensional rectangular, other triangular shapes such as, for example, a 3-dimensional equilateral triangle, or any other shape and configuration.

Returning to FIGS. 138-140, the support structure 1412 includes a substantially hollow rectangular top member including a front bar 1468, a rear bar 1472, and two end bars 1476 extending between the front and rear bars 1468, 1472, thereby forming an opening 1480 in the support structure 1412. The support structure 1412 also includes a plurality of support legs 1484 coupled at their top ends to the top member and having their bottom ends engaging and/or coupled to the bottom 1432 of the retaining wall 1404. In other exemplary embodiments, the support structure 1412 may be coupled to interior surfaces of one or more of the front 1420, rear 1424, and ends 1428 of the retaining wall 1404 by any of a wide variety of means such as, for example, welding, bonding, fastening, adhering, or any other type of permanent or temporary coupling means. Support structure 1412 may be made of a variety of different materials including, for example, metal, concrete, plastic, or any other sturdy material capable of supporting the weight of the media frames 108, media 110, microorganisms supported on the media frames 108 and the media 110, and any other load on the support structure 1412.

The support structure 1412 is adapted to support the media frames 108 at a distance above the bottom 1432 of the retaining wall 1404. More particularly, bearing assemblies 1488 are coupled to top surfaces of front and rear bars 1468, 1472 of the support structure 1412 for receiving ends of the support shaft 120 of the media frame 108. Bearing assemblies 1488 allow the support shaft 120 and, therefore the media frames 108, to rotate relative to the support structure 1412 with little resistance. Thus, in the illustrated exemplary embodiment, the media frames 108 have a longitudinal extent that extends substantially perpendicular to a longitudinal extent of the retaining wall 1404. In other embodiments and with reference to FIG. 150, the media frames 108 may have a longitudinal extent that extends substantially parallel to a longitudinal extent of the retaining wall 1404. In such embodiments, the bearing assemblies 1488 may be coupled to top surfaces of end bars 1476 of the support structure 1412. In further embodiments, the media frames 108 may have a longitudinal extent that extends at orientations other than parallel and perpendicular relative to a longitudinal extent of the retaining wall 1404. In still other embodiments, individual media frames 108 may each have longitudinal extents at different orientations relative to one another, thereby providing media frames 108 with longitudinal extents at various orientations relative to the longitudinal extent of the retaining wall 1404.

With continued reference to FIGS. 138-140, the drive mechanism 1416 includes a motor 1492, an output shaft 1496 of the motor 1492, and a drive chain 1500 coupled to the output shaft 1496. Two gears or other coupling devices 1504 are coupled to a single end of each shaft 120 of the plurality of media frames 108. In the illustrated exemplary embodiment, the drive chain 1500 is coupled to a front or first 1504A of the gears 1504. A coupling chain 1508 is coupled to a rear or second 1504B of the gears 1504 of the same media frame 108 and a rear or second 1504B of the gears 1504 of a second media frame 108. A second coupling chain 1508 is coupled to the front or first gear 1504A of the second media frame 108 and a front or first gear 1504A of a third media frame 108. Adjacent media frames 108 continue to be coupled together in this manner by additional coupling chains 1508 to provide a daisy chain coupling between all of the media frames 108 such that the drive mechanism 1416 rotates the first media frame 108 and rotation of the first media frame 108 causes rotation of the other media frames 108.

It should be understood that this is only one configuration for rotating the media frames 108 and that many other mechanisms and configurations of elements may be used to rotate the media frames 108 and be within the intended spirit and scope of the present invention. For example, the system 1400 may include multiple motors 1492 for driving the media frames 108. In such an example, the system 1400 may include one motor 1492 for each media frame 108, or each of the motors 1492 may drive multiple media frames 108. Also, for example, the system 1400 may include other elements such as belts, sprockets, etc., for coupling the media frames 108 together to transfer rotation from one media frame 108 to the next media frame 108 and such coupling elements may be coupled to the media frames 108 in a variety of manners such as, for example, serpentine configuration, pulleys, or any other type of coupling that facilitates rotational transfer from one element to another element.

With particular reference to FIG. 140, the liquid management system 28 and the gas management system 24 may be similar to the liquid and gas management systems 28, 24 disclosed in other exemplary embodiments of the wastewater treatment systems described and illustrated herein. The liquid management system 28 controls wastewater introduction into and wastewater removal from the retaining wall cavity 1436 respectively through one or more liquid inlets 1512 and one or more liquid outlets 1516. In the illustrated exemplary embodiment, the retaining wall 1404 defines a sump or receptacle 1518 defined in the bottom 1432 and the one or more liquid outlets 1516 is/are in fluid communication with the sump 1518. The sump 1518 provides a deeper portion of wastewater from where the wastewater is exhausted from the retaining wall cavity 1436. This deeper portion of wastewater inhibits the liquid outlet 1516 from drawing air from a headspace 1528 while exhausting wastewater. In addition, the liquid management system 28 may assist with removal of microorganisms from the cavity 1436 by removing microorganisms from the cavity 1436 with the removal of wastewater from the cavity 1436. The wastewater containing microorganisms may then be transferred downstream to separation processes where the microorganisms are separated from the wastewater. After separation, the liquid management system 28 may recycle and reintroduce the wastewater into the cavity 1436 or may send it downstream for further processing.

The gas management system 24 controls gas introduction into and gas exhaustion from the retaining wall cavity 1436 respectively through one or more gas inlets 1520 and one or more gas outlets 1524. As indicated above with respect to other illustrated and described wastewater treatment systems, many types of gases having many different compositions may be introduced into the system 1400 for treating wastewater. Types and compositions of gases introduced into the cavity 1436 may depend on the type of microorganism and/or type of wastewater disposed in the cavity 1436. Gas introduced into the cavity 1436 occupies a headspace 1528 between the top surface 1532 of the wastewater and the cover 1408. In addition, gas exhausted from the system 1400 may be exhausted in a variety of manners such as, for example, directly to the environment, into other retaining wall cavities for further wastewater treatment, recycled back into the same cavity, to additional treatments for cleaning prior to exhaustion into the environment, back into the gas source, etc.

Environmental control within the system 1400 may be an important operation and the liquid management system 28 and gas management system 24 may be used to assist with environmental control. For example, a pH sensor 1536, a wastewater temperature sensor 1540, and any other environmental sensors or control devices generically represented by reference number 1544 may be introduced into a recirculation loop 1548 of the liquid management system 28. Alternatively, the pH sensor 1536, wastewater temperature sensor 1540, and other sensors and control devices may be positioned at locations within the system 1400 other than in the recirculation loop such as, for example, the cavity 1436.

The recirculation loop 1548 connects the liquid outlet 1516 with the liquid inlet 1512 to transfer wastewater removed from the cavity 1436 back into the cavity 1436 if desired. The presence of the elements in the recirculation loop 1548 provides the ability to determine the condition of the wastewater within the system 1400 and communicates the wastewater condition to a user and/or appropriate controls. For example, the pH sensor 1536 allows the system to determine the pH of the wastewater within the system 1400. PH control is important in wastewater treatment because microorganisms are sensitive to pH and slight variations outside of optimal pH ranges may negatively affect their ability to digest, consume, or otherwise treat the wastewater. The same may be said for wastewater temperature. Slight variations outside of optimal wastewater temperature ranges may negatively affect their ability to digest, consume, or otherwise treat the wastewater.

As generically represented by element 1544 in the recirculation loop 1548, a large variety of devices may be incorporated into the recirculation loop 1548 (or other locations within the system 1400) to monitor and/or control the wastewater environment in the system 1400 since optimal control of the wastewater is important to effectively treat the wastewater. Exemplary elements include, but are not limited to, nutrient sensors, nutrient injectors, acid and/or base injector (to control pH), heat exchanges (to control temperature), chemical injection for cleaning and/or sanitization, gas injection for aeration or other gas delivery, any other monitoring device, or any other treatment device. Also for example, the gas management system 24 may control the composition of the gas within the headspace 1528 to control the pH of the wastewater within the cavity 1436. The carbon dioxide level in the headspace 1528 affects the pH of the wastewater. Raising or lowering the level of carbon dioxide within the headspace 1528 can adjust the pH level of the wastewater as desired.

As indicated above, the liquid and gas management systems 28, 24 may be used to control the environment within the system 1400. In some exemplary embodiments, it may be desirable for the liquid and gas management systems 28, 24 to intentionally present a stressful environment for the microorganisms. In some instances, providing a stressful environment to the microorganisms may promote or accelerate wastewater treatment. Stressful environments exist when the wastewater treatment environment is outside of the ideal environment for the microorganisms. Since the system 1400 may use a wide variety of organisms to treat wastewater and each organism may have a different ideal environment, the system 1400 is capable of adjusting a wide variety of different environmental characteristics to provide stressful environments for a wide variety of different organisms. Exemplary environmental characteristics that may be altered to provide a stressful environment include, but are not limited to, pH, temperature, nutrient depletion, chemical additions, etc.

Referring now to FIGS. 138-141, the illustrated media frames 108 and media 110 are similar to earlier described and illustrated media frames and media. In the illustrated exemplary embodiment, the media frames 108 include spaced apart support plates 112, 116, a central shaft 120 coupled to and extending between the support plates 112, 116, and a plurality of support members 336 coupled to and extending between the support plates 112, 116. Also in the illustrated embodiment, the media 110 is similar to the media 110 illustrated in FIGS. 6-8 and is coupled to and extends between the support plates 112, 116. It should be understood that the media 110 may be any of the variety of types of media described and illustrated herein and any possible alternatives or equivalents. In addition, the variety of types of media 110 may be coupled to the support plates 112, 116 in any of the described and illustrated manners and any possible alternative or equivalent manners.

In the embodiment of the media frames 108 illustrated in FIGS. 138-141, the media 110 extends between support plates 112, 116 substantially parallel to the longitudinal extent of the media frames 108. It should be understood that the media 110 may be coupled to and orientated relative to the media frames 108 in other manners. For example, with reference to FIG. 142, the media 110 may be wound around a media frame 108 in a plane substantially perpendicular to the longitudinal extent of the media frame 108. In such an embodiment, the media frame 108 may include additional support members 336 extending between the support plates 112, 116 at or near the periphery of the support plates 112, 116 in order to provide a surface between the support plates 112, 116 to which the media 110 may couple. Additional support members 336 may extend between the support plates 112, 116 at positions other than the peripheries of the support plates 112, 116 to provide one or more surfaces between the support plates 112, 116 to which the media 110 may couple. In some embodiments, concentric surfaces may be provided by groups of concentrically arranged support members 336 extending between the support plates 112, 116.

As another example and with reference to FIG. 143, the media 110 may be spiraled around the media frame 108 between the support plates 112, 116. In such an embodiment, the media frame 108 may include additional support members 336 extending between the support plates 112, 116 at or near the peripheries of the support plates 112, 116 in order to provide a surface between the support plates 112, 116 to which the media 110 may couple and spiral. Additional support members 336 may extend between the support plates 112, 116 at positions other than the peripheries of the support plates 112, 116 to provide one or more surfaces between the support plates 112, 116 to which the media 110 may couple and spiral. In some embodiments, concentric surfaces may be provided by groups of concentrically arranged support members 336 extending between the support plates 112, 116.

In the embodiments illustrated in FIGS. 138-143, the media frames 108 are cylindrical in shape and have a length greater than their diameter. In some embodiments, a length of the media frames 108 may be three times a diameter of the media frames 108.

It should be understood that the media frames 108 may have a variety of shapes and sizes other than that illustrated in FIGS. 138-143 and be within the intended spirit and scope of the present invention.

For example and with respect to FIG. 144, an exemplary alternative of a media frame 108 is illustrated and includes a diameter greater than a length of the media frame 108.

As another example and with respect to FIG. 145, another exemplary alternative of the media frame 108 is illustrated and includes a rectangular three-dimensional shape. In such an embodiment, the support plates 112, 116 are square in shape and media 110 is coupled to and extends between the square support plates 112, 116. The support plates 112, 116 may be spaced apart from each other at any distance to facilitate media frames 108 of varying lengths. In some exemplary embodiments, the length of the media frame 108 may be about three times the width of the support plates 112, 116. The support plates 112, 116 may also be rectangular or any other polygonal shape and be within the intended spirit and scope of the present invention.

As a further example and with respect to FIG. 146, a further exemplary alternative of the media frame 108 is illustrated and includes a cubical shape. In such an embodiment, the support plates 112, 116 are square in shape and media 110 is coupled to and extends between the square support plates 112, 116. In this embodiment, the length of the media frame 108 is substantially similar to the width of the square support plates 112, 116, thereby providing the cubical shape of the media frame 108.

As yet another example and with respect to FIG. 147, yet another exemplary alternative of the media frame 108 is illustrated and includes a rectangular shaped frame 1550 having two spaced apart sides 1550A and two ends 1550B extending between the two sides 1550A, together defining an opening 1554 in the frame 1550. Alternatively, the frame 1550 is capable of having a variety of different shapes including, but not limited to, square, triangular, circular, oval, or any other polygonal or arcuately perimetered shape. In the illustrated embodiment, media 110 is coupled to the two sides 1550A and extends across the opening 1554 substantially parallel to the ends 1550B. Alternatively, the media 110 may be coupled to and extend relative to the frame 1550 in a variety of other manners such as, for example, parallel to sides 1550A, diagonal relation to the sides 1550A, etc. This illustrated exemplary media frame 108 is substantially narrower than other media frames 108 described and illustrated herein.

As yet a further example and with respect to FIG. 148, yet a further exemplary alternative of the media frame 108 is illustrated and includes a plurality of rectangular shaped frames 1550, similar to the frames 1550 illustrated in FIG. 147, coupled together via coupling members 1558 to provide a rigid device with multiple substantially parallel rectangular shaped frames. The plurality of coupled together frames 1550 includes a single shaft 120 for rotation. The individual frames 1550 in this exemplary media frame 108 may also be selectively removed from the media frame 108 by coupling the individual frames 1550 to the media frame 108 with selectively securable fasteners, selectively securable bonding, or any other selectively securable or selectively removable devices and manners of coupling.

Returning to the embodiment illustrated in FIGS. 138-143, the system 1400 includes a single row of media frames 108. It should be understood that the system 1400 may include different configurations of media frames 108 within the retaining wall cavity 1436 other than that illustrated in FIGS. 138-143.

For example and with respect to FIG. 151, the system 1400 may include two side-by-side rows of media frames 108. In such an exemplary embodiment, the support structure 1412 includes an appropriate configuration to accommodate the multiple rows of media frames 108. In the illustrated exemplary embodiment, the support structure 1412 comprises two rectangular support structures 1412A, 1412B, one of which surrounds each of the rows of media frames 108. Each of the surrounding support structures 1412A, 1412B includes a front bar 1468A, 1468B, a rear bar 1472A, 1472B, one end bar 1476A, 1476B at each end, and support legs 1484A, 1484B. Since this embodiment includes multiple rows of media frames 108, the support structure 1412 must support two rows of support shafts 120. Ends of the support shafts 120 disposed near the front 1420 and rear 1424 of the retaining wall 1404 are respectively supported by bearing assemblies 1488 supported on a front bar 1468A of the first support structure 1412A and a rear bar 1472B of the second support structure 1412B. The ends of the shafts 120 near a middle of the retaining wall 1404 are supported by a rear bar 1472A of the first support structure 1412A and a front bar 1468B of the second support structure 1412B.

In an alternative exemplary embodiment, the support structure 1412 may include a front bar, a rear bar, one end bar at each end, and one or more middle bars disposed between the two side-by-side rows of media frames 108. The one or more middle bars support bearing assemblies 1488 capable of receiving ends of the media frame shafts 120 near a middle of the retaining wall 1404.

It should be understood that the system 1400 may include any number of rows of media frames 108 and the support structure 1412 may have an appropriate configuration to accommodate the various rows of media frames 108.

In the illustrated exemplary embodiment in FIG. 151, the system 1400 includes one drive mechanism 1416 for driving each row of media frames 108. Alternatively, a single drive mechanism 1416 may be employed to rotate all the media frames 108 in all the rows and, to accommodate such rotation, the system 1400 includes chains or other coupling means to couple all the media frames 108 together such that rotation of a first media frame 108 via the drive mechanism 1416 causes rotation of all the media frames 108. Also in the alternative, any number of drive mechanisms 1416 may be employed to rotate the media frames 108 in multiple rows such as, for example, one drive mechanism for each media frame, one drive mechanism for multiple media frames, etc.

The retaining wall 1404 may have shapes and configurations different than that illustrated in FIGS. 138-140. For example and with reference to FIG. 152, the retaining wall 1404 may be a three-dimensional shaped oval with a hollow center. In such an exemplary embodiment, the retaining wall 1404 is comprised of an outer retaining wall 1404A and an inner retaining wall 1404B. The media frames 108 are disposed between the inner and outer retaining walls 1404A, 1404B and the support structure 1412 is complementarily shaped to the retaining wall 1404 to support bearing assemblies 1488 for receiving ends of the media frame shafts 120. It should be understood that the retaining wall 1404 may be shaped in any other arcuate or polygonal manner and still be within the intended spirit and scope of the present invention.

Now that structures of the wastewater treatment systems 1400 have been described, exemplary operations of the systems 1400 will be described herein. The following description relating to operations of the wastewater treatment systems 1400 exemplifies a sample of the variety of possible manners for operating the systems 1400. The following description is not intended to be limiting upon the wastewater treatment systems 1400 and the manners of operation.

With particular reference to FIGS. 138-140, the liquid management system 28 introduces wastewater into the retaining wall 1404. The wastewater level 1532 within the retaining wall 1404 may be at various heights relative to the media frames 108. In the illustrated exemplary embodiment, wastewater is introduced into the retaining wall 1404 until the media frames 108 are partially submerged in the wastewater. The media frames 108 may have any portion thereof submerged in wastewater and be within the intended spirit and scope of the present invention. For example, the media frames 108 may be one-third of the way submerged. Alternatively, the media frames 108 may be partially submerged in the wastewater to a greater or lesser extent. In other exemplary embodiments, the media frames 108 may be completely submerged in the wastewater.

With continued reference to FIGS. 138-140, gas management system 24 introduces gas into the headspace 1528 defined between the wastewater surface 1532 and the cover 1408. The portions of the media frames 108 not submerged in the wastewater are directly exposed to the gas in the headspace 1528. The gas management system 24 is controlled to ensure the appropriate composition of gas is present in the headspace 1528 to facilitate effective wastewater treatment.

Microorganisms may be introduced into the retaining wall cavity 1436 and onto the media frames 108 in a variety of manners. For example, the liquid management system 28 may introduce microorganisms into the cavity 1436 with the wastewater pumped through the water inlet 1512. Also, for example, microorganisms may have remained in the cavity 1436 and/or on the media frames 108 from a previous treatment cycle. This manner of introducing microorganisms into the system 1400 is generally referred to as microorganism seeding. Further, for example, the cover 1408 or some portion thereof may be removed or displaced from the retaining wall 1404, microorganisms may be introduced into the retaining wall cavity 1436 and/or onto the media frames 108, and the cover 1408 may be replaced to seal the environment within the system 1400. Other manners of introducing microorganisms into the cavity 1436 and onto the media frames 108 exist and are within the intended spirit and scope of the present invention.

Similar to previously described and illustrated wastewater treatment systems, drive mechanism 1416 may rotate the media frames 108 in multiple manners for various reasons. For example, the media frames 108 may rotate in a first manner to promote effective wastewater treatment and rotated in a second manner for dislodging microorganisms and/or wastewater debris from the media frames 108 and media 110. In the first manner, the media frames 108 may rotate at a relatively slow rate such as, for example, continuous rotation at one revolution per minute, or a periodic rotation such as, for example, one-quarter of a revolution lasting ten seconds and repeated every ten minutes, for purposes of promoting effective wastewater treatment. Rotation in this first manner may promote wastewater treatment by controlling exposure of the microorganisms to the gas in the headspace 1528 and the wastewater in the cavity 1436, controlling temperature, etc. In the second manner, the media frames 108 may rotate at a relatively fast rate such as, for example, thirty revolutions per minute to dislodge the microorganisms and/or wastewater debris from the media frames 108 and media 110. The centrifugal force in combination with the impact of the microorganisms and debris with the top surface 1532 of the wastewater and the hydrodynamic sheer resulting from traveling through the wastewater dislodges the microorganisms and debris from the media frames 108 and media 110 to suspend the microorganisms and debris in the wastewater. The wastewater, microorganism, and/or debris mixture may be removed from the retaining wall cavity 1436 through the liquid outlet 1516 via the liquid management system 28. The mixture may be sent downstream for further processing such as, for example, separation, drying, filtering, additional treatments, etc. As indicated above, the wastewater may be reintroduced/recycled back into the retaining wall cavity 1436, via the liquid management system 28, after microorganisms and/or debris have been removed from the wastewater. Alternatively, the media frames 108 may be rotated to dislodge the microorganisms and/or debris after wastewater has been removed. Such a manner of dislodging microorganisms and/or debris may be referred to as a "dry spin". Also in the alternative, the wastewater level 1532 within the retaining wall cavity 1436 may be adjusted for a harvesting cycle to levels other than the level used during treatment. For example, the wastewater level 1532 may be lowered or raised from the level used during treatment prior to rotation of the media frames 108 for purposes of harvesting or dislodging the microorganisms and/or debris.

Depending on environmental conditions, the species of microorganism used for wastewater treatment, performance of the microorganisms, quantity of wastewater to be treated, and various other parameters, the length of a wastewater treatment cycle may vary greatly. In some exemplary embodiments, one treatment cycle may be 48 hours. In other exemplary embodiments, one treatment cycle may be 24 hours. In still other exemplary embodiments, microorganisms themselves may not be regularly harvested, but, instead, secretions from the microorganisms may be harvested. For example, the microorganisms may be grown to a desired density/quantity on the media 110, then secretions such as, for example, metabolic byproducts, hydrocarbons, ethanol, sugars, proteins, oxygen, hydrogen, methane, etc., may be washed or otherwise expelled into the liquid or released into the headspace 1528, and the secretions are then harvested from the liquid and/or headspace 1528. It should be understood that the wastewater treatment systems disclosed herein and equivalents thereof are capable of having treatment cycles of any length and of any type and still be within the intended spirit and scope of the present invention.

Referring now to FIGS. 153 and 154, an alternative exemplary manner of rotating the media frames 108 is illustrated. In this illustrated exemplary embodiment, the media frames 108 include a plurality of fins or projections 1562 extending from outer surfaces of one or both support plates 112, 116 and the system 1400 may include a pump or other wastewater moving device that is capable of adjusting the velocity at which wastewater moves through the retaining wall cavity 1436. In some exemplary embodiments, a separate pump is not required to control the velocity and movement of the wastewater through the cavity 1436. Rather, the liquid management system 28 is capable of controlling the velocity of the wastewater by introducing wastewater through the liquid inlet 1512. Wastewater moving through the cavity 1436 engages the fins 1562 of the media frames 108 causing the media frames 108 to rotate. When slow rotation of the media frames 108 is desired, the wastewater moves through the retaining wall cavity 1436 at a relatively slow rate. When fast rotation of the media frames 108 is desired, the wastewater moves through the retaining wall cavity 1436 at a relatively fast rate. Wastewater velocity may be controlled at a variety of different rates and in a tightly controlled manner in order to provide precise and controlled rotation of the media frames 108. In the exemplary embodiment illustrated in FIGS. 153 and 154, eight fins 1562 extend from each support plate 112, 116 and the fins 1562 are substantially flat and planar in shape. It should be understood that any number of fins 1562 may extend from each support plate 112, 116 and the fins 1562 may have any shape and be within the intended spirit and scope of the present invention. It should also be understood that the fins 1562 may extend or project outward from one or both support plates 112, 116 at any distance. For example, the fins 1562 may project outward from one or more of the support plates 112, 116 at 0.5 inches, 0.75 inches, 1.00 inches, 2.00 inches, 5.00 inches, or any other distance.

In an alternative exemplary embodiment and with reference to FIG. 155, the fins 1562A have an alternative shape to that of the fins 1562 illustrated in FIGS. 153 and 154. More particularly, each exemplary fin 1562A has a first member 1566 and a second member 1570 with the second member 1570 extending from the first member 1566 in a non-parallel direction. In the illustrated exemplary embodiment, the second member 1570 extends back upon the first member 1566, thereby providing an acute angle between the first and second members 1566, 1570. This configuration provides a receptacle 1574 in which wastewater can enter and engage the fin 1562A. This receptacle 1574 provides additional surface area and a location where wastewater may be temporarily trapped, both of which contribute to additional conveyance of force from the moving wastewater to the fin 1562A. As stated earlier with respect to the fins 1562 illustrated in FIGS. 153 and 154, one or both support plates 112, 116 illustrated in FIG. 155 may include any number of fins 1562A extending therefrom.

In yet another alternative exemplary embodiment and with reference to FIG. 156, another exemplary configuration of fins 1562B is illustrated. More particularly, each fin 1562 is arcuate in shape and provides a receptacle 1578 in which wastewater can enter and engage the fin 1562B. This receptacle 1578 provides additional surface area and a location where wastewater may be temporarily trapped, both of which contribute to additional conveyance of force from the moving wastewater to the fin 1562B. As stated earlier with respect to the fins 1562 illustrated in FIGS. 153 and 154, one or both support plates 112, 116 illustrated in FIG. 156 may include any number of fins 1562B extending therefrom.

Referring now to FIG. 157, the system 1400 includes another exemplary embodiment of a support structure 1412. In this illustrated exemplary embodiment, the support structure 1412 is capable of vertically moving the media frames 108 relative to the retaining wall 1404. Vertical movement of the media frames 108 may be desirable to adjust a quantity of the media frames 108 that is submerged in the wastewater present in the retaining wall cavity 1436. The liquid management system 28 may adjust the wastewater level 1532 within the cavity 1436 to determine the quantity of the media frames 108 submerged in the wastewater, and the present illustrated exemplary embodiment of the vertically movable support structure 1412 provides additional capabilities for controlling submersion of the media frames 108 in the wastewater.

This illustrated exemplary support structure 1412 is similar to the support structure illustrated in FIGS. 138-140 except this support structure 1412 includes an actuator 1582 coupled to the support structure 1412 for vertically moving the support structure 1412. In the illustrated exemplary embodiment, the actuator 1582 comprises a drive device 1586 such as, for example, a dual direction motor, and a plurality of coupling members 1590 such as, for example, screw drives coupled between the drive device 1586 and the support legs 1484 of the support structure 1412. Driving the motor 1586 in a first direction rotates the screw drives 1590 in a first direction to move the support structure 1412 and media frames 108 upward and driving the motor 1586 in the second or opposite direction rotates the screw drives 1590 in a second or opposite direction to move the support structure 1412 and media frames 108 downward. It should be understood that the illustrated exemplary manner and structure of vertically moving the support structure 1412 and media frames 108 is not intended to be limiting. Many different manners and structures exist for vertically moving the support structure 1412 and the media frames 108, and such different manners and structures are intended to be within the spirit and scope of the present invention.

Referring now to FIGS. 158 and 159, the system 1400 includes another exemplary structure and manner for dislodging microorganisms and/or debris supported on the media 110. In this illustrated exemplary embodiment, the system 1400 includes a plate 1594 coupled to each media frame 108 in a position between and substantially parallel to the support plates 112, 116. Each plate 1594 includes a central aperture 1598, a plurality of support rod apertures 1600, and a plurality of media apertures 1604. The system 1400 also includes a drive mechanism 1608 coupled to the plate 1594 for moving the plate 1594 along the media frame 108 between the support plates 112, 116. In some exemplary embodiments, the system 1400 may include one drive mechanism 1608 for each plate 1594. In other exemplary embodiments, the system 1400 may include one drive mechanism 1608 for driving all the plates 1594. In yet other exemplary embodiments, the system 1400 may include any number of drive mechanisms 1608, with each drive mechanism 1608 adapted to drive any number of plates 1594.

Returning to the illustrated exemplary embodiment, the drive mechanism 1608 includes a motor 1612 such as, for example, a dual directional motor, and a coupling member 1620 such as, for example, a screw drive, coupled between the motor 1612 and the plate 1594. In the illustrated exemplary embodiment, the coupling member is a screw drive 1620, which is positioned in the central aperture 1598 of each of the plates 1594. The interior surface of each of the central apertures 1598 has threads complementarily shaped to external threads on the screw drives 1620 such that rotation of the screw drives 1620 via the motor(s) 1612 causes the plates 1594 to move along the screw drives 1620 between the support plates 112, 116. The motor(s) 1612 may be driven in both directions to rotate the screw drives 1620 in both directions with rotation of the screw drives 1620 in a first direction causing the plates 1594 to move toward one of the support plates 112 or 116 and rotation of the screw drives 1620 in a second direction, opposite the first direction, causing the plates 1594 to move toward the other of the support plates 112 or 116.

Each plate 1594 includes an appropriate number of support rod apertures 1600 to match the number of support rods 336 extending between the support plates 112, 116. The support rods 336 are positioned in and pass through the support rod apertures 1600 in the plate 1594 and the support rod apertures 1600 are sized larger than the diameter or width of the support rods 336 in order to provide clearance and allow movement of the plate 1594 relative to the support rods 336. That is, as the plate 1594 translates between the support plates 112, 116, the plate 1594 slides relative to the support rods 336 without significant resistance between the plate 1594 and the support rods 336.

Each plate 1594 also includes an appropriate number of media apertures 1604 to match the number of media strands 110 extending between the support plates 112, 116. The media strands 110 are positioned in and pass through the media apertures 1604 in the plate 1594 and the media apertures 1604 are sized smaller than the width of the media strands 110 in order to compress the media strands 110 and the microorganisms and/or debris supported on the media strands 110 as they pass through the media apertures 1604. With this configuration, the plate 1594 wipes or dislodges a majority of the microorganisms and/or debris from the media strands 110 as the media strands 110 pass through the media apertures 1604. Dislodging microorganisms and/or debris from the media 110 is desirable prior to removal of the microorganisms and/or debris from the system 1400. Dislodged microorganisms and/or debris are introduced into the wastewater disposed in the retaining wall cavity 1436 and the mixture of wastewater and microorganism and/or debris is removed from the cavity 1436 for further processing. The size of the media apertures 1604 defined in the plate 1594 may be any size relative to the size of the media 110 in order to provide the desired amount of organism and/or debris dislodgement. In general, the smaller the size of the media aperture 1604 relative to the size of the media 110, the more organisms and/or debris that will be dislodged from the media 110.

It should be understood that the plates 1594 may define other apertures or have different configurations in order to accommodate the presence of other elements on the media frames 108 or in the system 1400 and such other apertures may be sized to inhibit substantial interference between the plates 1594 and the other elements.

It should also be understood that the plates 1594 may have shapes other than the round disk shape illustrated in FIGS. 158 and 159 and still be within the intended spirit and scope of the present invention. For example, the plates 1594 may be square shaped disks to accommodate media frames having cubical or three-dimensional rectangular media frames such as, for example, those illustrated in FIGS. 145 and 146.

Referring now to FIG. 160, the system 1400 includes another exemplary structure and manner for dislodging microorganisms and/or debris from the media 110. In this illustrated exemplary embodiment, the system 1400 includes a flushing system 1624 operable to assist with dislodging microorganisms and/or debris from the media 110. The present illustrated exemplary embodiment of the flushing system 1624 may be similar in function and/or structure to the flushing system 38 illustrated in FIG. 81.

The exemplary flushing system 1624 illustrated in FIG. 160 includes a pressurized liquid source (not shown), a pressurized liquid inlet tube 1628 in fluid communication with the pressurized liquid source, and a plurality of spray nozzles 1632 in fluid communication with the tube 1628. The spray nozzles 1632 are incrementally disposed along the length of the retaining wall 1404 and cover 1408, at any desired spacing, and are directed toward the media frames 108 and media 110. In the illustrated exemplary embodiment, the spray nozzles 1632 are positioned directly above the media frames 108 and media 110. Alternatively, the spray nozzles 1632 may be positioned at any other angle relative to the media frames 108 and the media 110. The flushing system 1624 may be supported by the cover 1408, the retaining wall 1404, its own support structure, or any other structure of the system 1400. The flushing system 1624 may be activated whenever it is desirable to dislodge microorganisms and/or debris from the media frames 108 and media 110. When desired, a person manually or a controller automatically activates the spray nozzles 1632 to spray pressurized liquid onto the media frames 108 and media 110. Pressurized liquid may be sprayed at a variety of different pressures depending on the desired quantity of microorganisms and/or debris to be dislodged from the media frames 108 and media 110. In general, the greater the spray pressure, the greater the quantity of microorganisms and/or debris that will dislodge from the media frames 108 and media 110. Exemplary pressures of spray include about 20 psi to about 50 psi. In some exemplary embodiments, the media frames 108 and media 110 may rotate while the spray nozzles 1632 spray pressurized liquid. Rotation of the media frames 108 and media 110 moves all of the media 110 in front of the spray nozzles 1632 to provide an opportunity for dislodging the microorganisms and/or debris from all the media 110 rather than solely the media 110 immediately in front of the spray nozzles 1632 at the time of activation.

It should be understood that the system 1624 may be used for purposes other than dislodging microorganisms and/or debris from the media 110. For example, the system 1624 may be used to supply liquid such as, for example, water, wastewater, nutrients, etc., to the system 1400 for promoting effective treatment of wastewater.

It should also be understood that the system 1400 is capable of including other exemplary structures and manners for removing or dislodging microorganisms and/or debris supported on the media 110 and such other exemplary structures and manners are within the intended spirit and scope of the present invention.

For example, a vibration device may be coupled to the media frame 108 and/or media 110 and may vibrate the media frame 108 and/or the media 110 to a sufficient extent to dislodge the microorganisms and/or debris from the media 110. Such an exemplary vibration device is adjustable to modify the extent to which the media frame 108 and/or media 110 vibrates.

As another example, characteristics of the wastewater within the cavity 1436 may be altered, which would contribute to dislodging the microorganisms and/or debris from the media 110. Exemplary characteristic alternations include, but are not limited to, pH, temperature, surface tension, conductivity, chemical concentrations, nutrient concentrations, etc. To change these and other characteristics of the wastewater, one or more gases and/or chemicals may be introduced into the wastewater within the cavity 1436 to cause the microorganisms and/or debris to dislodge and fall from the media 110. Examples of such gases and chemicals include, but are not limited to, carbon dioxide (to modify the pH), surfactant (to modify the surface tension), electrolytes (to modify surface tension or cell morphology), oxidizing agents (to modify surface tension or cell morphology), etc.

As a further example, the system 1400 may include a movable dislodgement device that is disposed in the headspace 1528, moves over the media frames 108, is positionable over one or more media frames 108, and performs dislodging activity when in a desired position. Such dislodging activity may include, but is not limited to, spraying liquid onto the media frames 108 and media 110 to dislodge the microorganisms and/or debris, engaging the media frame 108 and media 110 to dislodge the microorganisms and/or debris, moving the media frames 108 to dislodge the microorganisms and/or debris, etc. In some exemplary embodiments, movement of the media frames 108 may include, but is not limited to, picking up the media frames 108 and performing a dislodging activity to the media frames 108 and media 110 (some of which activities may be similar to the activities described in the previous sentence), picking up the media frames 108 and transferring the media frames 108 and media 110 between a treatment position and a dislodging position different than the treatment position, etc.

With reference now to FIG. 161, the system 1400 is illustrated with another exemplary embodiment of the retaining wall 1404 and a different manner of treating and removing wastewater and microorganisms from the retaining wall 1404. In the exemplary embodiment of the retaining wall 1404 illustrated in FIGS. 138-140, the bottom 1432 is substantially flat. In the exemplary alternative embodiment illustrated in FIG. 161, bottom 1432 of the retaining wall 1404 is substantially "V"-shaped with two sides 1432' angling downward and converging at their lower ends to promote movement of the wastewater, microorganisms, and/or debris lower in the retaining wall 1404 under the force of gravity. The liquid outlet 1516 is positioned at a lowest most point of the bottom 1432 where the two sides 1432' converge. With this configuration, wastewater, microorganisms, and/or debris naturally move downward under the force of gravity toward the liquid outlet 1516 without requiring additional influence. In the illustrated exemplary embodiment, a single liquid outlet 1516 is shown. Alternatively, the system 1400 may include a plurality of liquid outlets 1516 disposed periodically along the lowest most point of the bottom 1432 where the two sides 1432' converge. Multiple liquid outlets 1516 provide wastewater, microorganisms, and/or debris with multiple locations to exit the retaining wall cavity 1436. An example of a system 1400 including multiple liquid outlets 1516 can be seen in FIG. 164.

In addition to the bottom 1432 of the retaining wall 1404 including two converging sides 1432', the bottom may include two converging ends (not shown) opposite each other and extending downward from ends 1428 of the retaining wall 1404. These additional converging ends in combination with the converging sides 1432' focuses natural downward movement of the wastewater, microorganisms, and/or debris to a smaller area where the wastewater, microorganisms, and/or debris may be removed from the retaining wall cavity 1436 with a single liquid outlet 1516. Alternatively, multiple liquid outlets 1516 may be combined with converging ends and sides 1432'.

With reference now to FIG. 162, the system 1400 is illustrated with another exemplary embodiment of the retaining wall 1404 and a different manner of treating and removing wastewater, microorganisms, and/or debris from the retaining wall 1404. In the exemplary alternative embodiment illustrated in FIG. 162, bottom 1432 of the retaining wall 1404 includes a first portion 1432" extending at a downward angle away from a front 1420 of the retaining wall 1404, and second and third portions 1432'" converging to form a substantially "V"-shape with the second portion 1432'" extending downward from an end of the first portion 1432" and the third portion 1432'" extending downward from the rear 1424 of the retaining wall 1404. The downwardly angled first, second, and third portions 1432", 1432'" promote natural downward movement of the wastewater, microorganisms, and/or debris in the retaining wall 1404 and ultimately into the "V" formed by the second and third portions 1432'". In the illustrated exemplary embodiment, the "V" formed by the second and third portions 1432'" is offset to a side of a central axis extending in a longitudinal direction of the retaining wall 1404. Alternatively, the "V" formed by the second and third portions 1432'" may extend the longitudinal length of the retaining wall 1404 along the longitudinal central axis of the retaining wall 1404. The liquid outlet 1516 is positioned at a lowest most point of the "V" formed by the second and third portions 1432'" of the bottom 1432. With this configuration, wastewater, microorganisms, and/or debris naturally move downward under the force of gravity toward the liquid outlet 1516 without requiring additional influence. In the illustrated exemplary embodiment, a single liquid outlet 1516 is shown. Alternatively, the system 1400 may include a plurality of liquid outlets 1516 disposed periodically along the lowest most point of the bottom 1432 where the second and third portions 1432'" converge. Multiple liquid outlets 1516 provide wastewater, microorganisms, and/or debris with multiple locations to exit the retaining wall cavity 1436.

Referring now to FIG. 163, the system 1400 includes an exemplary embodiment of a device for moving and assisting with removal of wastewater, microorganisms, and/or debris from the retaining wall cavity 1436. In the illustrated exemplary embodiment, the device includes an auger 1636 disposed near a bottom 1432 of the retaining wall 1404 and a motor coupled to the auger 1636 for driving the auger 1636 in one direction. Rotation of the auger 1636 causes the auger 1636 to engage wastewater, microorganisms, and/or debris positioned in its path and move the wastewater, microorganisms, and/or debris toward the liquid outlet 1516 where the mixture of wastewater and microorganisms and/or debris is removed from the retaining wall 1404.

It should be understood that some microorganisms and/or debris may remain in the bottom 1432 of the retaining wall 1404 after all the wastewater has been exhausted from the retaining wall 1404. In such instances, the auger 1636 may assist with moving the remaining microorganisms and/or debris toward the liquid outlet 1516 where the microorganisms may be removed from the retaining wall 1404.

It should also be understood that the system 1400 may include an alternative manner of removing microorganisms and/or debris from the retaining wall 1404. For example, the system 1400 may drain the wastewater from the retaining wall 1404 and leave the microorganisms and/or debris in the bottom of the retaining wall 1404. After drainage of the wastewater, the microorganisms and/or debris may be removed from the retaining wall 1404 via a second outlet separate from the liquid outlet 1516. In such instances, the auger 1636 is configured to move the microorganisms and/or debris toward the second outlet rather than toward the liquid outlet 1516. In some exemplary embodiments, the second outlet may have an inverted conical or frusto-conical shape. In other exemplary embodiments, microorganisms and/or debris may be removed from the retaining wall 1404 through both the liquid outlet 1516 and the second outlet. In such an alternative, the auger 1636 may move microorganisms and/or debris toward both the liquid outlet 1516 and the second outlet.

It should further be understood that the system 1400 may include other exemplary devices for moving and assisting with removal of wastewater, microorganisms, and/or debris from the retaining wall cavity 1436. For example, the system 1400 may include a scraper or plunger that moves along the bottom 1432 of the retaining wall 1404 and pushes and/or pulls the wastewater, microorganisms, and/or debris toward an outlet for removal. These exemplary devices may have a shape that conforms closely to the bottom 1432 of the retaining wall 1404 to ensure movement of a substantial portion of the wastewater, microorganisms, and/or debris toward an outlet by the exemplary devices.

With reference to FIG. 165, the system 1400 includes another exemplary embodiment of a bottom 1432 of the retaining wall 1404. In this illustrated exemplary embodiment, the bottom 1432 includes a generally scallop shape comprised of alternating semi-circular receptacles 1432A and peaks or protrusions 1432B. The receptacles 1432A are sized and shaped to receive a bottom portion of the media frames 108 and the media frames 108 engage the bottom 1432 of the retaining wall 1404 in the receptacles 1432A. Rotation of the media frames 108 causes the media 110 supported by the support plates 112, 116 to wipe against the bottom 1432 of the retaining wall 1404 in the receptacles 1432A. Wiping the bottom 1432 of the retaining wall 1404 with the media 110 inhibits biofilm from forming on the bottom 1432 and inhibits microorganisms and/or debris from settling on the bottom 1432.

Referring now to FIG. 166, an alternative exemplary embodiment of the system 1400 is illustrated. In this illustrated exemplary embodiment, the system 1400 includes multiple layers of media frames 108 and an alternative exemplary embodiment of the retaining wall 1432. The retaining wall 1432 includes three chambers 1640 with each chamber 1640 receiving one layer of media frames 108. It should be understood that the system 1400 is capable of having any number of layers of media frames 108 and any number of chambers 1640 for accommodating the layers of media frames 108 and still be within the intended spirit and scope of the present invention. Thus, the three layers of media frames 108 and three chambers 1640 are not intended to be limiting upon the present invention.

A liquid management system 28 is in fluid communication with all the chambers 1640 to provide and remove wastewater as desired. The liquid management system 28 includes three liquid inlets 1512, one inlet 1512 for each chamber 1640, and three liquid outlets 1516, one outlet 1516 for each chamber 1640. In addition, a gas management system 24 is in fluid communication with the chambers 1640 to provide and exhaust gas as desired. Similar to the liquid management system 28, the gas management system 24 includes three gas inlets 1520, one inlet 1520 for each chamber 1640, and three gas outlets 1524, one outlet 1524 for each chamber 1640. By having the liquid management system 28, gas management system 24, and chambers 1640 configured in this illustrated parallel manner, wastewater and gas may be independently supplied to and exhausted from the chambers 1640 as needed. Thus, the chambers 1640 may be controlled independently of each other. The chambers 1640 may either be controlled in a similar manner to each other or in different manners.

Alternatively and with reference to FIG. 167, the chambers 1640 may all be serially connected with one another such that both the liquid and gas management systems 28, 24 are coupled to the chambers 1640 in a serial manner. With this configuration, wastewater and gas are first introduced into the top chamber 1640, then wastewater and gas are subsequently introduced into the second or middle chamber 1640, and next wastewater and gas are introduced into the bottom chamber 1640. Wastewater and gas exit the retaining wall 1404 from the bottom chamber 1640. This configuration promotes similar wastewater levels and gas compositions within all the chambers 1640.

It should be understood that the other embodiments of the system 1400 illustrated in FIGS. 138-165 may include multiple layers of media frames 108 within the described and illustrated retaining walls 1404. That is, the retaining walls 1404 illustrated in FIGS. 166 and 167 are not the only configurations of retaining walls 1404 in which multiple layers of media frames 108 may be disposed. For example, multiple layers of media frames 108 may be disposed in the retaining wall 1404 shown in FIGS. 138-140. In such an instance, the top layer of media frames 108 may be partially submerged in the wastewater as shown in FIGS. 138-140 and one or more lower layers of media frames 108 positioned below the top layer may be completely submerged in the wastewater.

Referring now to FIG. 168, an alternative exemplary embodiment of the system 1400 is illustrated. In this illustrated exemplary embodiment, the system 1400 includes an angled retaining wall 1404 and cover 1408. A bottom 1432 of the angled retaining wall 1404 has a similar scallop shape to that illustrated in FIG. 165. The media frames 108 are positioned in the bottom receptacles 1432A and may either engage the bottom within the receptacles 1432A or may be spaced above the bottom. A liquid inlet 1512 is disposed at a top end of the retaining wall 1404 to introduce wastewater into the retaining wall 1404 and a liquid outlet 1516 is disposed at a bottom end of the retaining wall 1404 to exhaust wastewater, microorganisms, and/or debris. Wastewater introduced at the top end of the retaining wall 1404 runs down the retaining wall 1404 under the influence of gravity, collects in each of the receptacles 1432A of the bottom 1432, gathers near the liquid outlet 1516, and may be removed from the retaining wall 1404 as desired. The system 1400 is capable of having any number of scallop shaped receptacles 1432A and any number of media frames 108. In addition, the retaining wall 1404 may be oriented at any angle relative to horizontal such as, for example, ten degrees, 20 degrees, 30 degrees, 45 degrees, 60 degrees, 70 degrees, 80 degrees, etc., and be within the intended spirit and scope of the present invention.

The receptacles 1432A defined in the bottom 1432 of the retaining wall 1404 are configured to support wastewater at the desired level 1532 relative to the media frames 108. In the illustrated exemplary embodiment, about one-third of each of the media frames 108 is submerged under the wastewater level 1532. Alternatively, the receptacles 1432A may have any depth to submerge any desired amount of the media frames 108 such as, for example, one-quarter, one-half, two-thirds, three-quarters, completely covered, or any other proportion of the media frames 108.

With reference to FIGS. 169 and 170, another exemplary alternative embodiment of a system 1400 is illustrated. In this embodiment, the system 1400 includes a base member 1652, a liquid management system 28, a gas management system 24, a plurality of containers 1656 horizontally supported on the base member 1652, and a drive mechanism 1660.

The liquid management system 28 and gas management system 24 are coupled to the containers 1656 and provide the desired quantities of wastewater and gas to the containers 1656. The containers 1656 are all substantially the same and, therefore, only one of the containers 1656 will be described herein. Each container 1656 includes a housing 1664, a media frame 108 disposed in the housing 1664, and media 110 coupled to the media frame 108. In the illustrated exemplary embodiment, the housing 1664 is substantially cylindrical in shape. In other exemplary embodiments, the housing 1664 may be other shapes such as, for example, those illustrated in and described with respect to FIGS. 123-126. The media frame 108 includes two support plates 112, 116 and a shaft 120 coupled to and extending between the support plates 112, 116. An end of the shaft 120 is coupled to the drive mechanism 1660 for purposes of rotating the shaft 120, which results in rotation of the support plates 112, 116 and the media 110 coupled to and extending between the support plates 112, 116. In the illustrated exemplary embodiment, the housing 1664 is only a portion of the way filled with wastewater to submerge only a portion of the media frame 108 and media 110, thereby leaving the remaining unsubmerged portion of the media frame 108 and media 110 directly exposed to the gas headspace 1528 above the wastewater. The liquid management system 28 cooperates with the container 1656 to control the wastewater level 1532 within the container 1656. The wastewater level 1532 may be controlled to any level within the container 1656. Also in the illustrated exemplary embodiment, outer media strands 110 coupled at or near the periphery of the support plates 112, 116 engage an interior surface 1668 of the housing 1664 and wipe against the interior surface 1668 as the media frame 108 rotates. This wiping action performs several tasks including, but not limited to, removing condensation from the interior surface 1668 of the housing 1664 in the gas headspace 1528, removing microorganisms and/or debris from the interior surface 1668 of the housing 1664, removing biofilm from the interior surface 1668 of the housing 1664, etc.

Referring now to FIG. 171, yet another exemplary alternative embodiment of the system 1400 is illustrated. This illustrated exemplary embodiment of the system 1400 is similar to the embodiment of the system illustrated in FIGS. 169 and 170, except that the housing 1664' of the embodiment illustrated in FIG. 171 is larger in size than the housing 1664 illustrated in FIGS. 169 and 170. More particularly, the diameter of the housing 1664' illustrated in FIG. 171 is larger, thereby providing a larger gas headspace 1528 above the wastewater level 1532 and resulting in the outermost media strands 110 engaging a smaller portion of the interior surface 1668' of the housing 1664'. In this exemplary embodiment, the outermost media strands 110 engage a bottom portion of the interior surface 1668' and do not engage an upper portion of the interior surface 1668'. In the illustrated exemplary embodiment, the housing 1664' is substantially cylindrical in shape. In other exemplary embodiments, the housing 1664' may be other shapes such as, for example, those illustrated in and described with respect to FIGS. 123-126.

With reference to FIGS. 172 and 173, still another exemplary embodiment of a system 1400 is illustrated. In this illustrated exemplary embodiment, the system 1400 is disposed in a body of wastewater 1672 such as, for example, a wastewater pond, etc., and treats the wastewater in the body of wastewater 1672.

The system 1400 includes a plurality of treatment units 1676 for treating the wastewater in the body of wastewater 1672. The treatment units 1676 are all substantially the same and, therefore, only one of the treatment units 1676 will be described herein. Each unit 1676 includes a pair of floatation devices 1680, a cover 1408 coupled to the floatation devices 1680, a support structure 1412 coupled to the floatation devices 1680, and a plurality of media frames 108 coupled to the support structure 1412. The floatation devices 1680 may be a variety of different shapes and sizes as long as they provide sufficient buoyancy to the treatment unit 1676. The illustrated cover 1408 is only one of many possible configurations of covers 1408 and is not intended to be limiting. The media frames 108 are coupled to the support structure 1412 such that only a portion of each media frame 108 is submerged in the body of wastewater 1672. The remainder of media frames 108 is exposed to the headspace 1528 above the wastewater surface 1532 and beneath the cover 1408. A gas management system may supply gas to the headspace 1528 or the headspace 1528 may comprise the same air as the surrounding environment. In exemplary embodiments where the gas management system supplies gas to the headspace 1528, the headspace 1528 is isolated from the ambient atmosphere by having a bottom edge of the cover 1408 submerged below a surface of the body of wastewater 1672, or by having the cover 1408 in contact with the support structure 1412 and/or the floatation device 1680, or in a variety of other possible manners, which are within the intended spirit and scope of the present invention. The media frames 108 may rotate relative to the floatation devices 1680 in any of the manners described herein such as, for example, a drive mechanism, natural wastewater flow combined with fins secured to support plates, or any other appropriate manner.

The plurality of treatment units 1676 may be secured or anchored in place to prevent significant movement of the units 1676 around the body of wastewater 1672. Alternatively, the treatment units 1676 may be allowed to move freely around the body of wastewater 1672. The plurality of treatment units 1676 may also be coupled to one another or may not be coupled together. In some exemplary embodiments, it is desirable to have the treatment units 1676 spaced apart from one another to provide a space between the treatment units 1676 where evaporation may occur. Such evaporation between the treatment units 1676 allows cooling of the body of wastewater 1672 to maintain wastewater temperatures at desired levels. In such exemplary embodiments, the treatment units 1676 may be spaced apart at any distance. For example, the treatment units 1676 may be spaced apart by twelve inches, twenty-four inches, or any other distance.

With reference to FIG. 174, an alternative exemplary embodiment of a wastewater treatment system 1400 is illustrated. This illustrated exemplary embodiment is similar to the embodiment of the system 1400 illustrated in FIGS. 172 and 173 except the system 1400 illustrated in FIG. 174 includes a container or retaining wall 1404 coupled to the floatation devices 1680 to provide an internal cavity 178. The internal cavity 178 may be isolated from the body of wastewater 1672 or may be in fluid communication with the body of wastewater 1672. In instances where the internal cavity 1684 is in fluid communication with the body of wastewater 1672, wastewater from the body of wastewater 1672 may be introduced into the internal cavity 1684. In instances where the internal cavity 1684 is isolated from the body of wastewater 1672, the system 1400 requires a liquid management system 28 to introduce wastewater into the internal cavity 1684 from an alternative wastewater source. Wastewater surrounding the retaining wall 1404 may be in constant movement around and in contact with the exterior surface of the retaining wall 1404. Such moving wastewater may cool or warm the wastewater within the retaining wall 1404 depending on the temperature of the body of wastewater and the temperature of the wastewater within the retaining wall 1404. In the illustrated exemplary embodiment, the media frames 108 and media 110 are spaced above a bottom 1432 of the retaining wall 1404. In other exemplary embodiments, the media frames 108 and media 110 may contact the bottom 1432 of the retaining walls 1404 in a manner similar to that illustrated in FIGS. 165 and 168, or in any other manner.

It should be understood that the structure and concepts of the exemplary systems described above and illustrated in FIGS. 138-174 may be combined with each other in any manner. For example, an exemplary system may include a container or retaining wall and a plurality of tightly packed media frames, similar to the media frames illustrated in FIG. 147, positioned in the retaining wall and the system is capable of completely submerging, partially submerging, or not submerging the media frames in wastewater located in the retaining wall cavity. The tightly packed media frames provide a dense accumulation of media on which microorganisms may be supported and treat wastewater. In addition, the extent to which the media frames are exposed to wastewater may be achieved in a variety of manners such as, for example, by moving the frames vertically into and out of the wastewater with, for example, the system illustrated in FIG. 157, adjusting the wastewater level within the retaining wall cavity with the liquid management system, spraying the media frames with a spray system similar to that illustrated in FIG. 160, etc. Microorganisms and/or debris may be dislodged from the tightly packed frames in a variety of different manners including, but not limited to, running high speed and/or turbulent wastewater over the media frames with the liquid management system, vibrating the media frames, picking up the media frames one or more at a time and shaking or otherwise moving the frames to dislodge the microorganisms and/or debris, picking up the media frames and moving the media frames to a position where microorganisms and/or debris are dislodged from the media frames and then returning the media frames to their original positions after dislodging, etc. Many other combinations of structures and concepts disclosed herein are possible and are intended to be within the spirit and scope of the present invention.

It should also be understood that the exemplary systems illustrated in FIGS. 138-174 are capable of including any of the structural elements, electrical elements, and/or functional capabilities of the other systems described herein and illustrated in the other figures, and similarly, the other systems described herein and illustrated in the other figures are capable of including any of the structural elements, electrical elements, and/or functional capabilities of the systems illustrated in FIGS. 138-174.

The wastewater treatment systems described above may be used in a variety of different manners to achieve a variety of different desired results. The following description relating to FIG. 175 exemplifies a manner of operating the systems to achieve an exemplary result. The following exemplary operation is for illustrative purposes and is not intended to be limiting. Many other types of uses and operations are contemplated and are within the spirit and scope of the present invention.

Referring to FIG. 175, a system 20 is illustrated and includes a plurality of containers 32A, 32B, 32C, a gas management system 24, and a liquid management system 28. In the illustrated exemplary embodiment, container 32A includes an opaque housing 76A, a rotatable frame 108A and media 110A disposed in the housing 76A, and is adapted to receive a first type of organism therein to treat wastewater. The gas management system 24 provides the appropriate gas to the container 32A to facilitate treatment of the wastewater with the first type of organism. In some exemplary embodiments, the wastewater introduced into container 32A via the liquid management system 28 may have a high percentage of carbon, nitrogen, and/or phosphorous (i.e., wastewater nutrients) therein and it may be desirable to remove the excess quantity of wastewater nutrients from the wastewater. In such exemplary embodiments, the wastewater may originate from, for example, domestic or municipal sewage, industrial process wastewater including, but not limited to, beverage bottling, seafood processing, soup manufacturers, meat manufacturers, prepared food manufacturers, pet food formulators, feedlot wastewater, and many other organic waste streams. To treat such exemplary wastewaters, the first type of organism may be, for example, bacteria present in activated sludge microorganisms, and the gas management system 24 may introduce, for example, atmospheric oxygen, carbon dioxide, or other carbon sources such as, for example, methanol, liquid or solid granules of sugar, etc., into container 32A. In this exemplary embodiment, the first type of organism may not be a phototrophic or mixotrophic organism and, thus, does not require sunlight to grow. Since sunlight may not be required, the housing 76A may be opaque as illustrated. The wastewater within container 32A may be treated for any desired amount of time such as, for example, 48 hours, 72 hours, or an extended period of time in either a batch or continuous manner, and the frame 108A may be rotated and operated in any of the manners described herein or any other manner within the intended spirit and scope of the present invention.

In some exemplary embodiments, the wastewater resulting from treatment in container 32A in the above-described exemplary manner may have a high concentration of ammonia. The wastewater having a high concentration of ammonia may require additional treatment to reduce or eliminate the concentration of ammonia in the wastewater. Thus, the liquid management system 28 evacuates the wastewater from container 32A and introduces the wastewater into container 32B. In the illustrated exemplary embodiment, container 32B includes an opaque housing 76B, a rotatable frame 108B and media 110B disposed in the housing 76B, and is adapted to receive a second type of organism therein to treat wastewater. The second type of organism may be different than the first type of organism. The gas management system 24 provides the appropriate gas to the container 32B to facilitate treatment of the wastewater with the second type of organism. To treat the exemplary wastewater having a high ammonia concentration, the second type of organism may be, for example, nitrifying bacteria such as nitrosomonas, nitrobacter, any nitrifier, etc., and the gas management system 24 may introduce, for example, atmospheric or pure oxygen, into the container 32B. In this exemplary embodiment, the second type of organism may not be a phototrophic or mixotrophic organism or an organism that uses molecularly bound oxygen such as nitrate ($NO_3$) and, thus, does not require sunlight to grow. Since sunlight may not be required, the housing 76B may be opaque as illustrated. The wastewater within container 32B may be treated for any desired amount of time such as, for example, 48 hours, 72 hours, or an extended period of time in either a batch or continuous manner, and the frame 108B may be rotated and operated in any of the manners described herein or any other manner within the intended spirit and scope of the present invention.

In some exemplary embodiments, the wastewater resulting from treatment in container 32B in the above-described exemplary manner may have a high concentration of nitrate ($NO_3$). The wastewater having a high concentration of nitrate may require additional treatment to reduce or eliminate the concentration of nitrate in the wastewater. Thus, the liquid management system 28 evacuates the wastewater from container 32B and introduces the wastewater into container 32C. In the illustrated exemplary embodiment, container 32C includes a transparent housing 76C, a rotatable frame 108C and media 110C disposed in the housing 76C, and is adapted to receive a third type of organism therein to treat wastewater. The third type of organism may be different than the first and second types of organisms. The gas management system 24 provides the appropriate gas to the container 32C to facilitate treatment of the wastewater with the third type of organism. To treat the exemplary wastewater having a high nitrate concentration, the third type of organism may be, for example, an organism such as, for example, algae, and the gas management system 24 may introduce, for example, carbon dioxide, into container 32C. In instances where the third type of organism is a phototrophic, mixotrophic, or other organism requiring light, the transparent housing 76C facilitates penetration of sunlight therethrough and into engagement with the phototrophic or mixotrophic organism, and the gas management system 24 introduces carbon dioxide into the housing 76C, both of which may be required for the photosynthetic process to occur. The phototrophic or mixotrophic organism also absorbs the nitrate present in the water during the photosynthetic process to reduce the concentration of nitrate in the wastewater. The organism may also expel oxygen into the water during wastewater treatment, thereby aerating the water. Such aeration by the organism may reduce or eliminate the need to aerate the water with an external oxygen source, thereby leading to cost savings. The wastewater within container 32C may be treated for any desired amount of time such as, for example, 48 hours, 72 hours, or an extended period of time in either a batch or continuous manner, and the frame 108C may be rotated and operated in any of the manners described herein or any other manner within the intended spirit and scope of the present invention.

In some exemplary embodiments, the wastewater may be evacuated from container 32C and may be transferred downstream for further treatments, release into the environment, etc.

As indicated above, the above described manner of operating the systems 20 is for exemplary purposes only and is not intended to be limiting upon the spirit and scope of the present invention. Thus, numerous other manners of operation and equivalents are possible and are intended to be within the intended spirit and scope of the present invention.

The wastewater treatment systems described above may be used in a variety of different manners to achieve a variety of different desired results. The following description relating to FIG. 176 exemplifies a manner of operating the systems to achieve an exemplary result. The following exemplary operation is for illustrative purposes and is not intended to be limiting. Many other types of uses and operations are contemplated and are within the spirit and scope of the present invention.

Referring to FIG. 176, a system is illustrated and includes a plurality of wastewater treatment units 1400A, 1400B, 1400C, a gas management system 24, and a liquid management system 28. In the illustrated exemplary embodiment, unit 1400A includes a container or retaining wall 1404A, an opaque cover 1408A, a plurality of rotatable frames 108A and media 110A disposed in the retaining wall 1404A, and is adapted to receive a first type of organism therein to treat wastewater. The gas management system 24 provides the appropriate gas to the unit 1400A to facilitate treatment of the wastewater with the first type of organism. In some exemplary embodiments, the wastewater introduced into unit 1400A via the liquid management system 28 may have a high percentage of carbon, nitrogen, and/or phosphorous (i.e., wastewater nutrients) therein and it may be desirable to remove the excess quantity of wastewater nutrients from the wastewater. In such exemplary embodiments, the wastewater may originate from, for example, domestic or municipal sewage, industrial process wastewater including, but not limited to, domestic or municipal sewage, beverage bottling, seafood processing, soup manufacturers, meat manufacturers, prepared food manufacturers, pet food formulators, feedlot wastewater, and most other organic waste streams. To treat such an exemplary wastewater, the first type of organism may be, for example, bacteria and the gas management system 24 may introduce, for example, atmospheric oxygen, pure oxygen, carbon dioxide, or other carbon sources such as, for example, methanol, liquid or solid granules of sugar, etc., into unit 1400A. In this exemplary embodiment, the first type of organism is not a phototrophic organism and, thus, does not require sunlight to grow. Since sunlight is not required, the cover 1408A may be opaque as illustrated. The wastewater within unit 1400A may be treated for any desired amount of time such as, for example, 48 hours, 72 hours, or an extended period of time in either a batch or continuous manner, and the frame 108A may be rotated and operated in any of the manners described herein or any other manner within the intended spirit and scope of the present invention.

In some exemplary embodiments, the wastewater resulting from treatment in unit 1400A in the above-described exemplary manner may have a high concentration of ammonia. The wastewater having a high concentration of ammonia may require additional treatment to reduce or eliminate the concentration of ammonia in the wastewater. Thus, the liquid management system 28 evacuates the wastewater from unit 1400A and introduces the wastewater into unit 1400B. In the illustrated exemplary embodiment, unit 1400B includes a container or retaining wall 1404B, an opaque cover 1408B, a plurality of rotatable frames 108B and media 110B disposed in the retaining wall 1404B, and is adapted to receive a second type of organism therein to treat wastewater. The second type of organism may be different than the first type of organism. The gas management system 24 provides the appropriate gas to unit 1400B to facilitate treatment of the wastewater with the second type of organism. To treat the exemplary wastewater having a high ammonia concentration, the second type of organism may be, for example, a nitrosomonas, nitrobacter, any nitrifier, etc., and the gas management system 24 may introduce, for example, atmospheric or pure oxygen, into unit 1400B. In this exemplary embodiment, the second type of organism is not a phototrophic organism and, thus, does not require sunlight to grow. Since sunlight is not required, the cover 1408B may be opaque as illustrated. The wastewater within unit 1400B may be treated for any desired amount of time such as, for example, 48 hours, 72 hours, or an extended period of time in either a batch or continuous manner, and the frame 108B may be rotated and operated in any of the manners described herein or any other manner within the intended spirit and scope of the present invention.

In some exemplary embodiments, the wastewater resulting from treatment in unit 1400B in the above-described exemplary manner may have a high concentration of nitrate ($NO_3$). The wastewater having a high concentration of nitrate may require additional treatment to reduce or eliminate the concentration of nitrate in the wastewater. Thus, the liquid management system 28 evacuates the wastewater from unit 1400B and introduces the wastewater into unit 1400C. In the illustrated exemplary embodiment, unit 1400C includes a container or retaining wall 1404C, a transparent cover 1408C, a plurality of rotatable frames 108C and media 110C disposed in the retaining wall 1404C, and is adapted to receive a third type of organism therein to treat wastewater. The third type of organism may be different than the first and second types of organisms. The gas management system 24 provides the appropriate gas to unit 1400C to facilitate treatment of the wastewater with the third type of organism. To treat the exemplary wastewater having a high nitrate concentration, the third type of organism may be, for example, an organism such as, for example, algae, and the gas management system 24 may introduce, for example, carbon dioxide into unit 1400C. In instances where the third type of organism is a phototrophic, mixotrophic, or other organism requiring light, the transparent cover 1408C facilitates penetration of sunlight therethrough and into engagement with the phototrophic or mixotrophic organism, and the gas management system 24 introduces carbon dioxide into unit 1400C, both of which may be required for the photosynthetic process to occur. The phototrophic or mixotrophic organism also absorbs the nitrate present in the wastewater during the photosynthetic process to reduce the concentration of nitrate in the wastewater. The organism may also expel oxygen into the water during wastewater treatment, thereby aerating the water. Such aeration by the organism may reduce or eliminate the need to aerate the water with an external oxygen source, thereby leading to cost savings. The wastewater within unit 1400C may be treated for any desired amount of time such as, for example, 48 hours, 72 hours, or an extended period of time in either a batch or continuous manner, and the frame 108C may be rotated and operated in any of the manners described herein or any other manner within the intended spirit and scope of the present invention.

In some exemplary embodiments, the wastewater may be evacuated from unit 1400C and may be transferred downstream for further treatments, release into the environment, etc.

As indicated above, the above described manner of operating the systems is for exemplary purposes only and is not intended to be limiting upon the spirit and scope of the present invention. Thus, numerous other manners of operation and equivalents are possible and are intended to be within the intended spirit and scope of the present invention.

The preceding description of the various systems and operations illustrated in FIGS. 1-174 primarily relates to treatment of wastewater. These systems also may be used for alternative purposes. For example, the act of treating wastewater with microorganisms causes the microorganisms to produce desirable byproducts and such desirable byproducts may be harvested as a result of wastewater treatment. As an example, microorganisms may have secretions that are introduced into the wastewater or headspace and such secretions may be harvested from the wastewater and/or headspace. Exemplary secretions include, but are not limited to, metabolic byproducts, hydrocarbons, ethanol, sugars, proteins, oxygen, carbon dioxide, hydrogen, methane, etc. Also, for example, microorganisms used to treat wastewater within the systems may themselves be harvested and converted to other products such as, for example, biofuel, human and animal comestible products, pharmaceuticals, etc. It should be understood that the systems disclosed herein may have a variety of uses other than the specific examples described and illustrated herein, and such alternative uses are intended to be within the intended spirit and scope of the present invention.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

The invention claimed is:

1. A method of treating wastewater, the method comprising:

providing a container including a first member, a second member spaced apart from the first member, and at least one media strand supported by and extending between the first and second members, wherein the first member, second member, and the at least one media strand are at least partially positioned within the container;

wherein each of the first and second members includes a plurality of apertures defined therethrough to receive and secure the at least one media strand to the spaced apart first and second members;

introducing an organism into the container, wherein the organism is supported on the media strand;

introducing wastewater into the container;

submerging the organism and at least a portion of the media strand in the wastewater; and rotating the first member, second member, and media strand within the container.

2. The method of claim 1, wherein introducing the organism and introducing the wastewater occur simultaneously.

3. The method of claim 1, wherein the organism is introduced into the container in the wastewater.

4. The method of claim 1, wherein introducing the organism into the container occurs prior to introducing the wastewater into the container.

5. The method of claim 1, wherein rotating the first member, second member, and media strand further comprises rotating the first member, second member, and media strand with a motor.

6. The method of claim 1, wherein rotating the first member, second member, and media strand further comprises rotating the first member, second member, and media strand with wastewater movement in the container.

7. The method of claim 1, further comprising partially filling the container with wastewater to provide a headspace in the container above the wastewater.

8. The method of claim 7, wherein rotating the first member, second member, and media strand within the container further comprises rotating at least a portion of the media strand and the organism from submersion in the wastewater to exposure in the headspace.

9. The method of claim 1, further comprising providing a liquid management system for introducing the wastewater into the container, the liquid management system including at least one pipe in fluid communication with the container and at least one pump in fluid communication with the pipe.

10. The method of claim 1, further comprising:

providing a gas management system; and introducing a gas into the container with the gas management system.

11. The method of claim 10, wherein introducing a gas into the container further comprises introducing the gas into the wastewater positioned in the container.

12. The method of claim 10, further comprising partially filling the container with the wastewater to provide a headspace in the container above the wastewater, and wherein introducing a gas into the container further comprises introducing the gas into the headspace in the container.

13. The method of claim 1, wherein the media strand includes an elongated member and a plurality of projections extending from the elongated member.

14. The method of claim 1, wherein the media strand includes an elongated member and a plurality of loops extending from the elongated member.

15. The method of claim 1, wherein each of the at least one media strands are strung back and forth between the first and second members through the apertures.

16. The method of claim 10, further comprising the steps of:

measuring the pH of the wastewater within the container; and adjusting the amount of gas introduced into the container by the gas management system based on the measured pH.

* * * * *